US010527806B2

(12) United States Patent
Butler et al.

(10) Patent No.: US 10,527,806 B2
(45) Date of Patent: Jan. 7, 2020

(54) GLASS-BASED FERRULES AND OPTICAL INTERCONNECTION DEVICES AND METHODS OF FORMING SAME

(71) Applicant: CORNING RESEARCH & DEVELOPMENT CORPORATION, Corning, NY (US)

(72) Inventors: Douglas Llewellyn Butler, Painted Post, NY (US); Michael de Jong, Colleyville, TX (US); Alan Frank Evans, Beaver Dams, NY (US); Robin May Force, Corning, NY (US); James Scott Sutherland, Corning, NY (US)

(73) Assignee: Corning Research & Development Corporation, Charlotte, NC (US)

( * ) Notice: Subject to any disclaimer, the term of this patent is extended or adjusted under 35 U.S.C. 154(b) by 0 days.

(21) Appl. No.: 16/430,509

(22) Filed: Jun. 4, 2019

(65) Prior Publication Data

US 2019/0302376 A1 Oct. 3, 2019

Related U.S. Application Data

(63) Continuation of application No. 15/919,550, filed on Mar. 13, 2018, now Pat. No. 10,345,535.

(Continued)

(51) Int. Cl.

*G02B 6/42* (2006.01)
*G02B 6/38* (2006.01)
*G02B 6/36* (2006.01)

(52) U.S. Cl.

CPC ......... *G02B 6/4292* (2013.01); *G02B 6/3874* (2013.01); *G02B 6/3882* (2013.01);

(Continued)

(58) Field of Classification Search

None

See application file for complete search history.

(56) References Cited

U.S. PATENT DOCUMENTS

| | | | |
|---|---|---|---|
| 5,321,785 | A | 6/1994 | Iida et al. |
| 5,377,286 | A | 12/1994 | Iida et al. |

(Continued)

FOREIGN PATENT DOCUMENTS

| | | | |
|---|---|---|---|
| EP | 176623 | A1 | 4/1986 |
| JP | 8334651 | A | 12/1996 |

(Continued)

OTHER PUBLICATIONS

Brusberg et al; "Detachable Optical Connectors for Optical Chips and Methods of Fabricating the Same" ; Filed Internationally as PCT/US2018/022091 on Mar. 13, 2018; 63 Pages.

(Continued)

*Primary Examiner* — Jerry Rahll

(74) *Attorney, Agent, or Firm* — Adam R. Weeks

(57) ABSTRACT

The glass-based ferrules include a glass substrate and two spaced-apart guide tubes, which can also be made of glass. The guide tubes include bores sized to receive guide pins from another ferrule. The ferrule can be used to form an optical interconnection device in the form of a waveguide connector that includes a planar lightwave circuit that supports multiple waveguides. The ferrule can also be used to form an optical interconnection device in the form of a fiber connector that includes a support substrate and an array of optical fibers supported thereby. The waveguide connector and fiber connector when mated form an integrated photonic device. Methods of forming the ferrule components, the ferrules and the optical interconnection devices are also disclosed.

35 Claims, 82 Drawing Sheets

Related U.S. Application Data

(60) Provisional application No. 62/472,042, filed on Mar. 16, 2017.

(52) U.S. Cl.
CPC ........... *G02B 6/3885* (2013.01); *G02B 6/423* (2013.01); *G02B 6/4257* (2013.01); *G02B 6/3636* (2013.01); *G02B 6/3821* (2013.01); *G02B 6/3825* (2013.01); *G02B 6/3881* (2013.01); *G02B 6/4206* (2013.01)

(56) References Cited

U.S. PATENT DOCUMENTS

| | | | | |
|---|---|---|---|---|
| 5,764,833 | A | 6/1998 | Kakii et al. | |
| 6,243,518 | B1 | 6/2001 | Lee et al. | |
| 6,321,019 | B1 | 11/2001 | Shibuya et al. | |
| 7,048,447 | B1 | 5/2006 | Patel et al. | |
| 7,156,561 | B2 | 1/2007 | Patel et al. | |
| 8,586,188 | B1 | 11/2013 | Kim et al. | |
| 9,304,264 | B2 | 4/2016 | Bowen et al. | |
| 9,561,897 | B2 | 2/2017 | Chen et al. | |
| 10,288,812 | B1 * | 5/2019 | Evans | G02B 6/30 |
| 2006/0204179 | A1 | 9/2006 | Patel et al. | |
| 2014/0321809 | A1 | 10/2014 | Bowen et al. | |
| 2017/0097482 | A1 * | 4/2017 | Furuya | G02B 6/30 |
| 2018/0267255 | A1 * | 9/2018 | Butler | G02B 6/3874 |

FOREIGN PATENT DOCUMENTS

| | | | |
|---|---|---|---|
| JP | 2003043305 | A | 2/2003 |
| JP | 2005345951 | A | 12/2005 |

OTHER PUBLICATIONS

Butler et al; "Fiber Array Assemblies for Multifiber Connectorized Ribbon Cables and Methods of Forming Same" ; Filed as US15/797355 on Oct. 30, 2017; 57 Pages.

Evans et al; "Integrated Electrical and Optoelectronic Package" ; Filed Internationally as PCT/US2018/020907 on Mar. 5, 2018.

Matiss et al; "Universal Photonic Adaptor for Coupling an Optical Connector to an Optoelectronic Substrate" ; Filed Internationally as PCT/US2018/021000 on Mar. 6, 2018; 163 Pages.

Morimoto et al; "90 Bent With R=1MM Optical Fiber Technique for Optical Interconnection" ; Proc. Spie; 6891; Organic Photonic Materials and Devices X, 6891F (Feb. 12, 2008); pp. 38910F-1-68910F-11.

Yilmaz et al; "Effects of Geometric Parameters on the Pin-Bearing Strength of Glass/ Polyphenylenesulphide Composites" ; Journal of Compsite Materials; Sep. 2009; p. 2239-2253.

* cited by examiner

GLASS-BASED FERRULES AND OPTICAL INTERCONNECTION DEVICES AND METHODS OF FORMING SAME

PRIORITY APPLICATIONS

This application is a continuation of U.S. application Ser. No. 15/919,550, filed on Mar. 13, 2018, which claims the benefit of priority to U.S. application Ser. No. 62/472,042, filed on Mar. 16, 2017, both applications being incorporated herein by reference.

FIELD

The present disclosure relates to optical interconnection devices, and in particular to glass-based ferrules and to glass-based optical interconnection devices that employ the glass-based ferrules, and methods of forming the glass-based ferrules and the glass-based optical interconnection devices.

BACKGROUND

Optical interconnection devices can be used to optically connect a first optical waveguide to a second optical waveguide, or a first set of optical waveguides to a second set of optical waveguides. The optical waveguides can be optical fibers. Such optical interconnection devices are referred to in the art as fiber-to-fiber connectors.

Optical interconnection devices can also be used to optically connect one or more optical fibers to one or more optical waveguides of a planar light circuit (PLC) or an integrated photonic device such as a photonic integrated circuit (PIC). Such optical interconnection devices are referred to in the art as fiber-to-chip connectors. Because optical fibers have relatively small core diameters, e.g., on the order of 10 microns for single mode fibers, fiber-to-fiber connectors and fiber-to-chip connectors need to establish alignment with their counterpart connector or waveguide connector to submicron accuracy.

A conventional way of achieving such accuracy when optically connecting optical fiber arrays is to use multifiber push-on/pull-off (MPO) connectors that employ mechanical transfer (MT) ferrules as the main component. The MT ferrule is made of a polymer thermoplastic material such as polyphenylene sulfide (PPS) or thermoset materials. The component cost of MTP connectors is typically several dollars, which is relatively expensive. Furthermore, the coefficient of thermal expansion (CTE) of the MT ferrule differs substantially from silicon. This large difference in the CTE values of the two materials can create alignment issues (e.g., unacceptable lateral misalignment between cores) when connecting an MPO connector to a silicon-based PIC. For example, over a temperature range of 60° C., the CTE difference between the polymer thermoplastic of the MPO connectors and the silicon-based PIC can result in a maximum misalignment of 0.8 microns or greater over a linear array of 12 fibers spaced on 250 micrometer pitch, which when compounded with other sources of misalignment can lead to significantly higher insertion loss.

As greater and greater demands are placed on fiber-to-fiber and fiber-to-chip connectors with respect to size (form factor), alignment tolerances and insertion loss for both fiber-to-fiber and fiber-to-chip applications, it is becoming increasingly problematic to employ conventional optical fiber connectors.

SUMMARY

An embodiment of the disclosure includes a ferrule, which can be used for waveguide connector or a fiber connector. The ferrule includes: a glass substrate having a front end, a back end, a first surface, a second surface opposite the first surface, opposite sides, and a central axis that runs through the center of the glass substrate between the front and back ends; and first and second guide tubes each having a tube central axis, a front end, an outer surface and a longitudinal bore with a central bore axis, wherein the first and second guide tubes are secured to either the first surface or the second surface of the glass substrate at their respective outer surfaces, the first and second guide tubes being spaced apart with their respective bore axes running in substantially the same direction as the substrate central axis.

Another embodiment of the disclosure includes a waveguide connector that utilizes the ferrule as described above as a waveguide connector ferrule in combination with a PLC. The PLC has a top surface, a front end, a back end, and a PLC central axis that runs through the center of the PLC between the front and back ends. The PLC supports a plurality of waveguides that run substantially in the direction of the PLC central axis. Each waveguide has a top surface and an end face proximate the front end of the PLC. The ferrule is secured to the top surface of the PLC so that the bore axes of the first and second guide tubes of the ferrule run substantially in the same direction as the PLC central axis.

Another embodiment of the disclosure includes a photonic integrated device formed using the waveguide connector as described above and a fiber connector. The waveguide connector ferrule includes first alignment features. The fiber connector includes a plurality of optical fibers comprising a portion with exposed cores and also having a fiber connector ferrule with second alignment features. The fiber connector ferrule operably engages with the waveguide connector ferrule via cooperation of the first and second alignment features so that a portion of the top surfaces of the waveguides of the PLC are aligned with and in optical communication with the exposed cores of the optical fibers to define respective evanescent coupling regions for evanescent optical coupling between the waveguides and the optical fibers.

Another embodiment of the disclosure includes a fiber connector that utilizes the ferrule as described above as a fiber connector ferrule. The fiber connector also includes: a fiber support substrate having a front end, a back end, opposite first and second surfaces, and a substrate central axis that runs through the center of the fiber support substrate between the front and back ends; a plurality of optical fibers disposed on the first or second surface of the fiber support substrate and that run substantially in the same direction as the substrate central axis, with each optical fiber having an end face proximate the front end of the fiber support substrate; and wherein the fiber connector ferrule is operably attached to the fiber support substrate so that the bore axes of the first and second guide tubes of the fiber connector ferrule run substantially in the same direction as the support substrate central axis.

Another embodiment of the disclosure includes an attachment fixture for receiving and locking to a fiber connector having a housing with sides that respectively include a first locking feature. The attachment fixture includes: a mounting section comprising first and second spaced apart mounting pads that reside in a first plane; first and second spaced apart guide arms that respectively outwardly extend from the first and second mounting pads and that respectively reside in second planes transverse to the first plane to define a receiving region between the first and second guide arms, wherein each guide arm has a top side, a bottom side, a back end and a second locking feature; a support beam that connects the first and second guide arms at the back end at either the top sides or the bottom sides of the guide arms; and wherein the receiving region is sized to receive the housing of the fiber connector so that the second locking feature of the guide arms operably engages the first locking feature of the fiber connector housing.

Another embodiment of the disclosure includes an attachment fixture for attaching to a PLC and for receiving and locking to a fiber connector. The attachment fixture includes: a mounting section comprising first and second spaced apart mounting pads that reside in a first plane; and at least one guide arm that extends outwardly from the mounting section and defines a receiving region for the fiber connector, the at least one guide arm having first and second prongs that define a central slot and also comprising at least one locking feature configured to operably engage and disengage with a complimentary locking feature of the fiber connector.

Another embodiment of the disclosure includes a method of forming a ferrule for a waveguide connector or a fiber connector. The method includes: engaging first and second guide tubes with an alignment jig that holds the first and second guide tubes in a spaced apart configuration with a select pitch, the first and second guide tubes, a longitudinal bore with a central bore axis; bringing a surface of a glass substrate into contact with the outer surfaces of the first and second guide tubes; and securing the first and second guide tubes to the surface of the glass substrate.

Another embodiment of the disclosure includes a method of forming a plurality of ferrules for a waveguide connector or a fiber connector. The method includes: engaging first and second long guide tubes with an alignment jig that holds the first and second long guide tubes in a spaced apart configuration with a select pitch; bringing a surface of a long glass substrate into contact with the outer surfaces of the first and second long guide tubes; securing the first and second long guide tubes to the surface of the long glass substrate; and dicing the first and second long guide tubes and the long glass substrate along one or more dicing lines to form the plurality of ferrules.

Another embodiment of the disclosure includes a method of forming a waveguide connector from a ferrule and PLC having a plurality of waveguides. The method includes: engaging the ferrule with an active alignment jig that includes first and second guide pins and a plurality of optical fibers, wherein the ferrule includes first and second guide tubes attached to a glass substrate and wherein the first and second guide pins removably engage the first and second guide tubes; using the active alignment jig, bringing the ferrule into contact with a surface of the PLC so that the waveguides are at least coarsely aligned with and in optical communication with the optical fibers of the active alignment jig; actively aligning the ferrule relative to the PLC by directing light through at least one of the waveguides and into the corresponding at least one optical fiber and measuring an amount of optical power outputted by the at least one optical fiber while adjusting the relative position of one of the ferrule and the PLC to determine a target position of the ferrule relative to the PLC; and securing the ferrule to the PLC at the target position.

Another embodiment of the disclosure includes a method of forming a fiber connector from a ferrule and a fiber support structure that supports first optical fibers. The method includes: engaging the ferrule with an active alignment jig that includes first and second guide pins and second optical fibers, wherein the ferrule includes first and second guide tubes attached to a glass substrate and wherein the first and second guide pins removably engage the first and second guide tubes; using the active alignment jig, bringing the ferrule into contact with the fiber support structure so that the first optical fibers are at least coarsely aligned with and in optical communication with the second optical fibers; performing active alignment of the ferrule relative to the fiber support structure by directing light through at least one of the first optical fibers and into the corresponding at least one of the second optical fibers and measuring an amount of optical power outputted by the at least one second optical fiber while adjusting the relative position of the ferrule and the fiber support structure to define a target position of the ferrule relative to the support substrate; and securing the ferrule to the fiber support structure at the target position.

Another embodiment of the disclosure includes a method of forming a fiber connector from a ferrule and first optical fibers. The method includes: engaging the ferrule with an active alignment jig that includes first and second guide pins and second optical fibers, wherein the ferrule includes first and second guide tubes attached to a glass substrate and a cover attached to the guide tubes opposite the glass substrate, and wherein the first and second guide pins removably engage the first and second guide tubes; disposing the first optical fibers and a securing material onto the cover so that the first optical fibers are at least coarsely aligned with and in optical communication with the second optical fibers; disposing a V-groove substrate having V-grooves onto the first optical fibers and the securing material so that the V-grooves engage the first optical fibers and the securing material; directing light through at least one of the first optical fibers and into the corresponding at least one of the second optical fibers and measuring an amount of optical power outputted by the at least one second optical fiber while adjusting the relative position of the V-groove substrate on the cover; and securing the V-groove substrate to the cover using the securing material.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which.

DETAILED DESCRIPTION

Figure 1A:
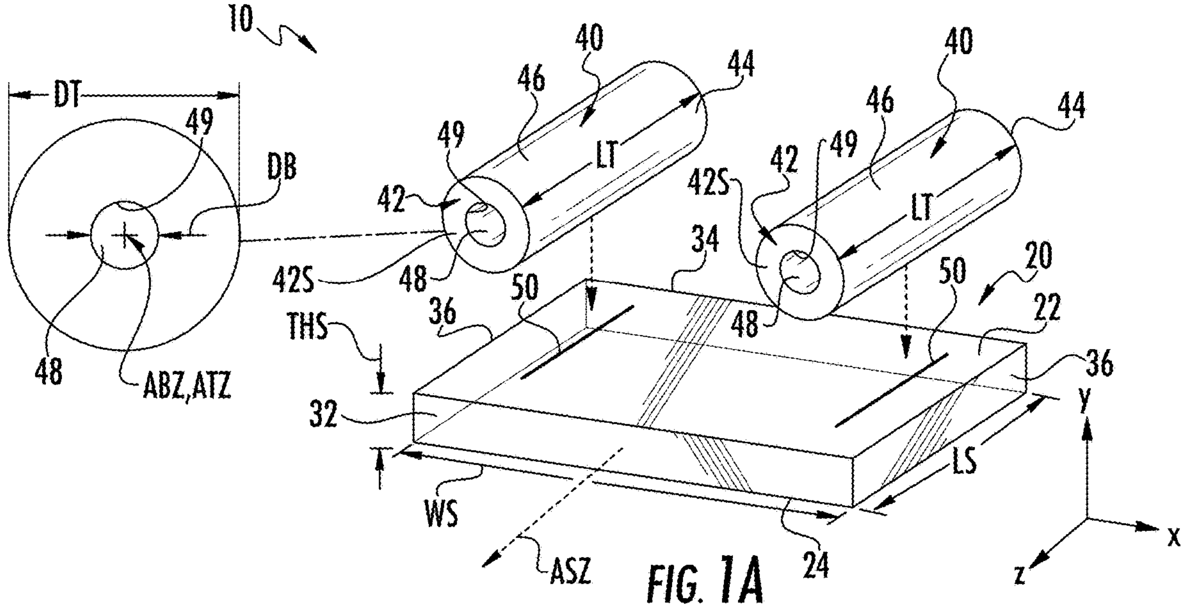
FIG. 1A through 1D are front elevated views illustrating a method of forming a ferrule as disclosed herein.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

The acronym PLC stands for planar lightwave circuit and generally refers to a passive optical device comprising one or more waveguides operably supported on or in a rectangular (or, more specifically, a rectangular cuboid) substrate. Example PLCs are fabricated from glass (e.g., with ion exchange or deposited dielectric waveguides) or from Si (e.g., with deposited dielectric waveguides).

The acronym PIC stands for "photonic integrated circuit" and refers to an active device that includes either PLC or one or more optical waveguides, as well as one or more types active components, such as light emitters and/or light detectors operably arranged relative to the waveguides of the PLC, and/or electronic circuitry and electronic processing components, etc.

The term "waveguide connector" is used to describe an optical interface device that includes a PLC.

The term "fiber connector" is used to describe an optical interface device that includes one or more optical fibers.

The waveguide connectors and the fiber connectors disclosed herein are configured to operably (matingly) engage with one another so that there is optical communication between the waveguides of the waveguide connector and the optical fibers of the fiber connector.

The term "integrated photonic device" means a waveguide connector operably engaged with a fiber connector.

The terms "process" and "method" are used interchangeably herein.

The term "substantially constant" as used herein is understood to mean "constant to within manufacturing limitations or to within manufacturing tolerances."

Overview

The present disclosure relates to optical interconnection devices, and in particular to glass-based ferrules and to glass-based optical interconnection devices that employ the glass-based ferrules, and methods of forming the glass-based ferrules and the glass-based optical interconnection devices. Here, the term "glass based" means at least a portion of the ferrules and optical interconnection devices is made of glass. In some cases, the ferrules and optical interconnection devices are made entirely of glass, in which case they can be referred to as an "all-glass ferrule" and an "all-glass optical interconnection device," respectively.

More particularly, aspects of the disclosure are directed to the design and fabrication of ferrules that are made substantially of or entirely of precision glass parts. The ferrules are used to form optical interface devices. Two main types of optical interface devices are disclosed, namely a waveguide connector and a fiber connector. The waveguide connector and the fiber connector are configured to operably engage to form one or more optical interconnections between waveguides and optical fibers, as described below.

When a ferrule is used to form a waveguide connector, the ferrule is referred to as a waveguide connector ferrule. Likewise, when a ferrule is used to form a fiber connector, the ferrule is referred to as a fiber connector ferrule. Thus, in examples, a waveguide connector ferrule and a fiber connector ferrule can have identical constructions, and in this case the prefixes "waveguide" and "connector" are used for convenience and merely refer to the type of connector the ferrules are being used to form.

Ferrule Fabrication

Figure 1B:
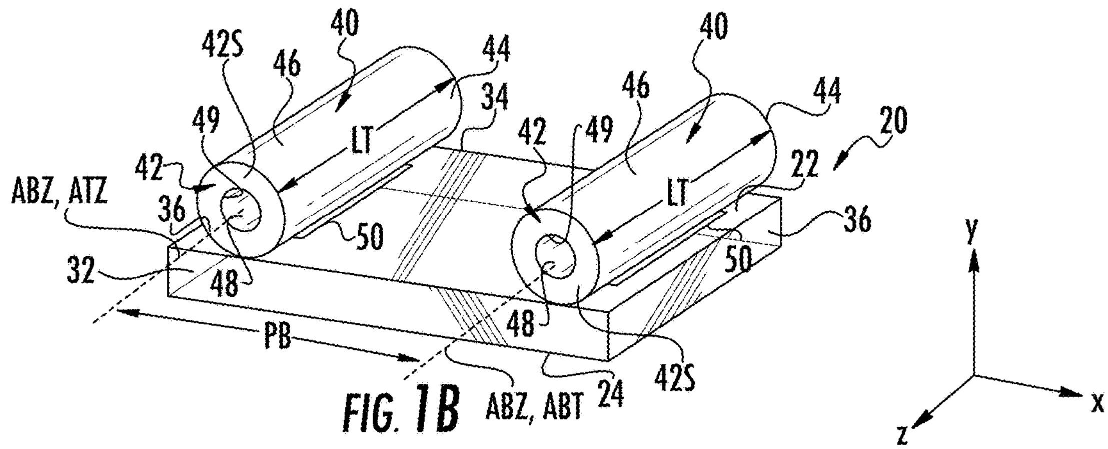
Figure 1C:
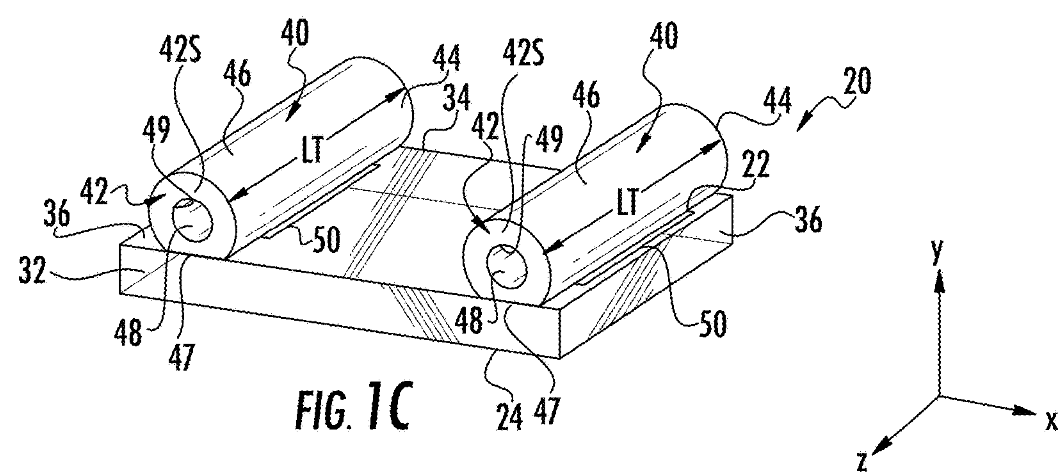

FIG. 1A through 1C are front elevated views illustrating a method of forming (fabricating) a ferrule 10. FIG. 1A is an exploded elevated view of the ferrule 10. The ferrule 10 includes a support substrate 20 having a body 21 that defines a top surface 22 and a bottom surface 24. The support substrate 20 also has a front end 32, a back end 34 and sides 36. The support substrate has a central axis ASZ that runs in the z-direction through the center of the body 21 and thus through the front and back ends 32 and 34. In an example, the sides 36 are parallel and reside in respective y-z planes and the top and bottom surfaces 22 and 24 are parallel and reside in respective x-z planes. As used herein, "parallel", "substantially parallel", or "generally parallel, means that the structure is parallel within acceptable manufacturing tolerances for suitable operation of the device such as within two degrees or less.

In an example, the body 21 of the support substrate 20 is made of glass. In an example, the support substrate 20 is substantially planar, i.e., can have small variations from perfect planarity due to manufacturing limitations or from certain features (e.g., V-grooves, alignment marks, etc.) that can be formed on or in the body 21. In an example, the support substrate 20 defines a rectangular cuboid having a substantially constant thickness THS in the y-direction, a substantially constant width WS in the x-direction, and a substantially constant length LS in the z-direction. In an example, the thickness THS is in the range defined by 0.3 mm≤THS≤1.5 mm. Also in an example, with width WS and the length LS are respectively in the ranges defined by 2 mm≤WS≤10 mm and 2 mm≤LS≤10 mm; however, other suitable dimension are possible according to the concepts disclosed herein. Here, the ranges indicate allowable substantially constant values of the given dimension for a given support substrate and not a variation of the dimension that can occur within a given support substrate.

In an example, the substrate thickness THS is well controlled, e.g., to within ±5 microns or to within ±2 microns or to within ±1 micron. In one specific and non-limiting example, the support substrate 20 has a width WS of 6.2 mm, length of 6 mm and a thickness THS of 333 microns ±5 microns. In an example, the support substrate 20 is polished, e.g., by mechanical polishing or laser polishing.

Figure 1D:
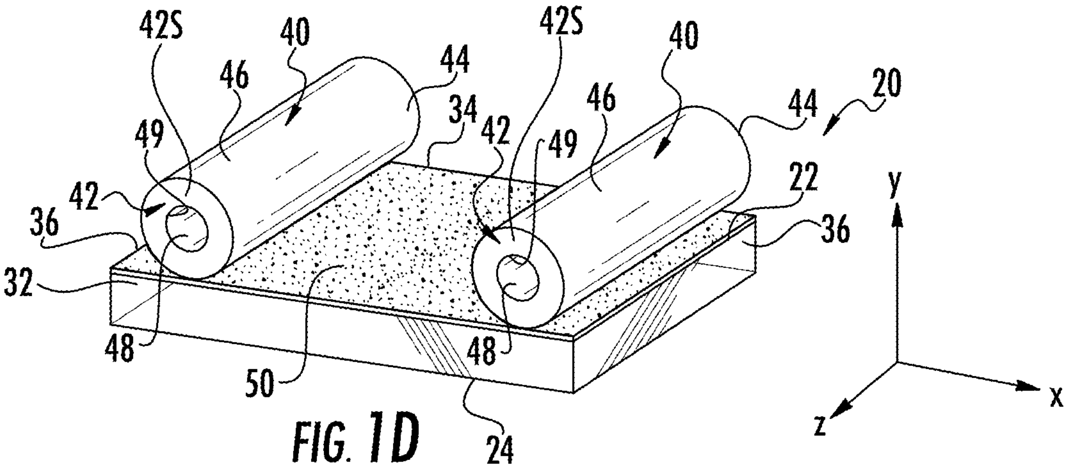

The ferrule 10 includes two (i.e., first and second) guide tubes 40. Each guide tube 40 has a front end 42, a back end 44, an outer surface 46, a tube central axis ATZ, and a longitudinal bore 48 (i.e., that runs in the z-direction) having a central axis ABZ. The front end 42 includes a front-end surface 42S. In an example, the bore 48 is centered on the tube central axis ATZ so that the bore central axis ABZ is coaxial with the tube central axis to within manufacturing tolerances. The guide tube 40 has a length LT, an outer diameter DT, and a bore diameter DB. In an example, the length LT is in the range 1 mm≤LT≤10 mm, and the outer diameter DT is in the range 0.7 mm≤DT≤2.0 mm. In an example, the bore diameter is in the range (0.3)·DT≤DB≤(0.9)·DT or (0.3)·DT≤DB≤(0.7)·DT The guide tubes 40 are secured to the top surface 22 of the support substrate 20. This can be accomplished using, for example, a securing material 50, which in examples can be an adhesive (e.g., a light-activated adhesive such as a UV-curable adhesive) or glass associated with a laser-soldering process (i.e., a glass solder) or a laser-welding process (i.e., a glass weld). The securing material 50 can also coat a larger portion of the top surface 22, including the entire top surface, as shown in FIG. 1D.

In an example, the front ends 42 of the guide tubes 40 reside in the same plane as the front end 32 of the support substrate 20 while the back ends 44 of the guide tubes reside in the same plane as the back end 34 of the support substrate. In another example, the front ends 42 of the guide tubes 40 can reside at a select offset relative to the front end 32 of the support substrate 20. Likewise, the back ends 44 of the guide tubes 40 can reside at a select offset relative to the back end 34 of the support substrate 20.

The guide tubes 40 are arranged such that the tube central axes ATZ are substantially parallel with each other and with the substrate central axis ASZ (i.e., the bore central axes run in substantially the same direction as the substrate central axis). The bore central axes ABZ have a center-to-center spacing or pitch PB and define the pitch for the spaced-apart guide tubes 40. In an example, the pitch PB is between 4 mm and 5 mm, e.g., 4.6 mm. Also in an example, the pitch PB has a tolerance of <0.5 micron. Other values for the pitch PB can also be employed as described in greater detail below.

In an example, the guide tubes 40 are made of glass. In other examples, the guide tubes 40 are made of metal, polymer or ceramic. Example metals include stainless steel, aluminum, copper, nickel alloys, invar, kovar, titanium, etc. The use of glass guide tubes 40 allows for the fabrication of an all-glass ferrule 10.

Figure 1E:
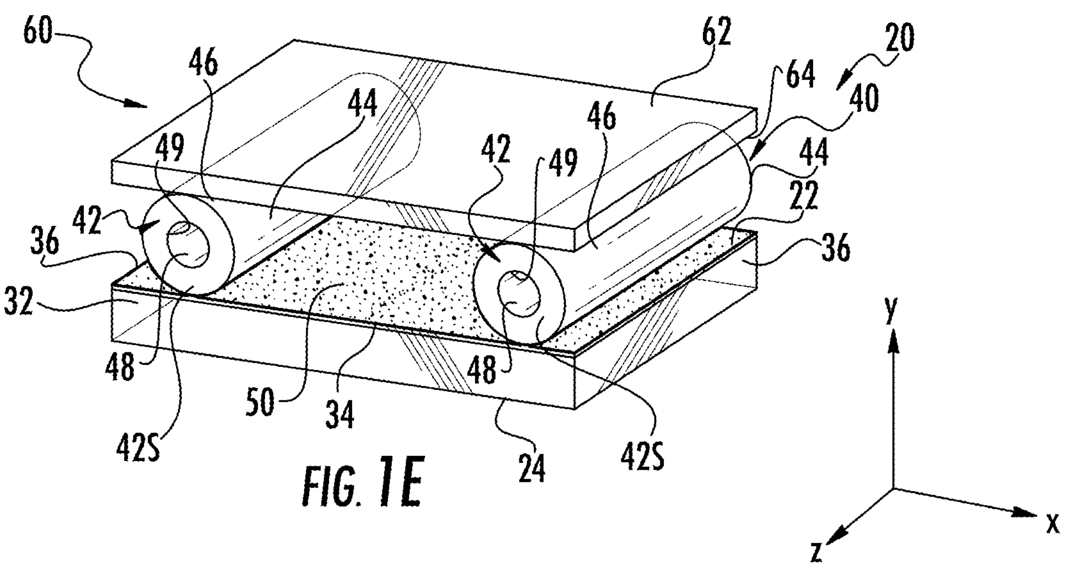
FIG. 1E is similar to FIG. 1D and shows an example where the ferrule includes an optional cover.

FIG. 1E is similar to FIG. 1D and shows an example ferrule 10 having a cover sheet ("cover") 60 secured to the guide tubes 40 on the opposite side of the support substrate 20. The cover 60 is used to provide additional mechanical strength to the ferrule 10 and to maintain the alignment of the guide tubes 40. The cover has a top surface 62 and a bottom surface 64. In an example, the cover 60 is made of glass, and further in the example is made of the same glass as the support substrate 20.

The guide tubes 40 are generally shown and described herein as having circular cross-sectional shapes for ease of illustration and explanation. However, other cross-sectional shapes can also be used. In the example shown in FIG. 1C, the outer surface 46 of each guide tube 40 has a flat section 47 that runs the length of the guide tube. In general, guide tube 40 can have at least one flat section 47. For example, a guide tube 40 having a square or rectangular cross-sectional shape will have four flat sections 47. Having at least one flat section 47 is advantageous in that it facilitates securing the guide tubes 40 to the top surface 22 of the support substrate 20, as shown in FIG. 1C. The at least one flat section 47 can be formed by polishing (e.g., mechanical polishing on a diamond polishing wheel, or laser polishing). Methods of forming the guide tubes 40 include using a drawing process are discussed in greater detail below.

In an example, the guide tubes 40 are formed or processed in a manner that have a precisely located outer surface 46 and bore 48 so that the relative positions of tube central axis ATZ, the bore central axis ABZ and the outer surface 46 are known to within a relatively high tolerance, e.g., <0.25 micron. Likewise, in an example, the support substrate 20 is formed or processed such that the top surface 22 has a high degree of flatness, e.g., the thickness THS has a tolerance of 5 microns or less.

Ferrule Fabrication Using V-Groove Alignment Jig

The process of forming ferrule 10 is preferably carried out in a way that takes advantage of the precision fabrication of its main components, namely the support substrate 20 and guide tubes 40. To this end, precision alignment jigs can be employed to carry out a kinematic assembly method.

Figure 2A:
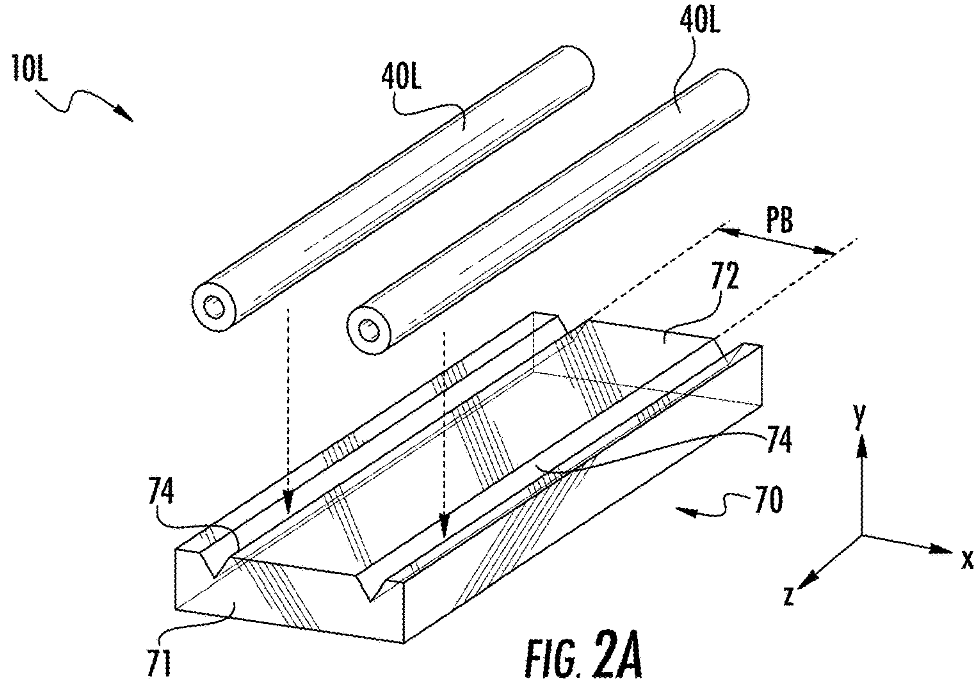
FIG. 2A is an exploded view that shows long guide tubes disposed relative to a V-groove alignment jig as part of a method of forming multiple ferrules.
Figure 2B:
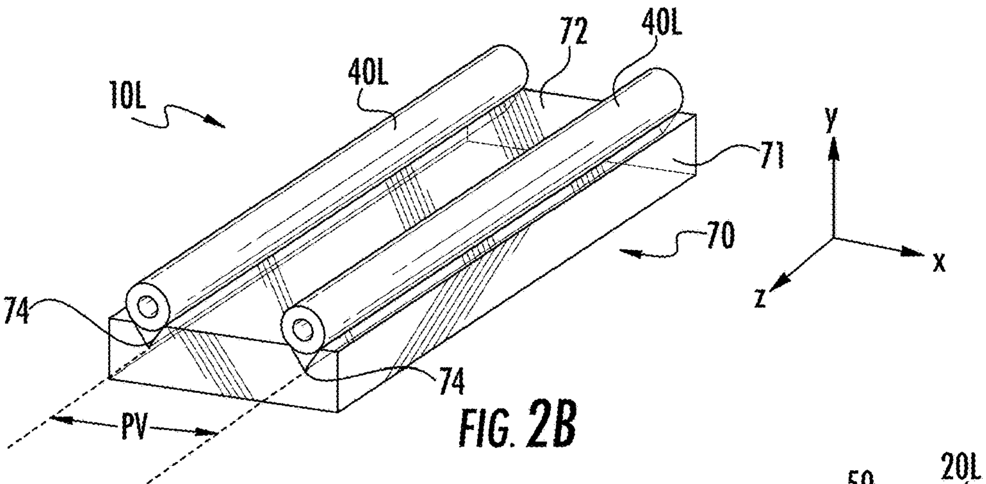
FIG. 2B shows the long guide tubes residing in the V-grooves of the V-groove alignment jig of FIG. 2A.

FIG. 2A is an exploded view that shows long guide tubes 40L disposed relative to a V-groove alignment jig 70. The V-groove alignment jig 70 includes a block 71 having a top surface 72 with two parallel V-grooves 74 that have a pitch PV, which is the same as the desired guide tube pitch PB. FIG. 2B shows the long guide tubes 40L residing in the V-grooves 72 of the V-groove alignment jig 70.

Figure 3A:
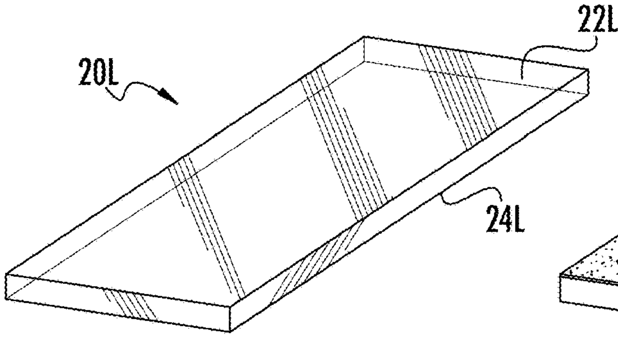
FIG. 3A is an elevated view of an example long support substrate.
Figure 3B:
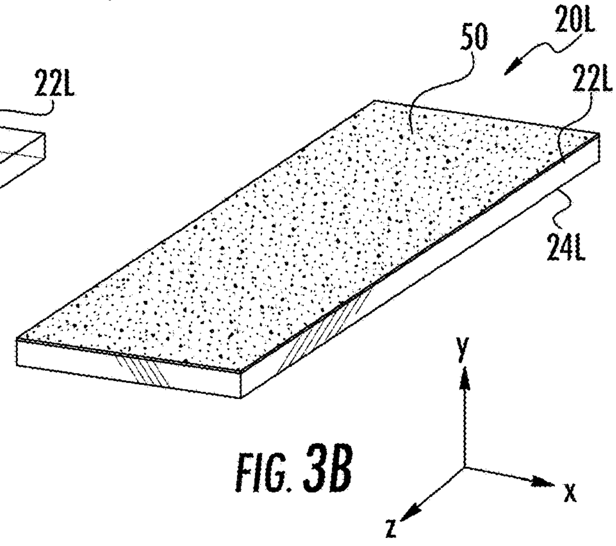
FIG. 3B is an elevated view of the same support substrate of FIG. 3A but that now includes a layer of securing material.

FIG. 3A is an elevated view of an example long support substrate 20L having a top surface 22L, while FIG. 3B is an elevated view of the same support substrate of FIG. 3A but that now includes a layer of securing material 50 on the top surface. The securing material 50 may be applied using for example a spray application, doctor blading, screen printing, jet printing or other localized deposition technologies for securing materials as known in the art.

Figure 4A:
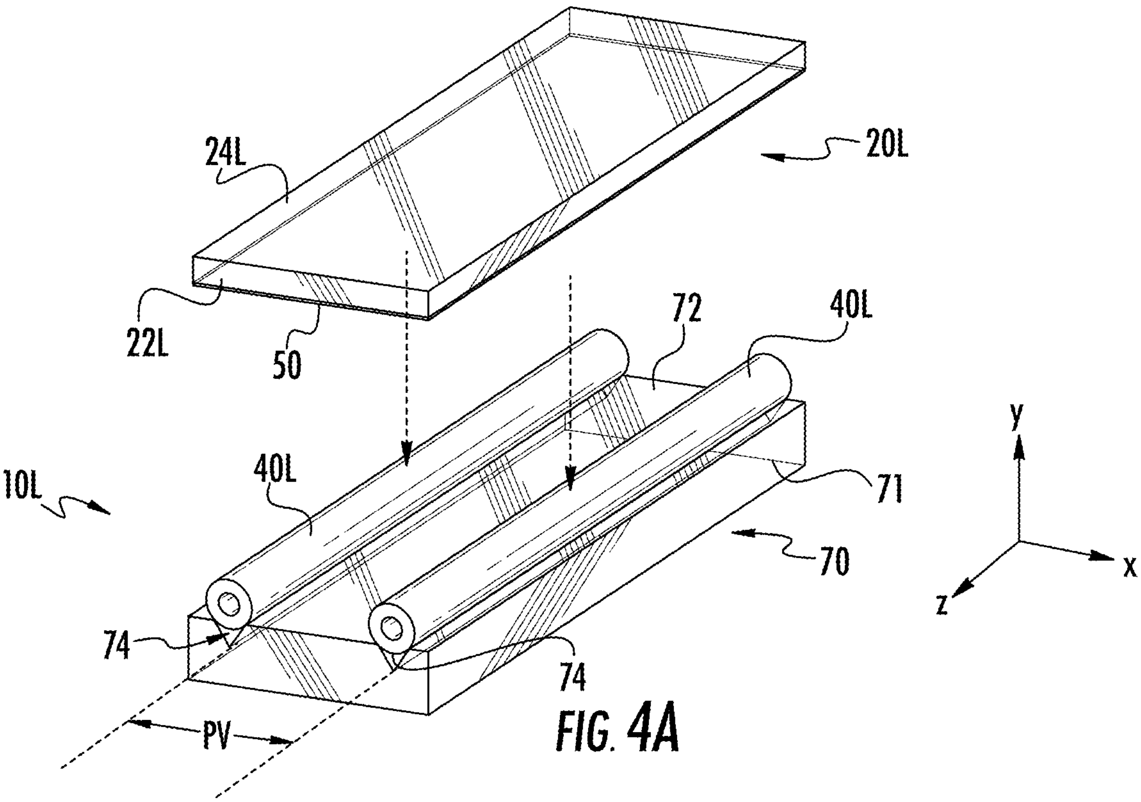
FIG. 4A is similar to FIG. 2B and shows the long support substrate with its top surface facing downward so that the layer of securing material faces the long guide tubes.
Figure 4B:
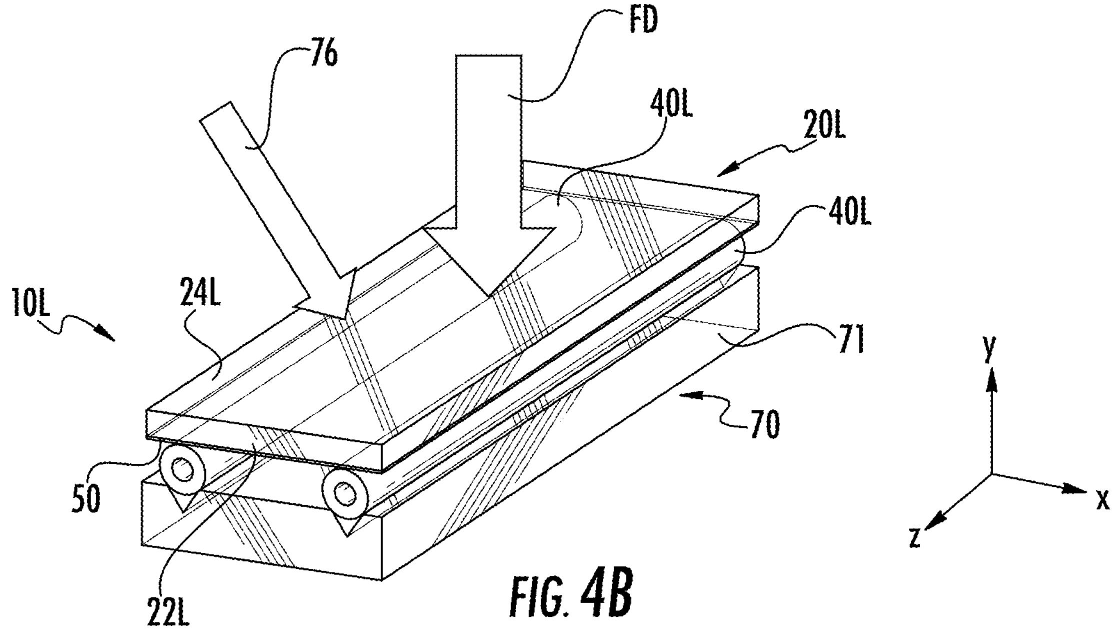
FIG. 4B is similar to FIG. 4A and shows the long support substrate in contact with the tops of the long guide tubes with a downward force, and also showing irradiation of the securing material to activate the securing material.

FIG. 4A is similar to FIG. 2B and shows the long support substrate 20L with its top surface 22 facing downward so that the layer of securing material 50 faces the long guide tubes 40L. The long support substrate 20L is then lowered onto the long guide tubes 40L so that the adhesive material 50 contacts the tops of the long guide tubes, as shown in FIG. 4B. The securing material 50 the secures the long guide tubes 40L to the long support substrate 20L in the parallel and spaced-apart configuration with the select pitch PV=PB as defined by the V-groove alignment jig 70. In an example, a downward force FD is applied to the long support substrate 20L while the securing material is activated (cured), e.g., by ultraviolet (UV) irradiation 76. The result is a long ferrule structure 10L.

Figure 4C:
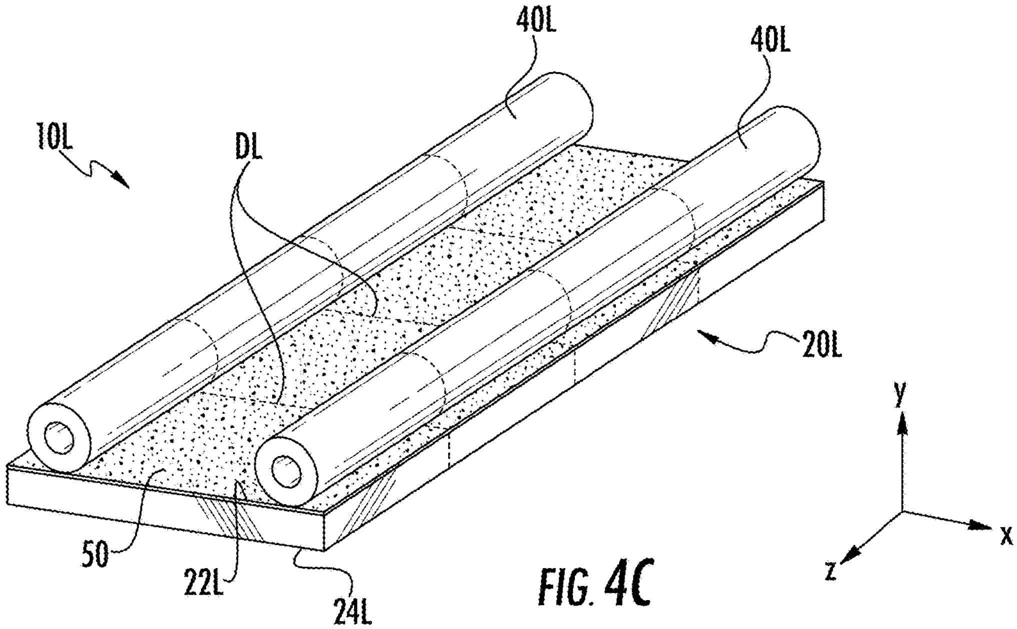
FIG. 4C is a front elevated view of the resulting long ferrule structure formed by the method step shown in FIG. 4B, and shows dicing lines.
Figure 4D:
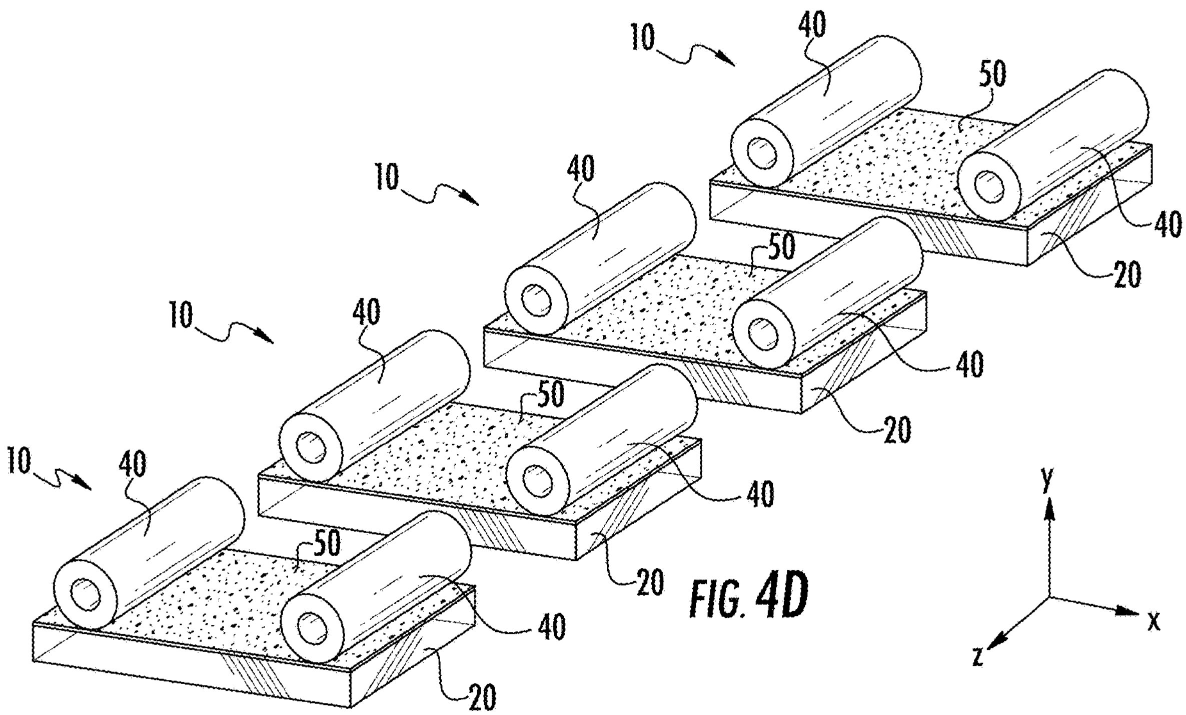
FIG. 4D shows the result of dicing the long ferrule structure along the dicing lines to form multiple individual ferrules.

Since the long guide tubes 40L are not attached to the V-groove alignment jig 70, the V-groove alignment jig can now be removed, and the long ferrule structure 10L can be flipped over as shown in FIG. 4C. Dicing lines DL that run perpendicular to the long guide tubes 40L are then selected. FIG. 4D shows the result of dicing the long ferrule structure 10L along the dicing lines DL to form multiple individual ferrules 10.

The long ferrule structure 10L of FIG. 4C was purposely made extra long as part of the fabrication method so that it could be diced into smaller sections to simply the manufacturing of large numbers of ferrules 10. An advantage of this dicing process is that provides clean edges for the support substrate 20 and guide tubes 40. The dicing process can also be used to create angles on one or both of the front and back ends 42 and 44 of the guide tubes 40, as described below.

Figure 4E:
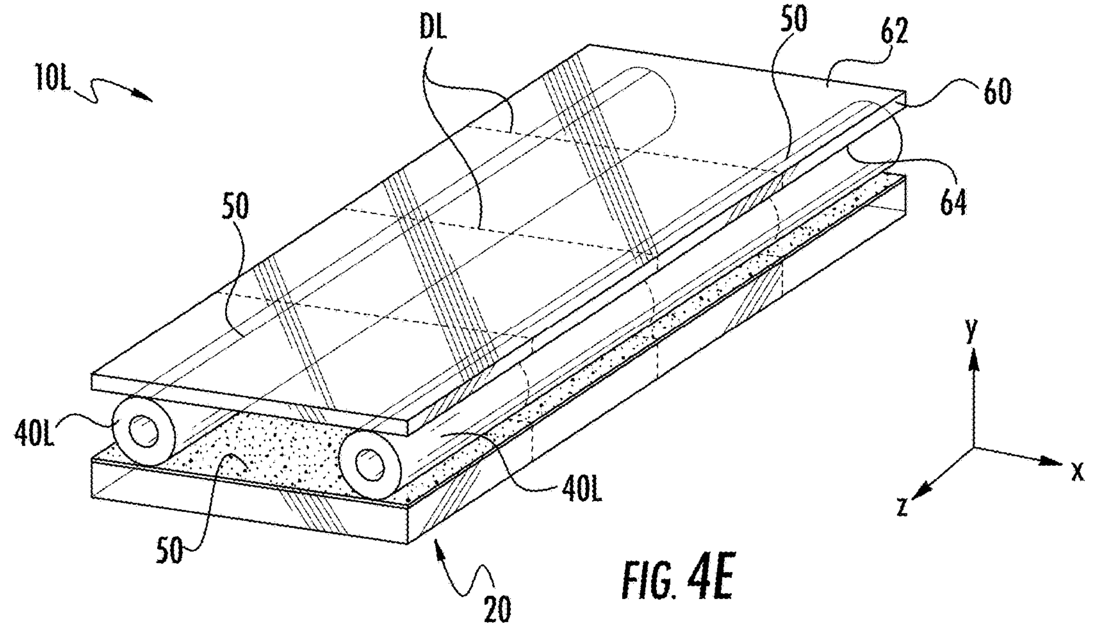
FIGS. 4E and 4F are similar to FIGS. 4C and 4D, and illustrate an example where the long ferrule structure includes a long cover so that each ferrule includes a cover.
Figure 4F:
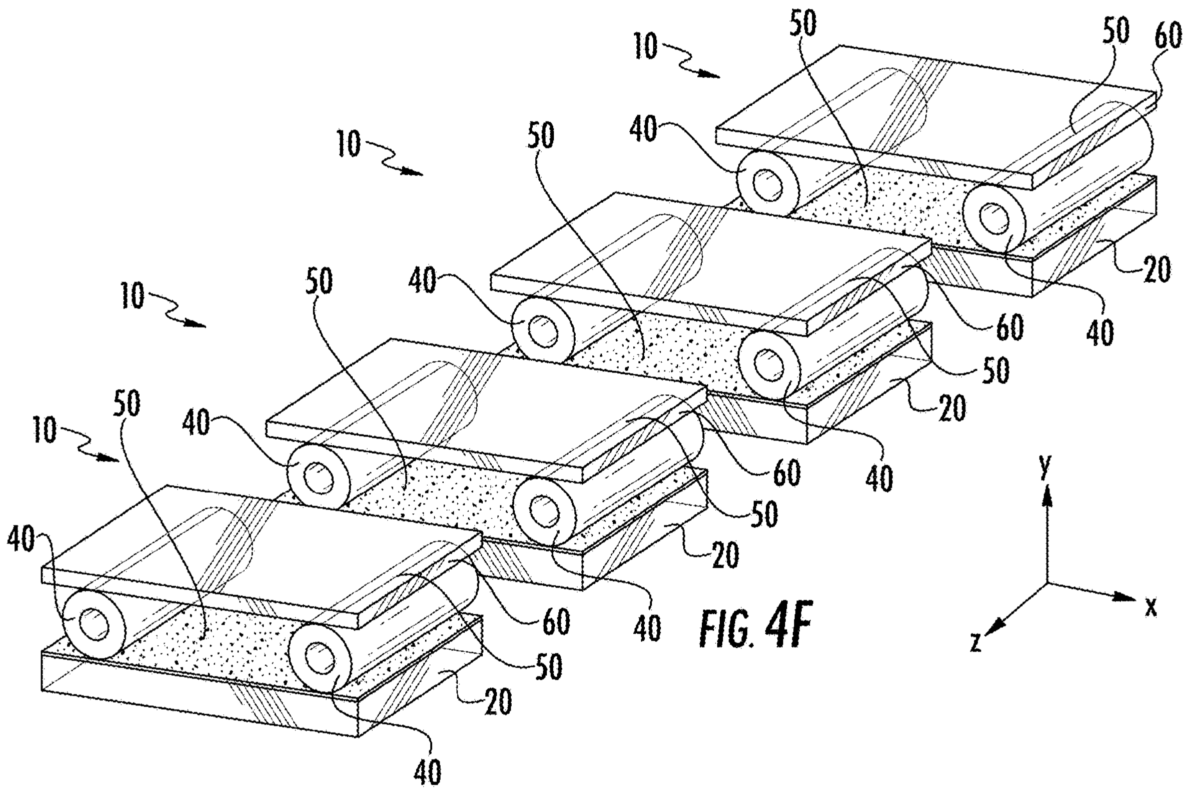

FIGS. 4E and 4F are similar to FIGS. 4C and 4D and illustrate an embodiment wherein the long ferrule structure 10L includes a long cover sheet 60L so when diced along the dicing lines DL, each ferrule 10 includes the cover sheet 60.

Ferrule Fabrication Using Guide-Pin Alignment Jig

Figure 5A:
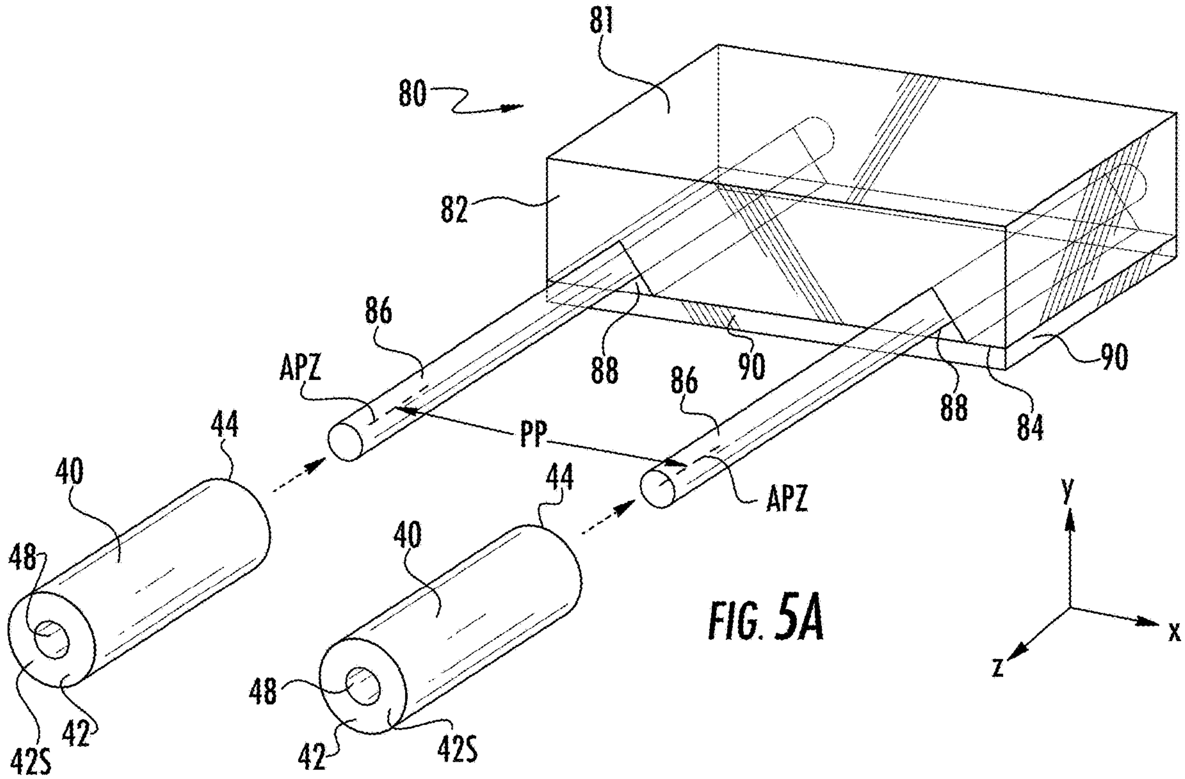
FIGS. 5A and 5B are front elevated views of an example guide-pin alignment jig used to engage the guide tubes used form the ferrule.

FIG. 5A is an elevated view of an example guide-pin alignment jig 80. The guide-pin alignment jib 80 has a block 81 having a front end 82 and a bottom surface 84. Two parallel and spaced-apart guide pins 86 each having a guide-pin central axis APZ extend from the front end 82 and have a spacing or pitch PP=PB, i.e., the same as the desired pitch PB of the guide tubes 40. In an example, the guide pins 86 are held in parallel V-grooves 88 formed in the bottom surface 84 and held in place with a cover sheet 90. In an example, the guide-pin alignment jig 80 can be formed using the V-groove alignment jig 70 described above by just adding the guide pins 86 to the V-grooves 74, then adding cover sheet 90 over the top surface 72, and then flipping over the resulting assembly. In an example, the guide pins 86 can be made of a metal while in other examples the guide pins can be made of glass, ceramic, polymer, etc.

Figure 5B:
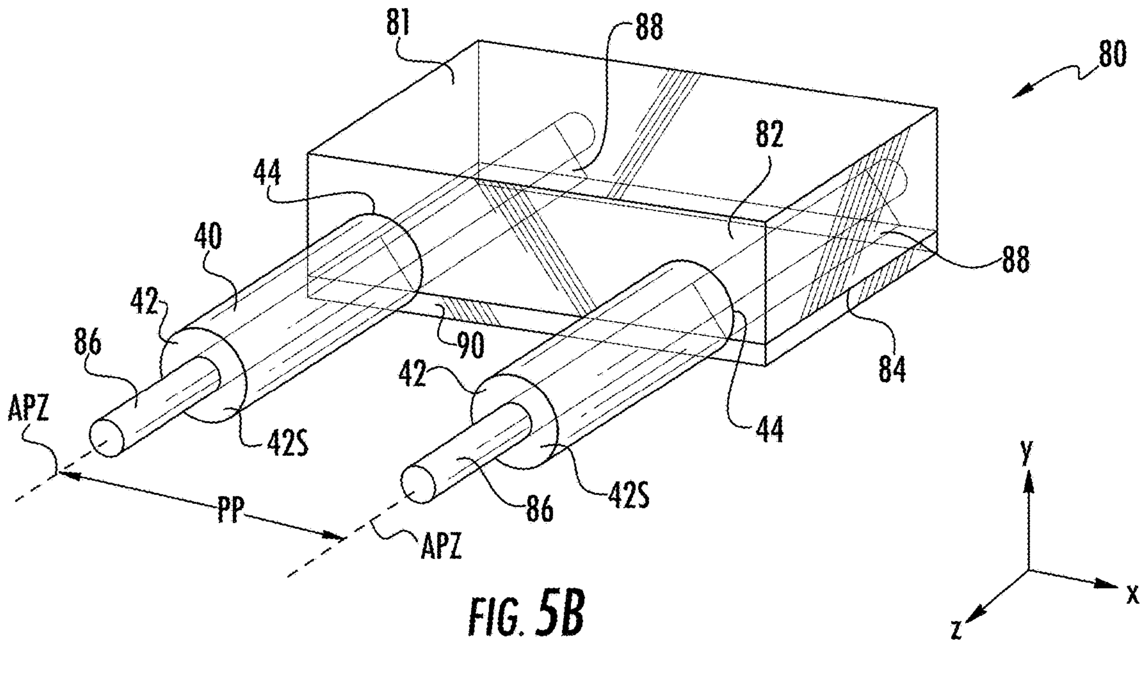

The guide pins 86 are sized to closely fit within the bores 48 of the guide tubes 40. Thus, the two guide tubes 40 are slid over the respective guide pins 86, as shown in FIGS. 5A and 5B. Note that the two guide tubes 40 are not secured to the guide pins 86 so that the guide pins and the guide tubes can slide relative to one another. This sliding action can be facilitated by a lubrication material, as discussed in greater detail below. In an example, the tips of the guide pins 86 can be tapered to facilitate insertion of the guide pins into the bores 48 of the guide tubes 40, also has discussed in greater detail below. The guide pins 86 and the bores 48 of the guide tubes 40 constitute an example of complementary alignment features that can be used in the ferrule 10 and the fiber connector ferrule 510 disclosed herein.

Figure 6A:
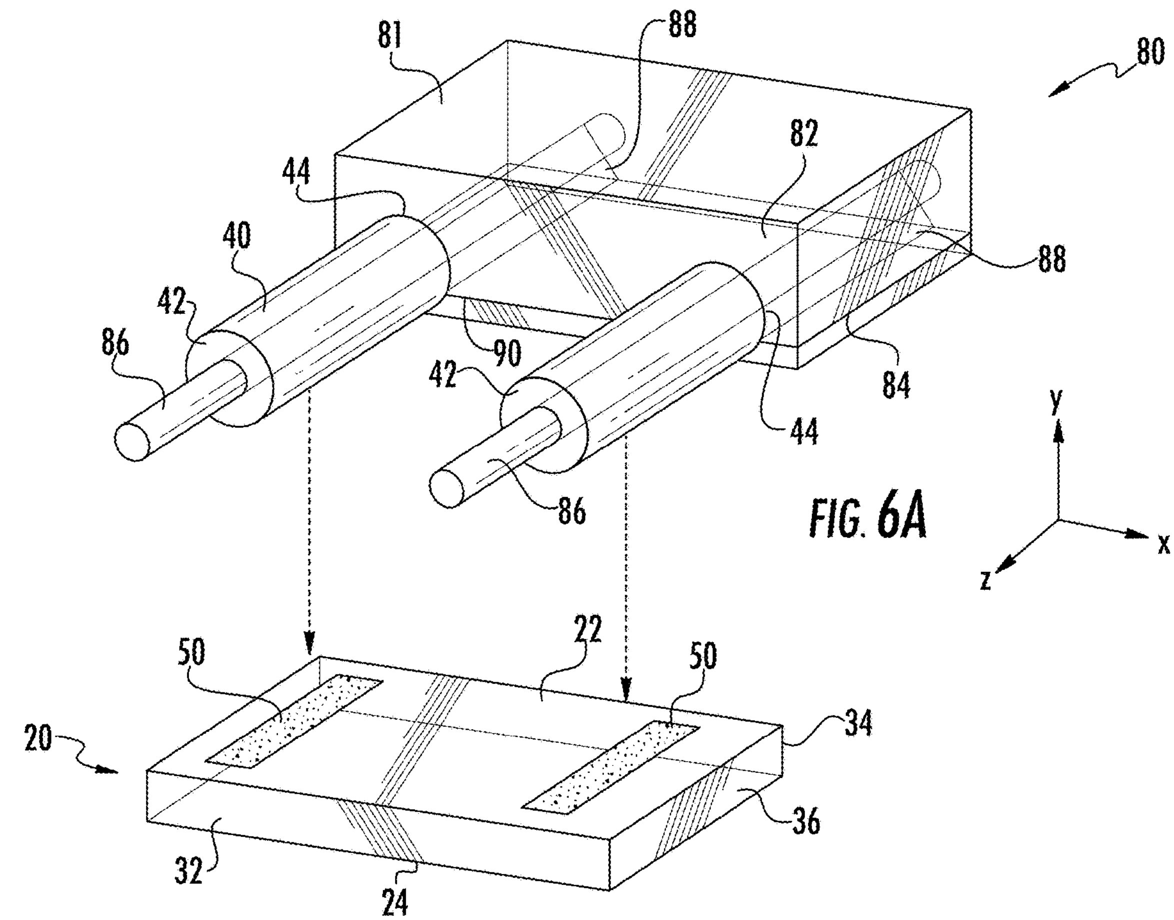
FIGS. 6A and 6B are front elevated views showing the guide tubes engaged with the guide pins of the guide-pin alignment jig and being placed on and secured to a glass substrate.

FIG. 6A is similar to FIG. 5B and shows the guide-pin alignment jig 80 and the guide tubes 40 in place on the guide pins 86, and also shows the support substrate 20 with securing material 50 in place on the top surface 22 of the support substrate. The guide-pin alignment jig 80 is then lowered (or the support substrate 20 is raised) so that the bottoms of the guide tubes 40 contact the securing material 50. Once the securing material 50 cures (e.g., is activated with UV radiation 76), the guide-pin alignment jig 80 is removed, leaving the ferrule 10 as shown in FIG. 1C. Note that in an alternative approach, the securing material 50 can also be applied directly to the bottoms of the guide tubes 40 rather than to the top surface 22 of the support substrate.

Figure 6B:
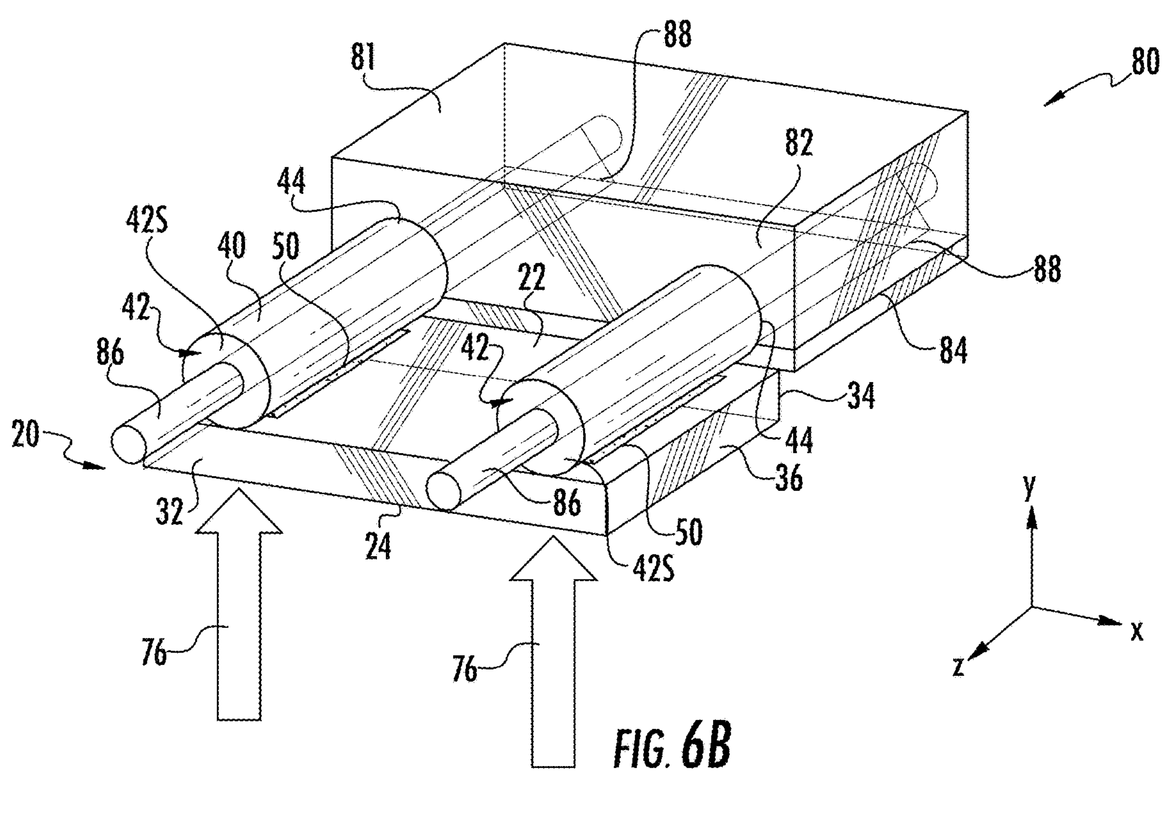
Figure 7A:
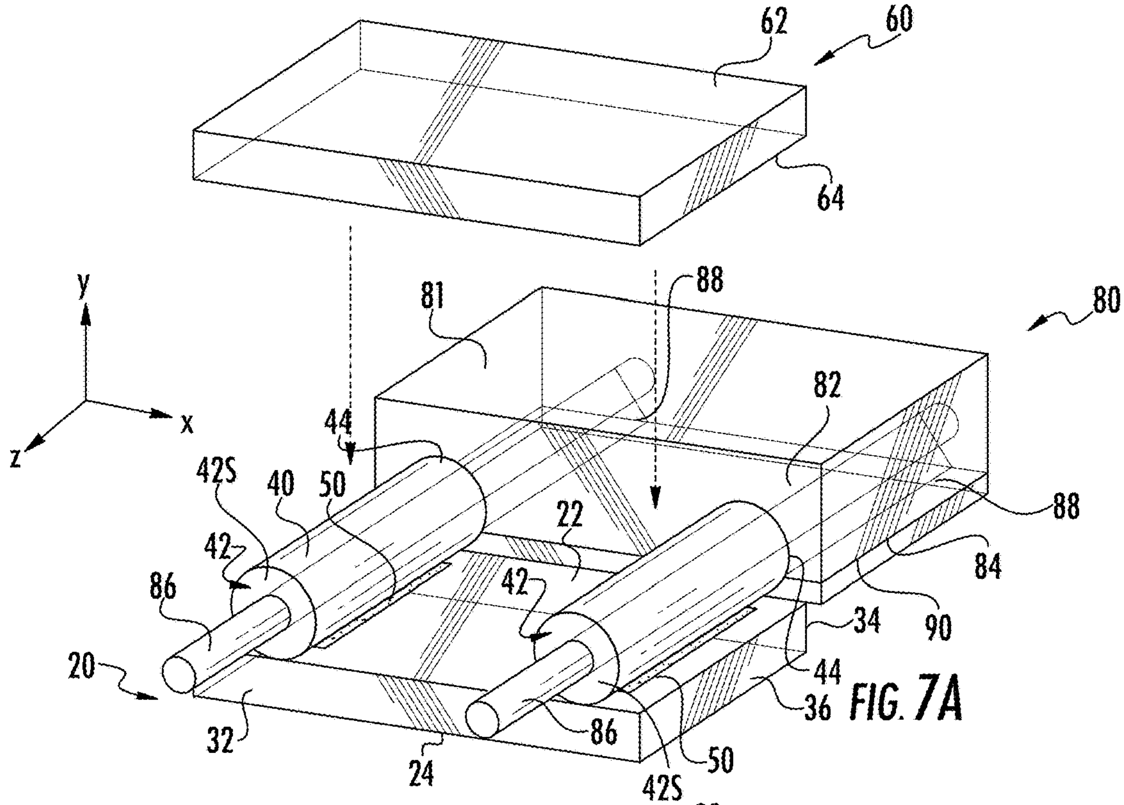
FIGS. 7A through 7C are front-elevated views that illustrate the additional steps associated with adding a cover sheet to the ferrule using the guide-pin alignment jig.
Figure 7B:
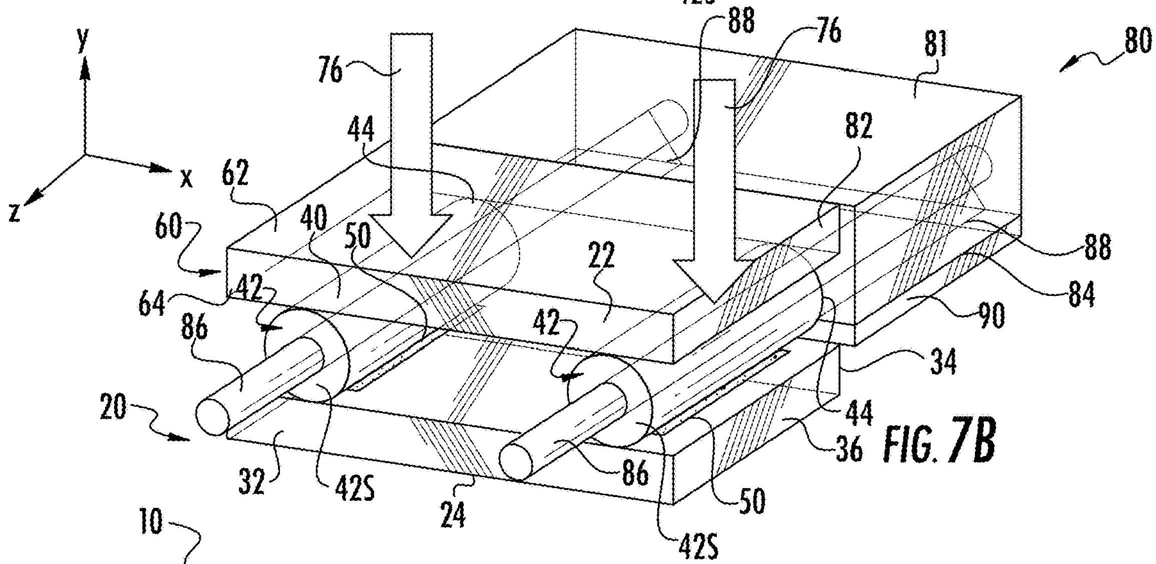
Figure 7C:
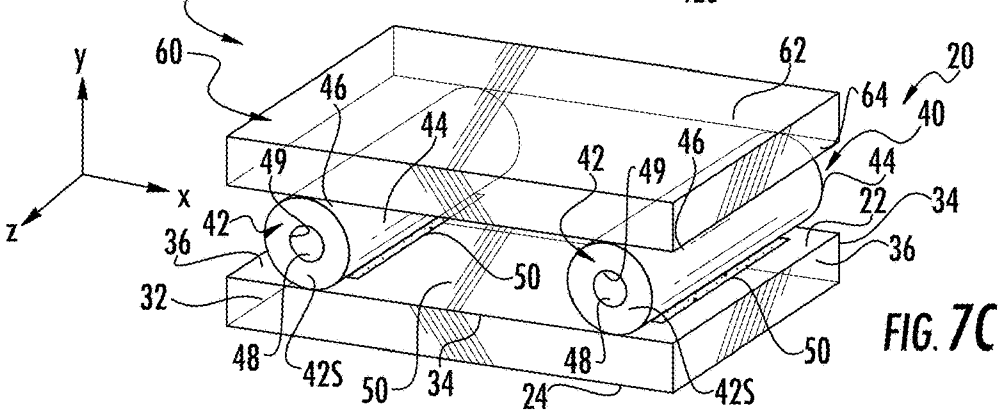

FIGS. 7A through 7C show an example process that adds the cover sheet 60 to the ferrule 10 while the guide tubes 40 are still engaged with the guide pins 86 of the guide-pin alignment jig 80. FIG. 7A is similar to FIG. 6B and shows the cover sheet 60 disposed above the guide tubes 40. The tops of the guide tubes 40 are then brought into contact with the cover sheet 60. The securing material 50 can be used to secure the cover sheet 60 to the tops of the guide tubes 40. Once the cover sheet 60 is so secured (e.g., by exposing UV-activating adhesive by UV radiation 76), the guide-pin alignment jig 80 is removed to form the final ferrule 10, as shown in FIG. 7C.

Waveguide Connector Fabrication Process

Figure 8A:
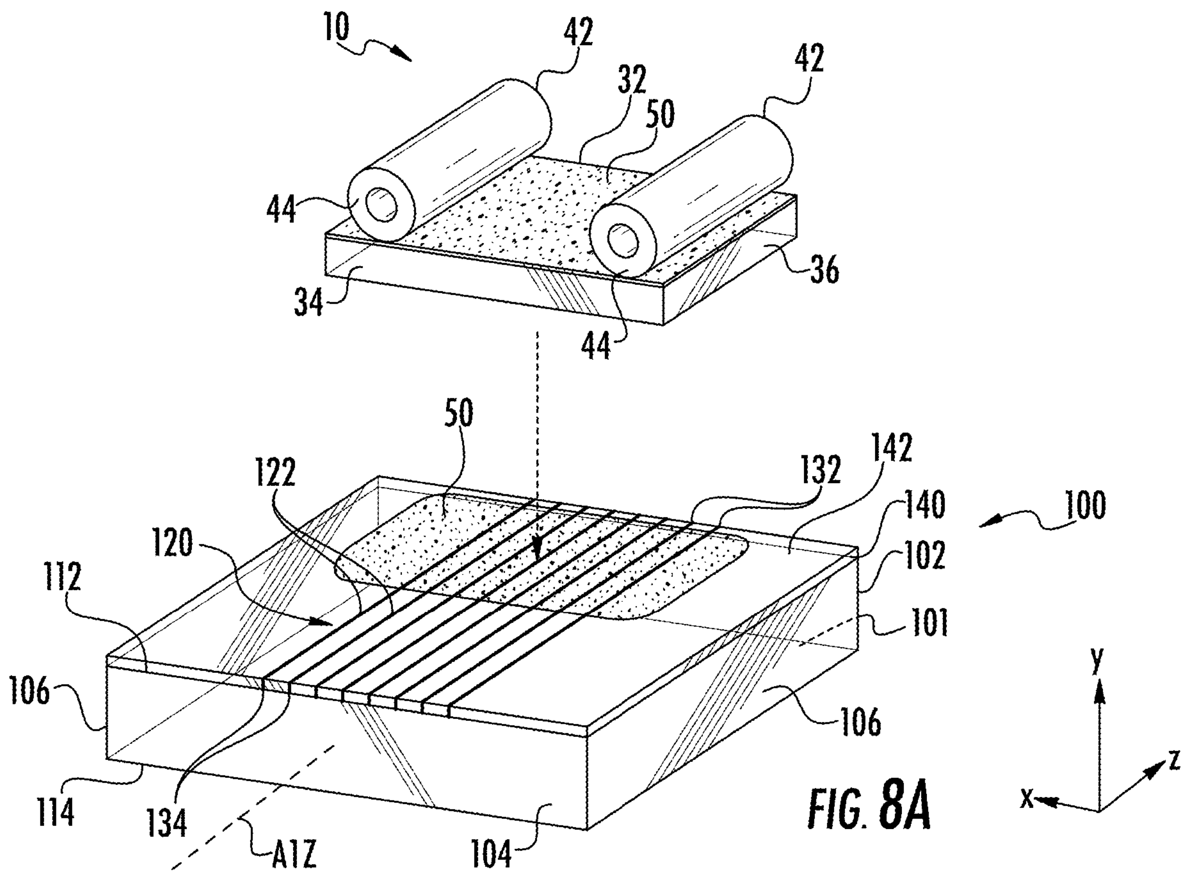
FIGS. 8A and 8B are back-elevated views that show a ferrule being secured to a PLC to form an optical interface device in the form of a waveguide connector.
Figure 8B:
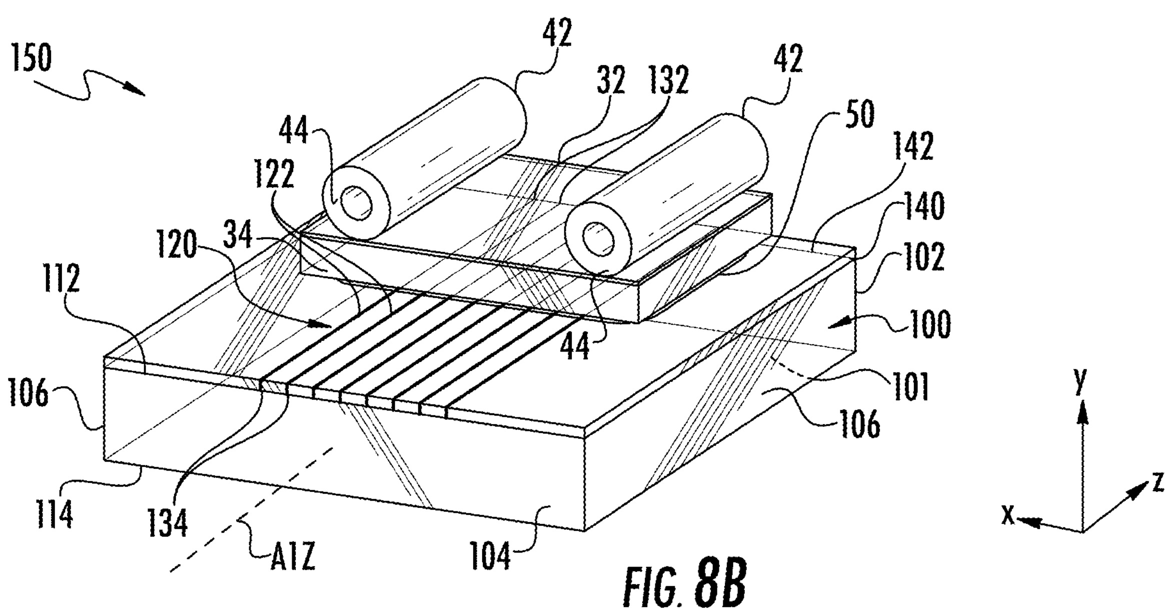
Figure 8C:
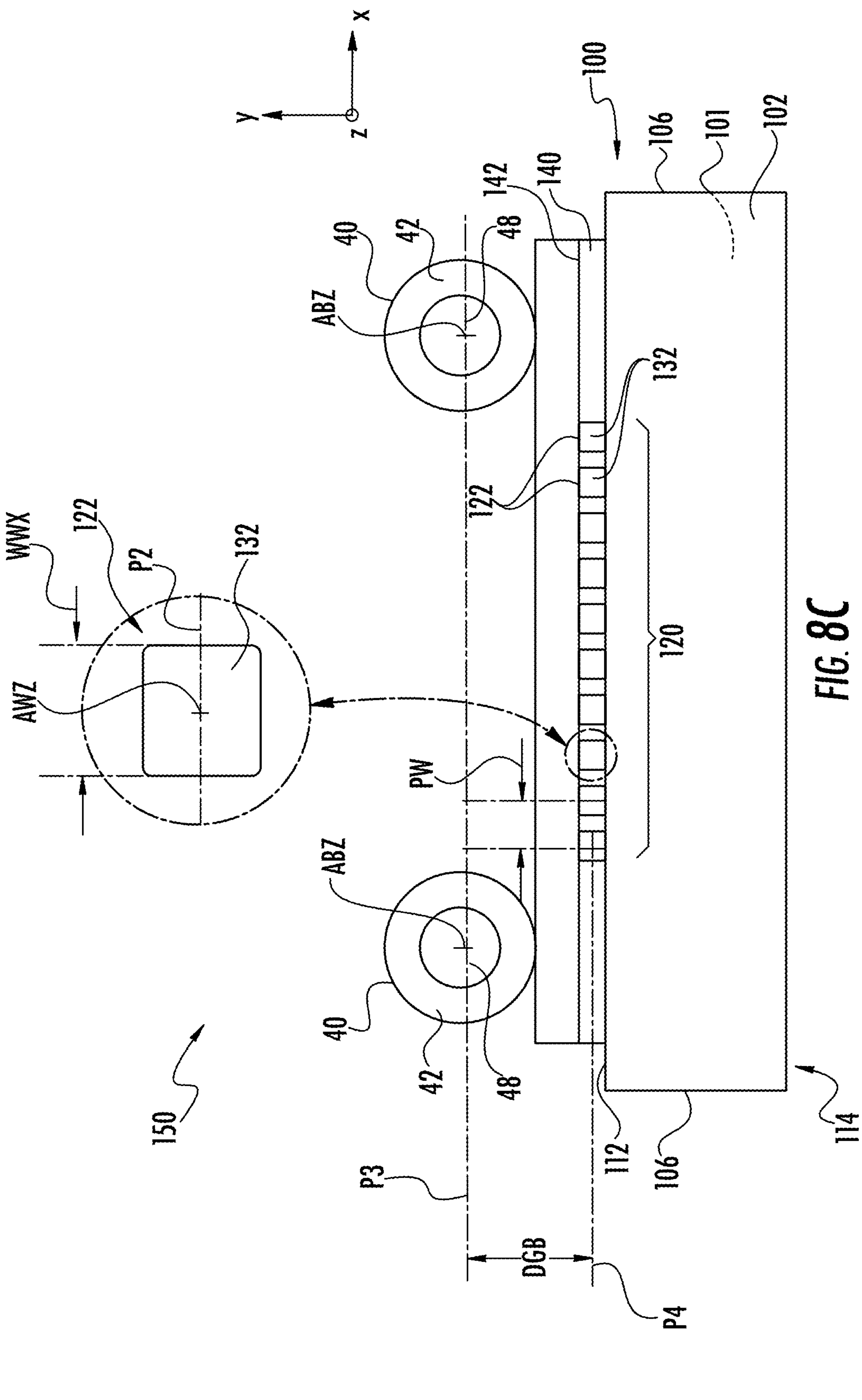
FIG. 8C is a front-on view of an example waveguide connector.

FIG. 8A is an elevated view that shows the example ferrule 10 of FIG. 1D arranged above a PLC 100 as part of the process of forming a waveguide connector 150. The ferrule 10 is thus referred to in this example as a waveguide connector ferrule. FIG. 8B is a back elevated view and FIG. 8C is a front-on view of the waveguide connector 150. The PLC 100 has body 101 that defines a front end 102, a back end 104, sides 106, a top surface 112 and a bottom surface 114. The PLC body 101 has a central axis A1Z that runs in the z-direction between the front and back ends 102 and 104. In an example, the PLC body 101 comprises Si.

The PLC 100 includes an array 120 of waveguide 122 formed in or residing upon the top surface 112. Each waveguide 122 has an end face 132 at the front end 102 of the PLC 100 and an opposite back end 134 at the back end 124 of the PLC. In an example, the waveguides 122 run generally in the z-direction and each has a waveguide central axis AWZ. In an example, the array 120 of waveguides 122 is formed in a silica layer 140 that resides on the top surface 112 of the PLC body 101. The silica layer 140 has a top surface 142, which in example defines the top surface of the PLC 100. In an example, the waveguides 122 have a pitch PW of 250 microns. Also in an example, the waveguides 122 have a width dimension WWX in the x-direction, which in an example can be about 4.2 microns.

In an example shown in FIG. 8A, securing material 50 is deposited on the top surface 142 of the PLC 100 adjacent the front end 102. The securing material 50 can also be deposited on the bottom surface 24 of the support substrate 20 of the waveguide connector ferrule 10.

With reference to FIGS. 8B and 8C, the waveguide connector ferrule 10 is secured to the PLC 100 to form the waveguide connector 150. The waveguide connector ferrule 10 enables forming an optical connection between the waveguides 122 of the PLC 100 and optical fibers of a fiber connector ferrule, as described in greater detail below. Thus, in an example the waveguide connector ferrule 10 is positioned and then secured on the PLC 100 using an active alignment process, as described below.

The process of securing and aligning the waveguide connector ferrule 10 to the PLC 100 can include the use of one of the alignment jigs as described herein. For the purposes of establishing at least coarse alignment, the waveguide connector ferrule 10 is positioned so that the bore axes ABZ of the guide tubes 40 are substantially parallel to the PLC central axis A1Z and substantially centered on the waveguide array 120. In an example, the bore axes ABZ and the waveguide axes AWZ reside in respective offset x-z planes P3 and P4 that are spaced apart by a distance the distance DGB in the y-direction (see FIG. 8C). In an example, the distance DGB is in the range 700 microns≤DGB≤725 microns, with an example value being 711 microns. Since the support substrate 20 can be used as a spacer member define the distance DGB, the support substrate is also referred to herein as the spacer member or just the spacer 20.

Active Alignment Jig for Waveguide Connector Fabrication

Figure 9A:
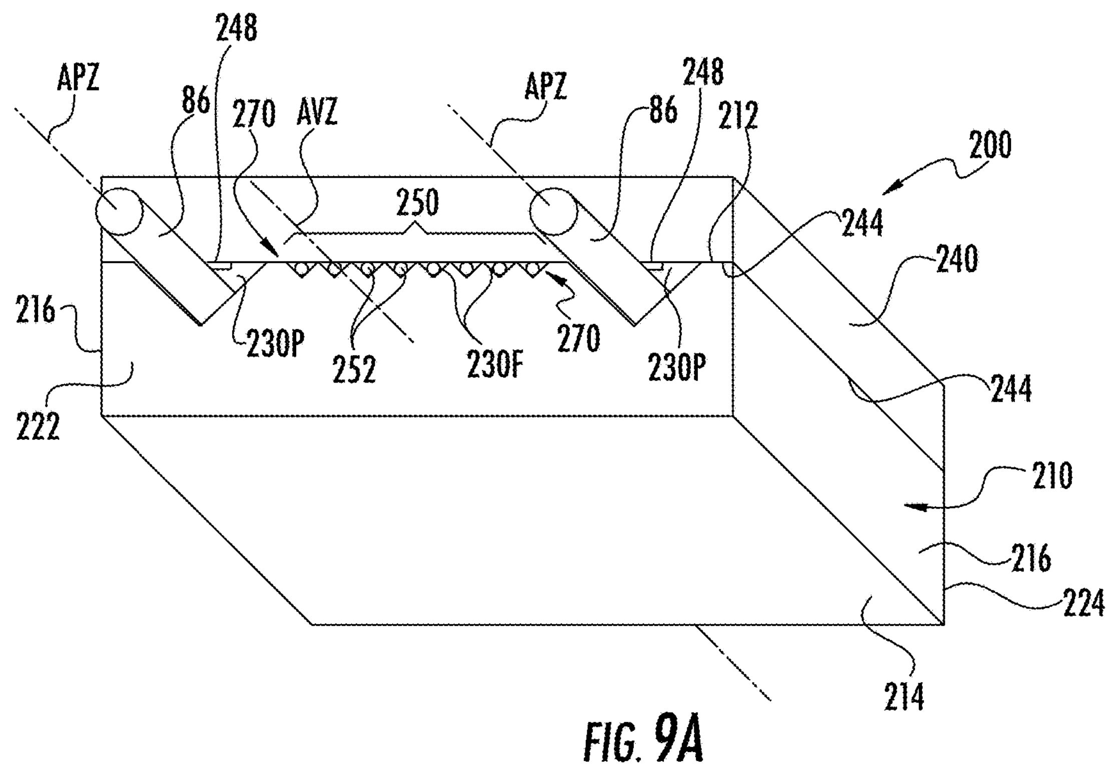
FIG. 9A is a bottom-elevated view of an example active alignment jig that employs a V-groove substrate.

FIG. 9A is a front elevated view of an example active alignment jig 200 used to form the waveguide connector 150 described above. The configuration of the active alignment jig 200 replicates the design of a fiber connector that mates with the waveguide connector and so can be thought of as a reference or "golden" fiber connector.

Figure 9B:
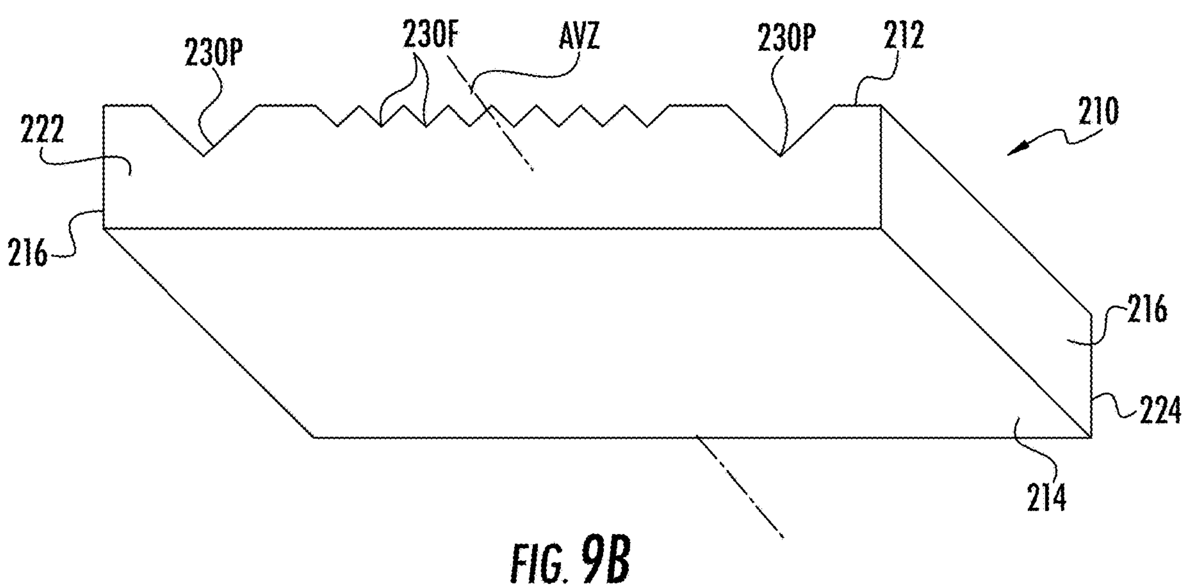
FIG. 9B is a bottom-elevated view of an example V-groove substrate used in the active alignment jig of FIG. 9A.

The active alignment jig 200 includes a V-groove substrate 210 as shown in the bottom-elevated view of FIG. 9B. The V-groove substrate has a top surface 212, a bottom surface 214, sides 216, a front end 222, a back end 224, and a substrate central axis AVZ that runs in the z-direction. The top surface 212 includes a first set of relatively shallow V-grooves 230F that are parallel and that run down the central portion of the V-groove substrate 210 between the front and back ends 222 and 224. These V-grooves 230F are referred to hereinafter as fiber V-grooves. The top surface 212 also includes two relatively deep V-grooves 230P that run parallel to and outboard of the fiber V-grooves 230F and adjacent respective sides 206. These V-grooves 230P are referred to hereinafter as guide-pin V-grooves.

The V-groove substrate 210 can be formed of glass, metal (e.g., brass), ceramic, polymer or other material that can be precision machined to form the fiber V-grooves 230F and the guide-pin V-grooves 230P. In an example, the fiber V-grooves 230F and the guide-pin V-grooves 230P are formed by diamond turning.

Figure 9C:
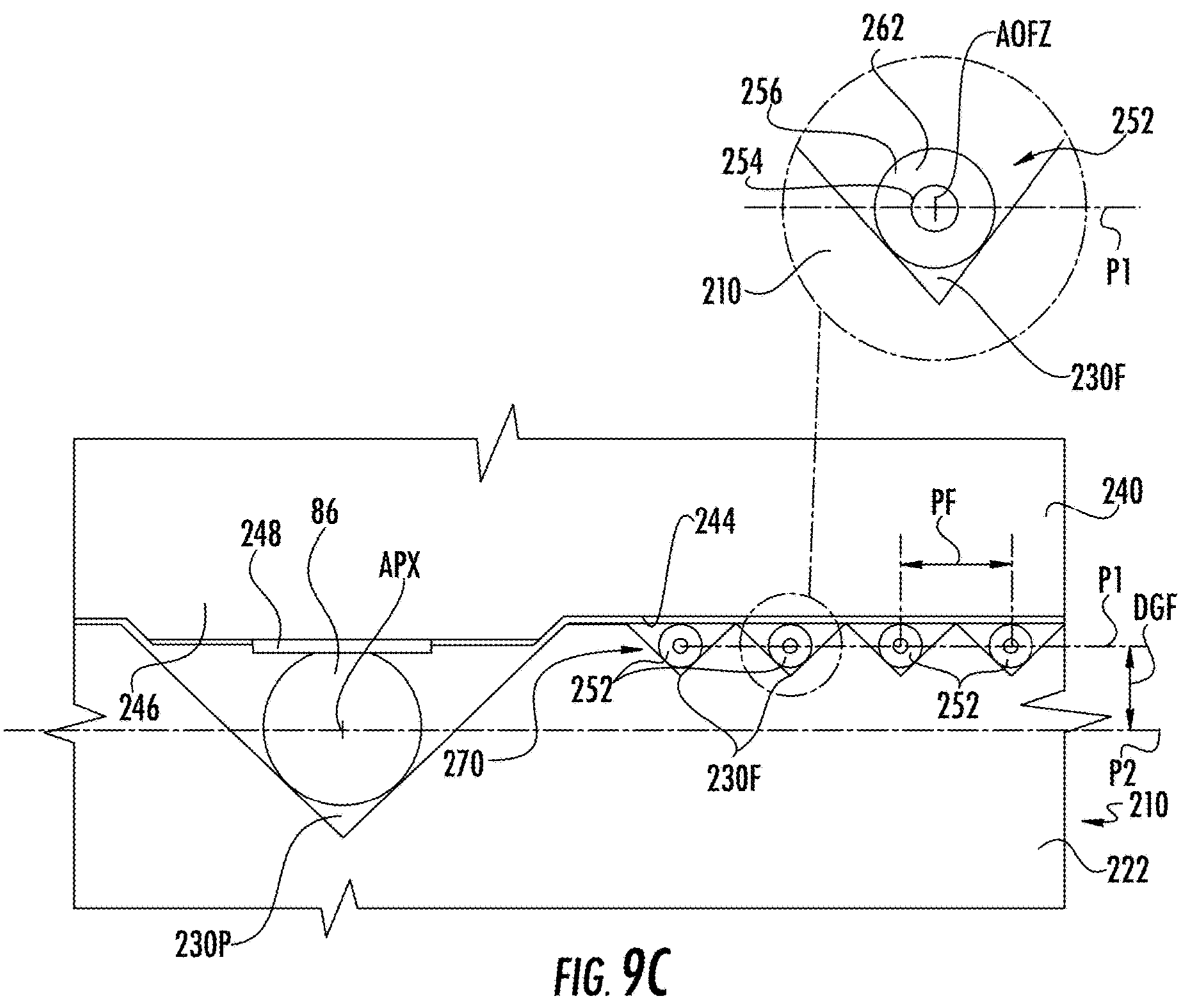
FIG. 9C is a front-on view of an example active alignment jig that includes a cover configured to maintain the guide tubes and the optical fibers in their respective V-grooves.

The active alignment jig 200 includes guide pins 86 that are secured within the respective guide-pin V-grooves. The active alignment jig 200 also includes a cover 240 that has a bottom surface 244. The cover 240 is attached to the V-groove substrate 210, with the bottom surface 244 of the cover disposed in closely proximate to the top surface 212 of the V-groove substrate. Shims 248 can be disposed between the guide pins 86 and the cover 240 to push the guide pins into the walls of the guide-pin V-grooves 230P so that they properly sit within the guide-pin V-grooves. The shims 248 can be rigid or resilient (e.g., elastomeric). In another embodiment shown in FIG. 9C the cover 240 can include protrusions 246 that extend into the guide-pin V-grooves 230G to make contact with the guide pins 86 therein.

Figure 9D:
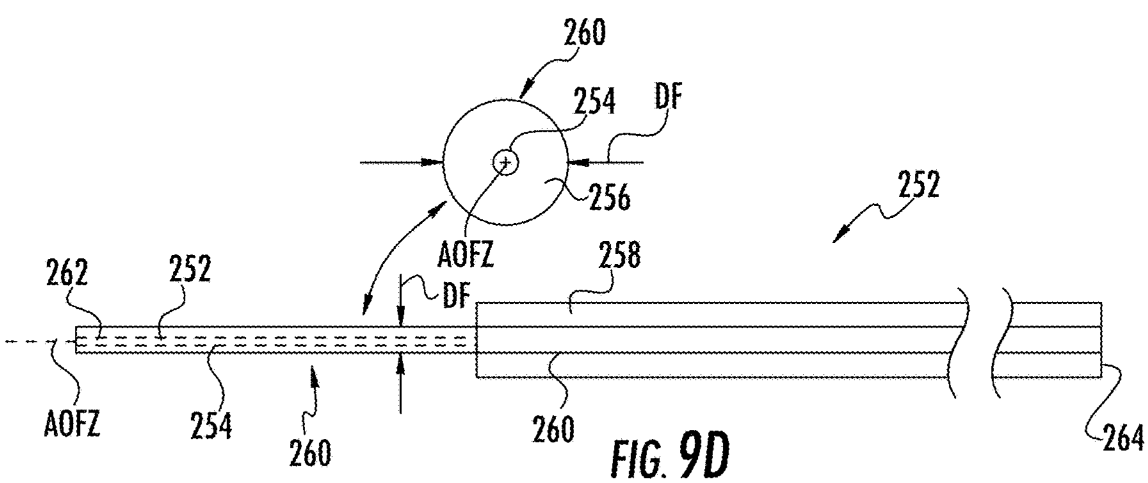
FIG. 9D is a side view of an example optical fiber used in the active alignment jig as well as in the fiber connector introduced and discussed below.

The active alignment jig 200 also includes an array 250 of optical fibers 252 disposed in the fiber V-grooves 230F. FIG. 9D is a side view of an example optical fiber 252. Each optical fiber 252 has a core 254 surrounded by a cladding 256. In an example, each optical fiber 252 can an outside diameter DF=125 microns or 250 microns. Each optical fiber 252 also has an optical fiber central axis AOFZ. Each optical fiber 252 also has a protective coating (e.g., polymer coating) 258. In an example, each optical fiber 252 has a front-end portion 260 that is bare glass, i.e., does not include the protective coating 258. This front-end portion 260 is referred to hereinafter as the bare-glass portion 260. The bare-glass portion 260 includes an end face 262, while the opposite end of the optical fiber 252 defines the back end 264. The array 250 of optical fibers 252 includes sides 270 as defined by the two most outboard optical fibers in the array.

In an example, the bottom surface 244 of the cover 240 makes contact with the tops of the optical fibers 252 and provides a force that urges the optical fibers into their respective fiber V-grooves 230F when the cover is secured to the V-groove substrate (e.g., via securing material 50). In another example, shims 248 can be disposed between the bottom surface 244 of the cover 240 and the array 250 of optical fibers.

The respective depths of the fiber V-grooves 230F and the guide-pin V-grooves 230P is preferably precisely controlled so that a vertical distance DGF between an x-z plane P1 that includes the optical fiber axes AOFZ and an x-z plane P2 offset from the plane P1 and that includes the guide-pin axes APZ is precisely controlled. In particular, the distance DGF needs to be equal to the distance DGB of the waveguide connector 150 (see FIG. 8C).

Figure 10:
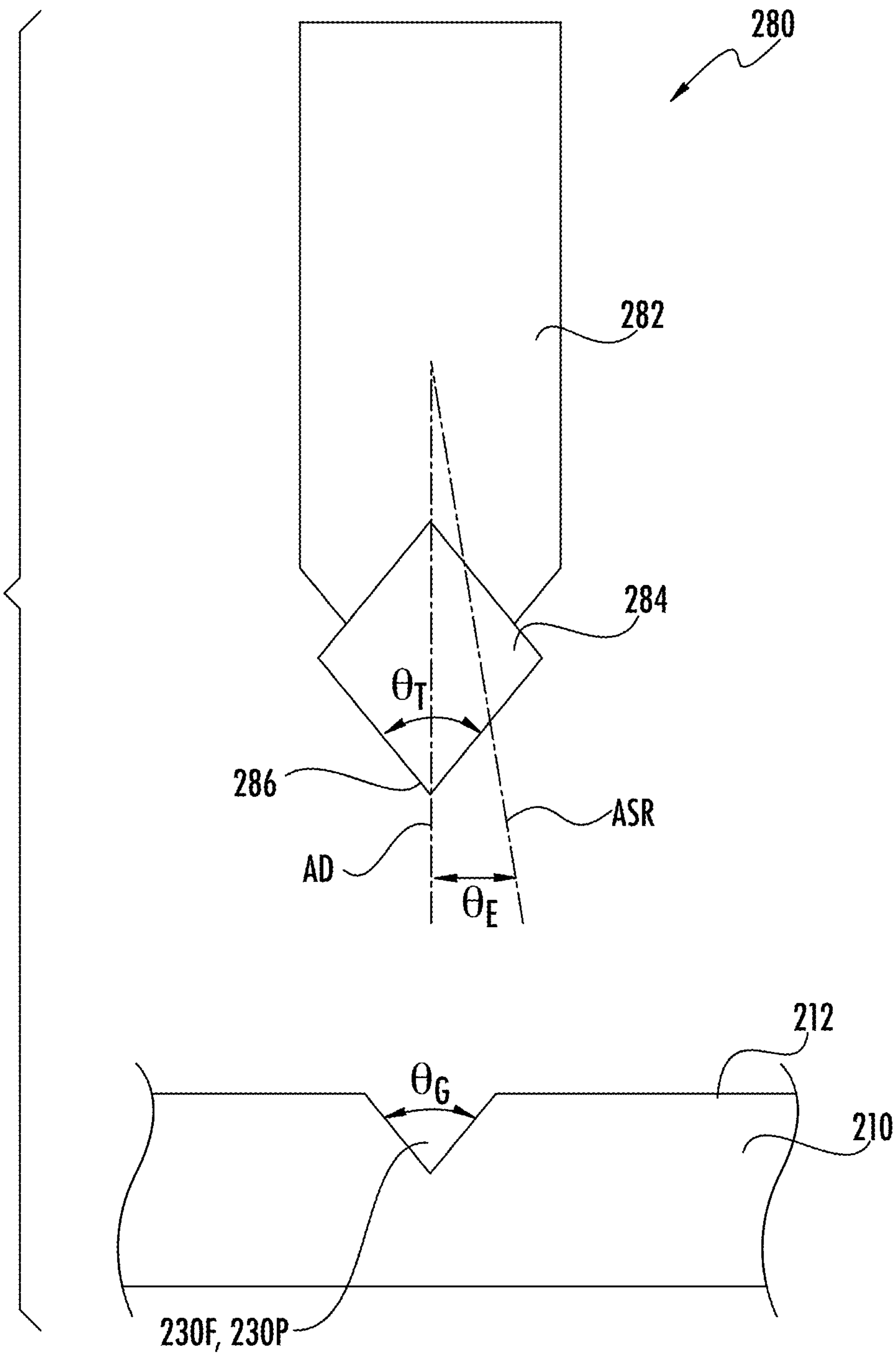
FIG. 10 is a schematic diagram of an example diamond turning tool used to form precision fiber V-grooves and guide-tube V-grooves in the V-groove substrate.

As noted above, one technique for forming the V-groove substrate 210 utilizes a diamond turning process. FIG. 10 is a side view of an example diamond turning tool 280. The diamond turning tool 280 has a shank 282 that supports a diamond chip 284 that has a diamond axis ADZ. The diamond chip 284 has an angled tip 286 with an angle $\theta_T$ that defines the groove angle $\theta_G$ of the V-grooves being formed. The shank has a rotation axis ASR.

The diamond chip 284 is typically not mounted perfectly on the shank 282, resulting in an additional non-zero angle error $\theta_E$ between the diamond axis AD and the shank rotation axis ASR. In practice, the angle error $\theta_E$ can also be defined to include any other angular errors that may arise between the diamond axis AD and the surface normal of the substrate being diamond turned. These angular errors lead to an x-axis shift dx (e.g., left or right) of the V-grooves. The magnitude of the x-axis shift dx is proportional to the angle error $\theta_E$. When V-grooves are only being fabricated at one depth (e.g., only fiber V-grooves), this x-axis shift dx can be compensated for during V-groove substrate dicing). But when V-grooves are fabricated at two different depths (e.g., fiber V-grooves and guide-pin V-grooves), the angular error leads to different x-axis shifts for two V-grooves. As a result, the two different types of V-grooves will not be centered on the same substrate axis When forming the fiber V-grooves 230F and the guide-pin V-grooves 230P using the diamond turning tool 280, it turns out that a small variation in the diamond tip angle $\theta_T$ can lead to a large difference in the depths of the V-grooves and thus large differences in the z-offset distance DZ, e.g., much great than the desired tolerance on DZ of ±0.5 microns. This tolerance requires that the diamond tip angle $\theta_T$ be controlled to within ±0.056 (or ±3.3'). A more relaxed tolerance associated with less precise applications of say $\theta_T$=60°±2° would prove unacceptable for precise fabrication of the V-groove substrate 210 when seeking the greatest precision in the fabrication process.

It has been observed that smaller diamond tip angles $\theta_T$ require a greater tolerance than larger diamond tip angles. For example, for $\theta_T$ of 90°, it must be within ±0.17° (or ±10.2') of this value while for $\theta_T$ of 110°, the tolerance is ±0.27° (or ±16.2').

In summary, the diamond tool chip angle error $\theta_E$ will primarily lead to errors in x-axis positioning of the fiber V-grooves relative to the guide-pin V-grooves, while diamond tip angles $\theta_T$ will induce errors in the fabricated depths of V-grooves (in the y-axis direction). Since it may be difficult to accurately measure $\theta_E$ and $\theta_T$ directly and predictively compensate for V-groove positions, an alternative approach is to fabricate a test device that includes both fiber V-grooves and guide-pin V-grooves. After test device fabrication, precision surface profilometer (e.g, Taylor-Hobson Form Talysurf) may be used to accurately measure all V-groove locations. Based on these measurements, x-axis and y-axis offsets can be applied to the two types of V-groove to ensure that they are fabricated at the correct depths and relative x-axis positions so that they are centered on a common axis.

Figures 11A, 11B, 11C:
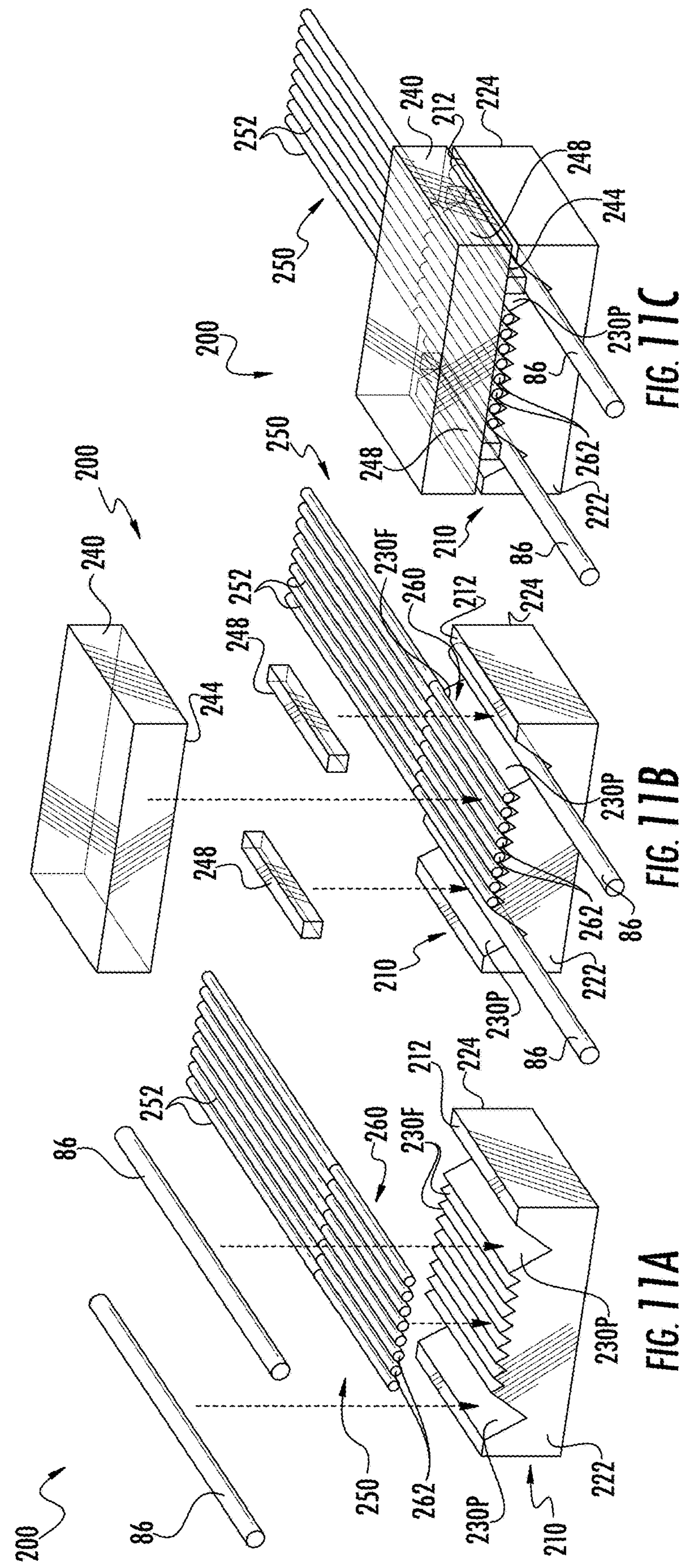
FIGS. 11A through 11C are front-elevated views that show an example of how the active alignment jig can be assembled.

FIGS. 11A through 11C are front elevated views that show an example of how the active alignment jig 200 can be assembled. The guide pins 86 are disposed in the guide-pin V-grooves 230G while the optical fibers 250 are disposed in the fiber V-grooves 230F. The optional shims 248 are then placed in the guide-pin V-grooves atop the guide pins 86 residing therein. Alternatively, the embodiment of cover 240 that includes protrusions 246 that contact the guide pins 86 can also be used.

The cover 240 is then secured to the portions of the top surface 212 of the V-groove substrate 210 that reside adjacent sides 216 since the other portion of the top surface 212 has been used to form the V-grooves. The bottom surface 244 of the cover 240 serves to maintain the positions of the optical fibers 252 in the fiber V-grooves 230F while the cover and the optional shims 248 serve to maintain the positions of the guide pins 86 within the guide-pin V-grooves 230P. FIG. 11C shows the resulting active alignment jig 200, which as noted above serves as a standardized or "golden" fiber connector ferrule that is representative of fiber connector ferrules designed to operably engage the waveguide connector ferrule 10 of the waveguide connector 150.

Figure 12A:
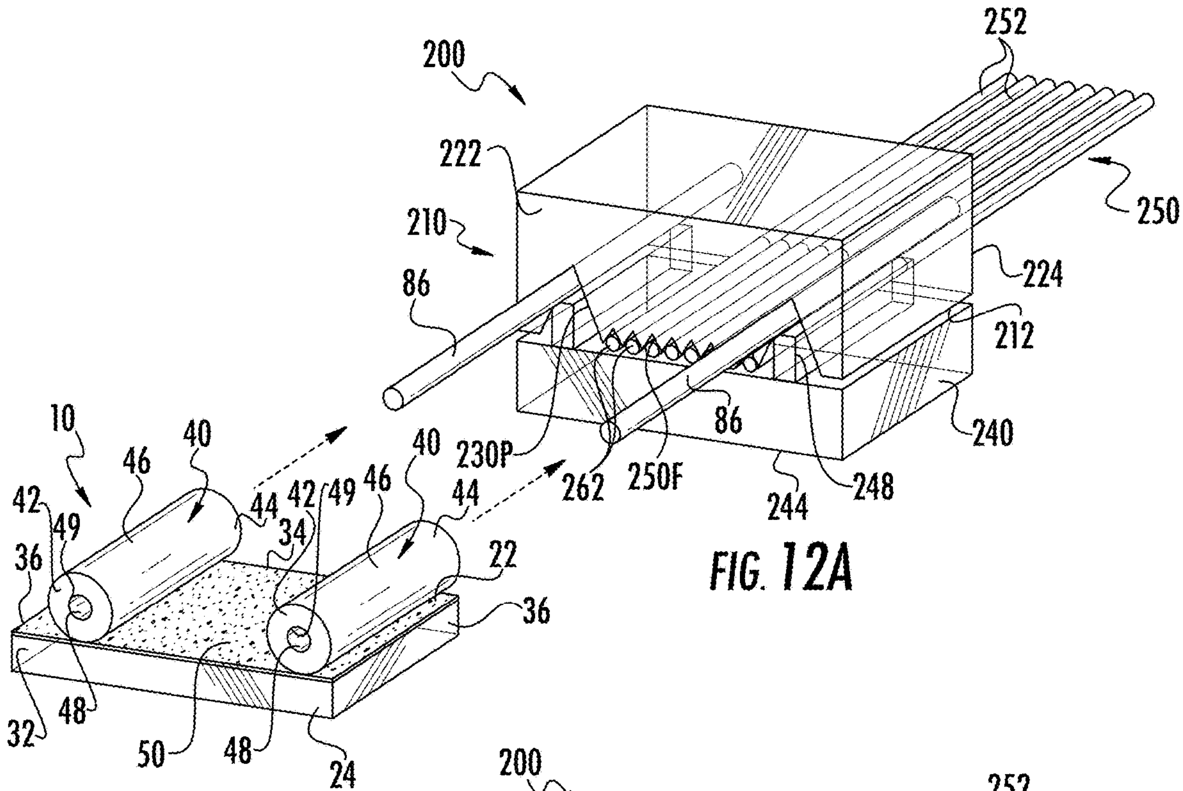
FIGS. 12A through 12G are elevated views that show an example of how the active alignment jig can be used to form a waveguide connector that can precisely align with a fiber connector since the active alignment jig has the same operational configuration as a fiber connector.
Figure 12B:
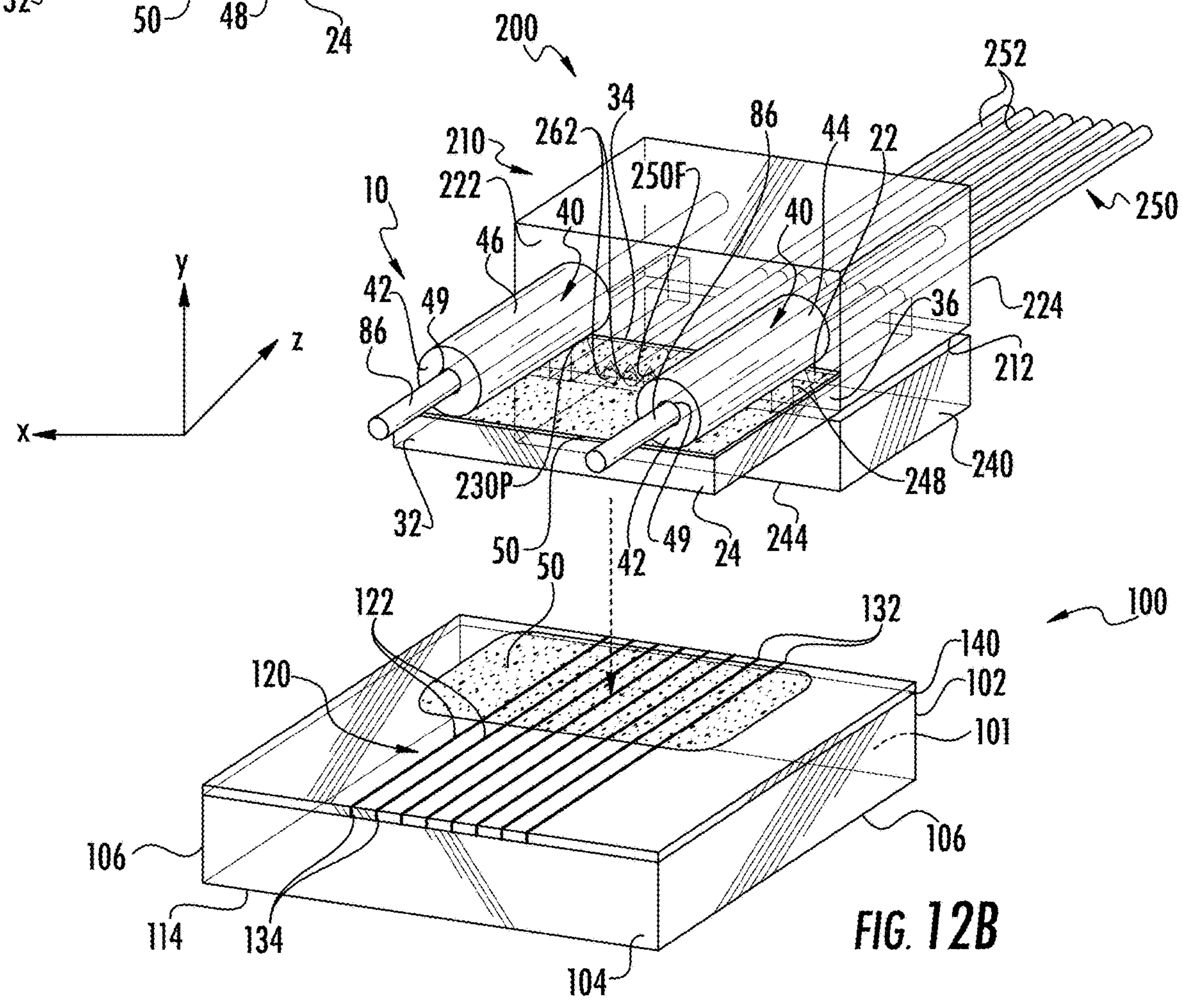

FIG. 12A is an elevated view of the active alignment jig 200 disposed to engage an example waveguide connector ferrule 10. As discussed above in connection with the guide-pin alignment jig 80, the guide pins 86 are inserted into the respective bores 48 of the guide tubes 40 of the waveguide connector ferrule 10, as shown in FIG. 12B. The active alignment jig 200 and waveguide connector ferrule 10 engaged therewith are then disposed above the PLC 100, which has securing material 50 on the top surface 142 of the silica layer 140 near the front end 102 of the PLC. The securing material 50 serves as a float layer that supports the waveguide connector ferrule 10 atop the PLC while allowing some movement of the waveguide connector ferrule prior to the securing material curing or otherwise being activated (e.g., by UV radiation 76), as shown in FIG. 12C.

The support substrate 20 thickness must be selected to avoid interference with the PLC substrate top surface during active alignment. For example, the support substrate 20 can be selected to have a thickness that leaves a 5 micron to 20 micron gap to accommodate securing material 50 (e.g., an adhesive) between the bottom surface 24 of the support substrate and the top surface 112 or 142 of the PLC substrate 110. This gap also accommodates typical variations (e.g., 1 micron to 5 microns) in the silica layer 140 formed on the top surface 112 of the PLC substrate 110.

Figure 12C:
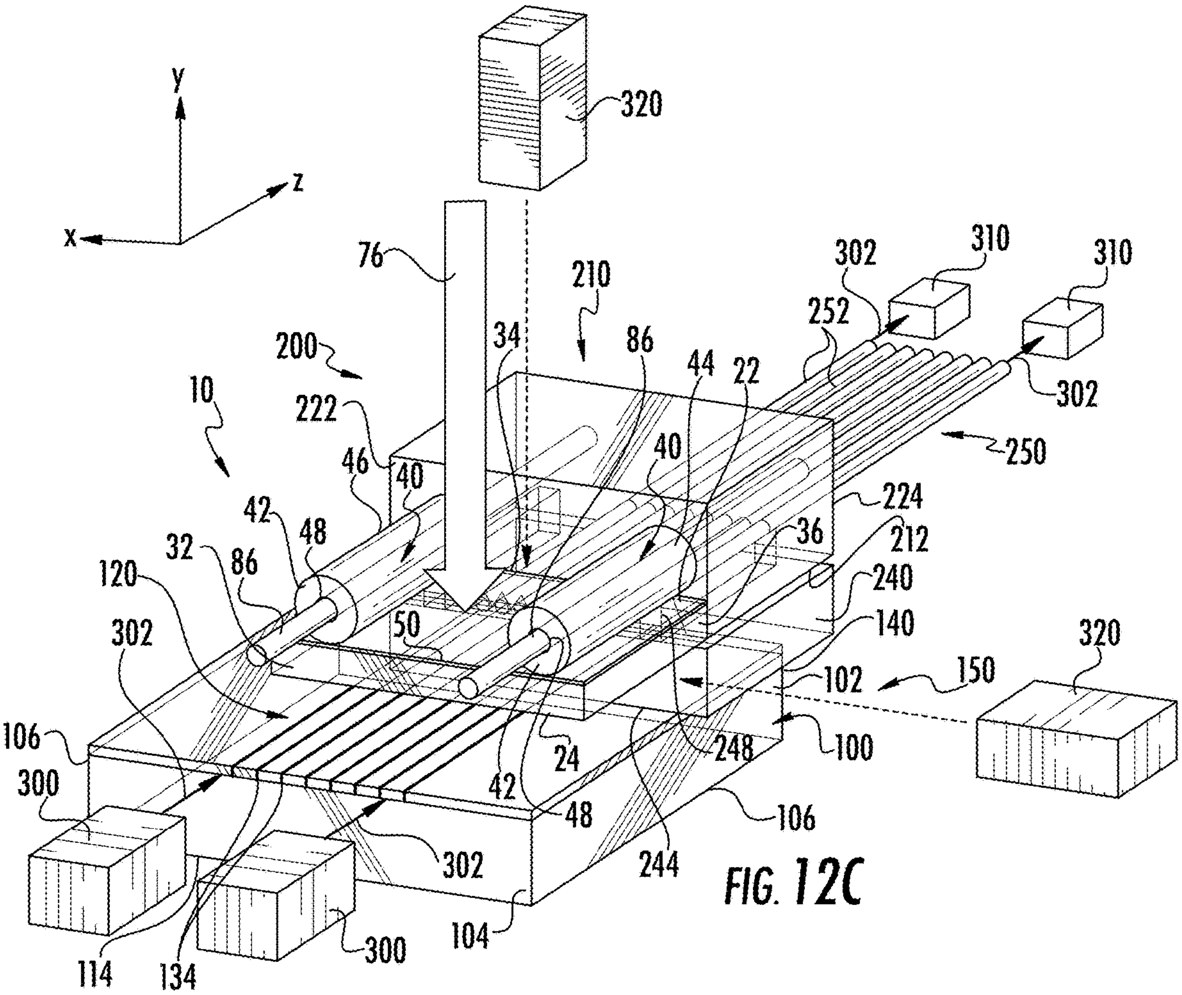

At this point, active alignment of the waveguide connector ferrule 10 on the PLC 100 is carried out (see FIG. 12C). This is accomplished by sending light 302 from a light source 300 through the back end of at least one waveguide 122. The light 302 travels through the at least one waveguide 122 where it exits the end face 132 and enters the end face 262 of the corresponding optical fiber 252. The light 302 then travels through the optical fiber 252 and is outputted at the output end 264, where it is detected by a detector (e.g., photodetector or light sensor) 310 that measures an amount of optical power in the detected light. The amount of optical power is monitored by detector 310 as the position of the waveguide connector ferrule 10 relative to the PLC 100 is adjusted. In an example, a six-axis micropositioning stage (not shown) can be used to adjust the relative positions of the waveguide connector ferrule 10 and the PLC 100.

It is anticipated that most of the position adjustment to obtain alignment will involve mostly lateral (x, y) movement. In an example, machine vision systems 320 can also be used to obtain the initial positioning of the waveguide connector ferrule 10 and the PLC 100. This can include for example placing the end faces 132 of the waveguides 122 and the end faces 162 of the optical fibers 150 to within about 200 microns of each other. In an example, a controller (e.g., a computer or micro-controller) (not shown) is operably connected to the light source 300, the detector(s) 310, the machine vision systems 320 and the micropositioning system to control the active alignment process.

When the amount of detected optical power is maximum or substantially maximum, the waveguide connector ferrule 10 is held in position on the PLC and the securing material is allowed to cure or is activated by exposure to UV radiation 76. The UV radiation 76 can be directed through the support substrate 20 as well as through the guide tubes 40 if needed.

In an example, the active alignment process is carried out by simultaneous illumination of the two most outboard waveguides 122 in the array 120 and detecting with respective detectors 310 the light 302 outputted by each of the corresponding optical fibers 250. In another example, every other optical fiber 252 or the entire array 250 of optical fibers is illuminated for active alignment. The resulting waveguide connector 150 is shown in FIG. 12D.

An example of a more detailed active alignment algorithm that employs a micropositioning system and a machine vision system is as follows. First, after setting the waveguide connector ferrule 10 onto the securing material 50 on the PLC 100, the relative position of the waveguide connector ferrule and the PLC is adjusted using the active alignment jig 200 to bring the waveguide end faces 132 and the optical fiber end faces 162 in close proximity, e.g., to within about 200 microns. Second, the active alignment jig 200 is rotated along the x-axis, y-axis and z-axis as needed so that the waveguide end faces 132 and the optical fiber end faces 162 reside in substantially parallel planes. Third, the waveguide end faces 132 and the optical fiber end faces 162 are brought closer together, e.g., to within about 15 microns to 20 microns. Fourth, the relative position of the waveguide connector ferrule 10 is adjusted in the (x, y, z) directions while measuring the outputted light from one of the outboard optical fibers 152 and first (x, y, z) coordinates are recorded corresponding to the maximum measured output power. Fifth, the fourth step is repeated for the other outboard optical fiber 152 and second (x, y, z) coordinates corresponding to the maximum measured output power are recorded. Sixth, the first and second (x, y, z) coordinates are used to determine a rotation about the z-axis that makes the waveguide end faces 132 parallel to the optical fiber end faces 162 and then the necessary z-rotation is performed. Seventh, the fourth and fifth steps of measuring the first and second (x, y, z) coordinates are repeated. Eighth, the position of the active alignment jig 200 is adjusted to the coordinate locations midway between the first and second (x, y, z) coordinates obtained in step 7 to place the waveguide connector ferrule 10 in its target location on the PLC 100. Ninth, the securing material 50 is allowed to cure or is actively cured to fix the waveguide connector ferrule 10 to the PLC 100 while the active alignment jig 200 holds the waveguide connector ferrule in its target location on the PLC. Since UV curable adhesives shrink by a small amount during curing, it may be desirable to bias the position of the active alignment jig 200 slightly upward prior to UV curing to compensate for shrinkage. Tenth, the active alignment jig 200 is removed, leaving the aligned waveguide connector 150 as shown in FIG. 12D.

Figure 12D:
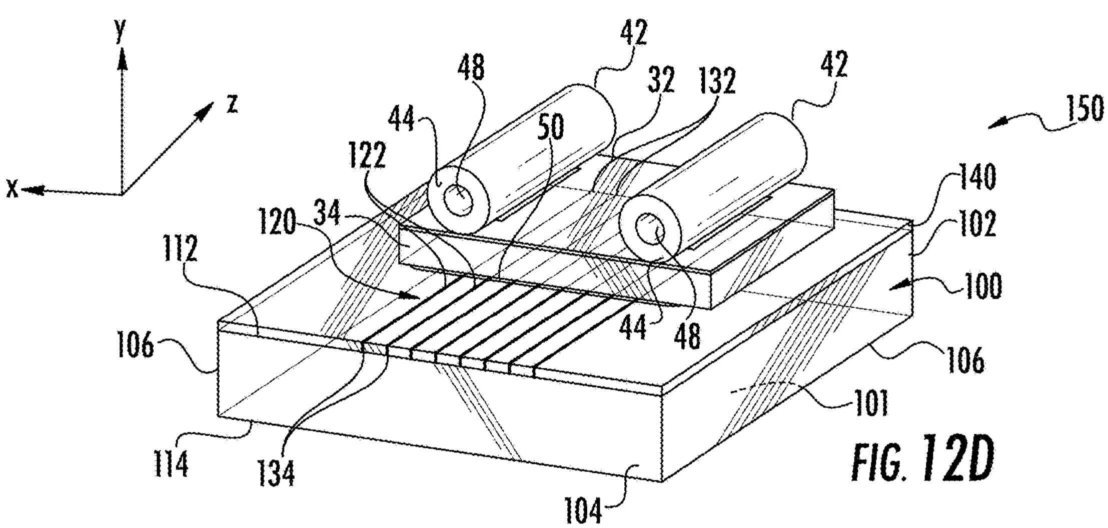
Figure 12E:
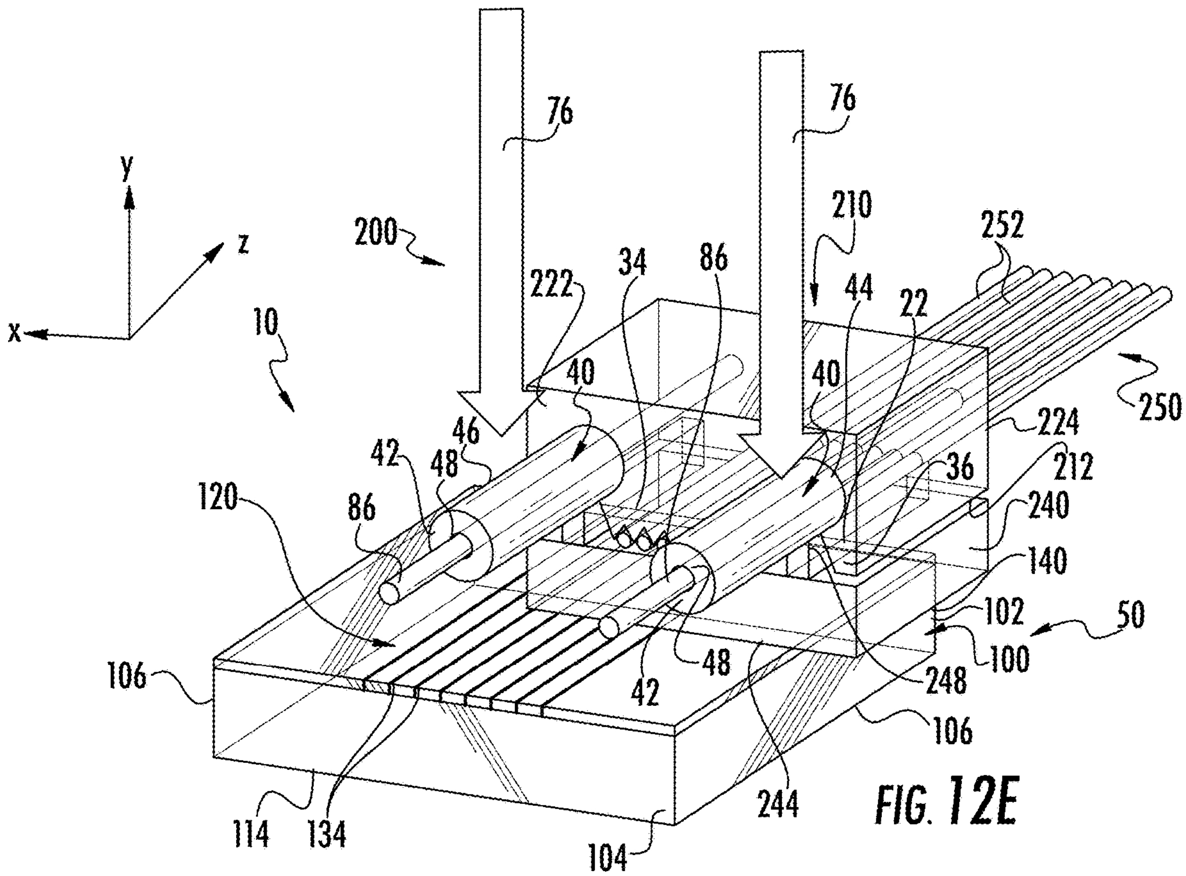
Figure 12F:
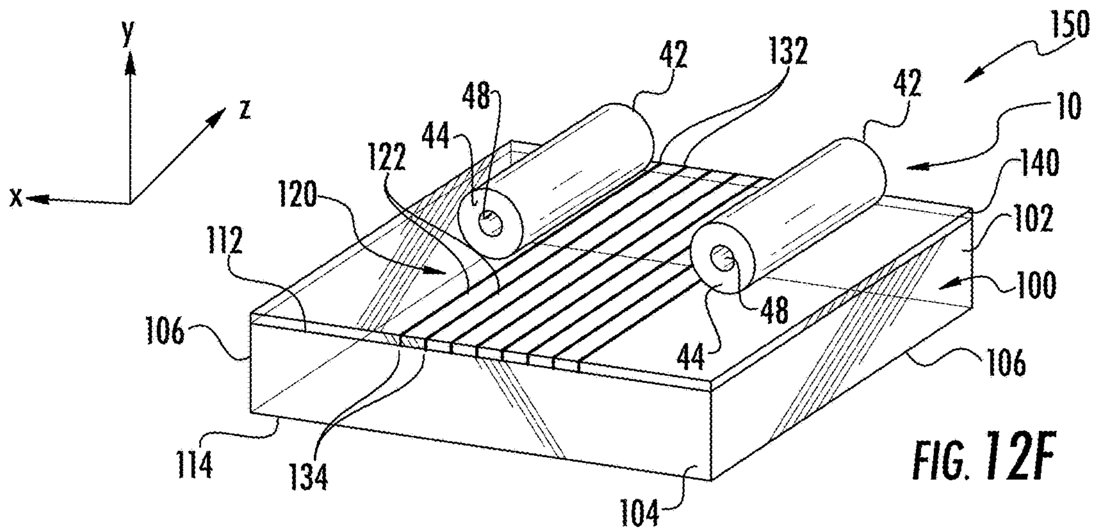

FIGS. 12E and 12F are similar to FIGS. 12C and 12D except that the waveguide connector ferrule 10 consists of only the two guide tubes 40 and does not include the support substrate 20. In this case, the two guide tubes 40 are place directly upon the top surface 142 of the silica layer 140 of the PLC 100 by the active alignment jig 200 and then actively aligned and secured thereto as described above. In this embodiment, the UV radiation 76 can be directed through the guide tubes 40 to activate the securing material 50. In an example, the UV radiation 76 can be conditioned such that it substantially uniformly irradiates the underlying securing material 50 after having passes through the guide tube 40.

Figure 12G:
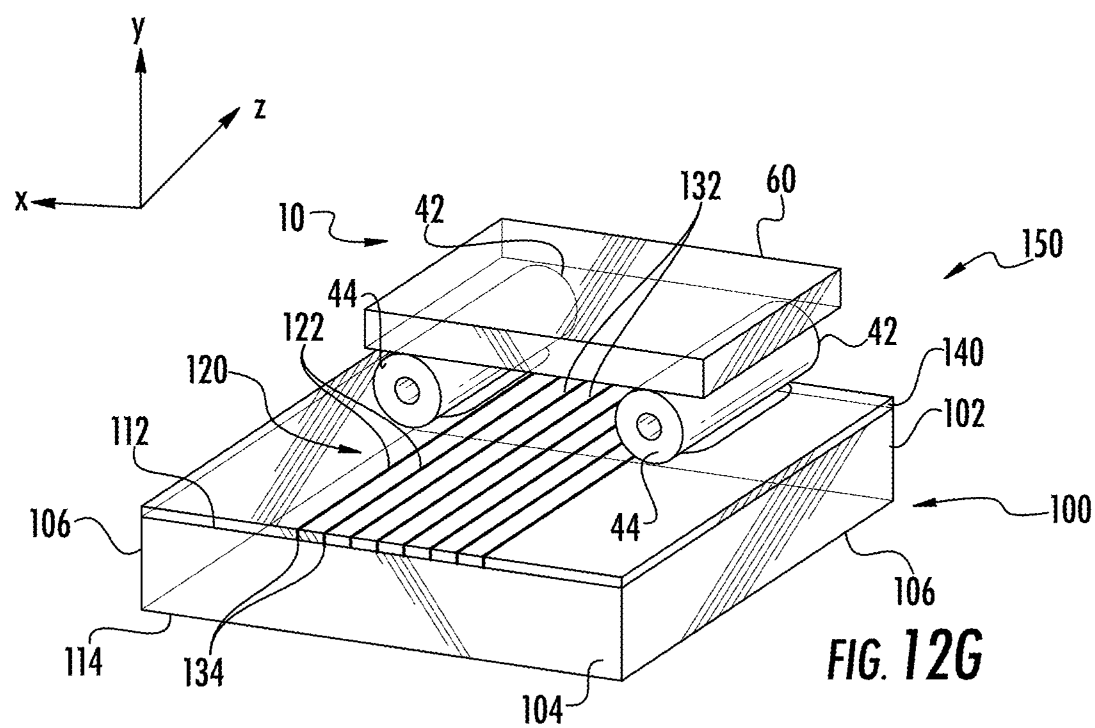

FIG. 12G is similar to FIG. 12D and illustrates an example where the waveguide connector ferrule 10 is brought into contact with and secured to the PLC 100 in a flipped over position so that the guide tubes 40 are secured to the PLC 100 with the support substrate 20 being on top of the guide tubes and acting as a cover and mechanical support. In an example, the outer diameter DT to the guide tubes 40 can be selected to prevent interference between the guide tubes and the PLC top surface 112 or 142 during active alignment of the waveguides 122 of the waveguide connector 150 and the optical fibers 252 of the fiber connector 400. For example, the outer diameter DT of the guide tubes 40 can be selected so that a gap of between 5 microns and 20 microns remains between the bottom surface of the guide tube and the top surface 112 or 142 of the PLC substrate 110. This gap is sized to accommodate securing material 50 and can also accommodate the aforementioned variations the thickness of the silica layer 140.

Different designs for the PLC 100 may have the waveguides 112 located at different depths relative to the top surface 112 of the PLC 100. These differences in waveguide depth can be accommodated different ways. In one example, the outside diameter DT of the guide tubes 40 can be selected to define the aforementioned gap for the securing material 50. In another example, the guide tubes 40 can include flat sections 47 to reduce the height of the guide tubes relative to the top surface 112 of the PLC (see FIG. 1C). In yet another example, the top surface 112 of the PLC 100 can be modified by adding or removing material in the regions where the guide tubes 40 are supported on the top surface 112 of the PLC.

Fiber Connector

Figure 13A:
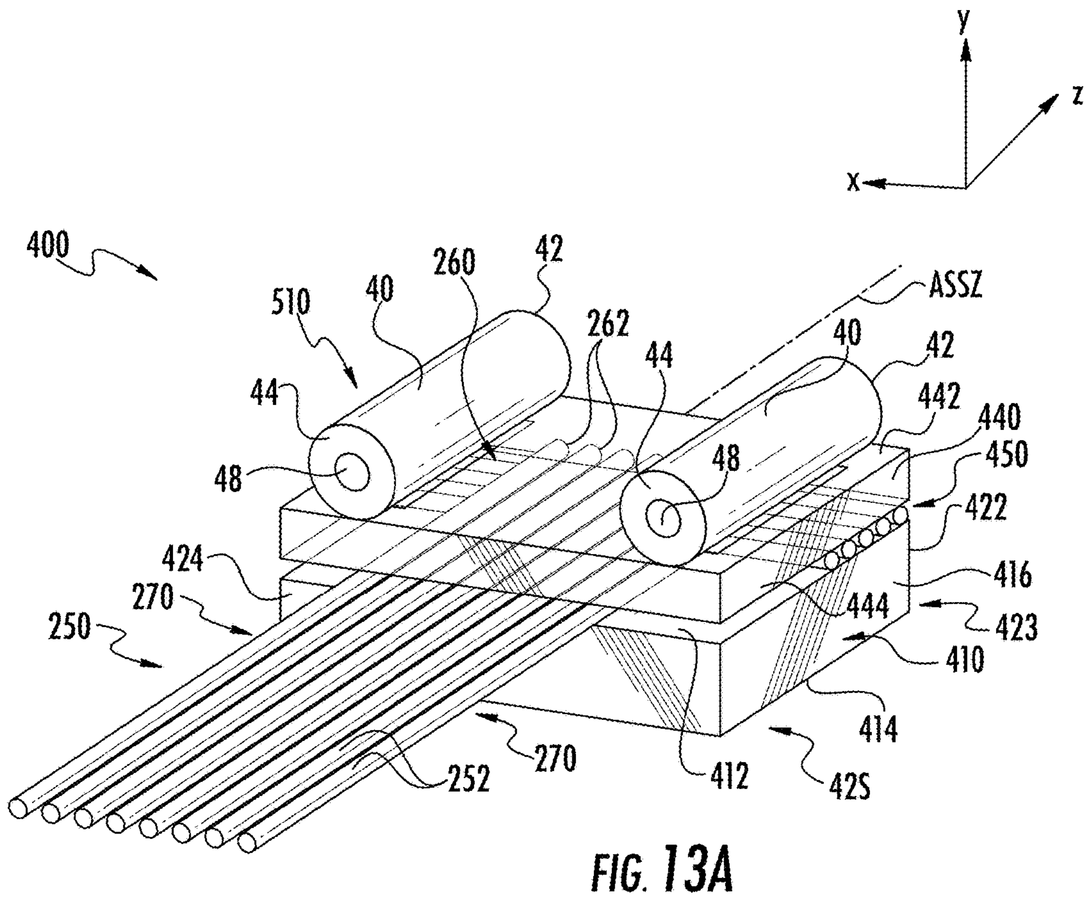
FIG. 13A is a back-elevated view of an example optical interface device in the form of a fiber connector that employs the ferrule as disclosed herein.
Figure 13B:
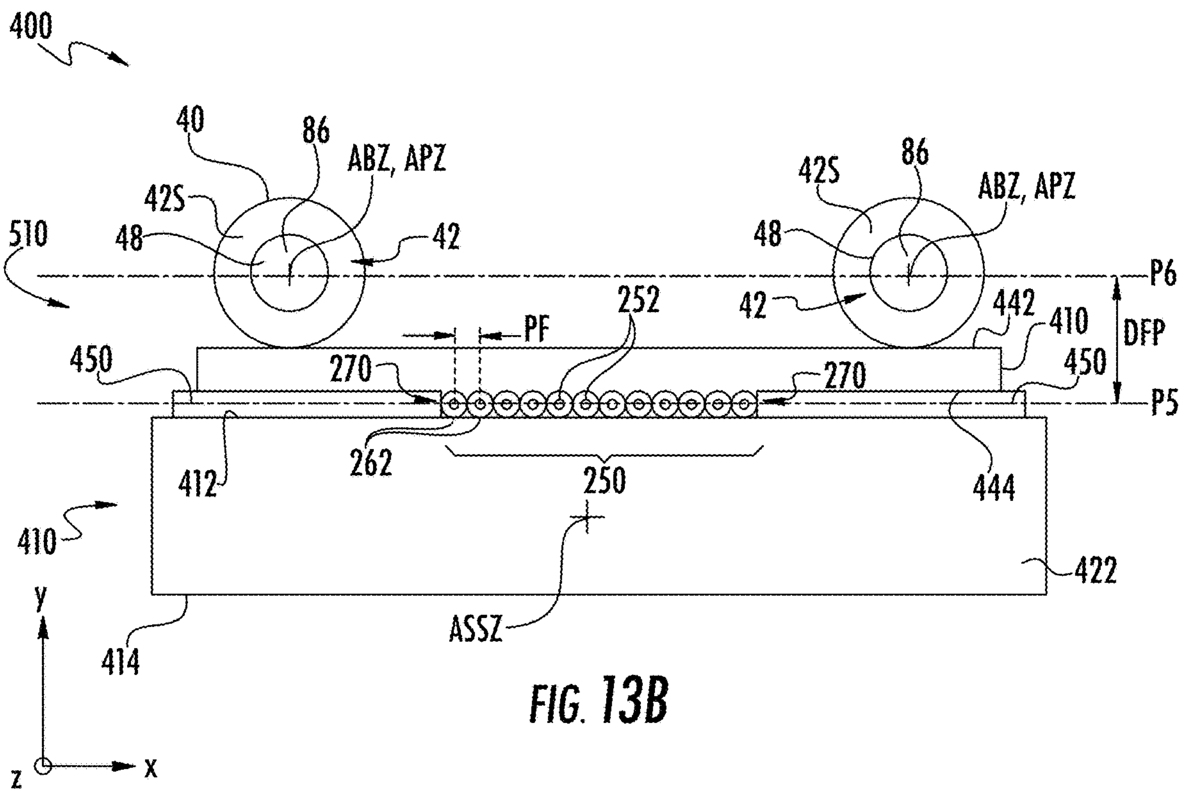
FIG. 13B is a front-on view and FIG. 13C is a side view of an example fiber connector.
Figure 13C:
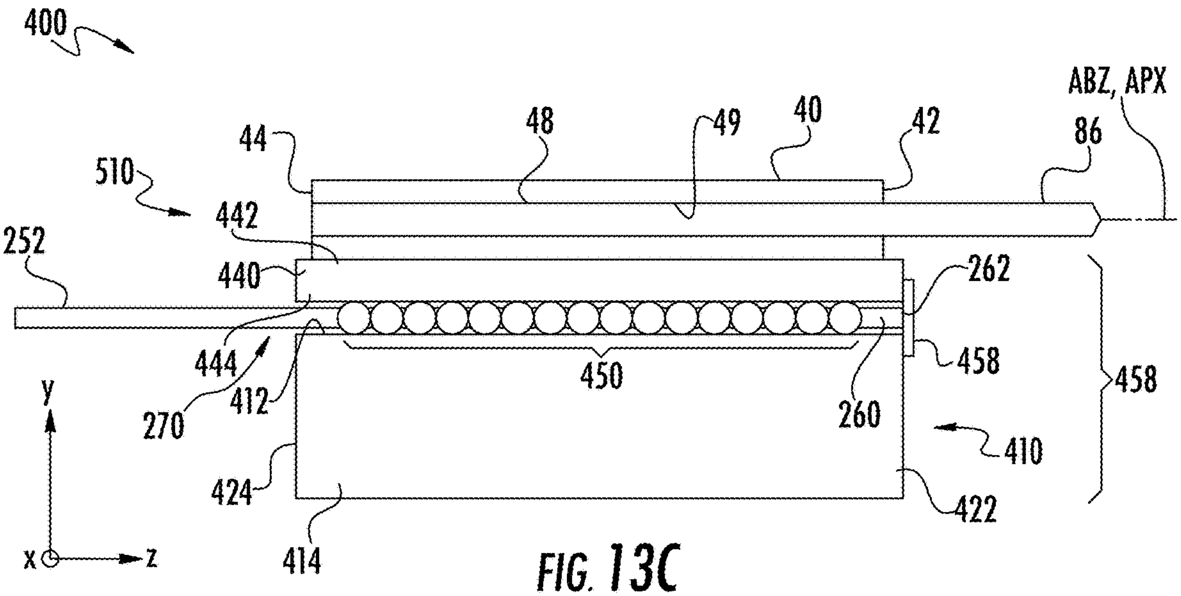

FIG. 13A is a back elevated view, FIG. 13B is a front-on view and FIG. 13C is a side view of an example fiber connector 400. The fiber connector 400 is functionally identical to the active alignment jig 200 in terms of its optical coupling abilities, but is fabricated from low cost materials, is designed to be more compact than the active alignment jig, and of course is designed to actually be used as a connector.

The fiber connector 400 includes a fiber support substrate 410 having a top surface 412, a bottom surface 414, sides 216, a front end 422 and a back end 424. The fiber support substrate 410 also has a central axis ASSZ that runs in the z-direction through the center of the support substrate. In an example, the fiber support substrate 410 is made of glass. In other examples, the fiber support substrate 410 can be made of other materials such as metal, ceramic or a polymer. The fiber connector 400 also includes an array 250 of optical fibers 252 supported on the top surface 412 of the fiber support substrate 410. In an example, the top surface 412 can include fiber V-grooves (not shown) to support the optical fibers 252. In an example, the array 250 of optical fibers 252 reside in an x-z plane P5.

The fiber connector 400 also includes a cover 440 having a top surface 442 and a bottom surface 444. The cover 440 resides atop the array 250 of optical fibers 252 opposite the fiber support substrate 410 so that the bottom surface 444 of the cover contacts the tops of the optical fibers 252. Fiber-retaining members 450 are disposed between the fiber support substrate 410 and the cover 440 on either side 270 of the array 250 of optical fibers 252. Prior to adding the cover 440, securing material 50 can be applied to the array 250 of optical fibers and to the fiber-retaining members 450. The cover 440 is then added to define a fiber support structure 456.

The fiber connector 400 also includes two guide tubes 40 arranged on and secured to the top surface of the spacer 440 using the securing material 50 in the same manner as for the waveguide connector ferrule 10. The guide tubes 40 are arranged such that the tube central axes ATZ are parallel to each other and to the support substrate central axis ASSZ. The guide tubes 40 and the spacer 440 of the fiber connector 400 define a fiber connector ferrule 510, which is similar if not identical to the ferrule 10 described above. Thus, in an example, the cover 440 can be defined by the support substrate 20 of the ferrule 10.

Each guide tube 40 supports a guide pin 86 secured within the bore 48 using securing material 50. Said differently, the connector ferrule 510 includes guide pins 86, which are configured to operably engage with the bores 48 of the guide tubes 40 of the waveguide connector ferrule 10. The bore axes ABZ of the bores 48 of the guide tubes 40 reside in an x-z plane P6 that is offset from the plane P5 of the optical fibers 252, as shown in FIG. 13B.

Because in some embodiments the cover 440 defines a y-direction distance DFP between the planes P5 and P6 to ensure proper optical coupling between the optical fibers and the waveguides 122 of the waveguide connector 150 (as well as proper alignment of guide pins 86 and the corresponding bore holes 48 of the guide tubes 40 of waveguide connector ferrule), the cover 440 is also referred to herein as a spacer member or just a spacer 440.

In an example shown in the side view in FIG. 13C, an index-matching film 458 is applied over the end faces 262 of the optical fibers 252. In an example, the index-matching film 458 is relatively thin (e.g., 10 microns to 20 microns thick) and is also elastic so that it can be squeezed in the small gap formed when engaging the fiber connector 400 and the waveguide connector ferrule 10 of the waveguide connector 150. The index-matching film 458 is used to eliminate the air gap between the waveguide end faces 132 and the fiber end faces 262 that can create unacceptable back reflections at the coupling interface.

Figure 13D:
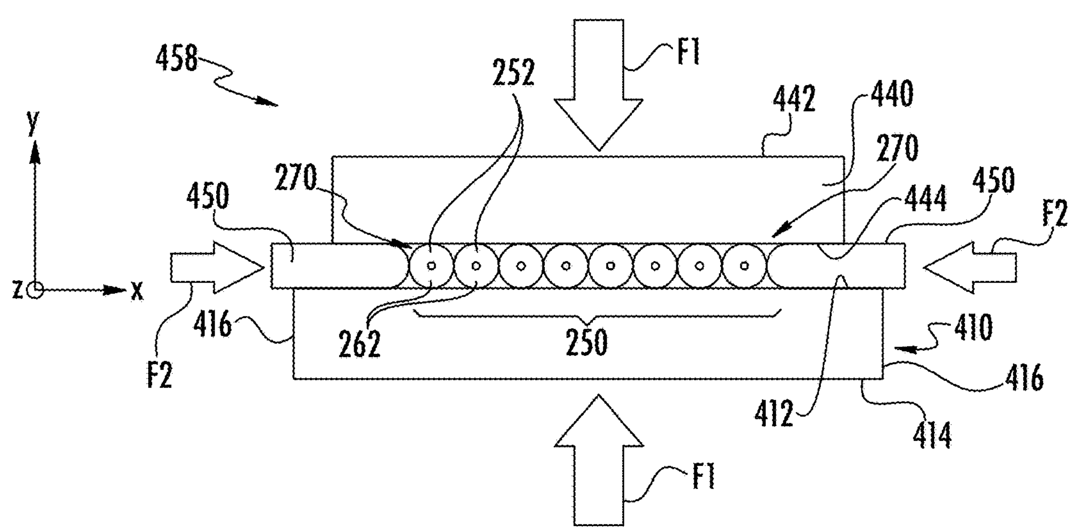
FIG. 13D is a front-on view of an example fiber support structure used to form a fiber connector.

FIG. 13D is a front-on view of the fiber support structure 456. Before the securing material 50 cures or is activated (e.g., by UV radiation 76), the cover 440 and fiber support substrate 410 are squeezed together by applying forces F1 in opposite directions along the y-axis as shown while the fiber-retaining members 450 are also squeezed together by applying forces F2 in opposite directions along the x-axis as shown. This allows the cover 440 and fiber support substrate 410 to maintain the optical fibers 252 in the same plane will allowing the fiber-retaining members to maintain the fiber pitch PF by squeezing the optical fibers together. In an example, the fiber-retaining members 450 can be in the form of glass rods or sections of optical fiber.

Figure 13E:
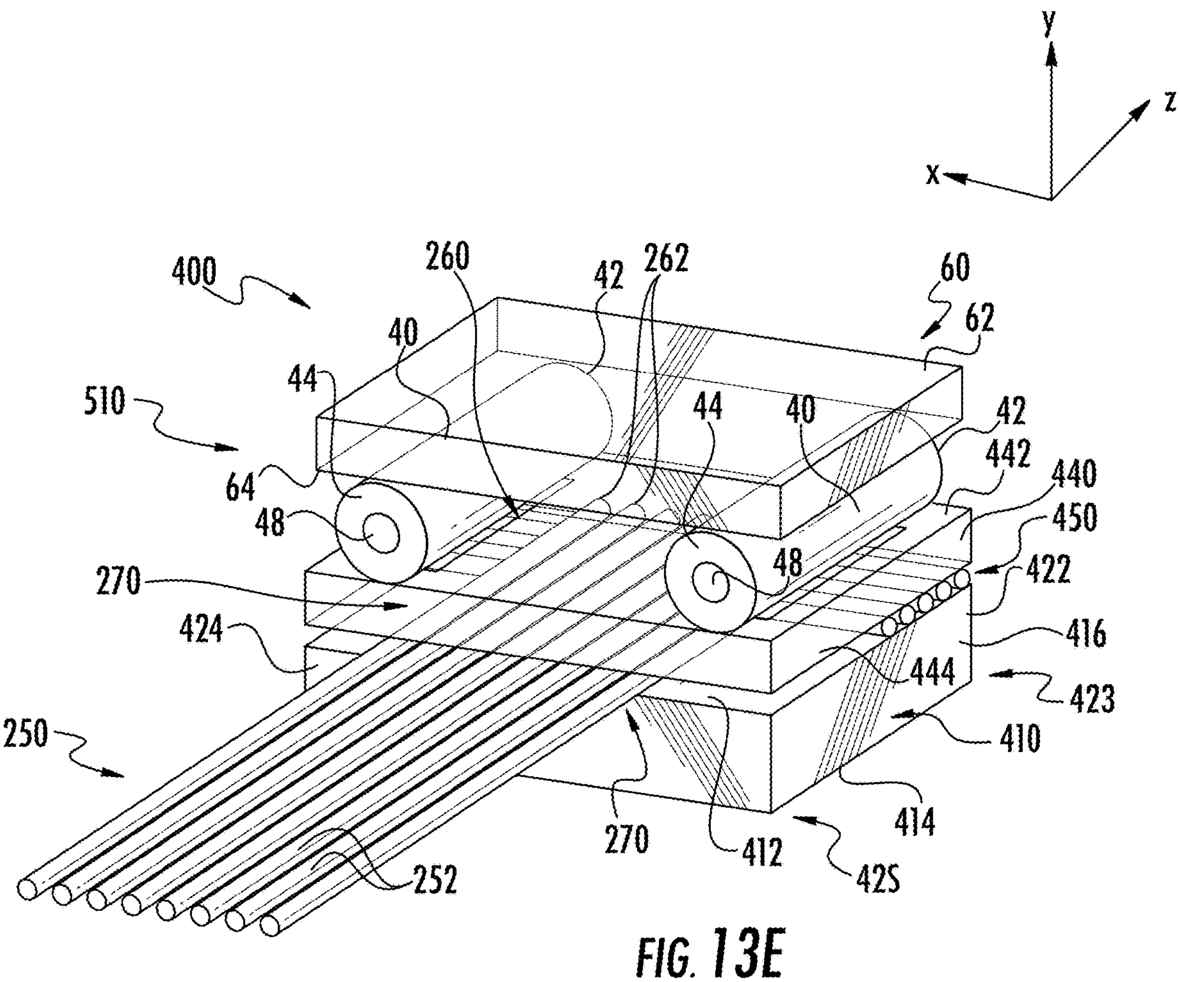
FIG. 13E is a back-elevated view of an example fiber connector that employs a ferrule having an optional cover.

FIG. 13E is similar to FIG. 13A and illustrates an embodiment wherein the fiber connector ferrule 510 includes a cover 60 secured to the guide tubes 440 on the side opposite the cover 440 to provide additional mechanical support to the structure.

Forming the Fiber Connector Using the Active Alignment Jig

Figure 14A:
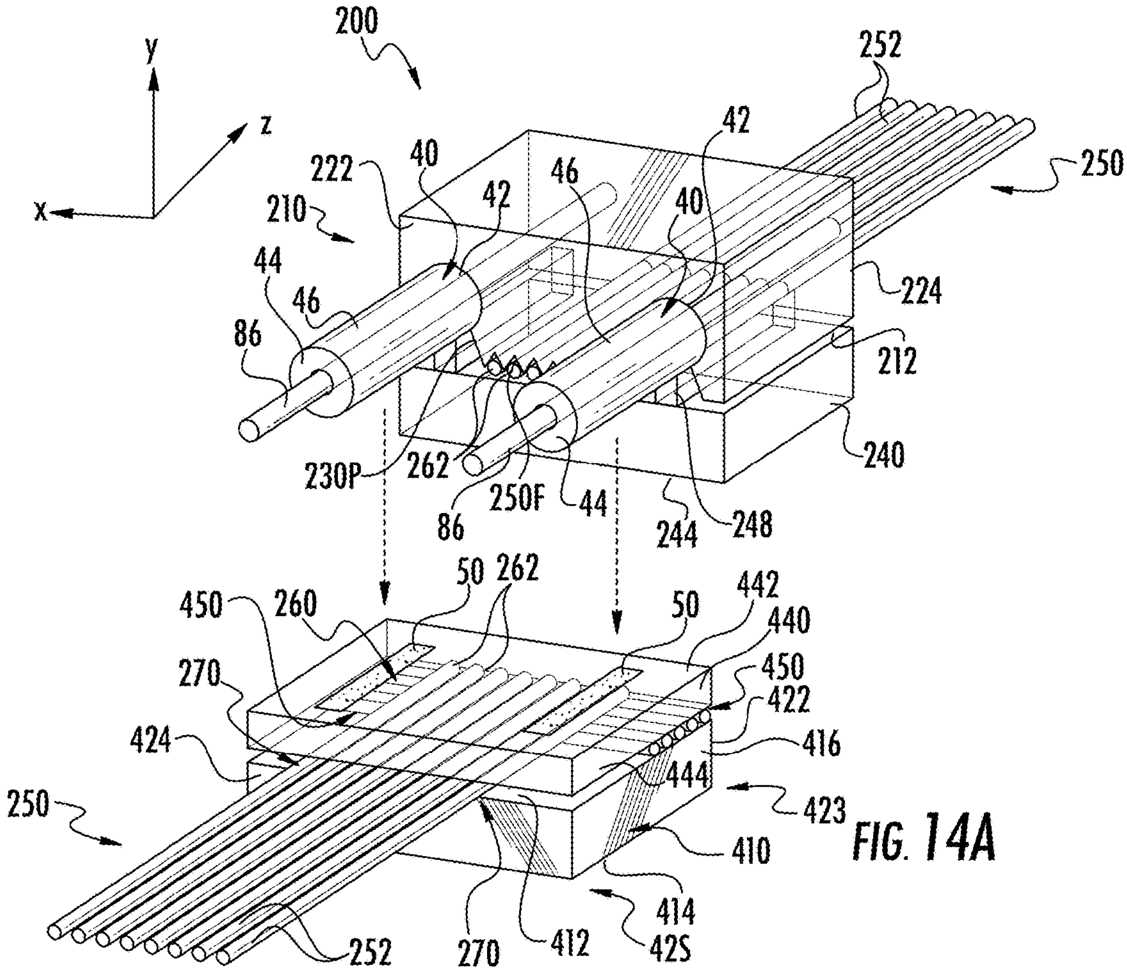
FIGS. 14A and 14B are elevated views that show an example of how the active alignment jig can be used to form a fiber connector using the ferrule disclosed herein.
Figure 14B:
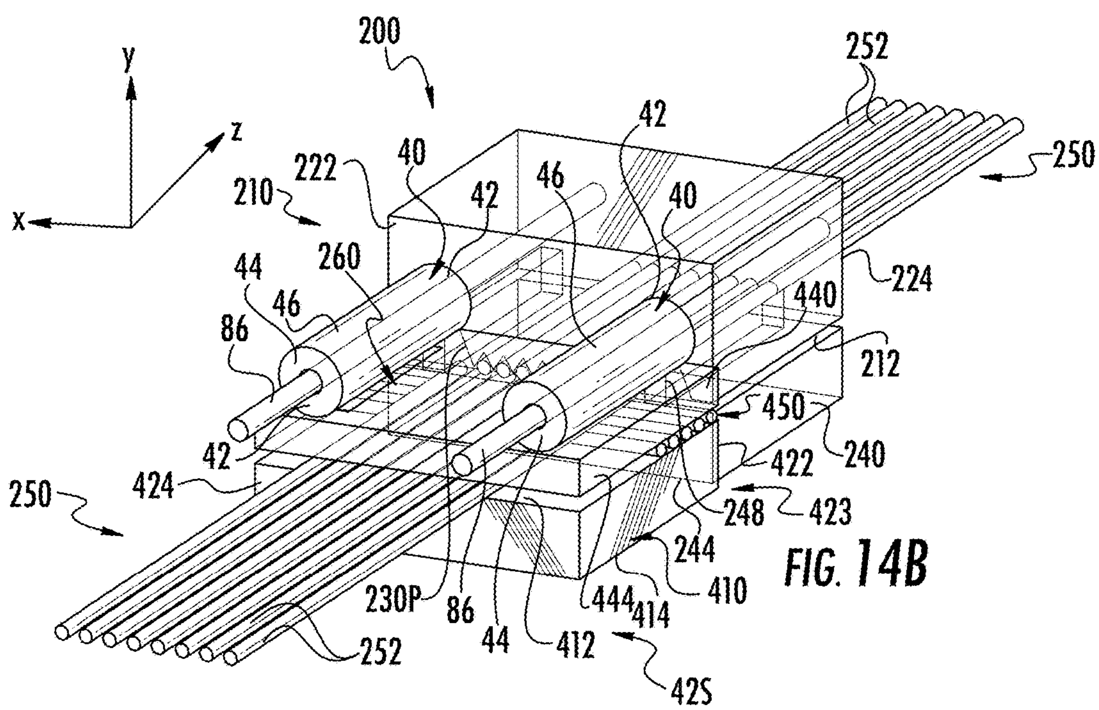

FIGS. 14A and 14B are elevated views that show an example of how the active alignment jig 200 can be used to form the fiber connector 400 by placing the two guide tubes 40 in their proper location on the top surface 442 of the spacer 440 prior to securing the guide tubes to the spacer. The active alignment jig 200 and the fiber connector 400 have the same optical fiber configuration so that the active alignment process such as that described above for the waveguide connector ferrule 10 and waveguide connector 150 can be used to position and secure the guide tubes 40 to the spacer 440 when forming the fiber connector.

Figure 14C:
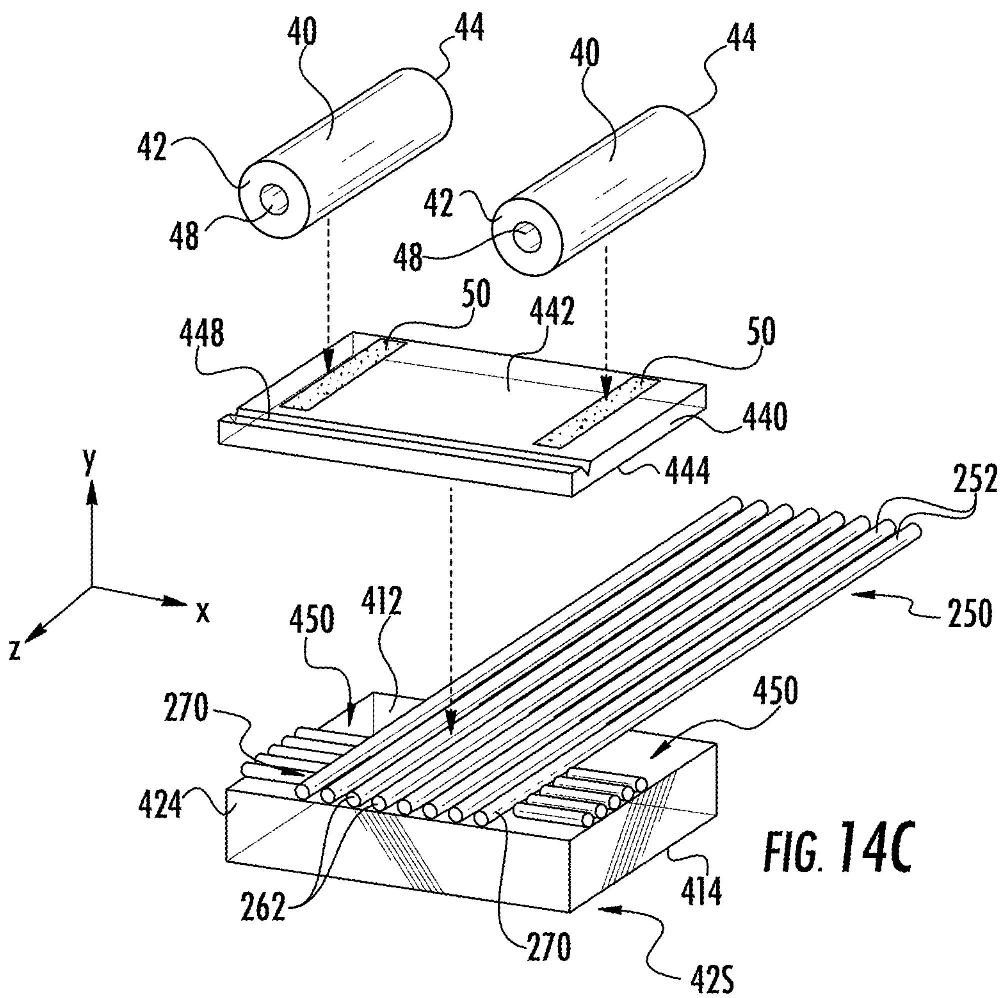
FIGS. 14C and 14D are elevated views that show an example a fiber connector wherein the glass substrate of the ferrule includes a lateral groove used to control the flow of securing material.
Figure 14D:
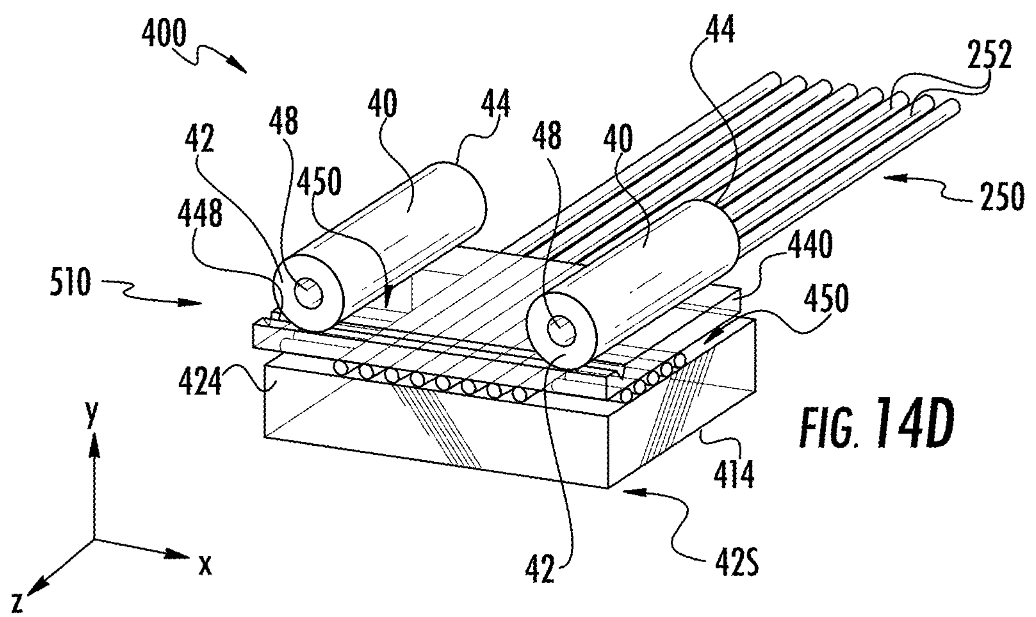

FIG. 14C is a partially exploded elevated view and FIG. 14D is an assembled elevated view of an example where the spacer 440 incudes a lateral groove 448 formed in the top surface 442 proximate to where the front ends 42 of the guide tubes 40 reside. The lateral groove 448 is for controlling the flow of securing material 50 and in particular can prevent the flow of the securing material from reaching the end faces 262 of the bare-glass portions 260 of the optical fibers 252.

Figure 15A:
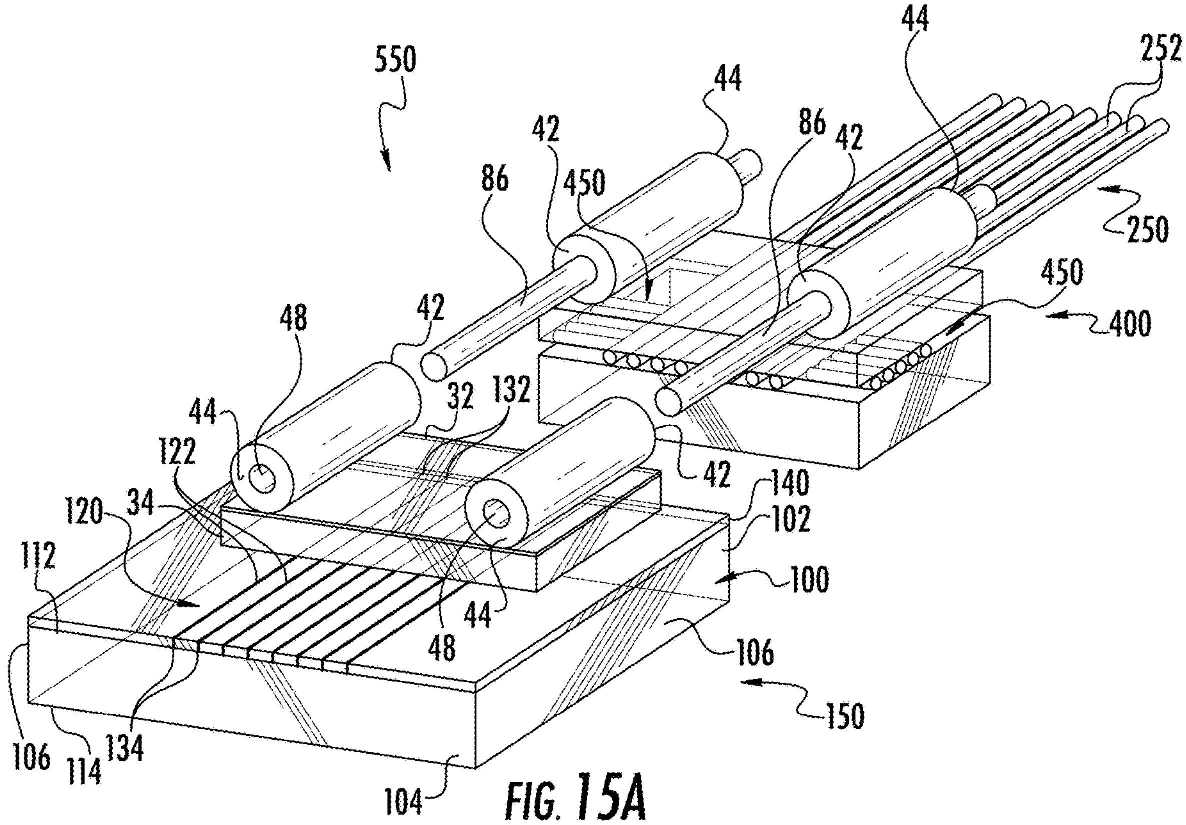
FIG. 15A is an elevated view of a waveguide connector and a fiber connector shown operably disposed to each other and spaced apart prior to engaging.
Figure 15B:
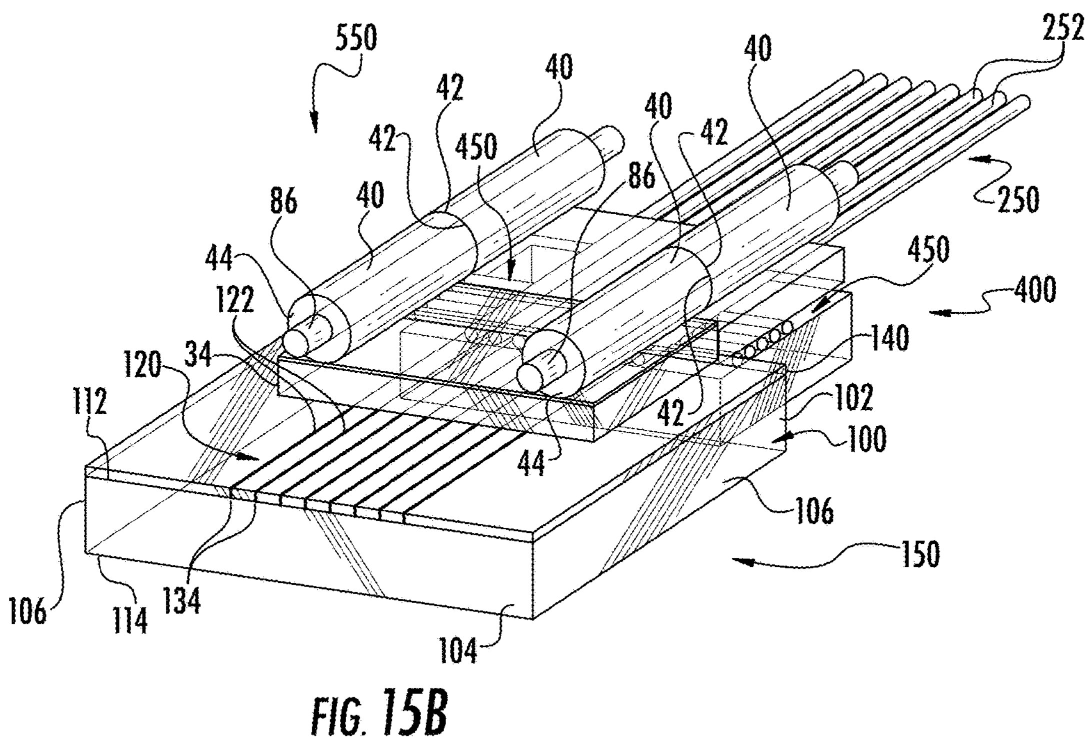
FIG. 15B shows the waveguide and fiber connectors of FIG. 15A operably engaged to form an integrated photonic device.

FIG. 15A is an elevated view of the waveguide connector 150 and the fiber connector 400 shown operably disposed to each other and spaced apart prior to engaging. FIG. 15B shows the waveguide connector 150 and the fiber connector 400 operably engaged to form an integrated photonic device 550. When so engaged, the guide pins 86 of the connector ferrule engage the bores 48 of the guide tubes 40 of the waveguide connector ferrule. This places the waveguides 122 of the waveguide connector 150 in optical communication with the optical fibers 252 of the fiber connector 400 through their respective end faces 132 and 262. While the guide pins 86 in FIG. 15A are shown to extend approximately the same distance out of their respective guide tubes 40, the guide pins can also be made to extend by different distances. This configuration allows the longer guide pin 86 to engage the bore 48 of the mating guide tube 40 of the waveguide connector 150 first. The can prevent cracking and bore damage that could otherwise occur if the guide pins 86 initially engage the respective bores 48 of the mating guide tubes 40 while being inadvertently misaligned by a small rotation about the y-axis.

Figure 15C:
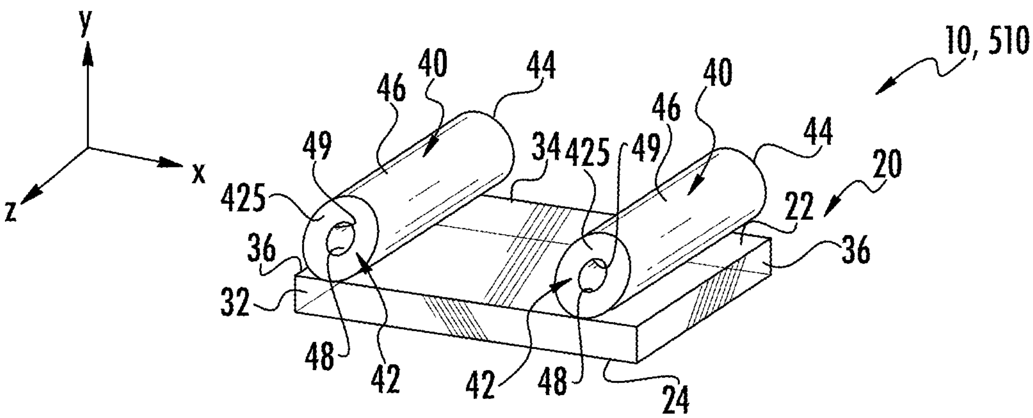
FIG. 15C is a front-elevated view of an example ferrule wherein guide tubes have angled front ends.

FIG. 15C is a front elevated view of an example ferrule 10 wherein the front ends 42 (and thus the front-end surfaces 42S) of the guide tubes 40 are angled relative to the x-y plane (i.e., the front-end surfaces do not reside in an x-y plane). The angled front ends 42 can be formed by a polishing process, e.g., laser polishing or mechanical polishing. The angled front ends 42 serve to enlarge the entrance area of the bores 48 in the direction of the angle, making it easier for insertion of the guide pins 86 of the fiber connector ferrule 510 when engaging the waveguide connector ferrule 10 and the fiber connector ferrule.

Figure 15D:
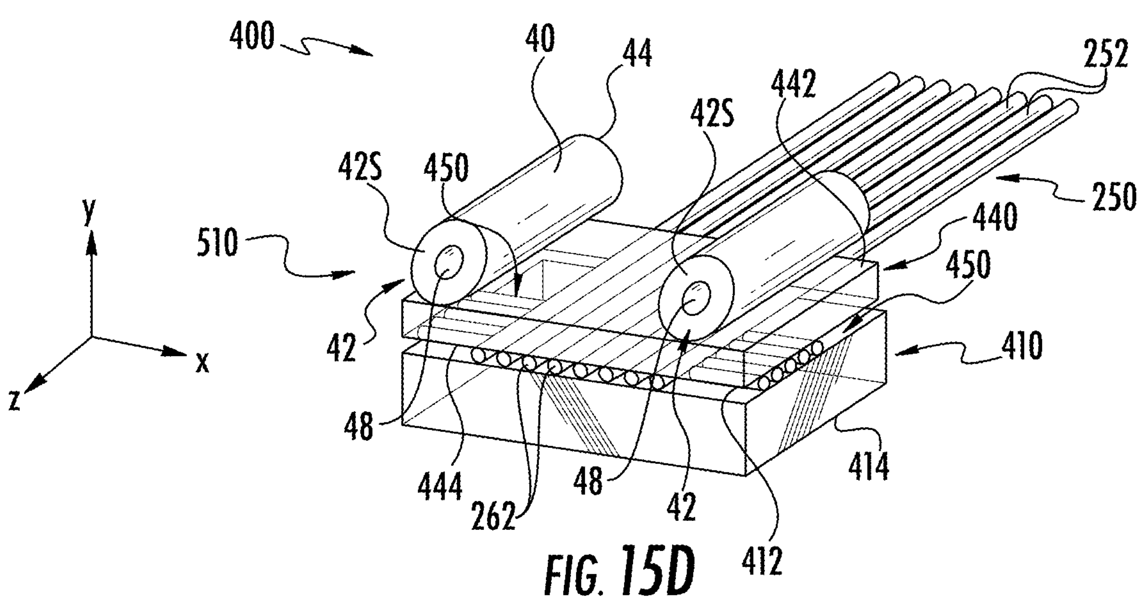
FIG. 15D is a front-elevated view of an example fiber connector that employs the ferrule of FIG. 15C having guide tubes with angled front ends.

FIG. 15D is a front elevated view of an example fiber connector 400 showing the guide tubes 40 of the fiber connector ferrule 510 having angled front ends 42. This embodiment can be effectively employed in the case where the guide tubes 40 of waveguide connector ferrule 10 support the guide pins 86. Likewise, this embodiment can be employed to facilitate the insertion and bonding of the guide pins 86 into the fiber connector ferrule 510 when forming a male fiber connector ferrule. Having a larger entrance area of the bores 58 reduces the chance of the guide pins 86 damaging the front ends 42 of the guide tubes when the guide pins are being inserted into the bores either for alignment purposes or for installation purposes to form male ferrule. The angled front ends 42 can be oriented in the same direction as shown in FIG. 15D or one tube can be rotated relative to the other. This tube configuration could be more tolerant to angular errors in guide pin position during insertion into the tube bores.

Figure 15E:
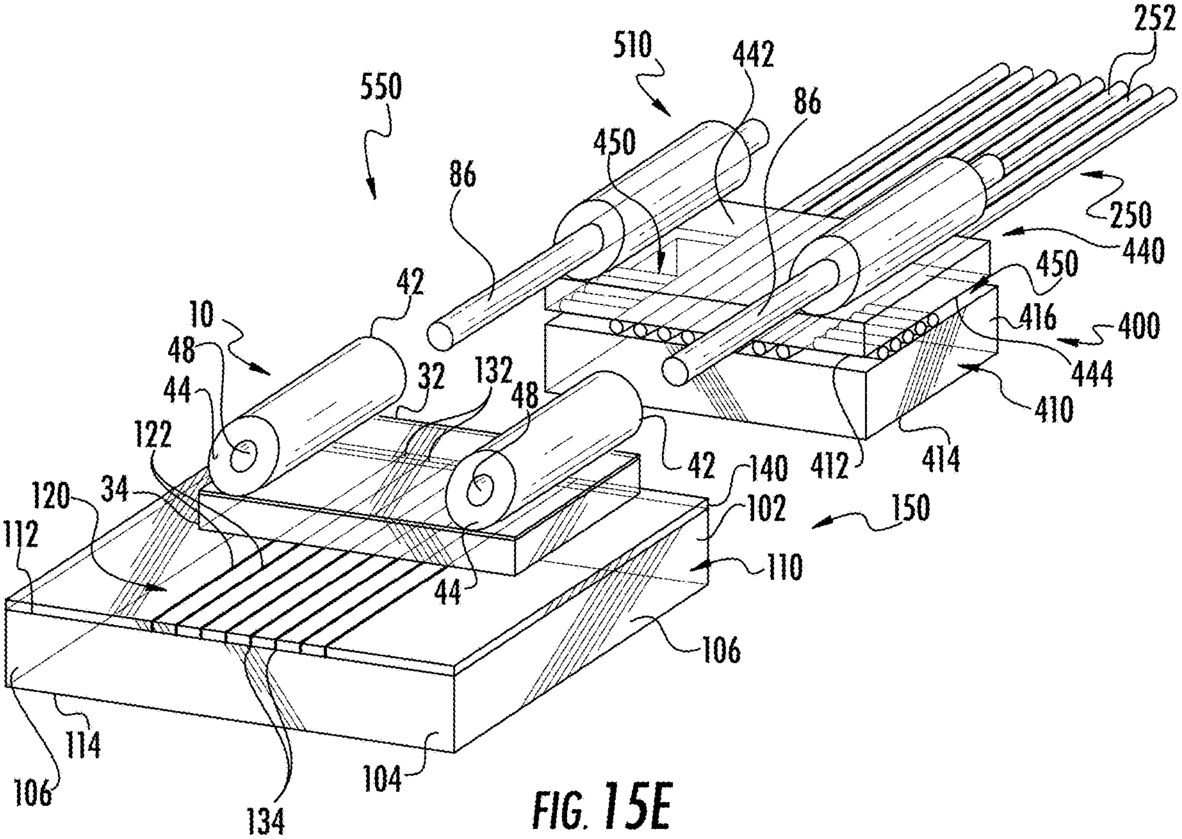
FIG. 15E is similar to FIG. 15A except that the guide tubes of the ferrules used on the waveguide connector and the fiber connector are angled.

FIG. 15E is an elevated view of the example waveguide connector ferrule 10 of FIG. 15C and the example fiber connector 400 of FIG. 15D (with guide pins 86) arranged in position to be operably engaged, with the aforementioned benefit of the larger entrance area of the bores 48 of the waveguide connector ferrule 10 due to the angled guide tubes 40.

Alternate Fiber Connector Fabrication Process

Figure 16A:
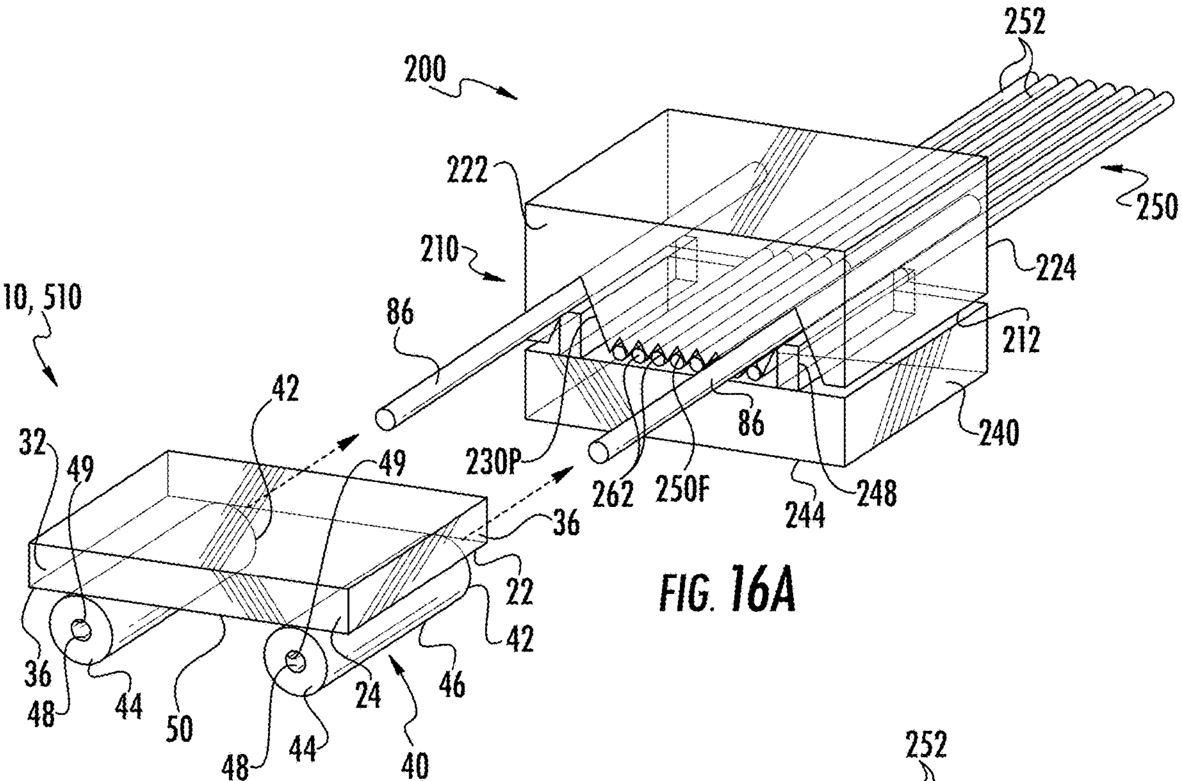
FIGS. 16A through 16C are elevated views that show another example of how the active alignment jig can be used to form a fiber connector using the ferrule disclosed herein.
Figure 16B:
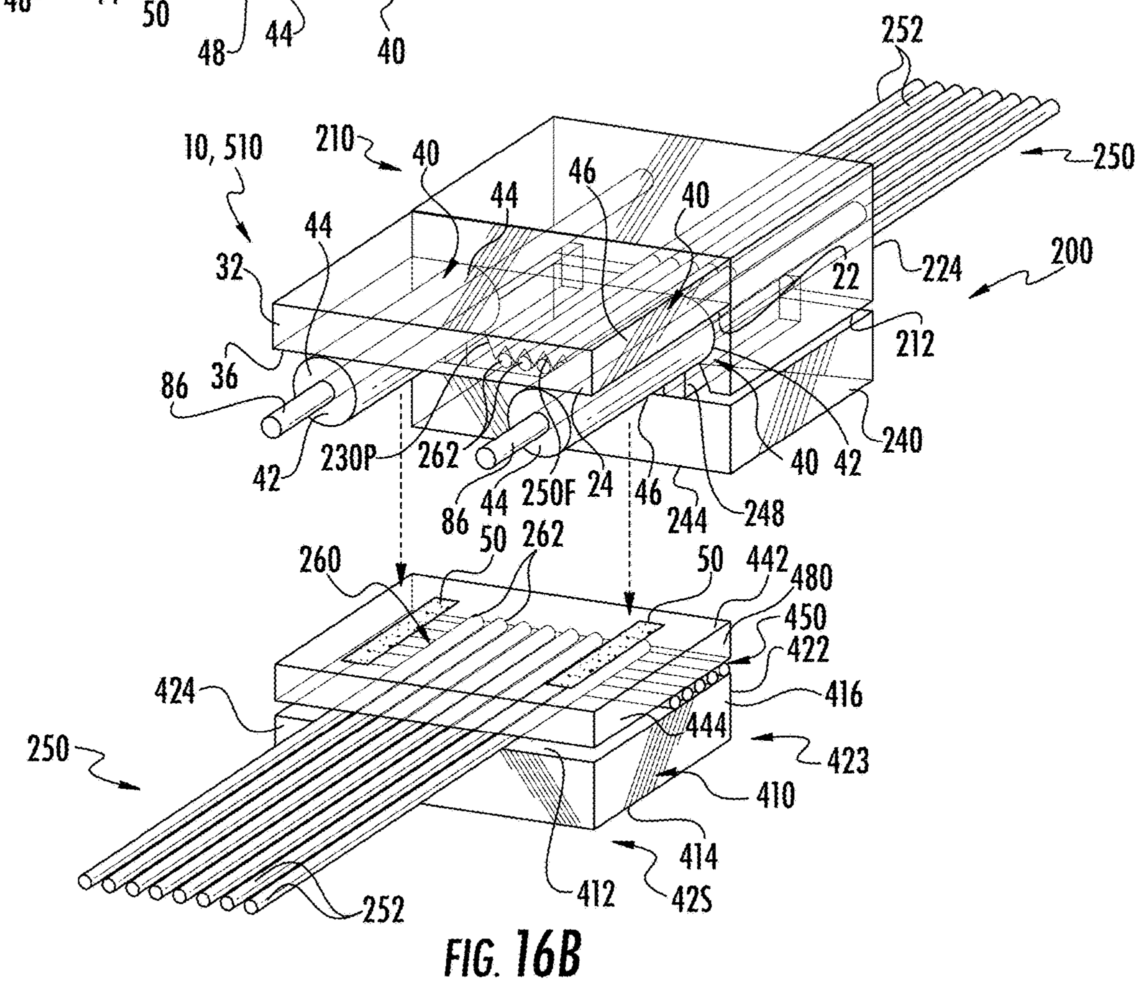
Figure 16C:
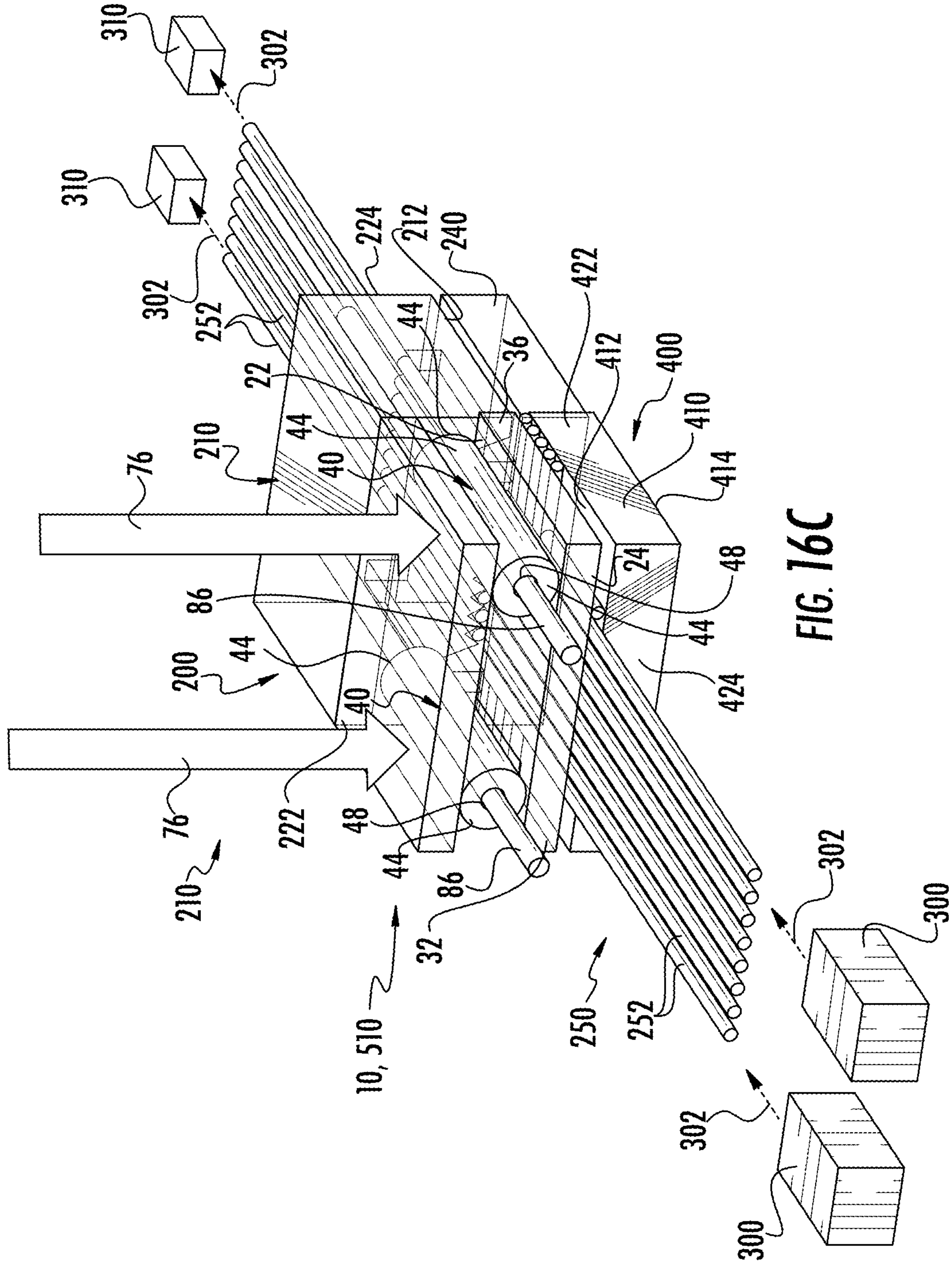

FIGS. 16A through 16C are elevated views that illustrate an example fabrication process for forming the fiber connector 400 using the active alignment jig 200 and a fiber connector ferrule 10 already formed as described above. FIG. 16A shows the active alignment jig 200 ready to receive the fiber connector ferrule 510 by the guide pins 86 of the active alignment jig engaging the bores 48 of the guide tubes 40 of the fiber connector ferrule, with the guide tubes downwardly depending from the support substrate 20. FIG. 16B shows the waveguide connector ferrule 510 as engaged with the active alignment jig 200 and also shows an example fiber support structure 456 with securing material 50 added to the top surface 442 of the spacer 440 at the locations where the guide tubes 40 are to be added to the fiber support structure.

FIG. 16C is similar to FIG. 16B and shows the fiber connector ferrule 510 lowered onto the fiber support structure 456 so that the guide tubes 40 contact the securing material 50 on the top surface 442 of the spacer 440. At this point, the active alignment process as described above is carried out to adjust the position of the fiber connector ferrule 10 until the target position associated with maximum optical power transmission between at least one optical fiber 252 of the fiber connector 400 and the corresponding optical fiber of the active alignment jig 200 is obtained. The securing material 50 is then allowed to cure or is actively cured, e.g., using UV radiation 76. The final fiber connector 400 is as shown in FIG. 13E.

Fiber Connector with V-Groove Cover

Figure 17A:
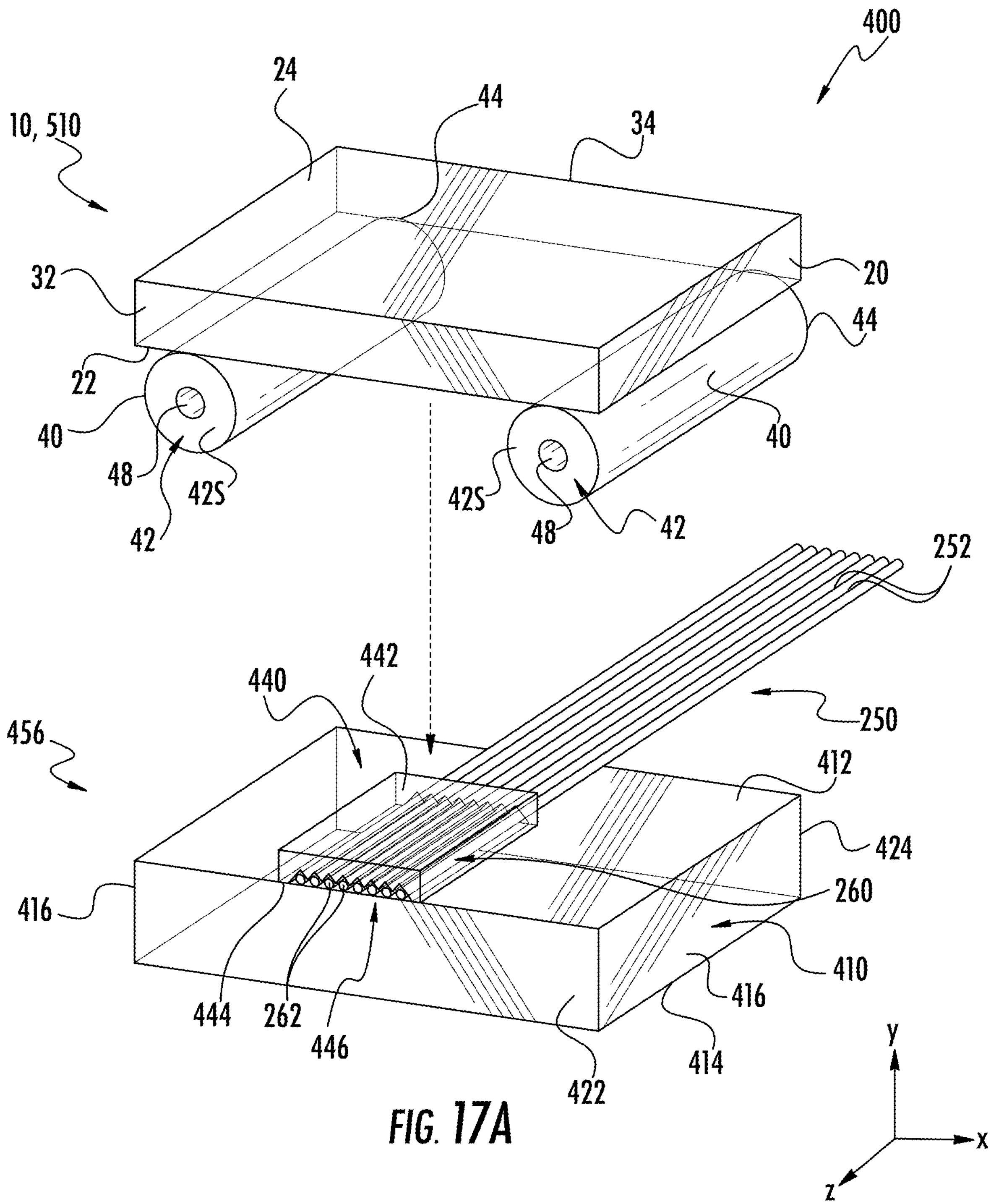
FIGS. 17A through 17C are front-elevated views that illustrate another example method of fabricating the fiber connector that employs a cover having V-grooves that engage the optical fibers.
Figure 17B:
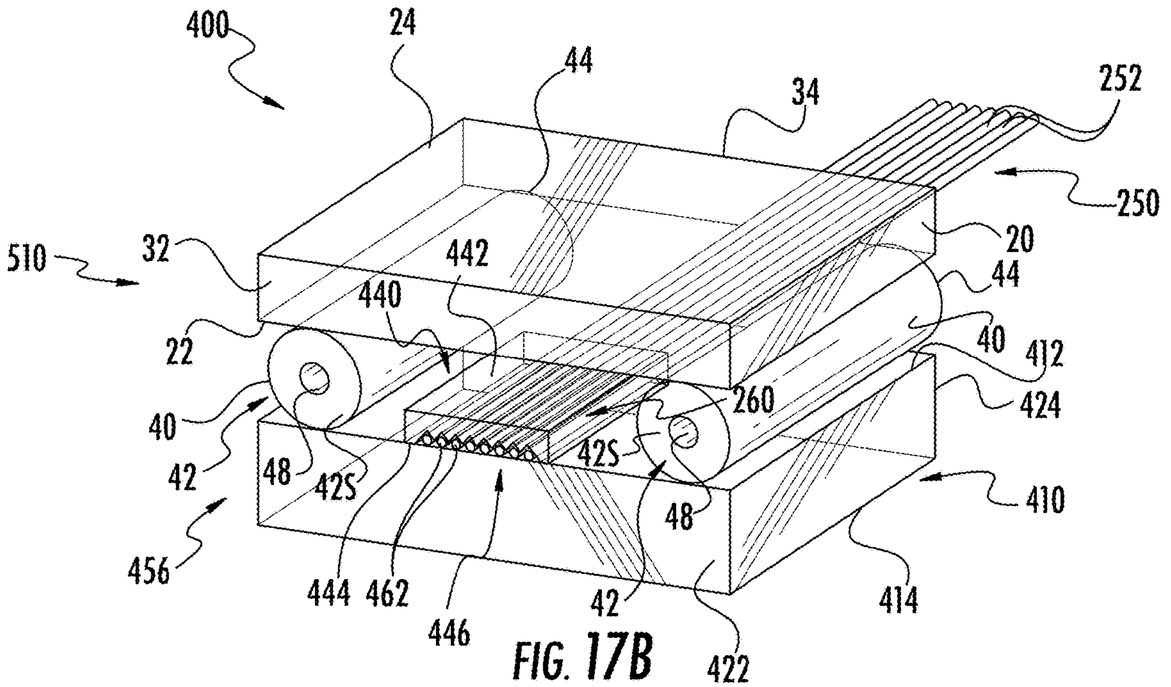
Figure 17C:
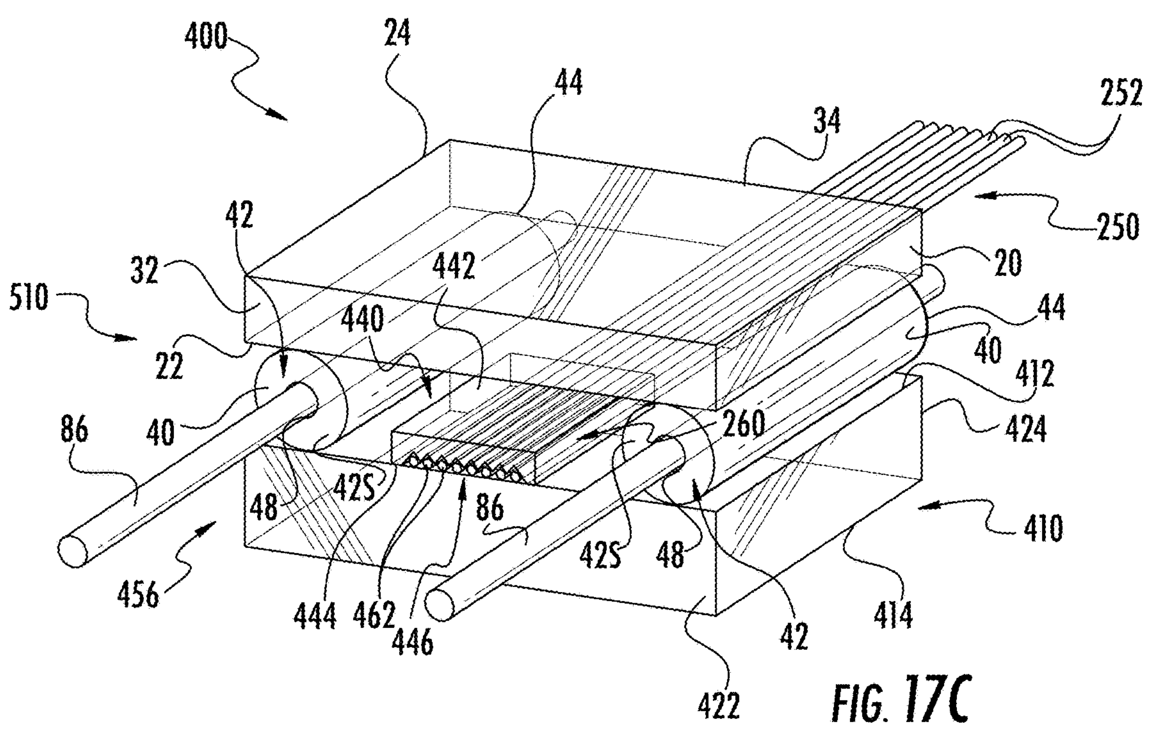

FIGS. 17A through 17C are front-elevated views that illustrate another example method of fabricating the fiber connector 400. FIG. 17A is front-elevated partially explode view that shows an example fiber connector ferrule 510 disposed above an example fiber support structure 456 wherein the bottom surface 444 of the cover 440 includes fiber V-grooves 446 that support the bare glass portions 260 of the optical fibers 252. The cover 440 is shorter in the x-direction so that the guide tubes 40 of the fiber connector ferrule 510 can secured directly to the top surface 412 of the fiber support substrate 410 of the fiber support structure 456, as shown in FIG. 17B.

Note that in this embodiment, the cover 440 does not serve as a spacer but is a V-groove cover that engages the optical fibers 252. The fiber V-grooves 446 in the bottom surface 444 of the cover 440 obviate the need for fiber-retaining members 450. FIG. 17C shows the addition of the guide pins 86 to the bores 48 of the guide tubes 40 to complete the fiber connector 400. Note how the basic ferrule 10 described above can be used as the fiber connector ferrule 510 when forming the fiber connector 400. In an alternative embodiment fiber alignment V-grooves are provided on the top surface of fiber support structure 456. In this case fiber V-grooves are not required on the bottom surface 444 of the cover 440.

Figure 18A:
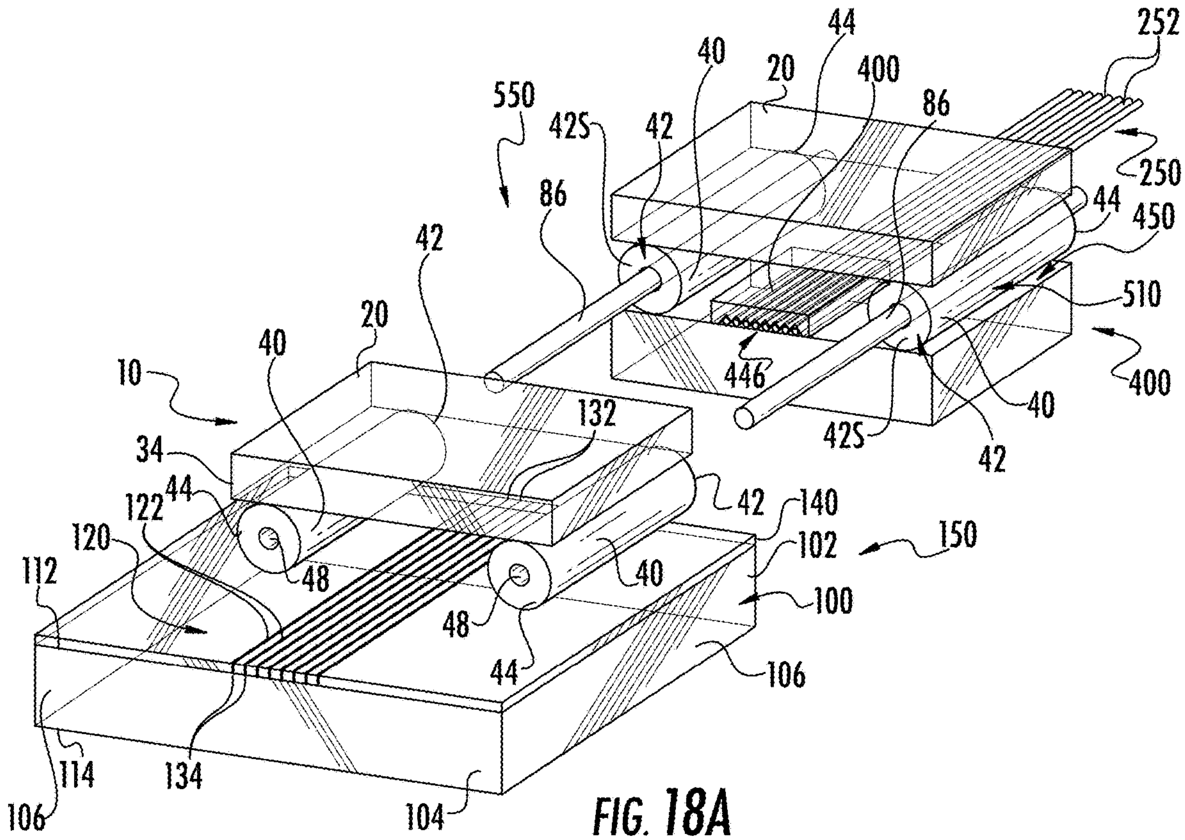
FIGS. 18A and 18B are similar to FIGS. 15A and 15B but with the example fiber connector of FIG. 17C.
Figure 18B:
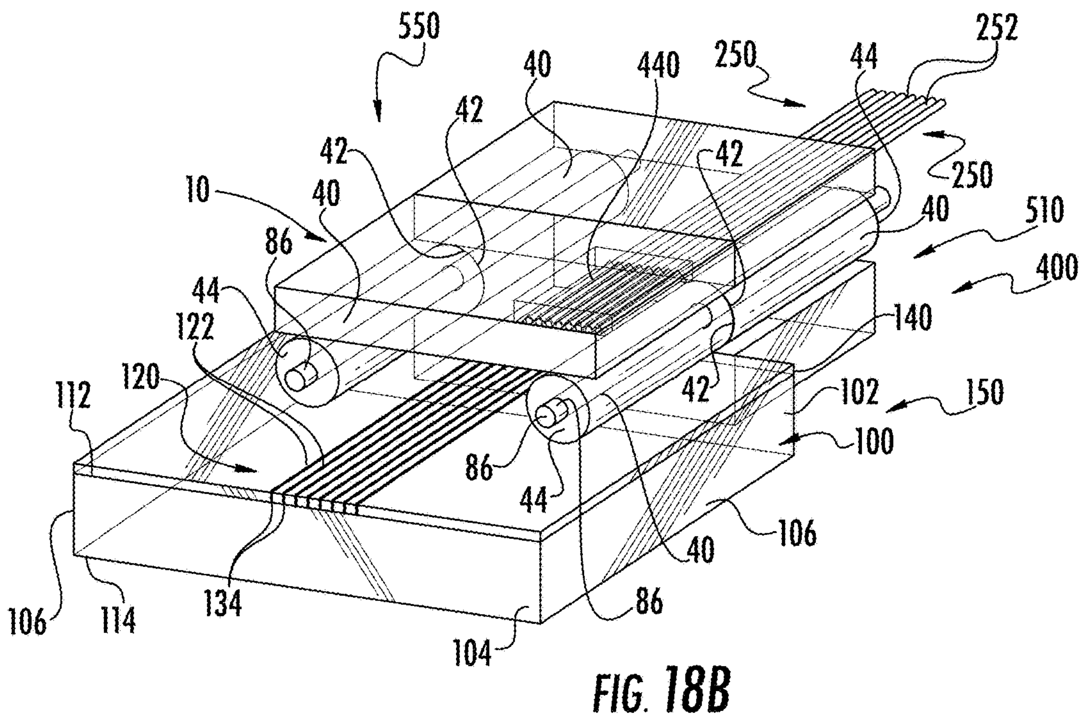

FIGS. 18A and 18B are similar to FIGS. 15A and 15B, with FIG. 18A being an elevated view of the waveguide connector 150 and the fiber connector 400 of FIG. 17C shown in position prior to engaging. FIG. 18B shows the waveguide connector 150 and the fiber connector 400 operably engaged to form an example integrated photonic device 550. When so engaged, the guide pins 86 of the fiber connector ferrule 510 engage the bores 48 of the guide tubes 40 of the waveguide connector ferrule 10. This places the waveguides 122 of the waveguide connector 150 in optical communication the optical fibers 252 of the fiber connector 400 via their respective end faces 132 and 262.

FIGS. 19A through 19G are elevated views that illustrate an example fabrication process for forming the fiber connector 400 using an example connector ferrule 510 having the configuration of the basic ferrule 10 as shown in FIG. 4F and in FIG. 7C, i.e., with the guide tubes 40 sandwiched by the spacer 20 and the cover 60.

Figure 19A:
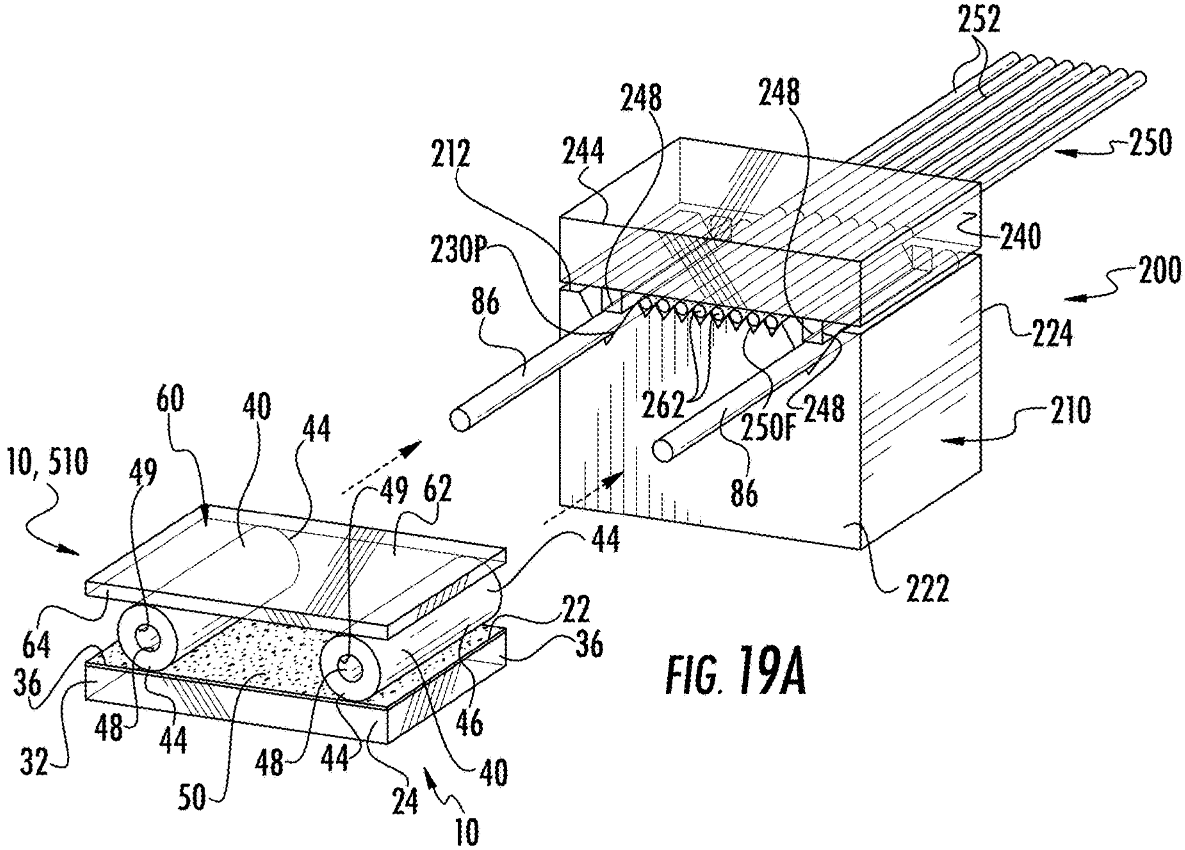
FIGS. 19A through 19F are front-elevated views that illustrate another example method of fabricating the fiber connector disclosed herein using the active alignment jig, wherein the optical fibers reside on the bottom side of the glass substrate of the ferrule and are secured thereon using a V-groove cover.
Figure 19B:
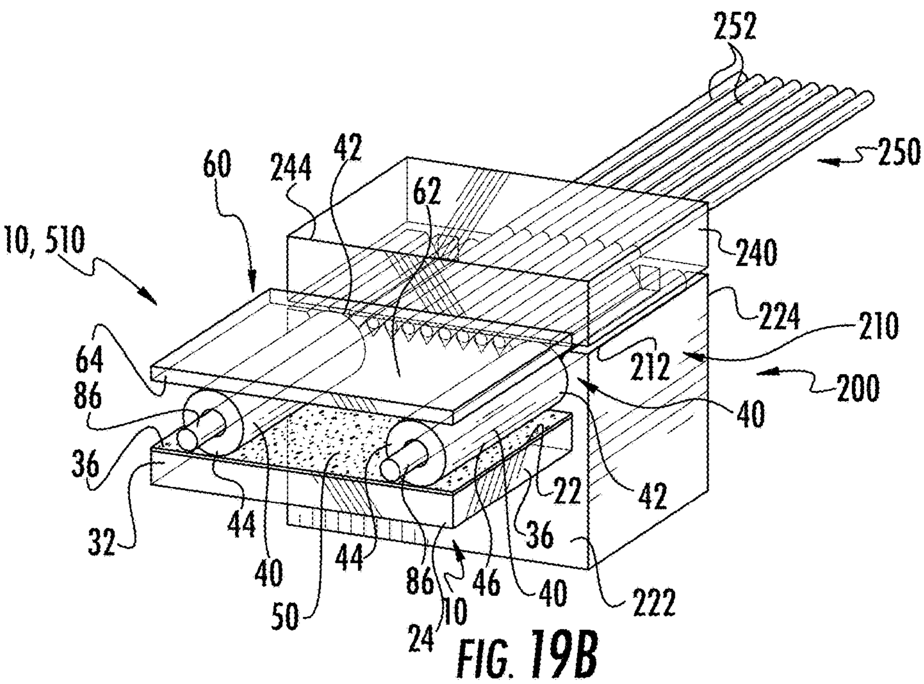

FIG. 19A shows the fiber connector ferrule 510 arranged adjacent the active alignment jig 200 while FIG. 19B shows the fiber connector ferrule operably engaged with the active alignment jig 200, with the guide pins 86 of the active alignment jig inserted into the bores 48 of the guide tubes 40.

Figure 19C:
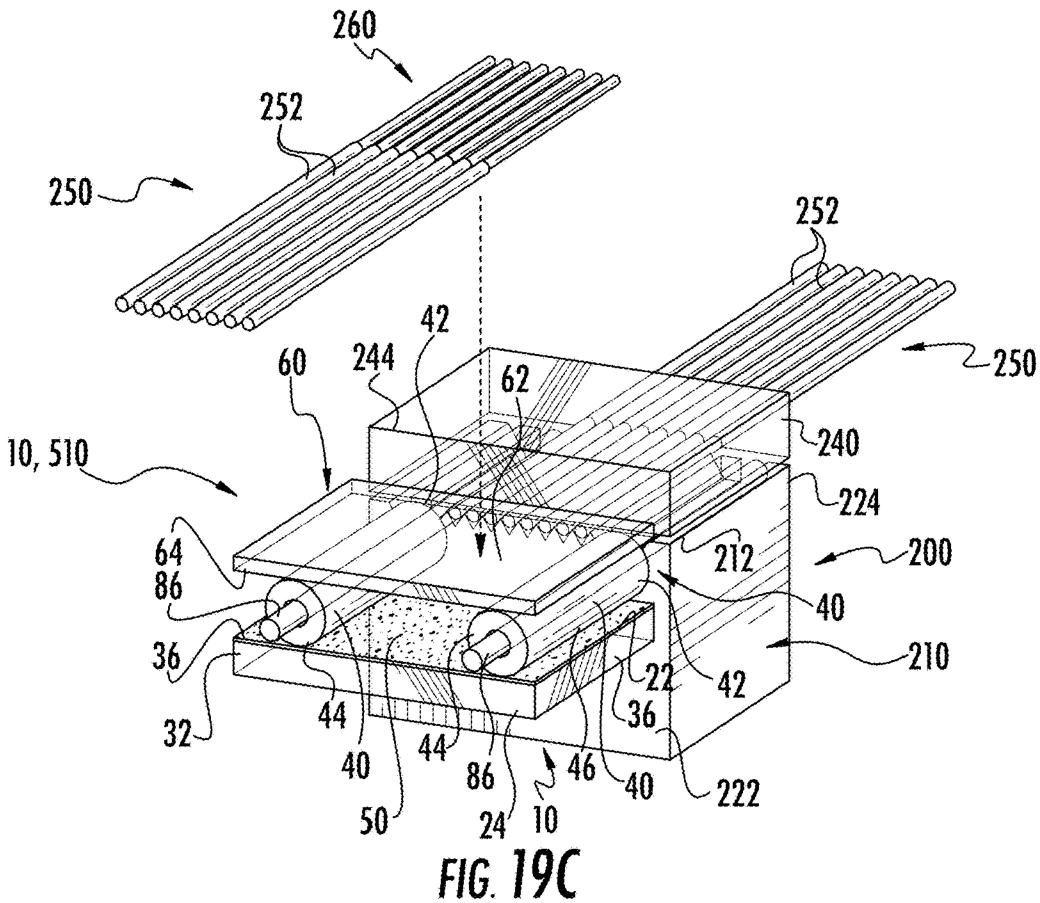
Figure 19D:
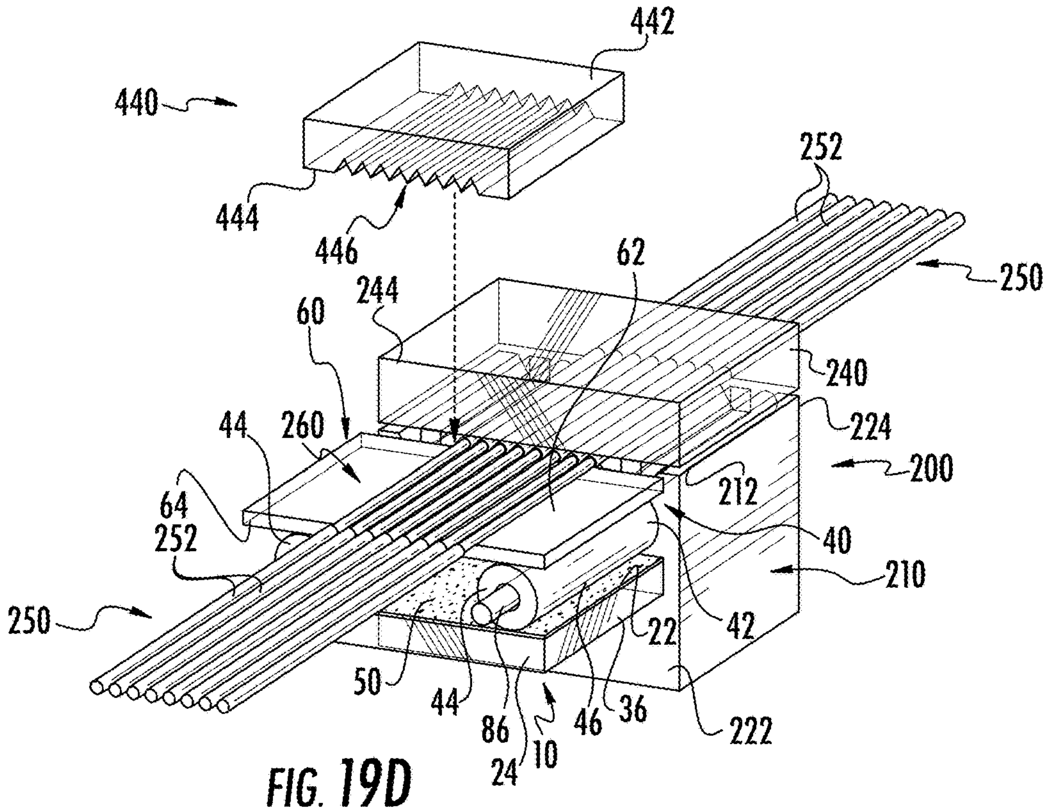
Figure 19E:
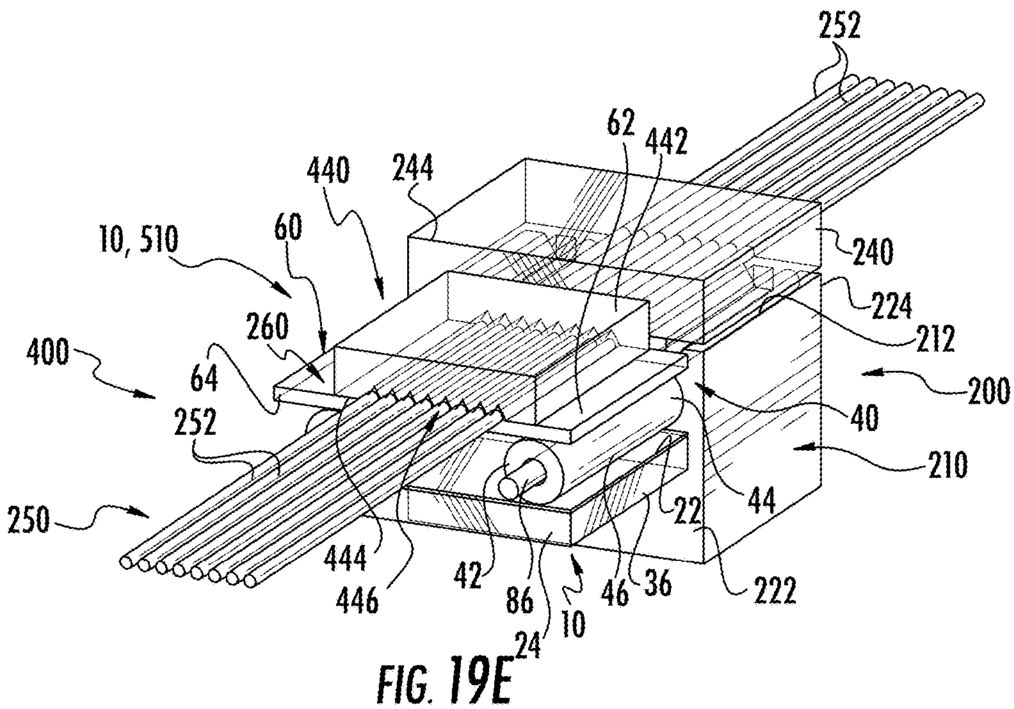

FIG. 19C is similar to FIG. 19B and shows an array 250 of optical fibers 252 disposed above the top surface 462 of the cover 60. FIG. 19D shows the array 250 of optical fibers 252 with the bare glass portions 260 supported on the top surface 462 of the cover 60. Securing material 50 is then added to the bare glass portions 260. A V-groove substrate 520 that has a top surface 522 and a bottom surface 524 with fiber V-grooves 526 formed therein is then lowered onto the securing material 50, as shown in FIGS. 19D and 19E.

Figure 19F:
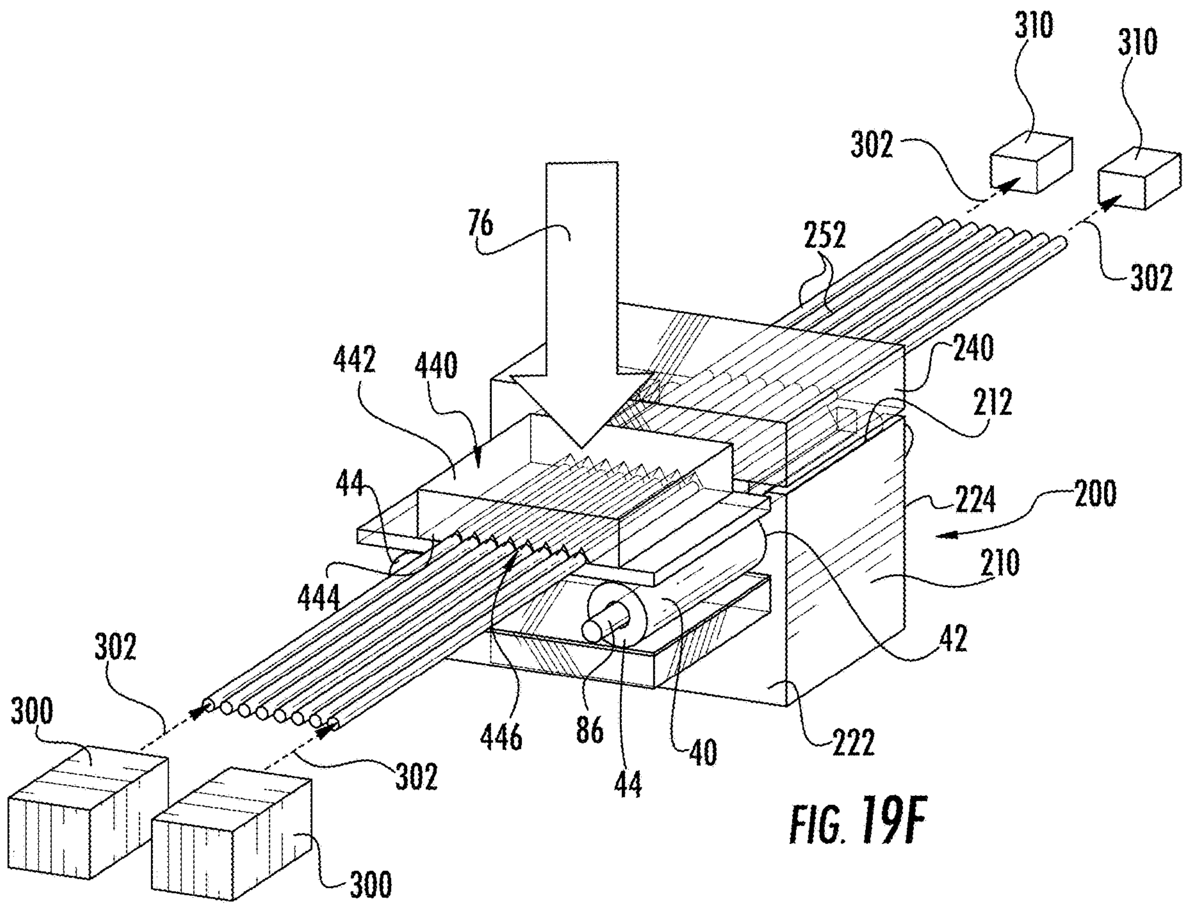

With reference to FIG. 19F, prior to allowing the securing material 50 to cure or prior to actively curing the securing material, active alignment is performed. The active alignment jig 200 is used to adjust the position of the V-groove substrate 520 on the connector ferrule 510 and the optical fiber array 250 until the target position is achieved. The securing material 50 is then allowed to cure or is actively cured, e.g., using UV radiation 76.

Figure 19G:
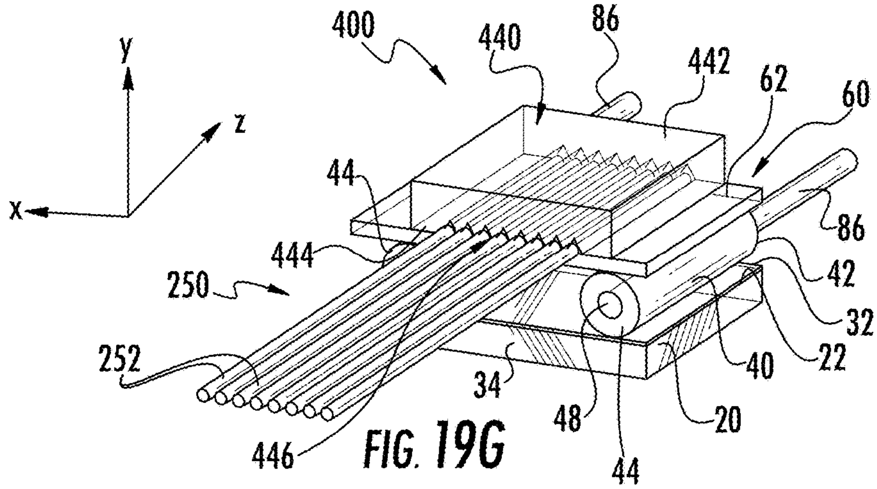
FIG. 19G is back-elevated view and FIG. 19H is a front-on view of the example fiber connector as formed using the method steps illustrated in FIGS. 19A through 19F.
Figure 19H:
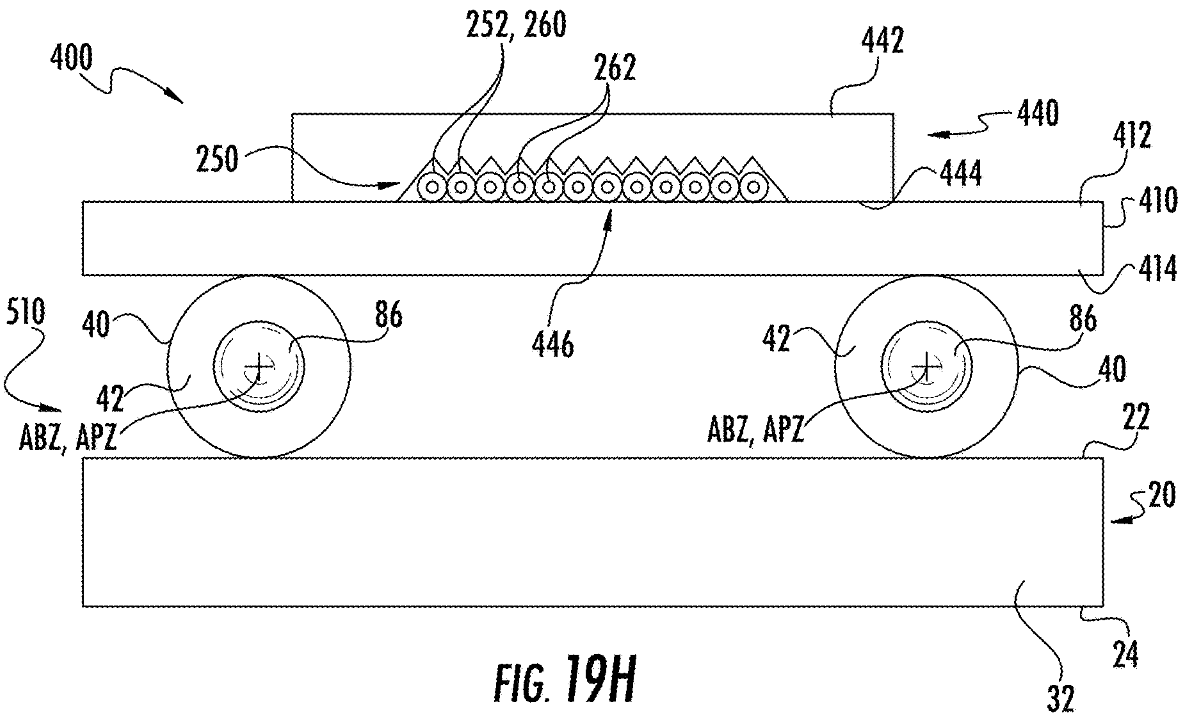

FIG. 19G shows the final fiber connector 400 formed after curing of the securing material 50 and after the active alignment jig 200 has been removed and guide pins 86 have been added. FIG. 19H is a front-on view of the fiber connector 400 of FIG. 19G.

Integrated Photonic System

Figure 20A:
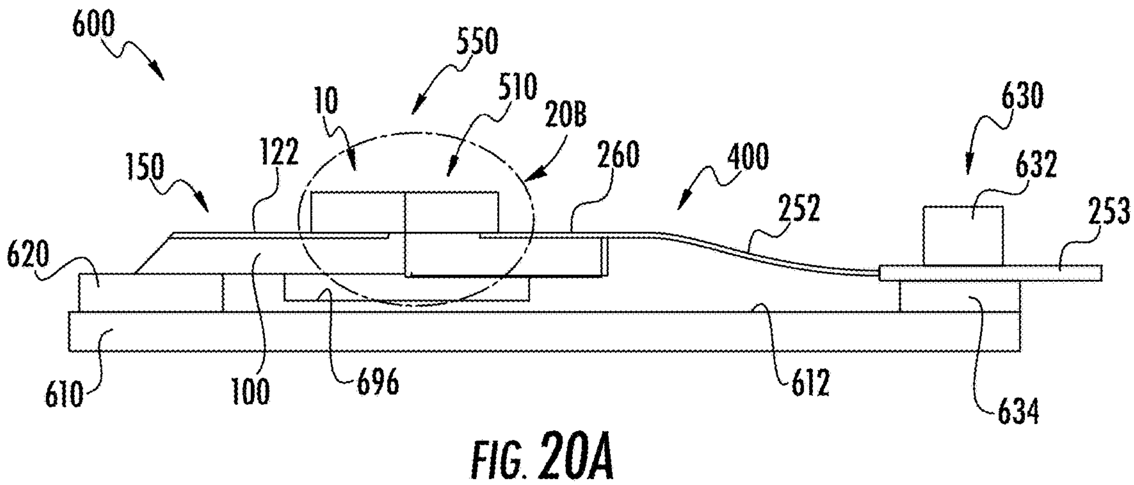
FIG. 20A is a side view of an example integrated photonic system.
Figure 20B:
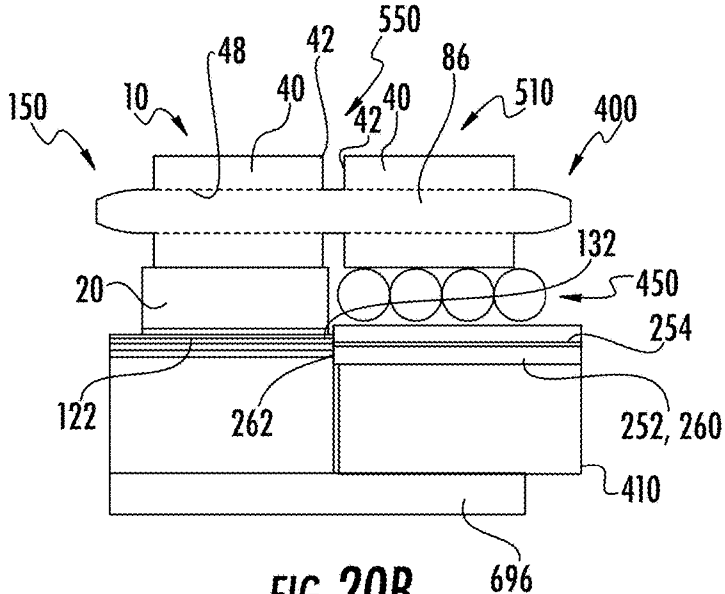
FIG. 20B is a close-up side view of a central portion of the integrated photonic system of FIG. 20A.
Figure 20C:
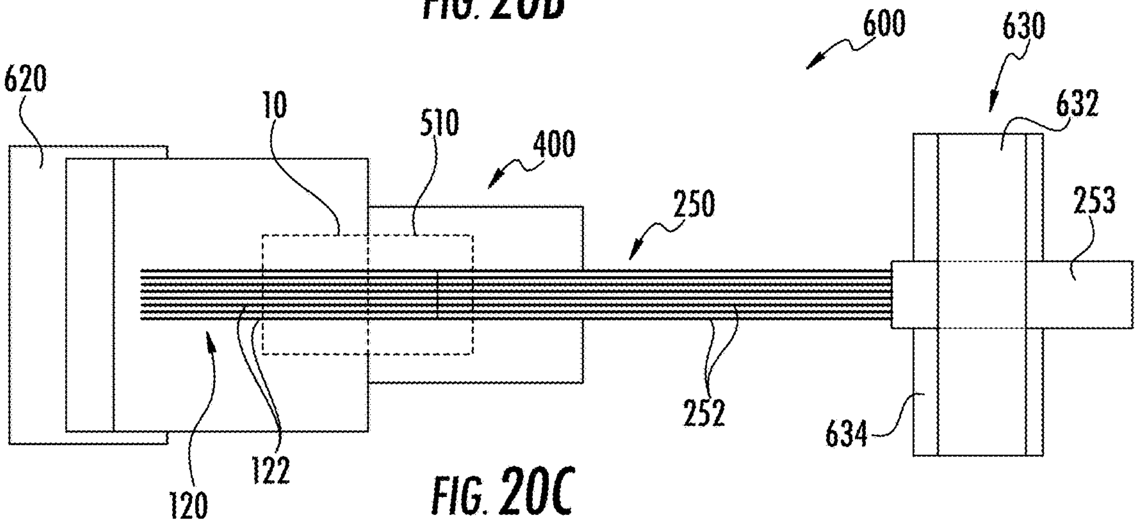
FIG. 20C is a top-down view of the integrated photonic system of FIG. 20A.

FIG. 20A is a side view of an example integrated photonic system 600. FIG. 20B is a close-up side view of a central portion of the integrated photonic system 600 of FIG. 20A. FIG. 20C is a top-down view of the integrated photonic system 600 of FIG. 20A.

The integrated photonic system 600 includes a support substrate 610 having a top surface 612 that supports the waveguide connector 150 as described above. The support substrate 610 also supports a fiber connector 400 as described above. In an example, the support substrate 610 is in the form of a printed circuit board (PCB) and includes components such as conductive wires, conductive pads, electrical processing devices, etc. (not shown) normally associated with PCBs.

The waveguide connector 150 is optically coupled to a PIC 620, which includes waveguides as well as active devices (not shown). The optical fiber array 250, which extends from the back end of the fiber connector 400, is supported on the support substrate 610 by a strain-relief device 630. In an example, the array of optical fibers 250 are supported in an optical fiber cable 253, such as a ribbon cable, and a portion of the optical fiber cable is supported by the strain-relief device 630. Between the fiber connector ferrule 510 and the strain-relief device 630, the optical fibers 252 are coated but not ribbonized and have some slack. This configuration accommodates small relative displacements of the waveguide connector 150 and the fiber connector 400. Such displacements may arise during mating of the waveguide connector ferrule 10 to the connector ferrule 510, or in operation due to temperature variations combined with CTE mismatches in selected optical, electronic, and packaging materials.

The strain-relief device 630 also at least substantially isolates the waveguide connector 150 and the fiber connector 400 from strains in the array 250 of optical fibers 252 that can arise from internal as well as from external source, e.g., during installation of the optical fiber cable 253.

In an example, the strain-relief device 630 comprises a clamp 632 that can be latched and unlatched from a base 634, thereby allowing for multiple optical fiber cables 253 to be retained in proximity to the integrated photonic system 600 and swapped in and out of the fiber connector 400, and to allow for individual optical fiber cables to be retained during board-level optical fiber cable routing. In an example, the clamp-based strain-release device 630 can be configured to engage with a mating anchor feature (not shown) on the optical fiber cable 253. In an example, the clamp 632 is configured to be activated by a pick-and-place system.

Figure 20D:
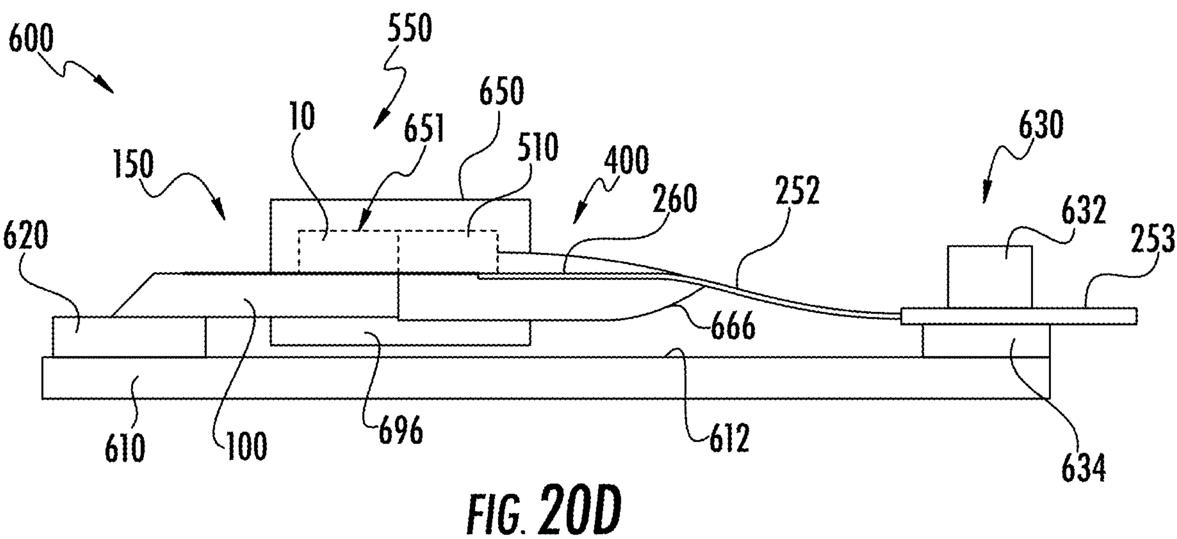
FIG. 20D is similar to FIG. 20A and illustrates an example wherein the integrated photonic system includes a waveguide connector housing.

FIG. 20D is similar to FIG. 20A and illustrates an example wherein the integrated photonic system 600 includes a waveguide connector housing 650 having an interior 651. The waveguide connector housing 650 is supported by the waveguide connector 150 and houses in the interior 651 the waveguide connector ferrule 10 as well as a portion of the PLC 100. In an example, the waveguide connector housing 650 has an open front end 652 that allows for a front-end portion of the fiber connector 400 to reside within the housing interior 651 when the waveguide connector 150 and the fiber connector 400 are operably engaged.

The integrated photonic system 600 of FIG. 20D also shows an example of a strain-relief boot 666 formed on a back-end portion of the fiber connector 600. The strain-relief boot 666 is configured to provide strain relief to the coated optical fibers 252 that extend from the back end of the fiber connector ferrule 510 and that lead into the optical fiber cable 253 supported by the strain-relief device 630. In an example, the strain-relief boot 666 is made of a polymer material.

Coarse Alignment Features

Figure 21A:
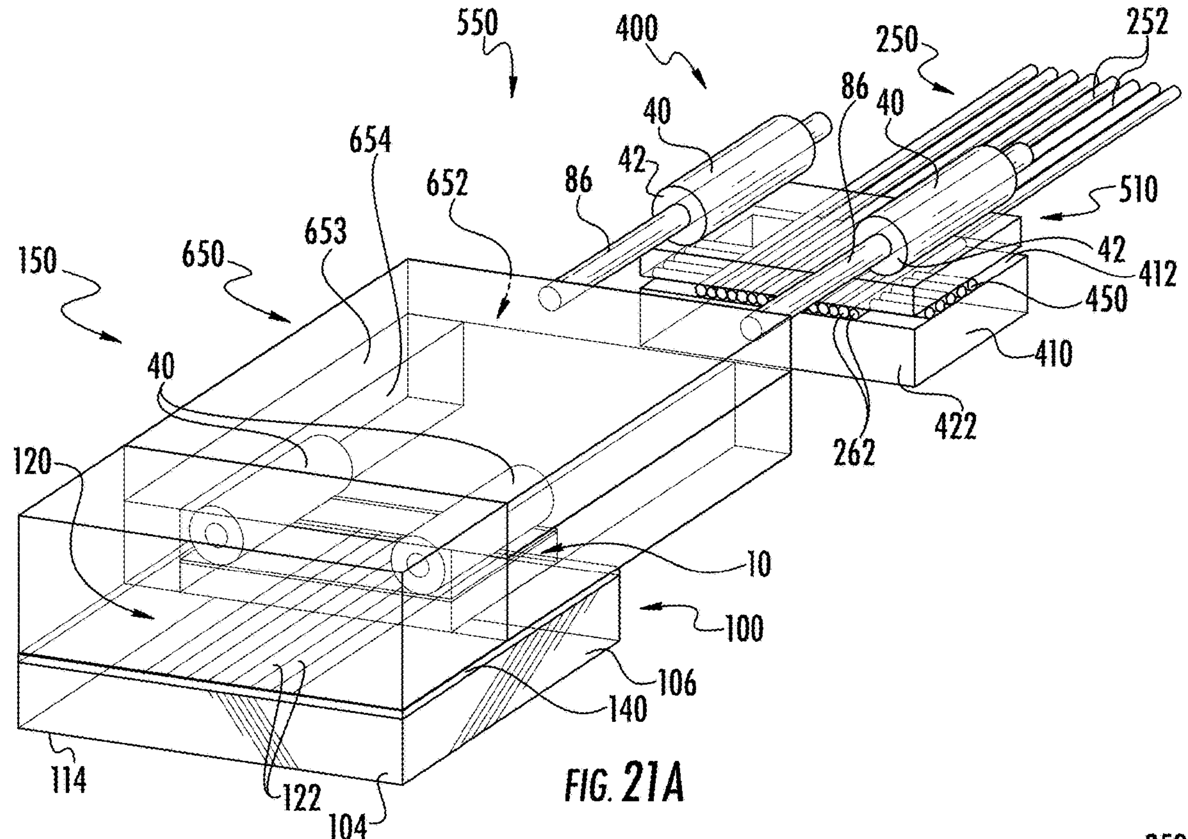
FIGS. 21A and 21B are similar to FIG. 18A and show an example of the waveguide connector and the fiber connector, wherein the waveguide connector includes the waveguide connector housing, with FIG. 21B showing a front portion of the waveguide connector housing removed to better show an example squared-off U-shaped configuration.
Figure 21B:
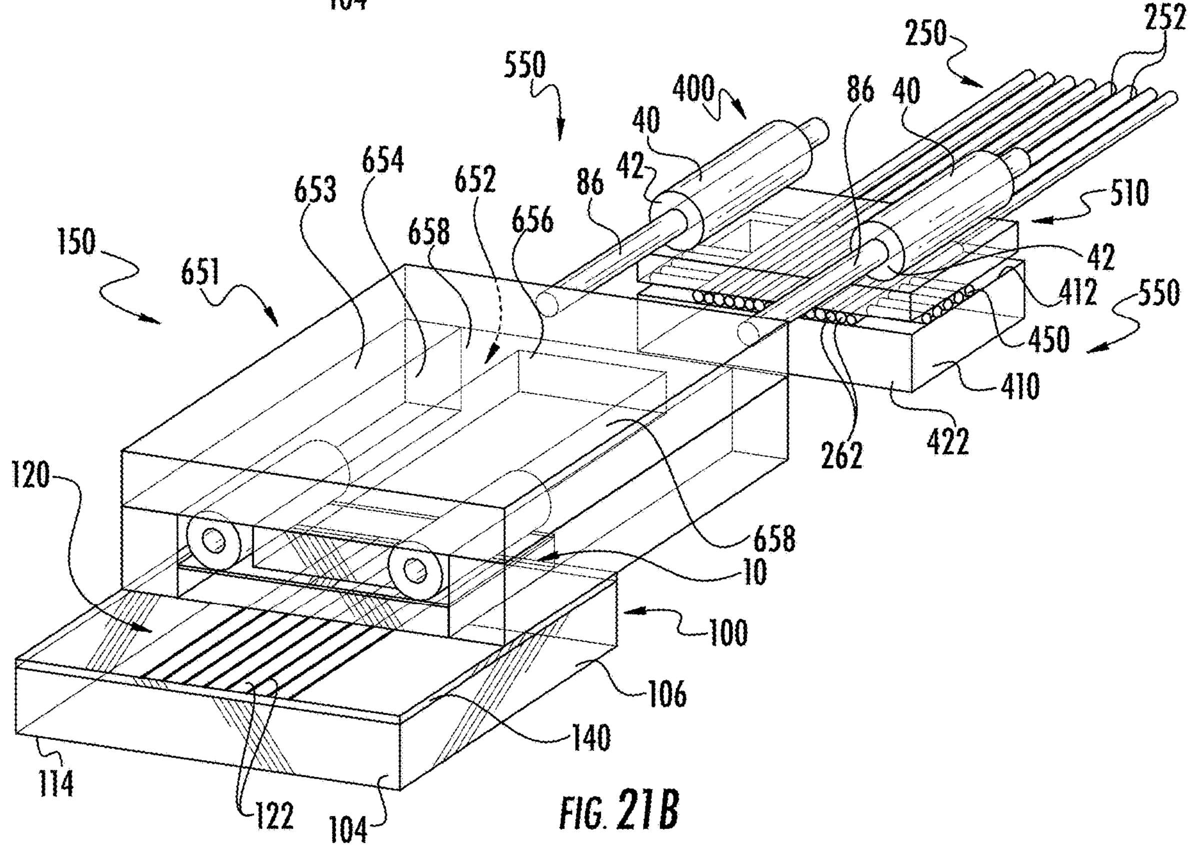

FIGS. 21A and 21B are similar to FIG. 18A and shows an example of the waveguide connector 150 and the fiber connector 400 in position to form an integrated photonic device 550, wherein the waveguide connector includes the waveguide connector housing 650 discussed above. FIG. 21B shows a front portion of the waveguide connector housing 650 removed to better show an example squared-off U-shaped configuration of the waveguide connector housing defined by two downwardly depending and parallel outer walls 653 and a roof 655 that is perpendicular to the outer walls. The outer walls 653 have interior surfaces 654 that in part define the interior 651 and that can also serve as coarse alignment features, as described below.

Figure 21C:
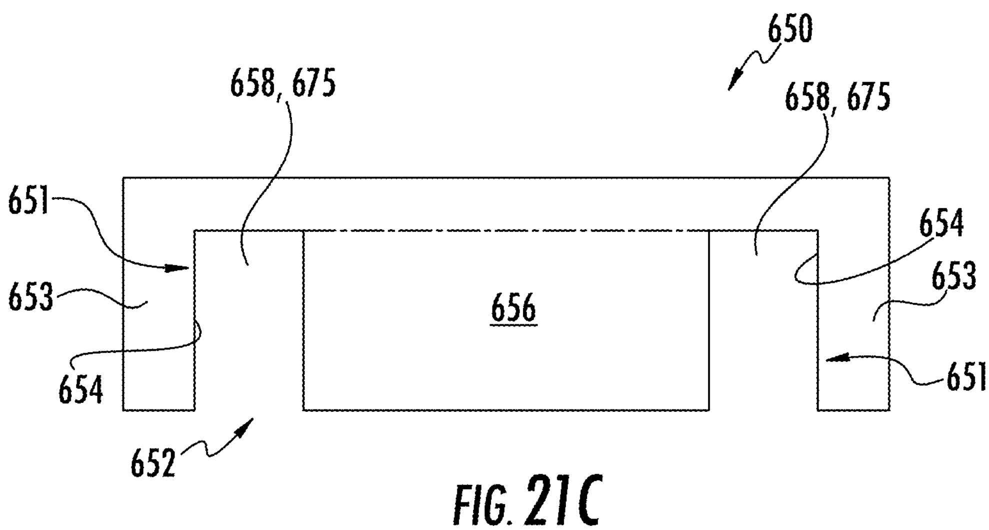
FIG. 21C is a front-on view of an example waveguide connector housing having a central beam that serves to define coarse alignment slots.

The waveguide connector housing 650 can include within the housing interior 651 a central beam 656 that runs in the z-direction and that downwardly depends from the roof 655. The central beam 656 is configured to form within the housing interior 651 to two spaced-apart slots 658 defined by the central beam 656 and the interior surfaces 654 of the two outer walls 653, as best seen in the cross-sectional view of FIG. 21C. In an example, the central beam 656 need not downwardly depend as far as the two outer walls 653. The central beam 656 thus defines a type of coarse alignment feature that can work in tandem with another type of coarse alignment feature, such as the interior surfaces 655 of the waveguide connector housing 650.

As best seen in FIG. 21B, back-end portions of the slots 658 respectively accommodate guide tubes 40 of the waveguide connector ferrule 10 while the front-end portions of the slots are available to closely accommodate the guide tubes 40 of the fiber connector ferrule 510. The slots 658 thus act as a coarse-alignment feature 675 used when engaging the waveguide connector 150 with the fiber connector 400. In an example, the waveguide connector housing 650 can be formed from glass or a polymer. In an example, the slots 658 can be flared at the ends that receive the guide tubes 40 of the fiber connector ferrule 510, thereby providing more latitude for an initial misalignment. Also, other cross-sectional shapes other than rectangular can be used for the slots 658.

In another example, the central beam 656 is omitted and the coarse alignment is performed only by the inner surfaces 654 of the outer walls 653 of the waveguide connector housing 650.

Figure 22A:
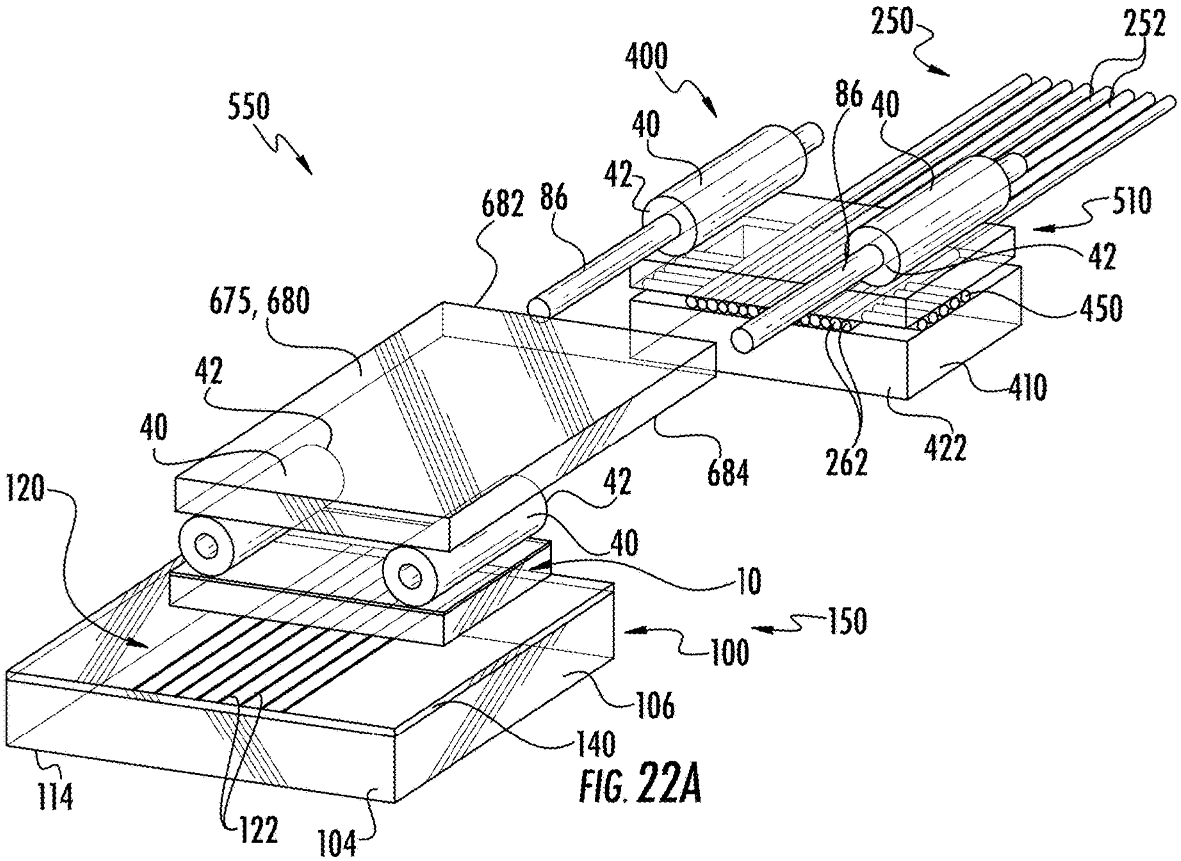
FIG. 22A is similar to FIG. 21A and shows an example wherein the waveguide connector includes a long cap used as a coarse alignment feature when engaging the waveguide connector and the fiber connector.

FIG. 22A is similar to FIG. 21A and illustrates an embodiment for coarsely aligning the waveguide connector 150 and the fiber connector 400 using another example coarse alignment feature 675 when forming an integrated photonic device 550. The coarse alignment feature 675 of FIG. 22A is in the form of a cap 680 attached to the top of the guide tubes 40 of the waveguide connector ferrule 10. The cap 680 can also be attached to the tops of the guide tubes 40 on the fiber connector 400. The cap 680 has a front end 682 and a flat bottom surface 684. The front end 682 extends beyond the front ends 42 of the guide tubes of the waveguide connector ferrule 10.

In an example, the cap 680 comprises a glass sheet similar to the glass sheets that can be used to form the various support substrates, caps and spacers described above. The flat bottom surface 684 of the cap 680 provides for coarse alignment in the vertical direction while other features (e.g., of the waveguide connector housing 650) can be configured for the coarse alignment in the horizontal direction. In an example, the cap 680 is sufficiently thick to provide mechanical stiffness to resist upward rotation of the connector ferrule 510 during mating.

The cap 680 can be tapered (e.g., using laser machining and/or an etching process) at the end that first interacts with the fiber connector 400 to provide more latitude for a vertical misalignment. The cap 680 can also include other types of alignment features, including those that can interface with complementary alignment features or retention hardware on the connector ferrule 510.

Figure 22B:
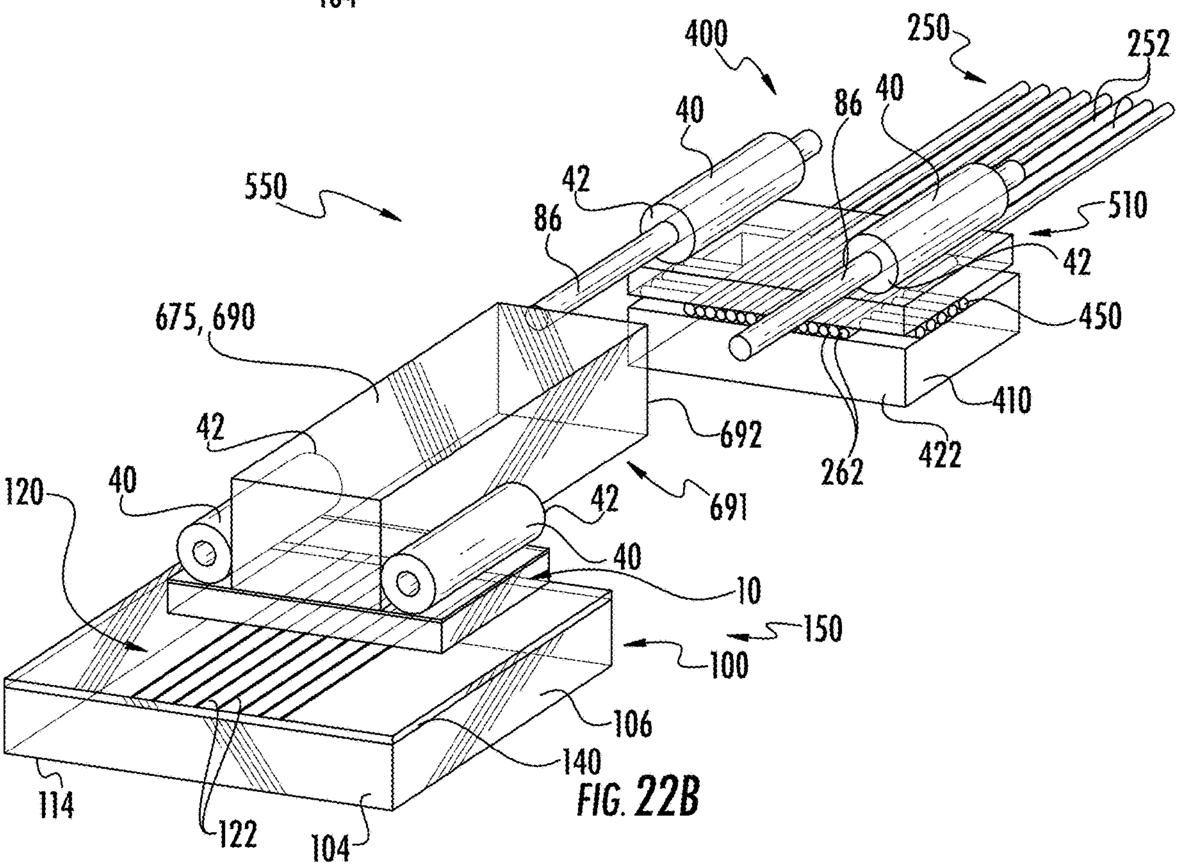
FIGS. 22B and 22C are similar to FIG. 22A and show an example wherein the waveguide connector includes a central tongue that serves as a coarse alignment feature when engaging the waveguide connector and the fiber connector.

FIG. 22B shows another example of a coarse alignment feature 675 in the form of a tongue 690 that resides between the two guide tubes 40 of the waveguide connector ferrule 10. The tongue 690 can also reside between the two guide tubes 40 of the fiber connector ferrule 510. The tongue 690 has a front-end section 691 that includes a front end 692. The front-end section 691 extends beyond the front ends 42 of the guide tubes 42 of the waveguide connector ferrule 10. The tongue 690 is sized to fit within the two guide tubes 40 of the fiber connector ferrule 510 when the waveguide connector ferrule and the fiber connector ferrule are operably engaged. The tongue 690 can be made thick in the y-direction to provide mechanical stiffness. Like the cap 680, the tongue 690 can include alignment features, including those that can interface with complementary alignment features or retention hardware on the connector ferrule 510. In an example, the tongue 690 can be used in combination with the waveguide connector housing 650 and can be used in place of the central beam 656.

Figure 22C:
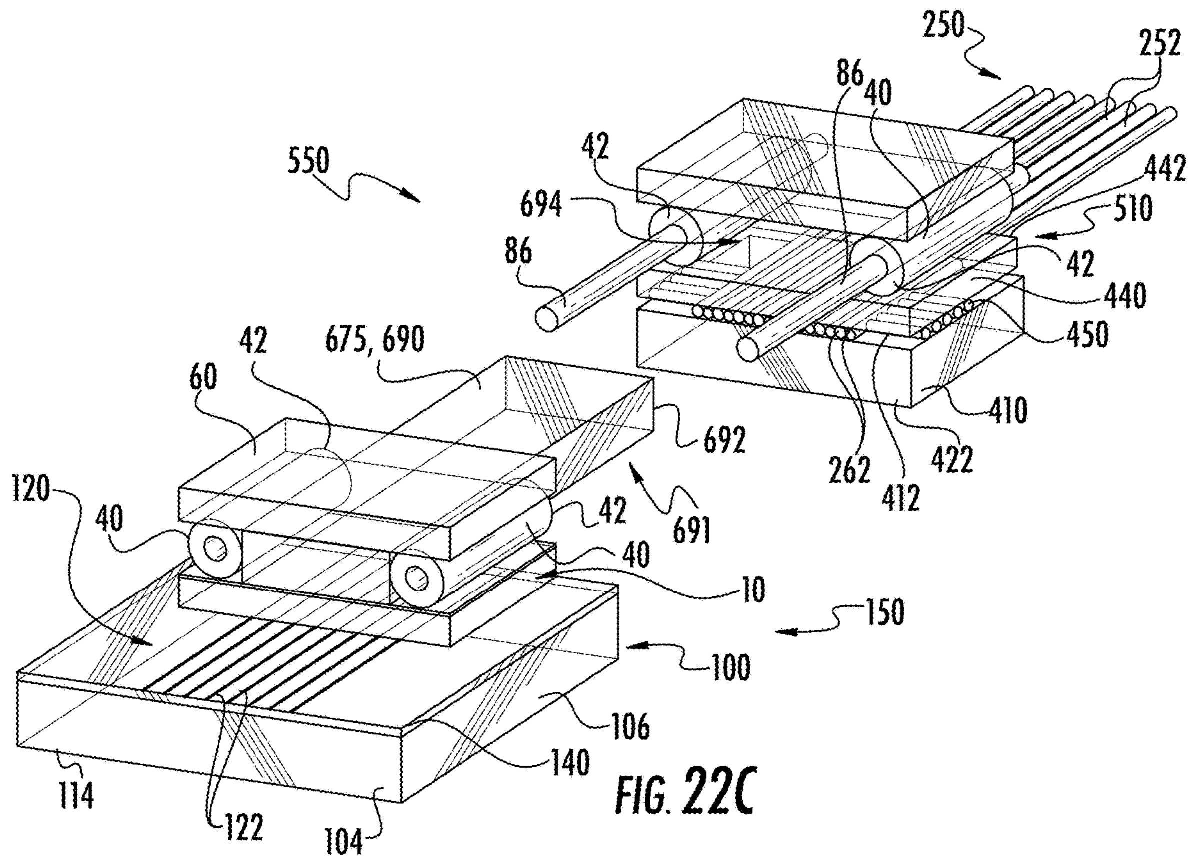

FIG. 22C is similar to FIG. 22B and shows an example of the tongue 690 that can be used when the waveguide connector ferrule 10 and the fiber connector ferrule 510 each have a cover 60. The front-end section 691 of the tongue 690 is sized to fit into an aperture 694 defined in the fiber connector ferrule 510 by the spacer 440, the guide tubes 40 and the cover 60.

Figure 22D:
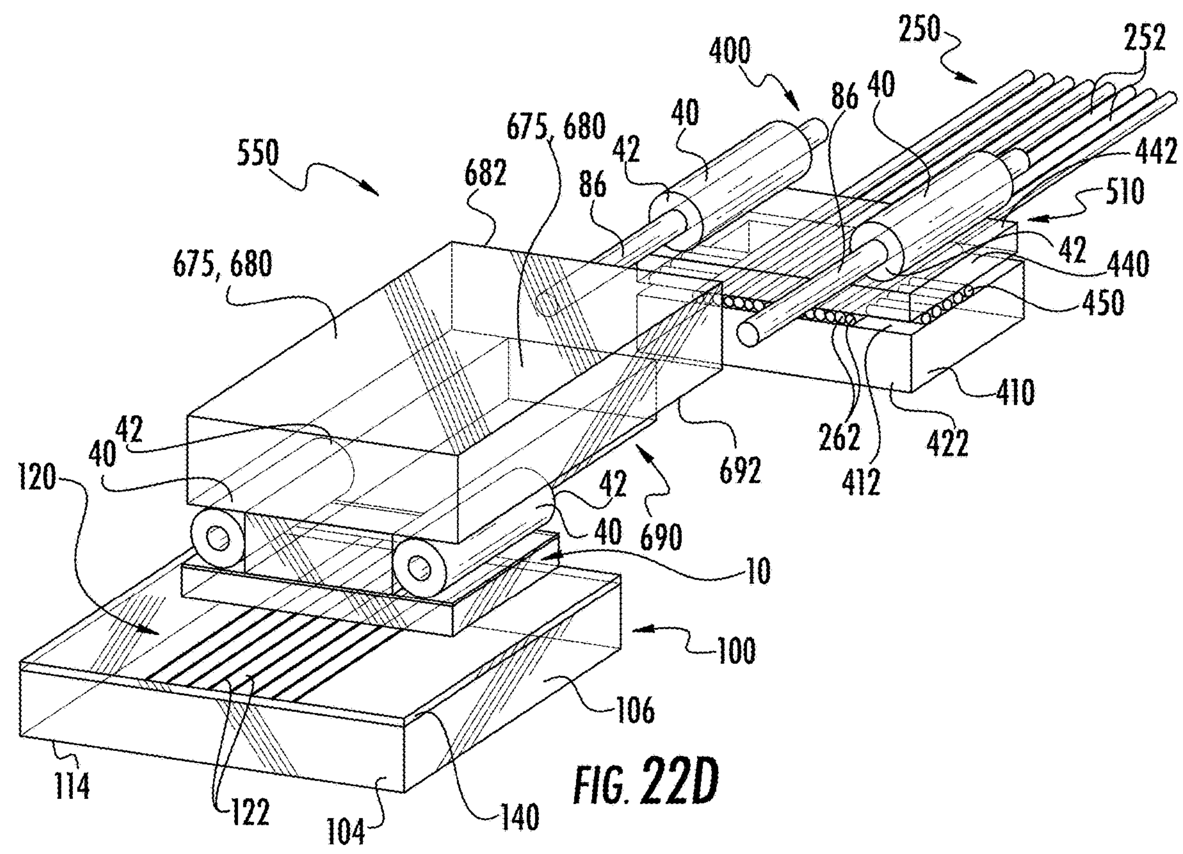
FIG. 22D is similar to FIG. 22A and shows an example wherein the waveguide connector includes both a central tongue and a long cap to define a coarse alignment feature when engaging the waveguide connector and the fiber connector.

FIG. 22D is similar to FIGS. 22A and 22B and shows a coarse alignment features 675 that includes a combination of the cap 680 and the tongue 690.

Figure 22E:
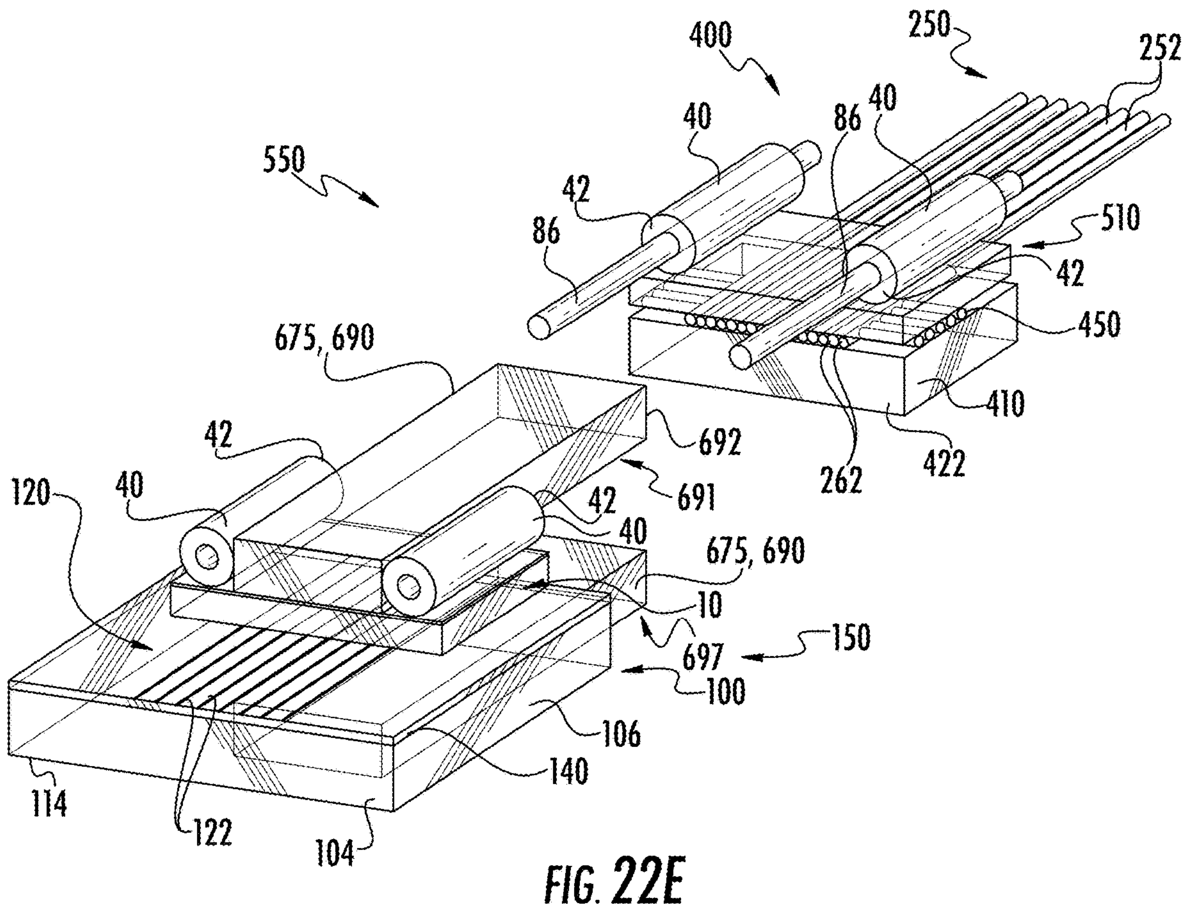
FIG. 22E is similar to FIG. 22B and shows an example wherein the waveguide connector includes both a central tongue and lower tongue to define a coarse alignment feature when engaging the waveguide connector and the fiber connector.

FIG. 22E is similar to FIG. 22B and shows a coarse alignment feature 675 that includes the tongue 690 as an upper tongue and also includes a lower tongue 696 attached to the bottom surface 114 of the PLC 100. The lower tongue 696 has a front-end section 697 that extends beyond the front end 102 of the PLC 100. This configuration for the coarse alignment feature 675 allows for the symmetric loading of the fiber connector 400.

The addition of the lower tongue 696 displaced in the vertical direction relative to the upper tongue 690 does not limit the available real estate in the horizontal direction. This enables the lateral (horizontal) expansion of the waveguide connector 150 and the fiber connector 400 to maximize the bandwidth density. In an example, the bottom tongue 696 can be made wider than the top tongue 690 since the bottom tongue does not need to fit between the guide tubes 40 of the fiber connector ferrule 510.

Retention Apparatus

Figure 23:
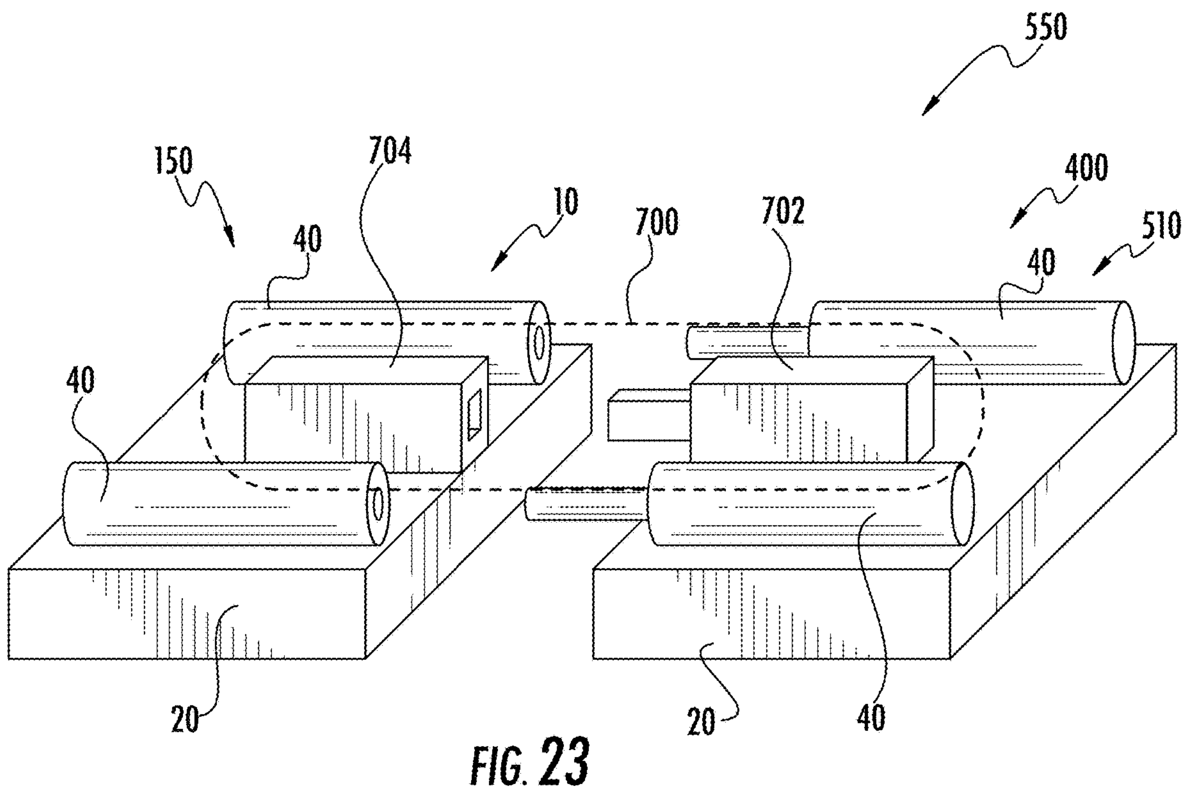
FIG. 23 is an elevated side view of a waveguide connector ferrule of a waveguide connector in position to be operably engaged with a fiber connector ferrule of a fiber connector, wherein the waveguide and fiber connectors include first and second components of a retention apparatus used to retain the waveguide and fiber connectors in operable contact during mating.

FIG. 23 is an elevated side view of a waveguide connector ferrule 10 of a waveguide connector 150 in position to be operably engaged with the fiber connector ferrule 510 of a fiber connector 400 when forming an integrated photonic device 550 (see also FIG. 24, introduced and discussed below). The integrated photonic device 550 includes a retention apparatus 700 configured to generate an axial compression force retain the waveguide connector ferrule 10 and the fiber connector 400 in operable contact. The example retention apparatus 700 of FIG. 23 includes complementary and cooperating retention components 702 and 704 shown by way of example and referred to hereinafter as a male component 702 and a female component 704, respectively. The male component 702 is supported by the fiber connector 400 and the female component 704 supported by the waveguide connector 150. These two components can be switched so that the male component 702 is supported by the waveguide connector 150 and the female component 704 supported by the fiber connector 400.

Figure 24:
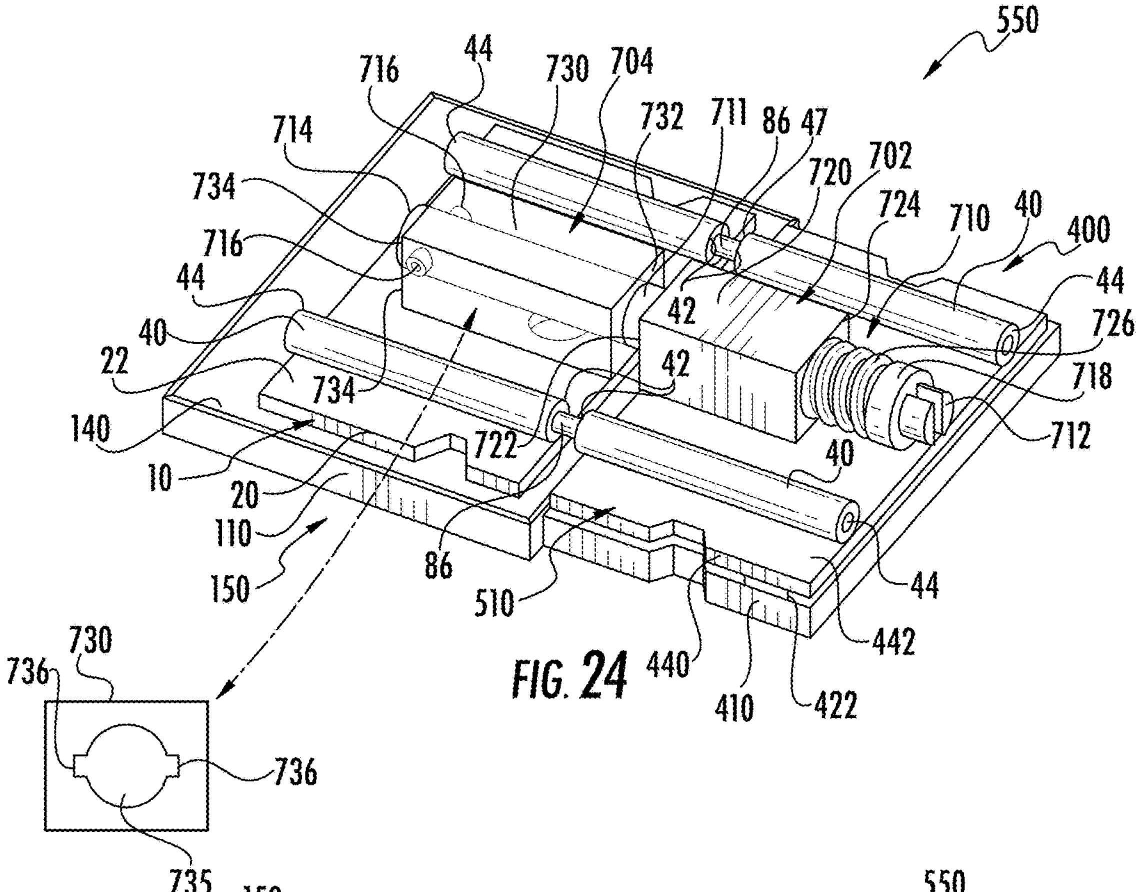
FIG. 24 is similar to FIG. 23 and is top-elevated view that shows an example retention apparatus in the form of a spring-loaded plunger.

FIG. 24 is a top-elevated view similar to FIG. 23 and shows in more detail an example of the retention apparatus 700 as part of the integrated photonic device 550. The male component 702 is supported by the fiber connector 400 and comprises a spring-loaded plunger 710 having a rod 711 that includes a proximal end 712 and a distal end 714. The distal end 714 includes two outwardly extending protrusions 716. The proximal end 712 includes a flange 718. The rod 711 movably extends through a support block 720 mounted to the top surface 442 of the cover 440. The rod 711 is also rotatable within the support block 720, which has a front end 722 and a back end 724. A resilient member (e.g., a spring) 726 is operably disposed over the rod between the flange 718 and the back end 724 of the support block 720 so that the rod 711 can be spring loaded. The female component 702 comprises a receiving tube 730 that has a front end 732, a back end 734 and bore 735, with interior grooves 736 that run the length of the tube within the bore and that are configured to receive and guide the protrusions 716 (see close-up inset).

In operation, the distal end 714 of the rod 711 is inserted into the front end 732 of the receiving tube 720 so that the protrusions 716 engage with the interior grooves 736. The rod 711 is further inserted into the receiving tube 720 until the protrusions 716 extend beyond the back end 734 of the receiving tube. At this point, the rod 711 is rotated so that the protrusions are no longer aligned with the interior grooves 736, thereby locking the rod 711 in place against the back end 734 of the receiving tube and preventing further axial movement back toward the fiber connector 400. Thus, the spring-loaded plunger 710 can be locked in place using the receiving tube 720.

During the insertion of the rod 711 into the receiving tube 730, the resilient member 726 is compressed between the flange 718 and the back end 724 of the support block 720, thereby providing an axial compressive force that acts to retain the waveguide connector 150 and the fiber connector 400 in operably contact. Likewise, the engagement of the rod 711 with the receiving tube 720 is coordinated with the engagement of the guide pins 86 of the fiber connector ferrule 510 with the bores 48 of the guide tubes 40 of the waveguide connector ferrule 10. The waveguide connector 150 and fiber connector 400 can be disconnected by rotating the rod 711 so that the protrusions align with the interior grooves 736 of the receiving tube 730 and then retracting the rod back toward the fiber connector. Thus, the spring-loaded plunger 710 can be unlocked from the receiving tube 720.

Figure 25A:
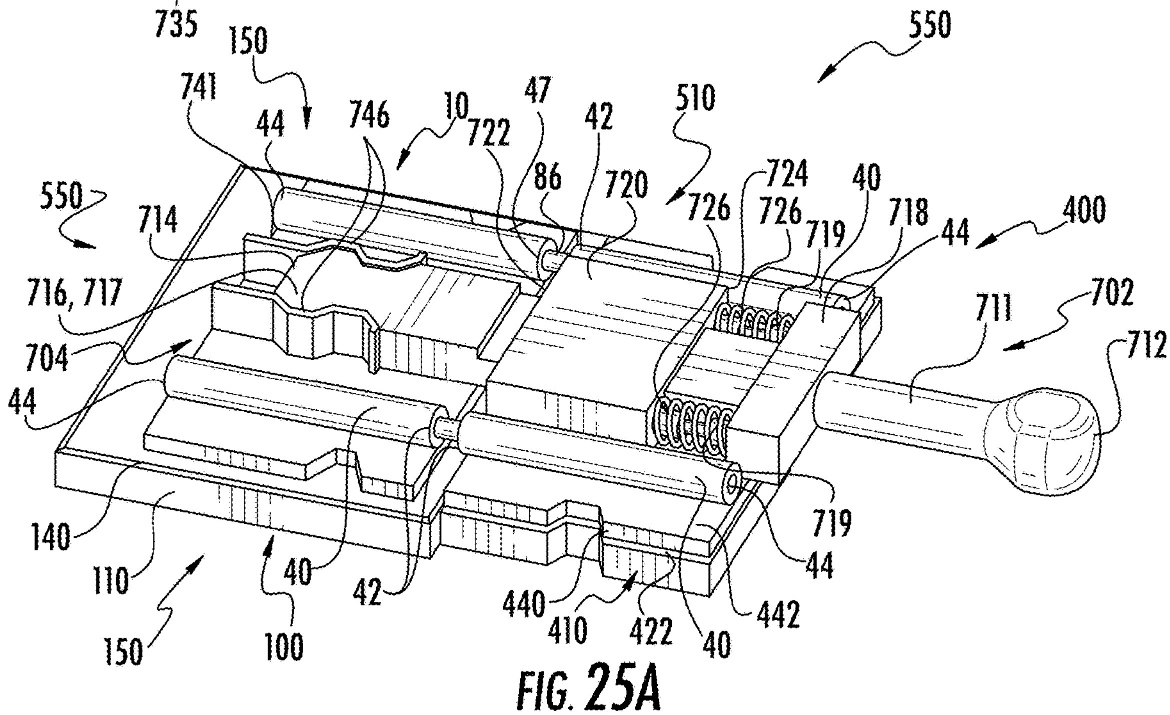
FIG. 25A is similar to FIG. 24 and shows another example of the retention apparatus that includes a different embodiment of the spring-loaded plunger.
Figure 25B:
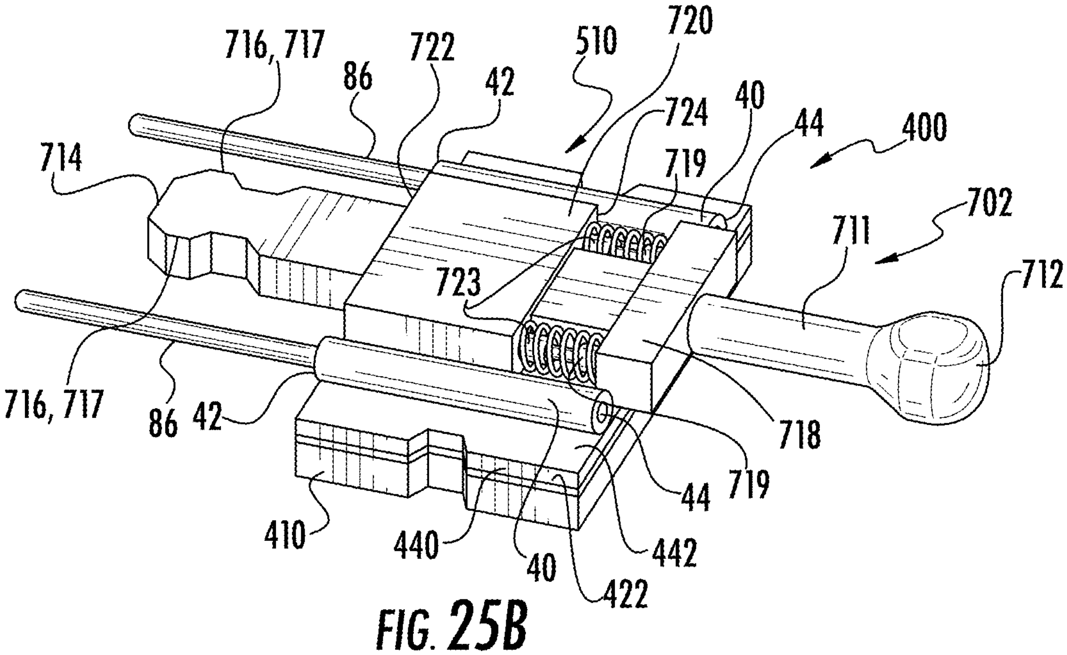
FIG. 25B is a front-elevated view of the fiber connector and the spring-loaded plunger of FIG. 25A.

FIG. 25A is similar to FIGS. 23 and 24 and shows another example retention apparatus 700 wherein the male component 702 includes another configuration of the rod 710. FIG. 25B is an elevated view of the fiber connector 400 showing the example male component 702 while FIG. 25C is an elevated view of the waveguide connector 150 showing the female component 704.

With reference now to FIGS. 25A and 25B, in another example, the rod 711 has flat sides and the protrusions 716 at the distal end 714 are defined by detents 717. The rod 711 passes through the support block 720 mounted to the top surface 442 of the spacer 440 of the fiber connector ferrule 510. The rod 711 also includes the flange 718, which is located near the distal end 712. The flange 718 includes two retention features 719 on either side of the rod and that extend parallel to the rod. The support block 720 also includes retention features 723 that outwardly extend from the back end 724 so that they are aligned with the retention features 719 of the flange 710. The distal end 712 of the rod 711 can be formed as a handle, as shown, to facilitate manual operation of the retention apparatus 700.

The rod 711 is axially movable within the support block 720. Two resilient members (e.g., springs) 726 are operably disposed between the flange 718 and the back end 724 of the support block 720 using the retention features 719 and 723. This configuration allows for the rod 711 to be spring loaded.

Figure 25C:
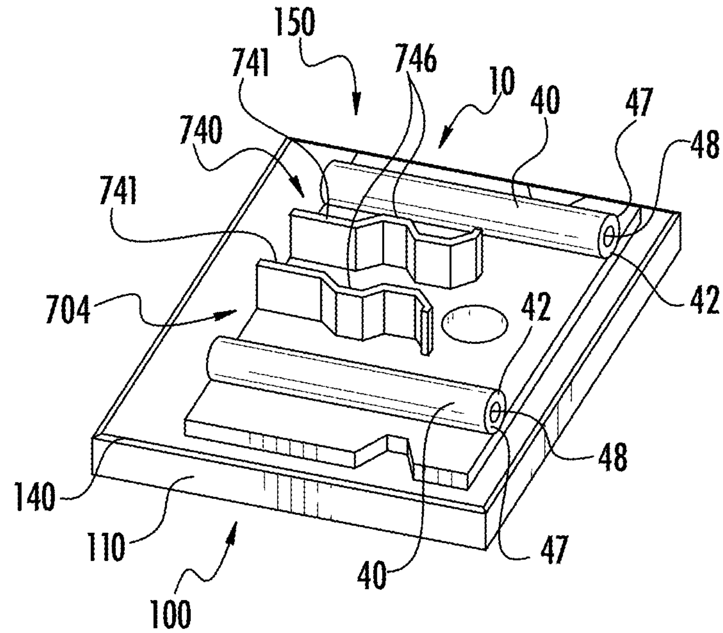
FIG. 25C is a front-elevated view of the waveguide connector and the receiving latch that constitutes the complementary component to the spring-loaded plunger of FIG. 25B.

With reference to FIG. 25C, the female component 704 comprises a flexible receiving latch 740 disposed between the glass rods 40 of the waveguide connector ferrule 10. The flexible receiving latch 740 is defined by spaced-apart flexible walls 741 that generally run in the z-direction and that define an open front end 722. The flexible walls 741 include respective recesses 746 sized to accommodate the protrusions (detents) 716 on the distal end 714 of the rod 711.

In the operation of the retention apparatus 700 of FIGS. 25A through 25C, the distal end 714 of the rod 711 is inserted into the front end 742 of the flexible receiving latch 740. In response, the walls 741 outwardly flex at the front end 742 to allow the protrusions 716 to pass through to and engage with the recesses 746 of the flexible receiving latch 740. The walls 741 of the flexible receiving latch 740 then flex back to their original shape, thereby retaining the distal end 714 of the rod 711.

During the insertion of the rod 711 into the flexible receiving latch 740, the resilient members 726 are compressed between the flange 718 and the back end 724 of the support block 720, thereby providing an axial compressive force that acts to retain the waveguide connector ferrule 10 and the fiber connector 400 in operable contact. Likewise, the engagement of the rod 711 with the flexible receiving latch 740 is coordinated with the engagement of the guide pins 86 of the fiber connector ferrule 510 with the bores 48 of the guide tubes 40 of the waveguide connector ferrule 10. The waveguide connector 150 and fiber connector 400 can be disconnected by pulling on the proximal end 712 of the rod 711 to overcome the latching force provided by the flexible receiving latch 740 and then retracting the rod 711 back toward the fiber connector.

Coarse Alignment

Since the guide pins 86 that are used to align the fiber connector ferrule 400 and the waveguide connector ferrule 10 are relatively small (e.g., 300 microns to 450 microns in diameter) and the guide tubes 40 receiving the guide pins can be damaged by the guide pins, providing a coarse alignment between the guide pins and the guide tubes can prevent damage to the guide pins and the guide tubes during mating of the waveguide connector ferrule 10 and the fiber connector ferrule 510. Damage to the guide pins 86 can occur for example, due to unwanted collisions or bending of the guide pins when they are not properly aligned with the bores 48 of the guide tubes 40 to which the guide pins need to be inserted. Damage to the guide tubes 40 can occur by the guide pins hitting the front end 42 of the guide tubes during the mating process. While the guide pins 86 can be tapered and/or the bores 48 of the guide tubes flared to increase the amount of tolerable misalignment during mating, it may still be desirable to improve the accuracy of early stage alignment prior to mating to reduce guide pin and guide tube damage and wear.

Figure 26A:
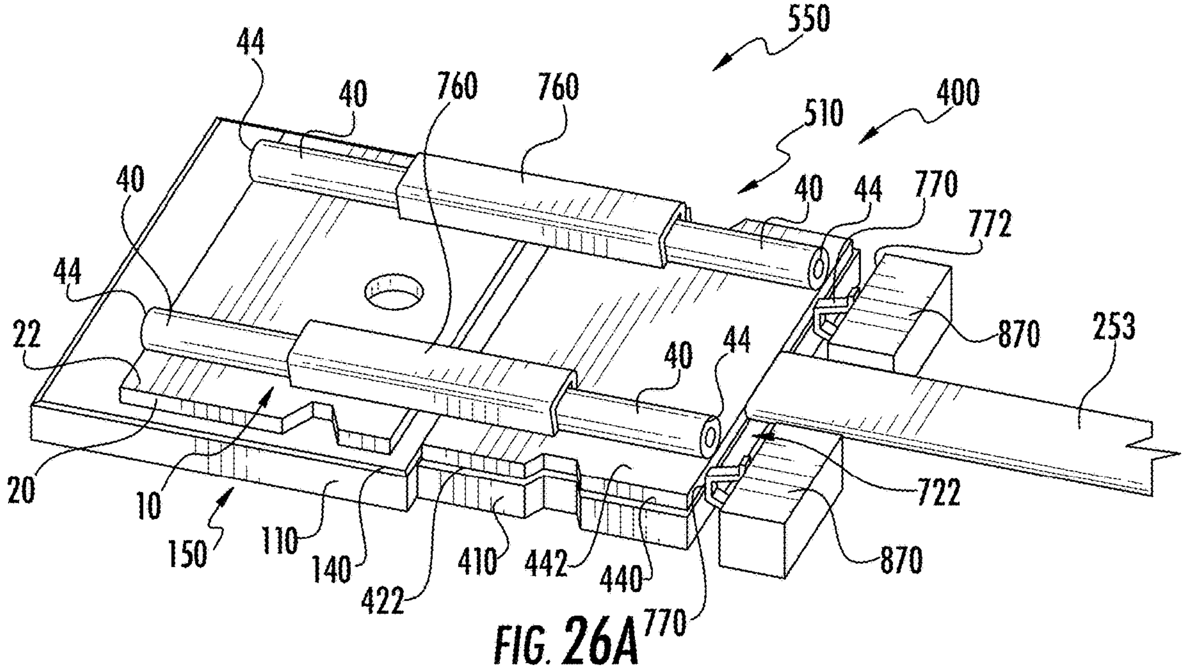
FIG. 26A is a top-elevated view of mated waveguide and fiber connectors wherein coarse alignment sleeves are used to coarsely align the guide tubes of the ferrules of the waveguide and fiber connectors, and also illustrating an example retention apparatus in the form of leaf springs.
Figure 26B:
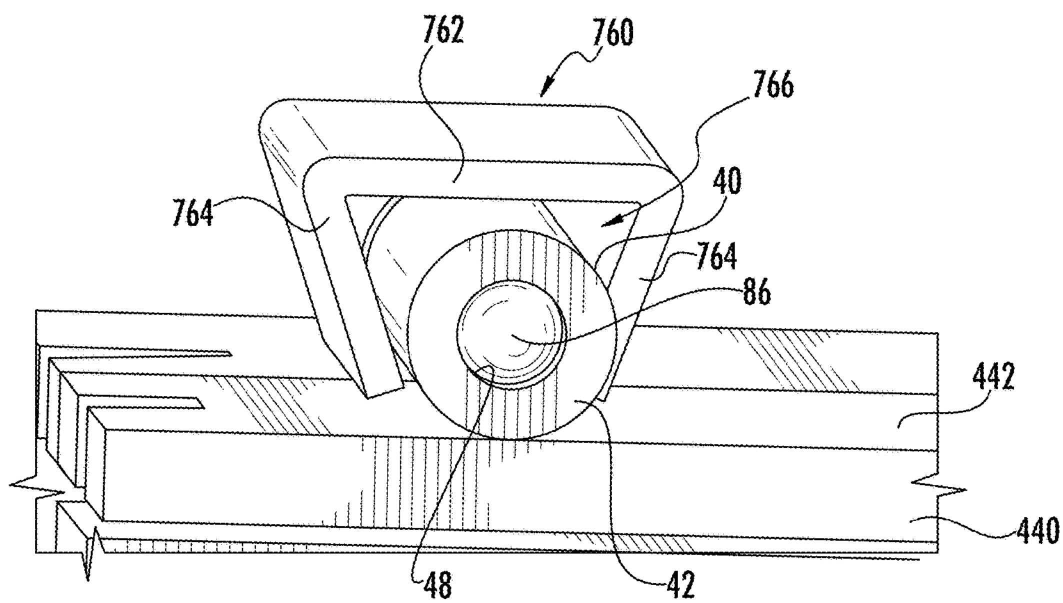
FIG. 26B is a front-on view of an example of one of the coarse alignment tubes shown engaging a guide tube of the fiber connector.

FIG. 26A is an elevated view of an example waveguide connector ferrule 10 of waveguide connector 150 mated with an example fiber connector ferrule 510 of a fiber connector 400. Two coarse alignment sleeves 760 are shown disposed over front-end portions of each confronting pair of guide tubes 40 as shown. FIG. 26B is a close-up front-on view that shows an example configuration for the coarse alignment sleeve 760 as disposed over the guide tube 40 of the fiber connector ferrule 510, wherein the guide tube supports a guide pin 86. In an example, only one coarse alignment sleeve 760 is employed.

In one example, the coarse alignment sleeve 760 includes a base 762 with angled walls 764 that extend from the base at an inward angle to define a slot opening 766 that is narrower than the base. This defines an open interior 768 that is wider towards the base than at the slot opening 766, which resides closest to the top surface 22 of the support substrate 20 of the waveguide connector ferrule 10 or the top surface 442 of the spacer 440 of the fiber connector ferrule 510. The alignment sleeve 760 can made of metal or molded polymer (plastic). In an example, two coarse alignment sleeves 760 are employed wither on the waveguide connector ferrule 10 or the fiber connector ferrule 510, or one on each ferrule. The coarse alignment sleeves 760 are then used to coarsely align the guide tubes 40 of the waveguide connector ferrule 10 and the fiber connector ferrule 510 so that the guide pins 86 are coarsely aligned with the bores 48 of the opposite guide tubes. Additional housing components (not shown) may be employed to hold the coarse alignment sleeves 760 in position.

FIG. 26A also shows another example of a retention apparatus 700 in the form of leaf springs 770 shown fixed to the back end 424 of the fiber support substrate 410 of the fiber connector 400. The leaf springs 770 are arranged to press against a fixed surface 772, which can be part of the connector housing 870.

Figure 26C:
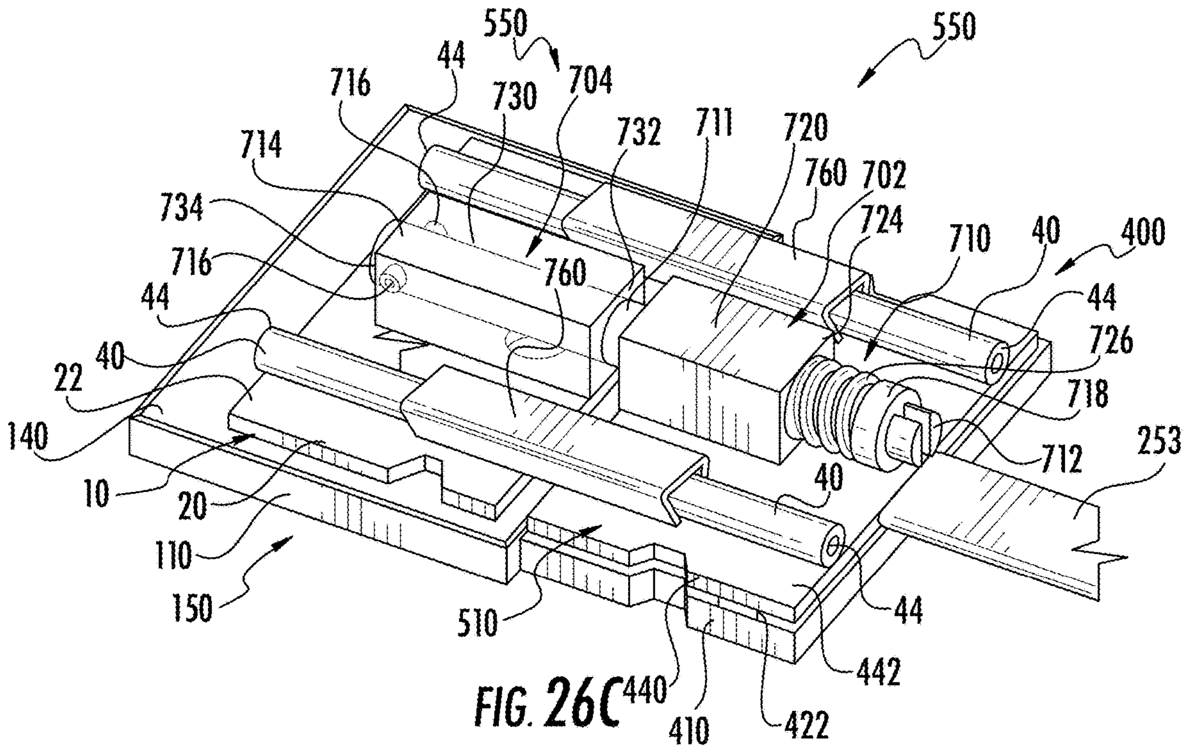
FIG. 26C is similar to FIG. 26A and further shows the example retention apparatus of FIG. 24 being employed to retain operable contact between the waveguide and fiber connectors.
Figure 26D:
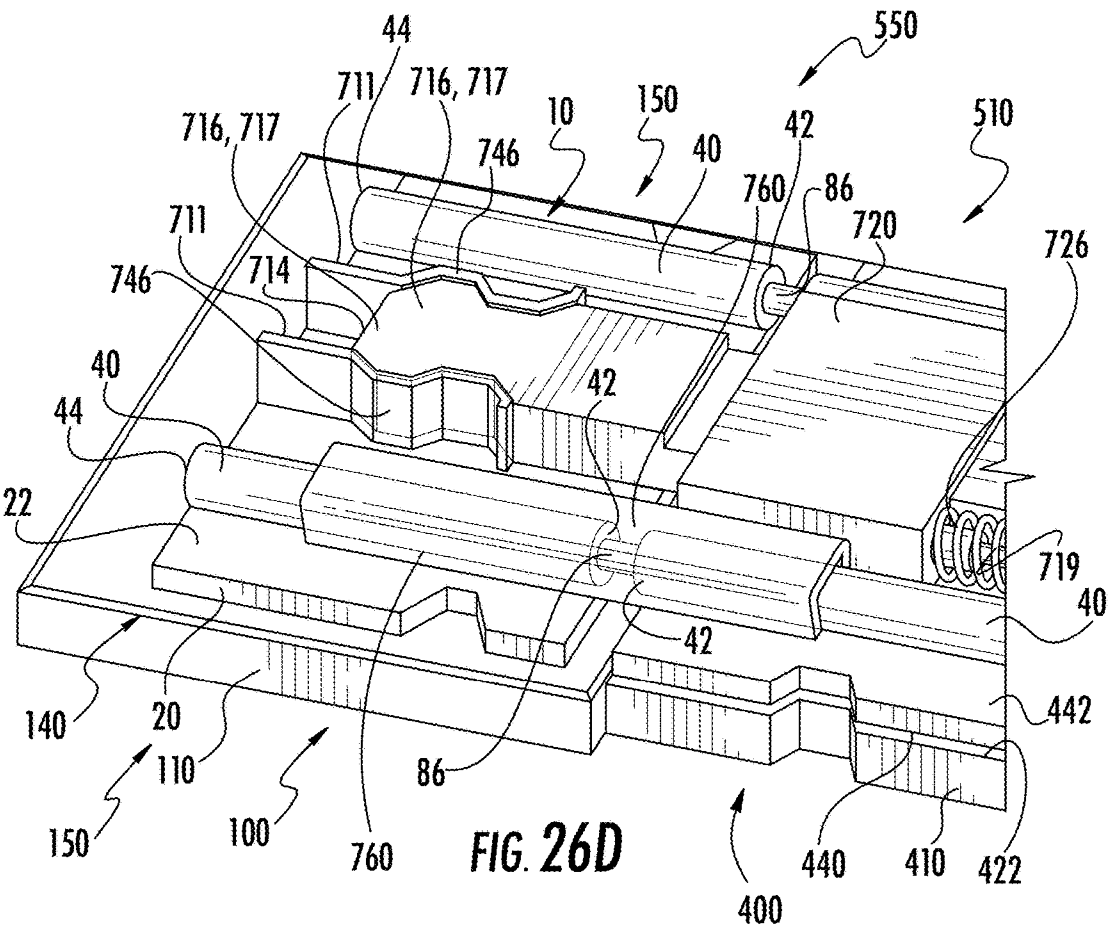
FIG. 26D is an top elevated view of the waveguide connector showing an example coarse alignment sleeve engaging the guide tubes on one side of the waveguide and fiber connectors, and also showing the use of the retention apparatus shown in FIGS. 25A through 25C.

FIG. 26C shows an example embodiment similar to FIG. 24, where the coarse alignment sleeves 760 are employed along with the retention apparatus 700 of FIG. 24. FIG. 26D shows an example embodiment wherein the coarse alignment sleeves 760 have round cross-sectional shapes and are employed along with the example retention apparatus 700 shown in FIGS. 25A through 25C (only one alignment sleeve 700 is shown).

Attachment Fixture And Housing for the Integrated Photonic Device

Figure 27A:
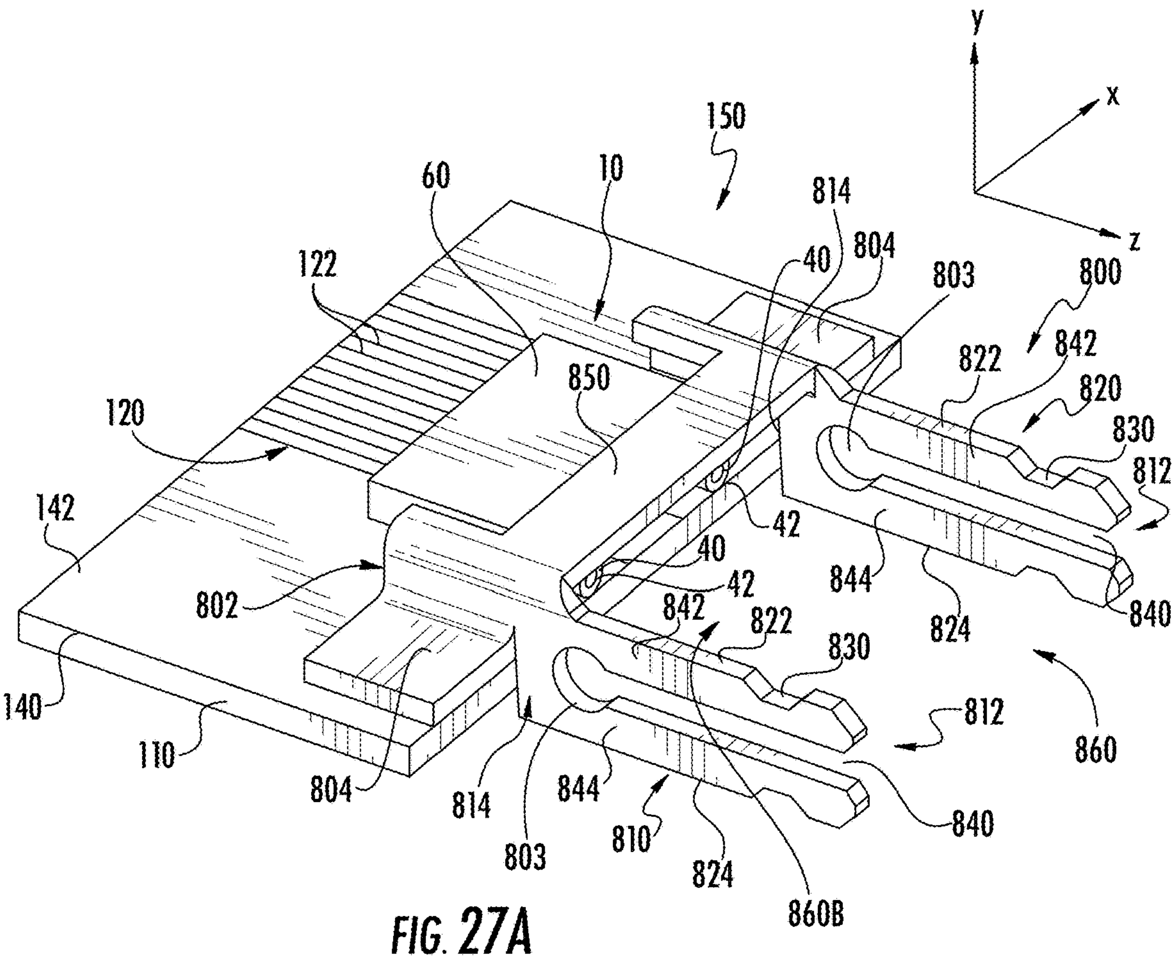
FIGS. 27A and 27B are front-elevated views of an example attachment fixture that is secured to a waveguide connector and that allows for a fiber connector to be attached to the waveguide connector to form an integrated photonic device.
Figure 27B:
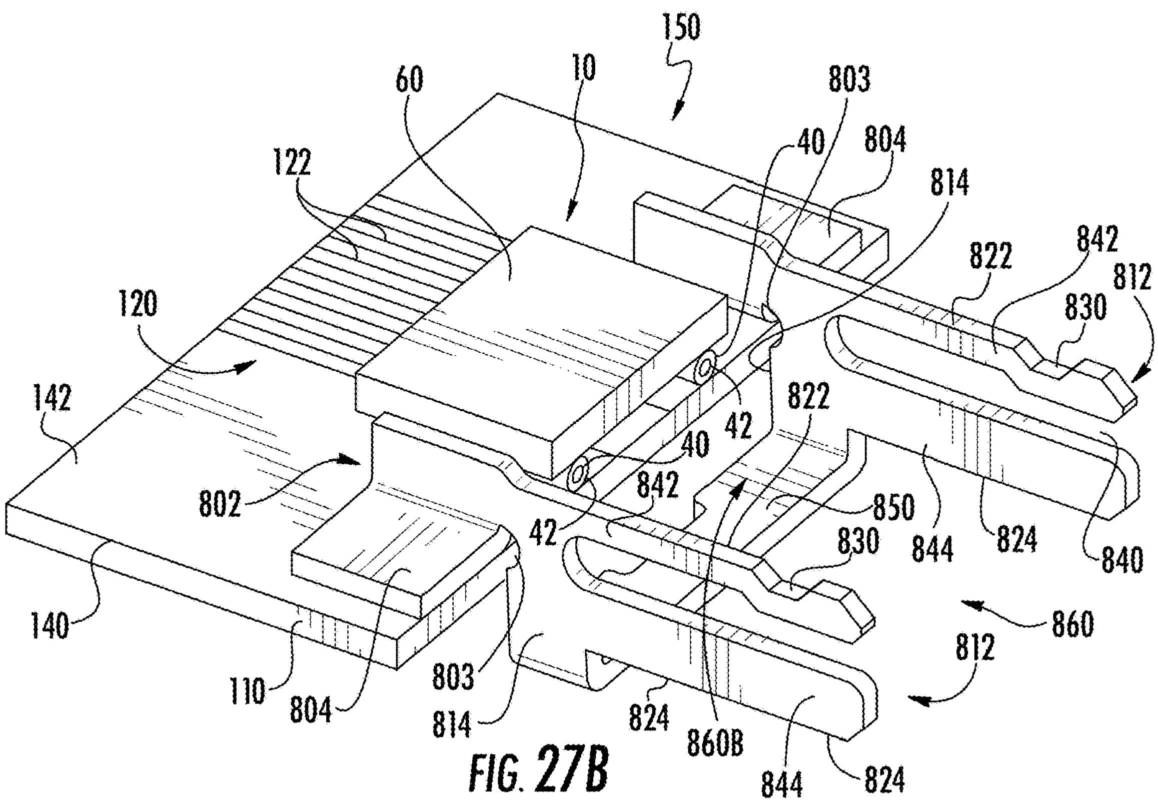

FIG. 27A and FIG. 27B are front-elevated views of an example attachment fixture 800 that is secured to the waveguide connector 150 and that allows for the fiber connector 400 to be attached to the waveguide connector to form an example of the integrated photonic device 550.

The example attachment fixture 800 is in the form of a clip. The attachment fixture includes a mounting section 802 having mounting pads 804 that mount to the top surface 112 of the PLC body 101. Two guide arms 810 extend outwardly in the z-direction (i.e., substantially parallel to the center line CL) from the mounting section 802. The guide arms 810 are spaced apart and are generally flat and reside in parallel y-z planes. Each guide arm 810 has a front end 812, a back end 814, a top side 822 and a bottom side 824. The back ends 814 of the guide arms 810 are connected by a support beam 850 that in one example is attached at the top sides 822 of the support arms (FIG. 27A) or in another example is attached at the bottom sides 824 of the support arms (FIG. 27B).

The guide arms 810 can be considered as constituting side clips or side guide arms. Each guide arm 810 includes a recess 830 in the top side 822 near the front end 812. Each guide arm 810 also includes a slot 840 that is open at the front end 812, that runs in the z-direction and that terminates just short of the back end 814. The slot 840 divides each guide arm into top and bottom prongs 842 and 844, with the top prong being flexible in the z-direction and with the bottom prong being stiffer that the top prong but still flexible. The top prongs 842 define the locking or "clipping" features of the attachment fixture 800.

Figure 28A:
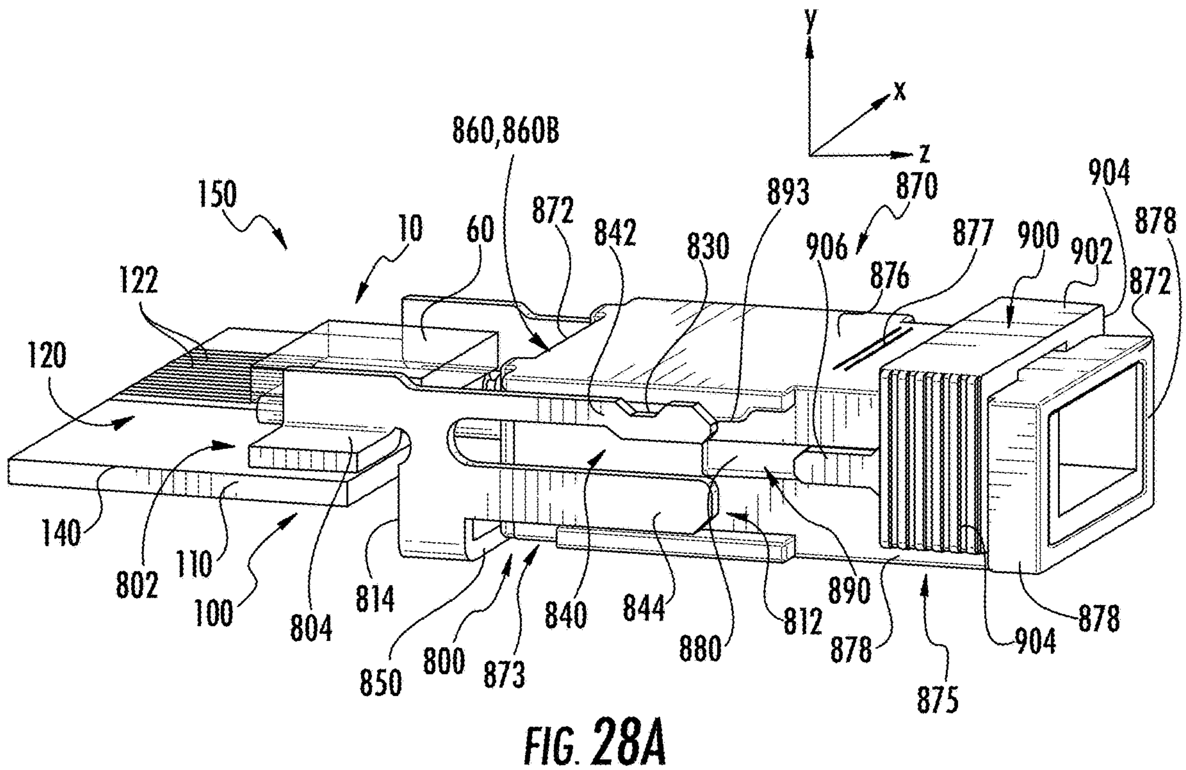
FIGS. 28A and 28B are side-elevated views of the waveguide connector and the attachment fixture, wherein the attachment fixture is shown operably engaging a fiber connector housing in an unlocking position (FIG. 28A) and in a locking position (FIG. 28B)
Figure 28B:
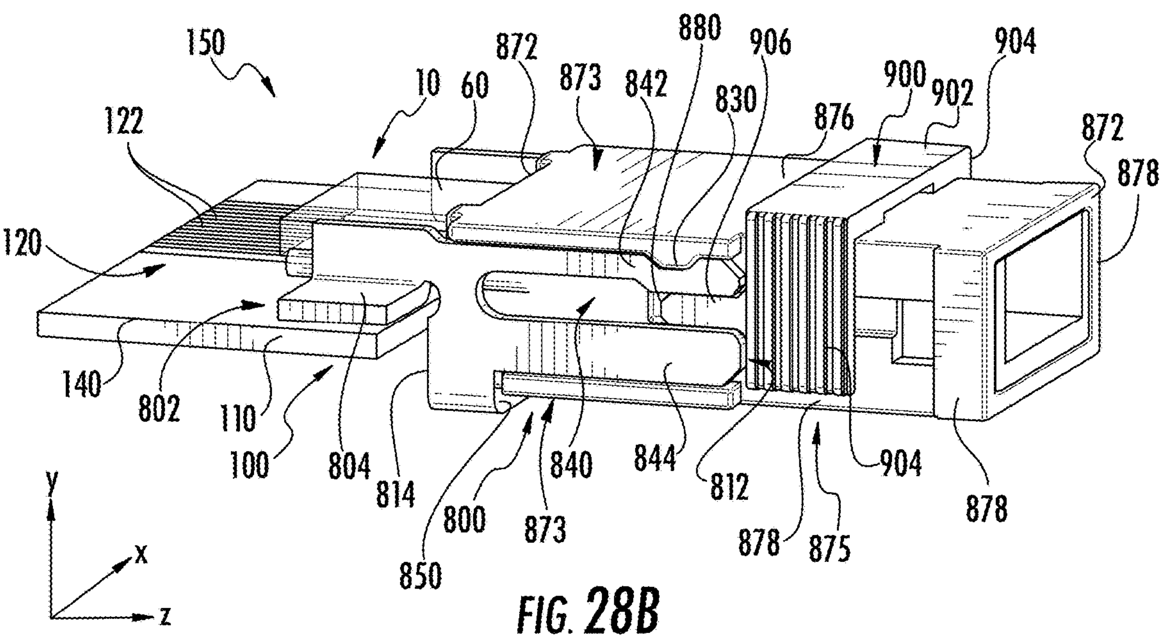

FIGS. 28A and 28B are side-elevated views showing the waveguide connector 150 and the attachment fixture 800 of FIG. 28B arranged thereon. FIG. 28A also shows an example connector housing 870 for the fiber connector 400. The connector housing 870 has a front end 872 that is part of a front-end section 873, a back end 874 that is part of a back-end section 875, a top 876 and sides 878.

A locking member 900 is operably disposed over the connector housing 870. The locking member 900 has a squared-off U-shape with a top 902 and downwardly depending sides 904. The top 902 resides on the top 876 of the connector housing 870 while the sides 904 reside adjacent the sides 878 of the housing and are in loose contact therewith. Each side 904 of the locking member 900 includes a tongue 906 that extends in the z-direction. The tongues 906 reside within and can slide within respective slots 880 formed in the sides of 878 of the connector housing 870 and that run in the z-direction. The locking member 900 is thus movable in the z-direction (i.e., axially) over the connector housing 870. In other words, the locking member 900 can slide back and forth over the connector housing. A detent 877 on the top 876 of the connector housing 870 can be used to hold the locking member 900 in place in a locking position on the connector housing, as described below. The detent 877 is configured to provide a locking force that is readily overcome by manual effort to move the locking member to an unlocking position, as described below.

Each of the sides 878 of the connector housing 870 also includes a guide 890 sized to receive a corresponding one of the guide arms 810. Each guide 890 includes a detent 893 configured to engage with the recess 830 in the top prong 842 of each guide arm 810. The spaced-apart guide arms 810 define a receiving region 860 for the front-end section of the connector housing 870. The detent 893 defines a locking feature as described below so that the guides 890 are also referred to as locking guides 890.

With reference now to FIG. 28A, the front-end section 873 of the connector housing 870 is inserted into the receiving region 860 defined by the two guide arms 810 so that each guide arm is received by (cooperates with) the locking guides 890 on the sides 878 of the housing. At this stage, the locking mechanism 900 is pushed toward the back-end section 875 of the connector housing 870, i.e., to the unlocking position. The insertion process continues until the top prongs 842 interact with the detent 893 of the locking guides 890 and deflect, thereby allowing the recesses 830 to engage the corresponding detents 893 of the guides of connector housing 870, thereby temporarily locking the guide arms 80 in the locking guides. At this point, the locking mechanism 900 is slid towards the front-end section 873 of the connector housing 870 so that the tongues 906 enter the respective slots 840 and occupy the space in the slot below the detents 893 and recesses 830.

The locking mechanism 900 is held in place in this locking position by the aforementioned detent 877 on the top surface 876 of the connector housing 870. This positioning of the locking member 900 prevents the top prong 842 from being able to flex, thereby more permanently locking the detents 893 of the locking guides 890 within the recesses 830 of the top prongs 842 of the guide arms 810. In this manner, the connector housing 870 and thus the fiber connector 400 can be locked into operable contact with the waveguide connector ferrule 10 and thus the waveguide connector 150. The unlocking procedure is the reverse of the above process, starting with moving the locking member 900 toward the back-end section 875.

The above-described locking process that employs the attachment fixture 800 is coordinated with the alignment process whereby the guide pins 86 of the fiber connector 400 engage with the bores 48 of the guide tubes 40 of the waveguide connector ferrule. In an example, coarse alignment features such as those described above can also be employed.

Housing Assembly for the Fiber Connector

Figure 29A:
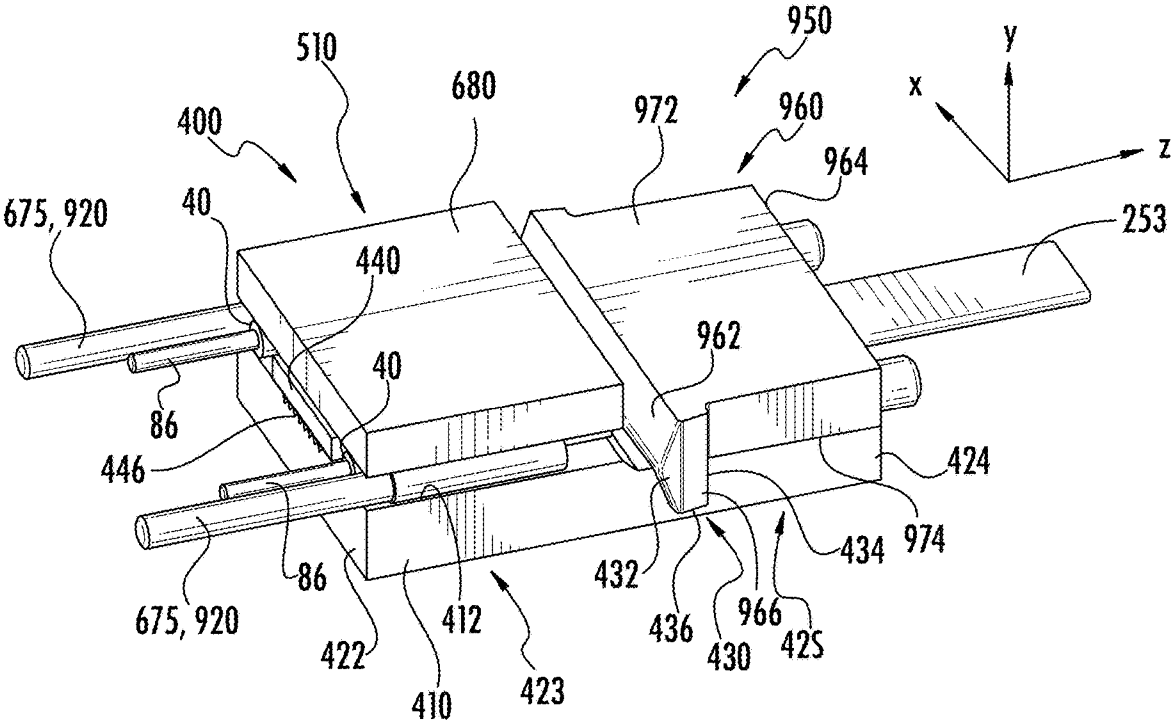
FIGS. 29A and 29B are front-elevated and back-elevated views, respectively, of an example housing assembly for an example fiber connector.
Figure 29B:
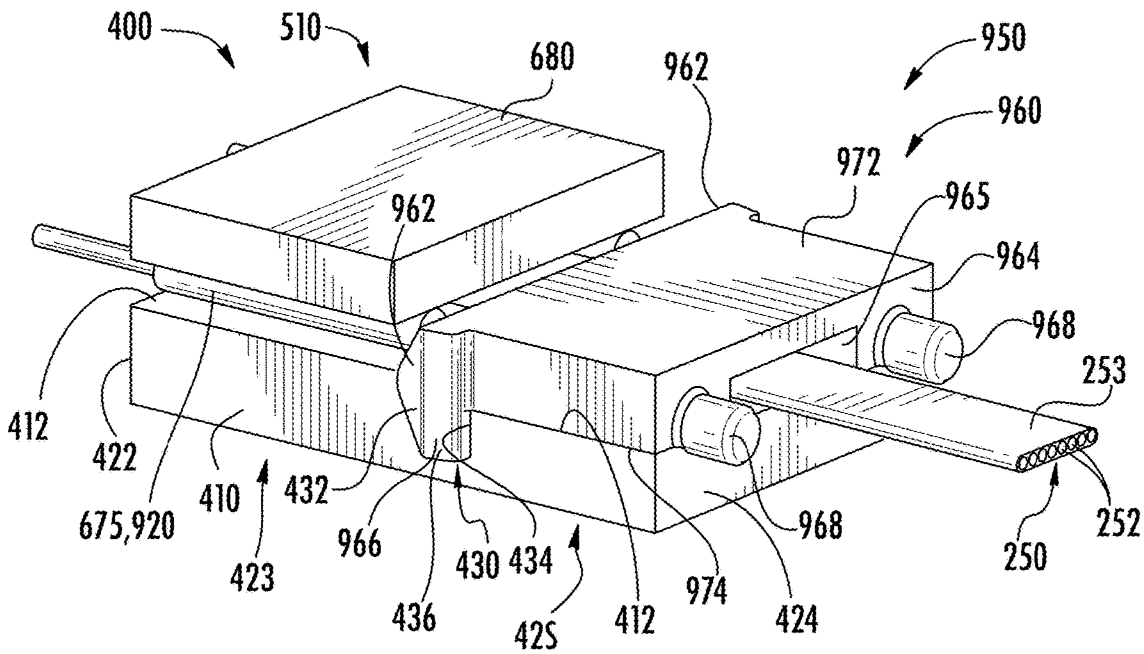

The above-described connector housing 870 is part of a housing assembly for the fiber connector 400. FIGS. 29A and 29B are front-elevated and back-elevated views of an example housing assembly 950 for an example fiber connector 400. The example fiber connector 400 includes a V-groove fiber support substrate 410 wherein the top surface 412 includes fiber V-grooves 446 that support the bare-glass portions 260 of optical fibers 252. The V-groove fiber support substrate 410 has a front-end section 423 that includes the front end 422 and a back-end section 425 that includes the back end 424.

The V-groove fiber support substrate 410 also includes a trench 430 that runs in the x-direction about mid-way between the front end 422 and the back end 424. The trench includes an angled front wall 432 (i.e., angled with respect to vertical or the x-y plane) and a vertical back wall 434, and a horizontal floor 436. The fiber connector 400 includes a cover 440 that covers the array 250 of optical fibers 252 and a cap 680 that resides atop the guide tubes 40 and the cover 440. In an example, a coarse alignment feature 675 in the form of coarse alignment pins 920 are includes outboard of the guide tubes 40 and sandwiched by the V-groove fiber support substrate 410 and the cap 680.

The housing assembly 950 further includes a spring-retaining member 960 that has a front end 962, a back end 964, a top surface 972 and a bottom surface 974. The spring-retaining member 960 resides on the back-end section 425 of the V-groove fiber support substrate 410, with the bottom surface 974 secured to the top surface 412 of the V-groove support substrate. As best seen in FIG. 29B, the spring-retaining member 960 has a central channel 965 that runs in the z-direction from the front end 962 to the back end 964 and that is open at the bottom surface 974. The central channel 965 is sized to accommodate the array 250 of optical fibers 252 of optical fiber cable 253, which runs along the top surface 412 of the V-groove fiber support substrate 410 in the z-direction from the back-end section 425 to the front-end section 423.

The front end 962 of the spring-retaining member 960 includes a downwardly depending tab 966 that is angled so that fits closely within the trench 430 while the remaining portion of the front end 962 resides proximate the back ends 44 of the guide tubes 40 that reside on the front-end section 423 of the V-groove fiber support substrate 410. The back end 964 of the spring-retaining member 960 includes spring retention features 968 on either side of the central channel 965.

Figure 29C:
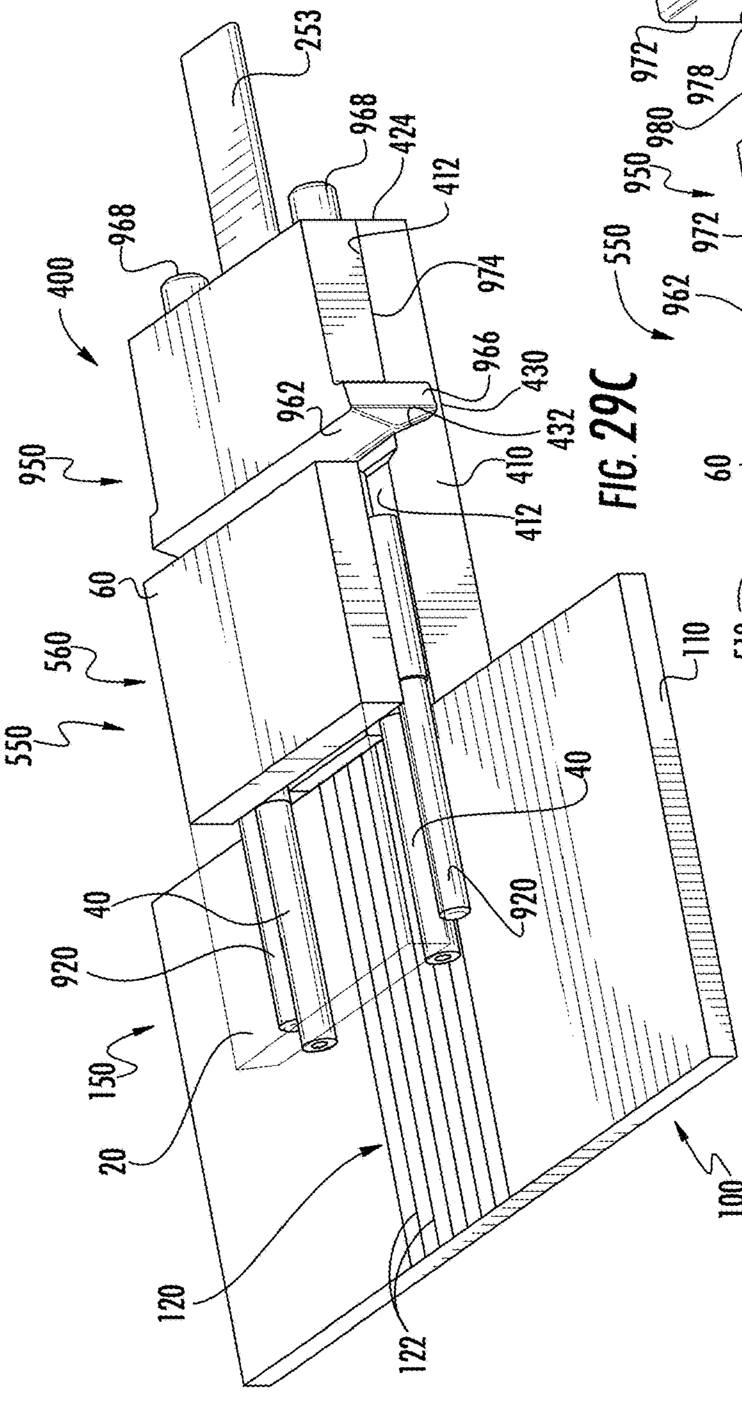
FIG. 29C is a front-elevated view similar to FIG. 29A and shows the fiber connector with the example housing assembly operably engaged with a waveguide connector.

FIG. 29C is similar to FIG. 29A and shows the ferrule connector 510 and the housing assembly 950 operably engaged with a waveguide connector ferrule 10 of the waveguide connector 150 to form an integrated photonic device 550.

Figure 30A:
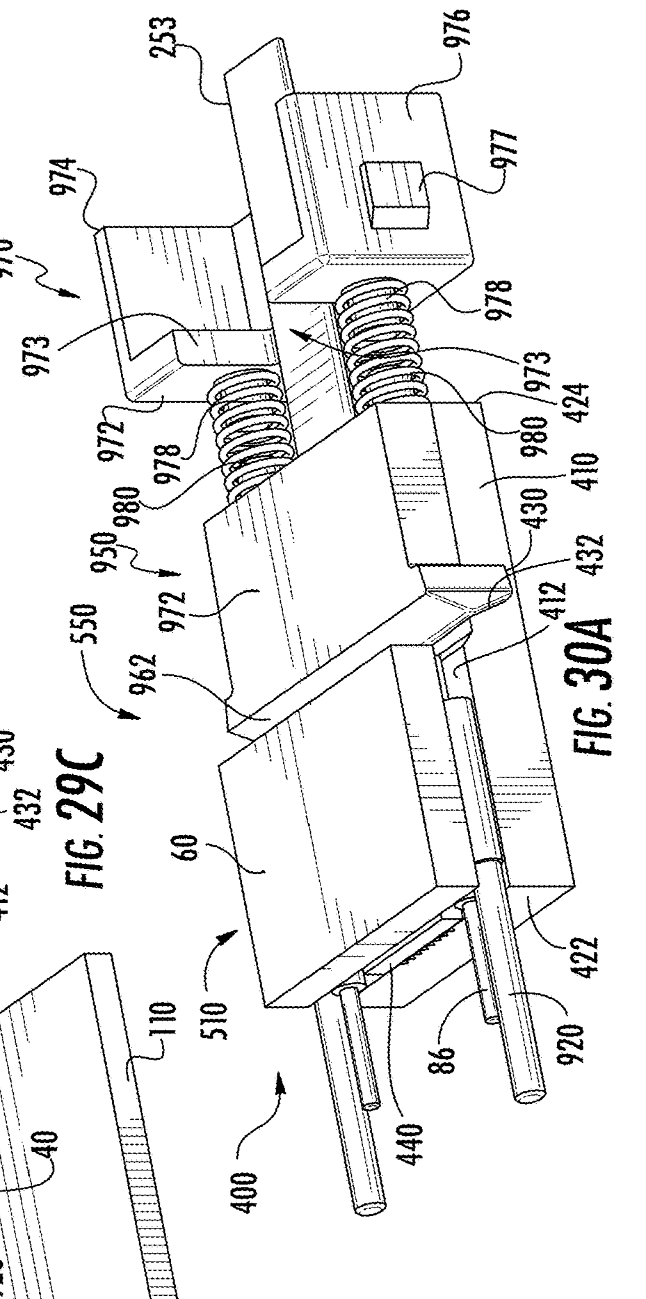
FIG. 30A is a side-elevated view that shows the housing assembly of the fiber connector as further including a spring base member.

FIG. 30A is similar to FIG. 29A and is a side-elevated view that shows the housing assembly 950 as further including a spring base member 970 that resides rearward of the back end 964 of the spring-retaining member 960. The spring base member 970 has a front end 972, a back end 974 and sides 976. Each side includes an angled detent 977. The back end 974 of the spring base member 970 is open so that it can accommodate one or more components of the housing assembly 950 or external components, e.g., associated with the formation of an integrated photonic system 600.

The front end 972 of the spring base member 970 includes spring retention features 978 that align with and confront the spring retention features 968 of the spring-retaining member 960. The example housing assembly 950 includes two springs 980, with one spring each disposed on one pair of the confronting spring retention features 968 and 978. The front end 972 includes a central opening 973 through which the array 250 of optical fibers 252 of optical fiber cable 253 runs. The spring base member 970 is fixed to the connector housing 870 (as shown in FIG. 30B) so that the springs 980 provide a forward bias that pushes the ferrule connector 400 into operable contact with the waveguide connector 150.

Figure 30B:
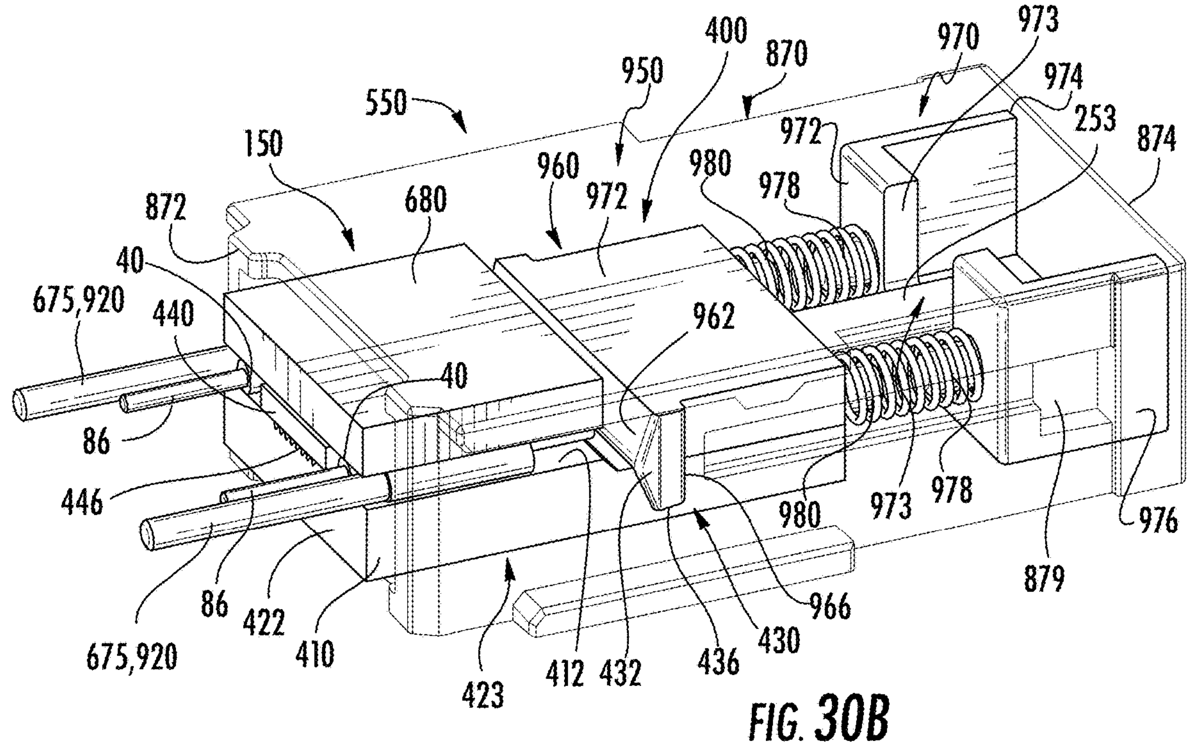
FIGS. 30B and 30C are elevated views that show the housing assembly of the fiber connector as including the connector housing.
Figure 30C:
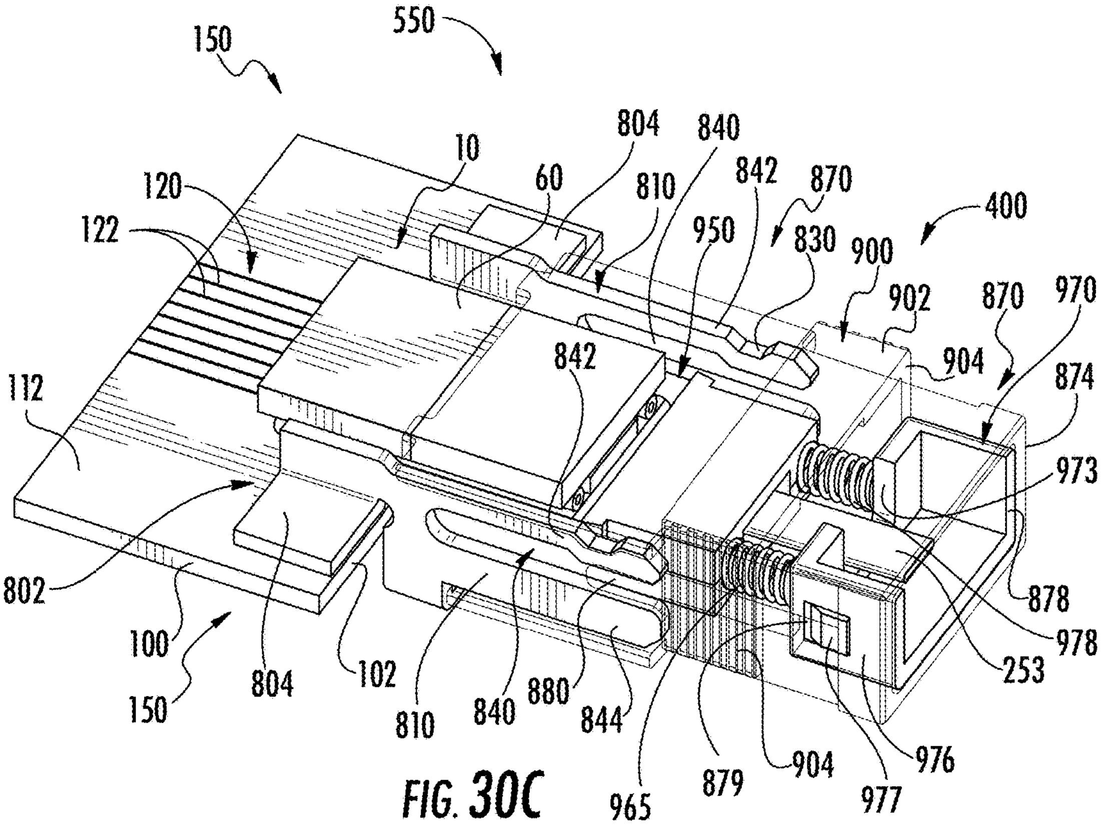

FIG. 30B is similar to FIG. 30A and shows the addition of the connector housing 870 to complete the housing assembly 950. The sides 878 of the connector housing 870 include respective apertures 879 that receive and engage the respective angled detents 977 on the sides 976 of the spring base member 970, thereby fixing the spring base member to the connector housing. FIG. 30C shows the ferrule connector 400 with its housing assembly 950 operably engaged with waveguide connector 150 via the attachment fixture 800 described above.

In an example, the attachment fixture 800 and the connector housing 870 are designed to provide an unobstructed line of sight from all sides during mating of the waveguide connector 150 and the fiber connector 400. This allows for visual inspection of the engagement process, including during active alignment operations, using the aforementioned machine visions systems 320 (see, e.g., FIG. 12C). For example, it is important that during active alignment that the confronting ends of the waveguide connector ferrule 10 and the fiber connector ferrule 510 are aligned to each other with minimal angular misalignment (i.e., minimal rotation about the x-axis and the y-axis), and no gap in the z-direction.

In an example shown in FIGS. 27A and 27BB, a viewing notch 803 is provided in or adjacent the mounting section 802, e.g., where the attachment fixture contacts the front end 102 and the top surface 112 of the PLC 100 or in one more of the guide arms 810S. The viewing notch 803 is sized and shaped (e.g., semicircular) to enable viewing in the +x-direction and −x-direction into a back-end portion 860B of the receiving region 860 adjacent the mounting section 802 and thus the front end 102 of the PLC 100. In another example also shown in FIG. 27B, another viewing notch 803 is provided in the support beam 850 to enable viewing in the +y-direction or −y-direction into the receiving region 860 at the front end 102 of the PLC 100. The front end 872 of the connector housing 870 can also include a viewing notch 803 to improve viewing access (see FIG. 28B). The viewing notches 803 can also be referred to as viewing windows, view ports, etc.

The viewing notches 803, as well as the U-shape of the attachment fixture 800, ensures that the mating interface of the waveguide connector 150 and the fiber connector 400 can be viewed from at least the top or the bottom during mating to form an integrated photonic device 550 or during the active alignment process used to form the waveguide connector using the active alignment jig 200 as described above in connection with FIGS. 12A through 12D.

Figure 30D:
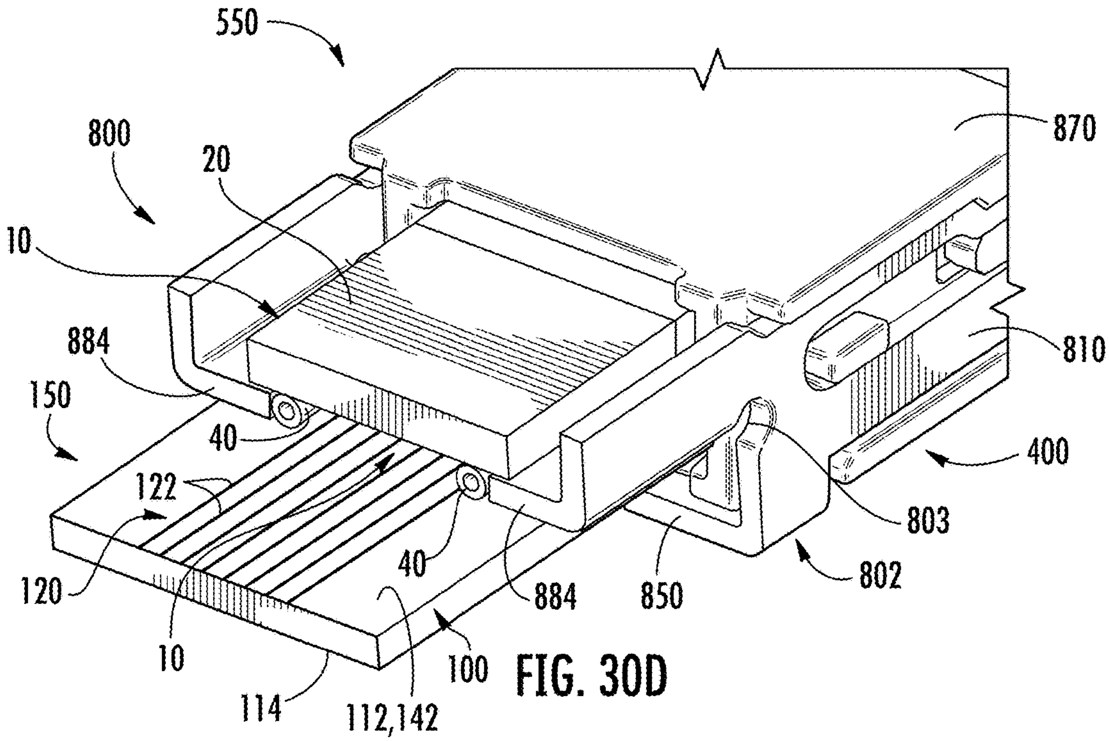
FIG. 30D is a front elevated view of an example integrated photonic device wherein the waveguide connector includes another example of the attachment fixture, wherein the mounting pads of the attachment fixture extend inward rather than outward.

FIG. 30D is a front elevated view of an example integrated photonic device 550 wherein the waveguide connector 150 includes an example attachment fixture 800 wherein the mounting section 802 is configured so the mounting pads 804 fold inward from the guide arms 810 rather than outward, as shown in FIG. 27A. This configuration allows for using the attachment fixture 800 on a waveguide connector 150 that has a relatively narrow PLC 100. Note how in an example the mounting pads 884 can extend under the substrate 20 and come into close proximity with the guide tubes 40, thereby reducing the overall footprint of the waveguide connector 150 while providing a sufficient securing area between the mounting pads 804 and the top surface 112 or 142 of the PLC 100 for a robust mechanical bond.

Figure 30E:
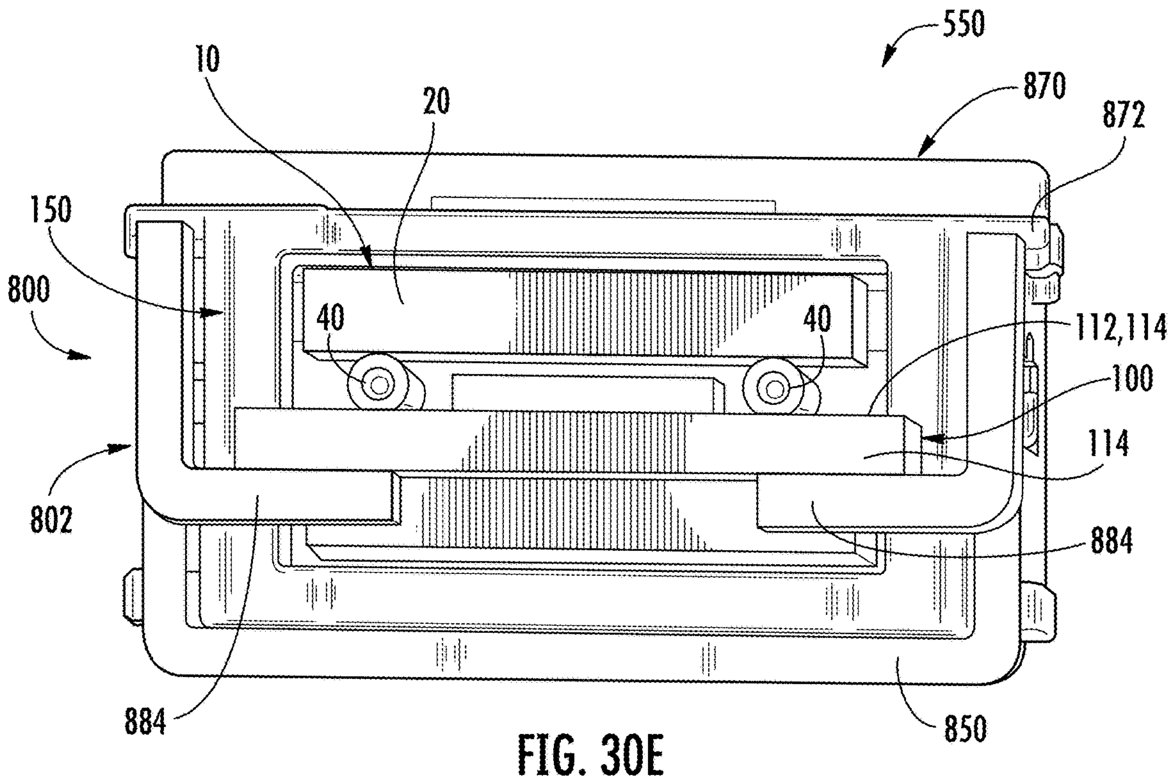
FIG. 30E is a front-on view of the integrated photonic device similar to that shown in FIG. 30D where the mounting pads of the attachment fixture are attached to the bottom surface of the PLC.

FIG. 30E is a front-on view of the integrated photonic device 550 of FIG. 30E but where the mounting pads 804 of the attachment fixture 800 mount to the bottom surface 114 of the PLC 100. In this configuration, the waveguide connector ferrule 10 does not mechanically interfere with the placement of the alignment fixture 800 on the waveguide connector 150.

Figure 30F:
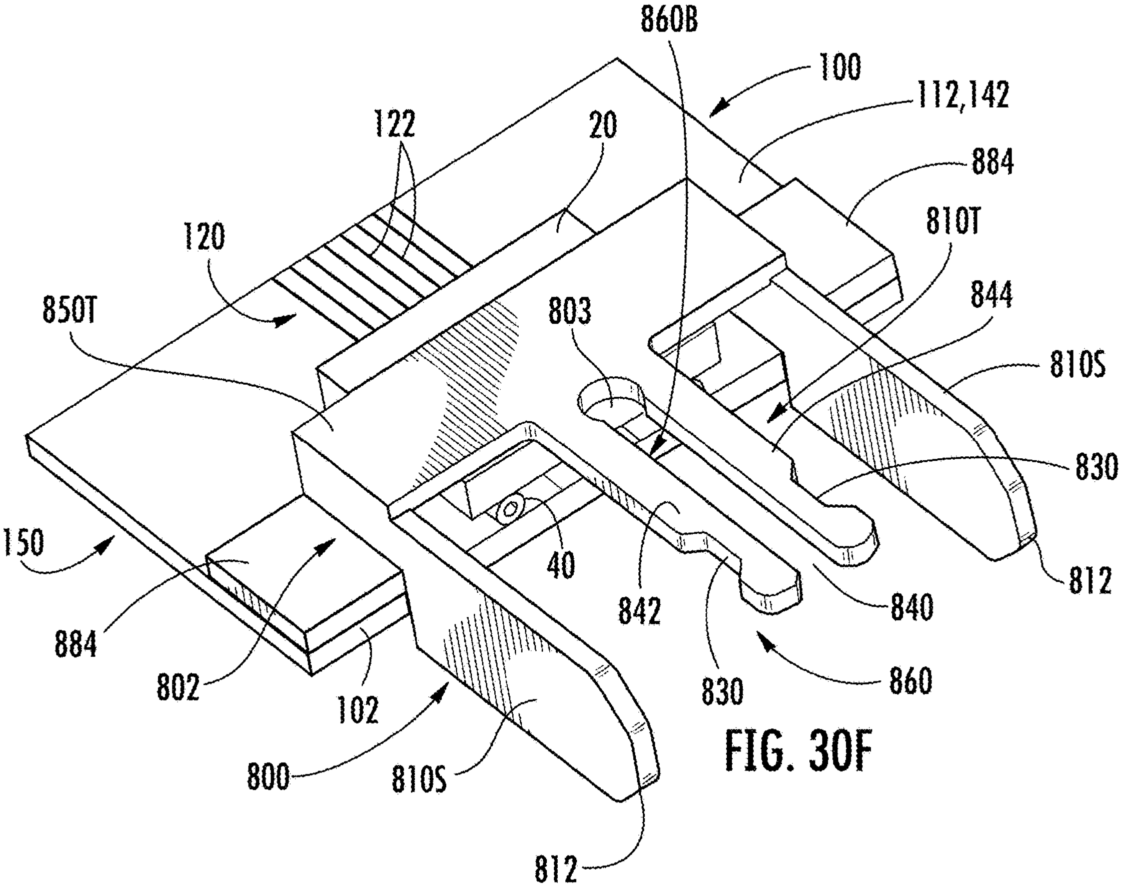
FIG. 30F is an elevated view of another embodiment of the alignment fixture wherein the alignment fixture includes a top guide arm along with the two side guide arms.

FIG. 30F is an elevated view of another embodiment of the alignment fixture 800 as attached to the waveguide connector 150. The alignment fixture 800 is similar to that of FIG. 27A except that the guide arms 810S are solid. A third “top” guide arm 810T similar to the “side” guide arms 810S shown in FIG. 27A and now denoted 810S. The top guide arm 810T extends from a top support beam 850T in the z-direction and resides in an x-z plane, i.e., is perpendicular to the side guide arms 810S. The top guide arm 810T includes the top and bottom (now, left and right) prongs 842 and 844 and the slot 840. Both the left and right prongs 842 and 844 include recesses 830 at the respective “top” sides (now, just “sides”) 822 and 824 of the prongs. In another embodiment, only one of the prongs 842 and 844 has a recess 830.

Figure 30G:
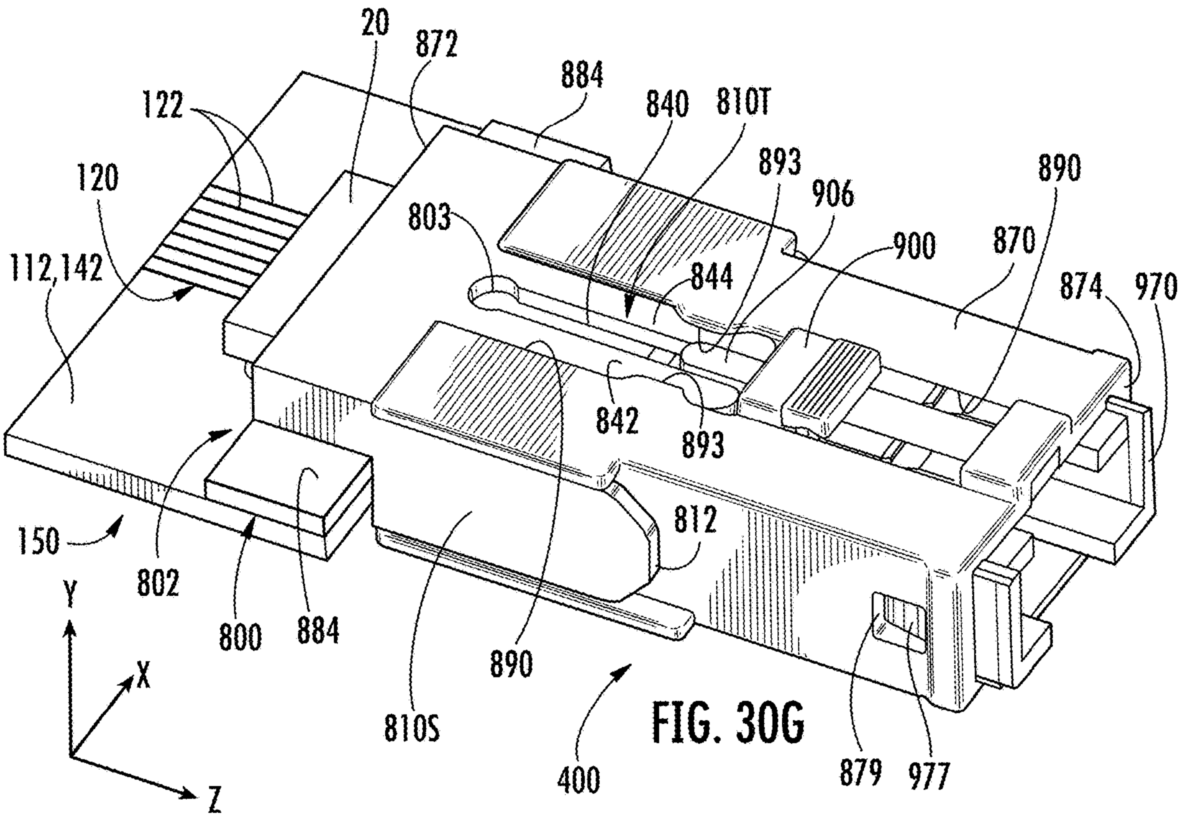
FIG. 30G shows the waveguide connector and alignment clip of FIG. 30F engaged with the connector housing of the fiber connector.

FIG. 30G shows the waveguide connector 150 and attachment fixture 800 of FIG. 30F engaged with the connector housing 870 of fiber connector 400 to form the integrated photonic device 550. In this embodiment, the locking member 900 slides within a central guide 890 in the top 876 of the connector housing 870. The central guide 890 includes the detents 893. The tongue 906 of the locking member 900 extends in the z-direction towards the front end of 872 of the connector housing 870. Thus, when mating the waveguide connector 150 and the fiber connector 400, the top guide arm 810T is received by the central guide 890 while the side guide arms 810S simply guide the connector housing 870 into the receiving region 860. As the waveguide connector 150 and the fiber connector 400 are urged together, the left and right prongs 842 and 844 flex when they encounter the detents 830. The left and right prongs 842 and 844 of the top guide arm 810T continue to move into the central guide 890 until the detents 893 engage the recesses 830 of the left and right prongs. At this point, the locking member 900 is slid from its unlocking position to its locking position so that the tongue 906 moves into the slot 840 between the left and right prongs 842 and 844. The tongue 906 so disposed prevents the left and right prongs 842 and 844 from flexing, thereby keeping the detents 893 engaged within the respective recesses 830 of the left and right prongs.

Figure 30H:
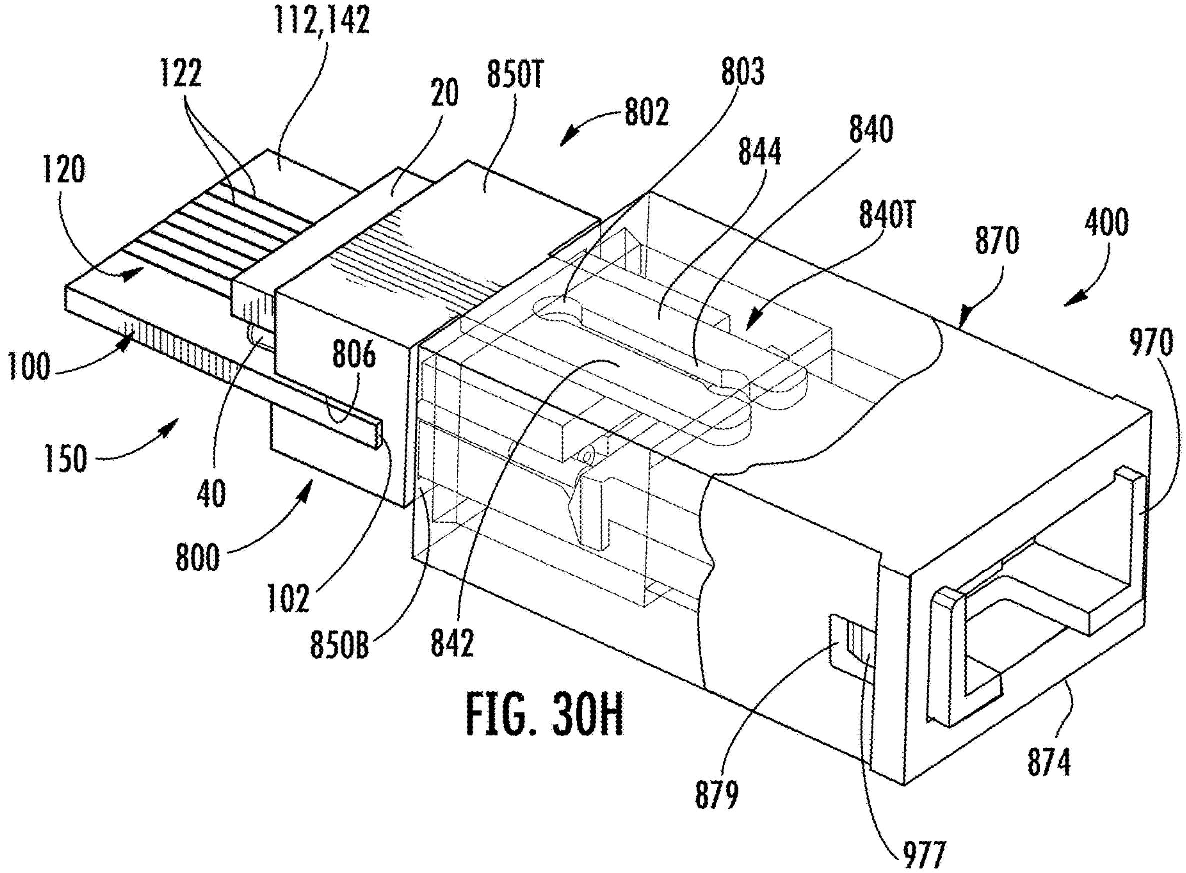
FIG. 30H is similar to FIG. 30G and shows an example wherein the alignment fixture does not include the two side guide arms.

FIG. 30H is similar to FIG. 30G and shows an example wherein the alignment fixture 800 does not include the side guide arms 810S. Further, the mounting section 802 does not include mounting pads 804 and instead is defined by a slots 806 configured to receive the front end 102 of the PLC 100. The mounting section 802 now also two support beams 850, namely a top support beam 850T and a bottom support beam 850B that define a hollow box configuration for the mounting section. The top guide arm 810T extends from the top support beam 850T.

Figure 30I:
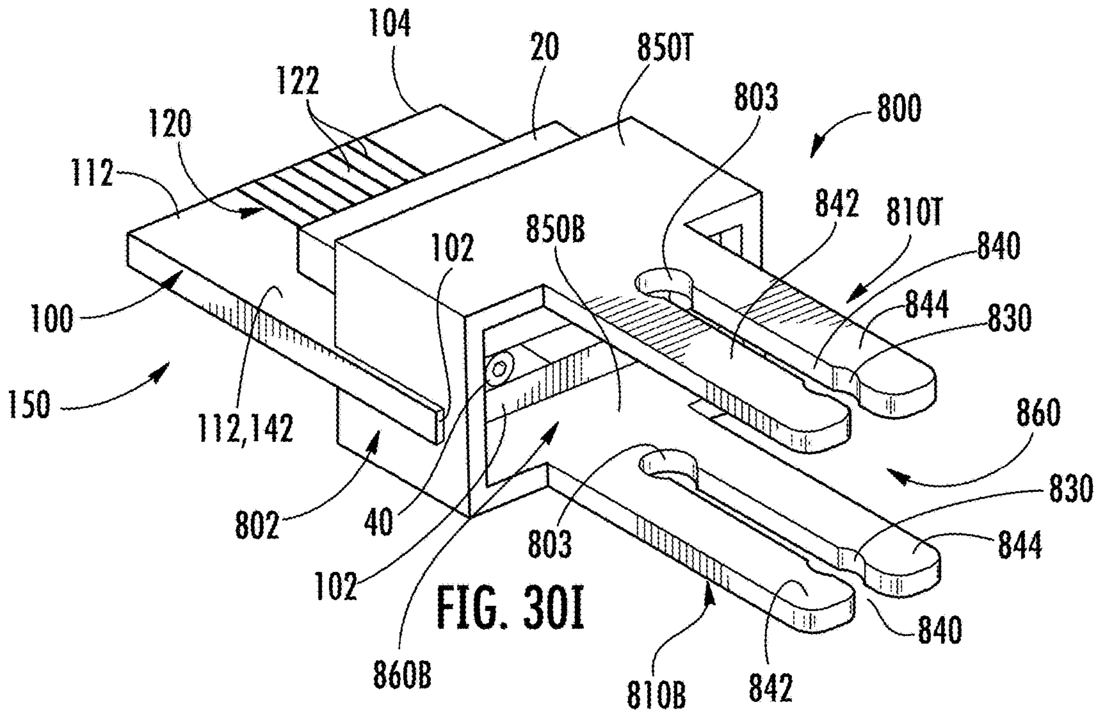
FIG. 30I shows a waveguide connector with an example alignment fixture similar to that shown in FIG. 30H but wherein the alignment fixture now includes both top and bottom guide arms.

FIG. 30I shows a waveguide connector 150 with an example alignment fixture 800 similar to that shown in FIG. 30H but wherein the alignment fixture now includes both the top guide arm 810T as well as a bottom guide arm 810B identical to or substantially similar to the top guide arm and that extends parallel to thereto from the bottom support beam 850B. The receiving region 860 is now defined by the space between the top and bottom guide arms 810T and 810B.

Figure 30J:
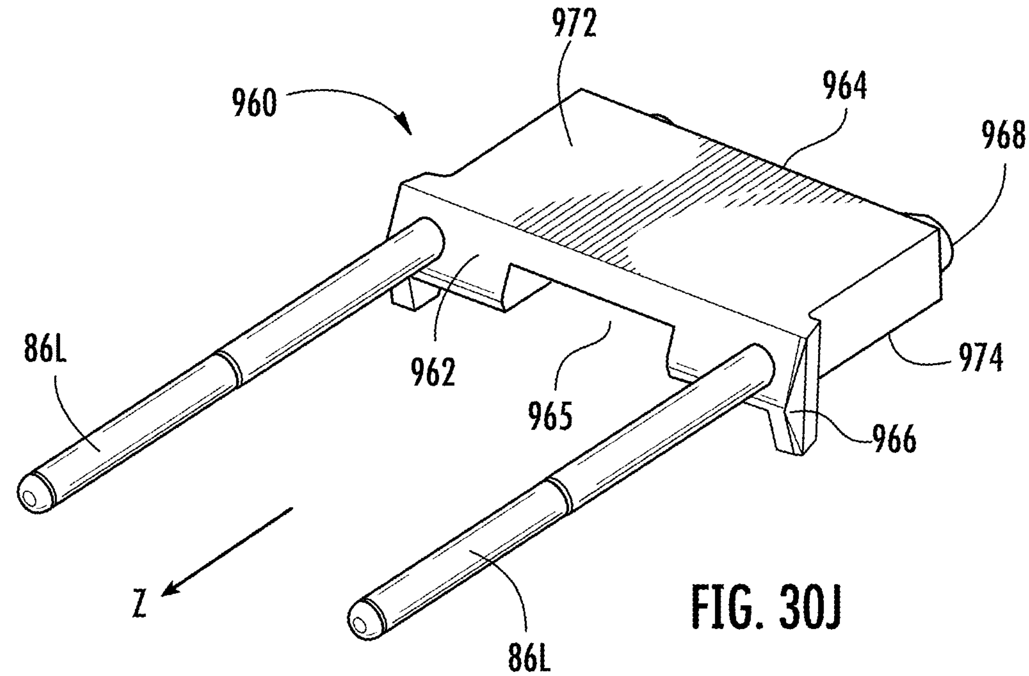
FIG. 30J shows an example spring-retaining member similar to that used in the fiber connector of FIGS. 29C, 30A and 30B, but wherein the angled front wall includes long guide pins.
Figure 30K:
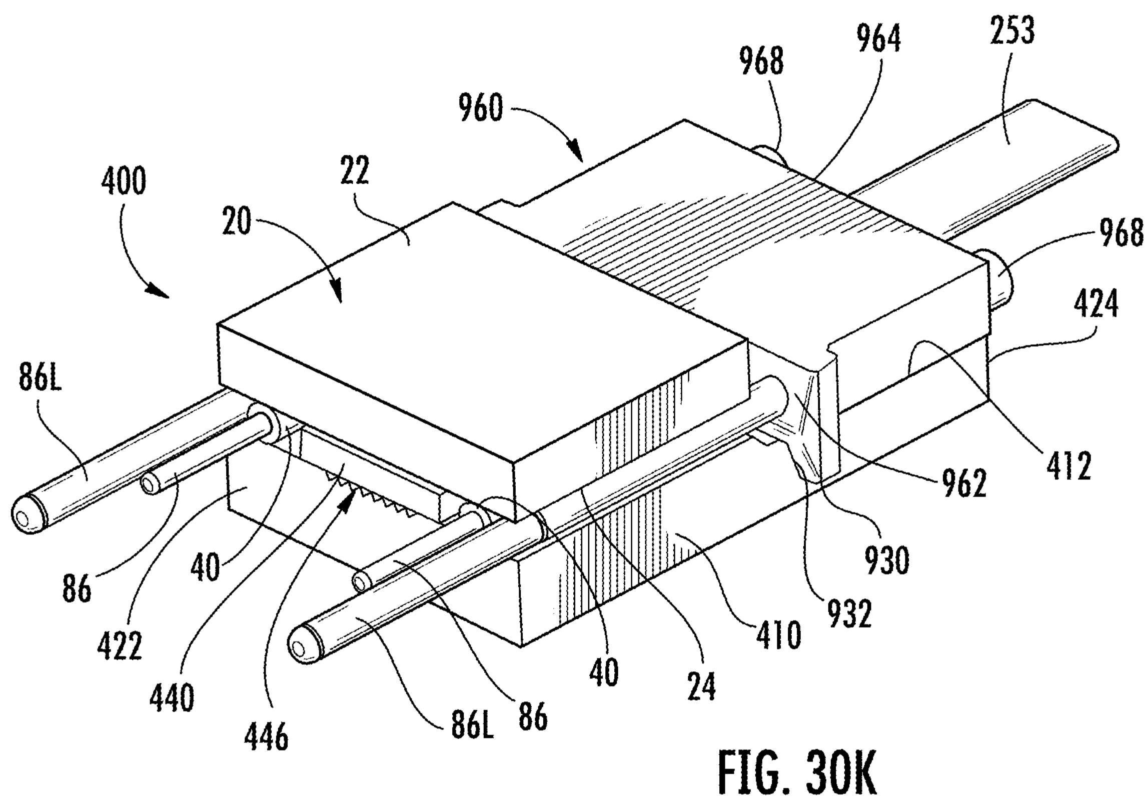
FIG. 30K shows an example fiber connector with the spring-retaining member of FIG. 30J.

FIG. 30J shows an example spring-retaining member 960 similar to that used in the fiber connector 400 of FIGS. 29A 29B, 29C, 30A and 30B, but wherein the front end 962 includes long guide pins 86L that extend in the z-direction. The long guide pins 86L can be formed integral with the rest of the spring-retaining member 960 or added, e.g., by forming holes in the front end 962 and then securing end portions of the long guide pins therein. FIG. 30K shows an example fiber connector 400 with the spring-retaining member 960 of FIG. 30J, with the long guide pins 86L extending beyond the front end of the support substrate 410.

Figure 30L:
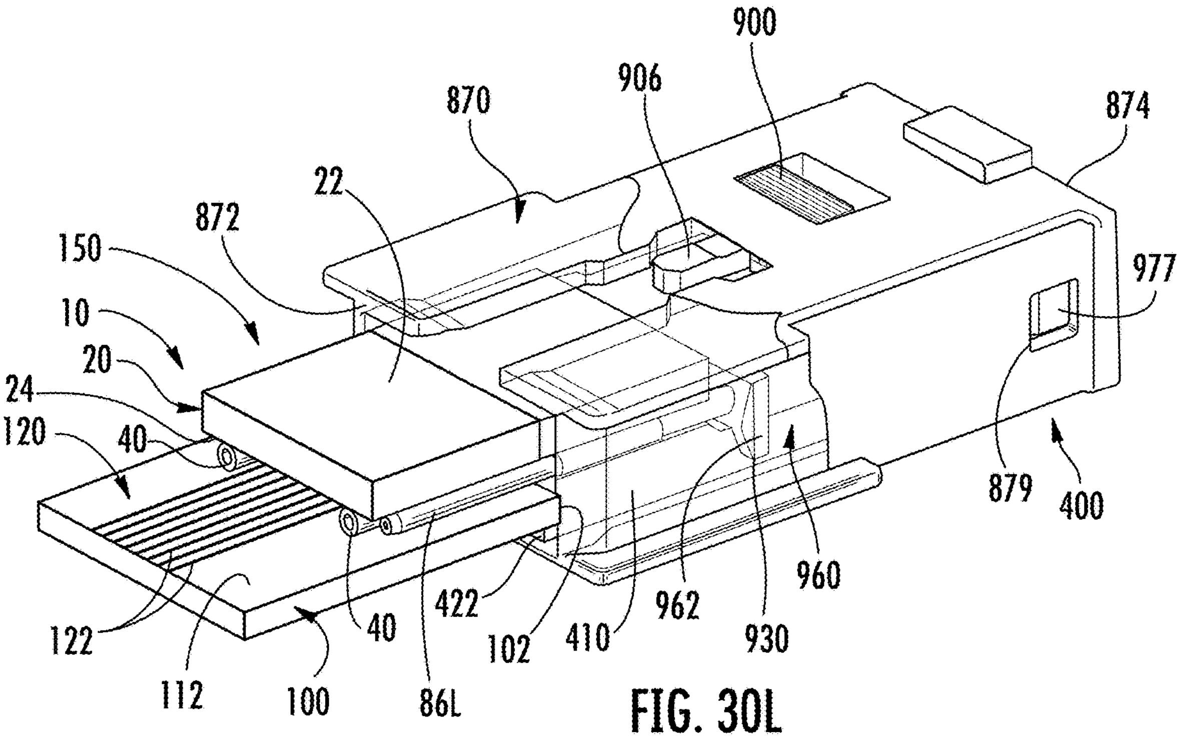
FIG. 30L is similar to FIG. 30B and shows how the long guide pins of the fiber connector of FIG. 30K extend past the outsides of the guide tubes of the waveguide connector to perform coarse alignment when mating the waveguide connector and the fiber connector to form an integrated photonic device.

FIG. 30L is similar to FIG. 30B and shows how the long guide pins 86L of the fiber connector 400 of FIG. 30K reside adjacent the outsides of the guide tubes 40 of the waveguide connector 410 to perform coarse alignment when mating the waveguide connector 150 and the fiber connector.

Compact Configurations for the Waveguide and Fiber Connectors

Traditional guide pin-based ferrules and connectors for multifiber applications typically place the guide pins to the left and right of a central region where the optical fibers are located. While convenient, this placement increases the width of the ferrule or connector, which is undesirable for making high-bandwidth-density optical interconnections around the perimeter of PLC substrates.

Figure 31A:
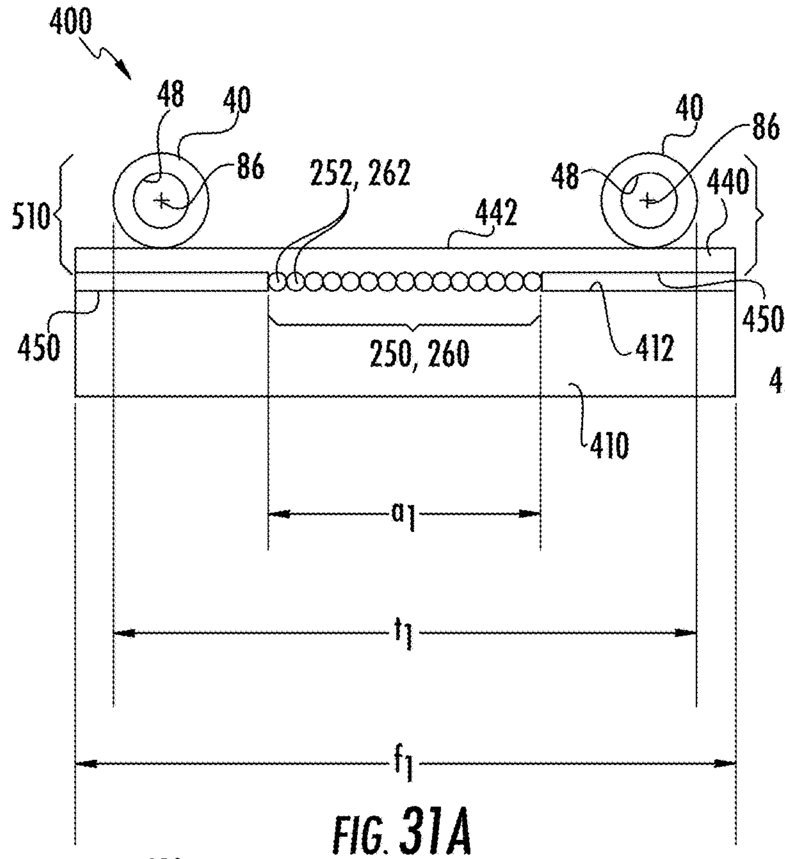
FIGS. 31A through 31D are front-on views of example configurations of the fiber connector, wherein the configurations of FIG. 31B through 31C are made more compact than the configuration of FIG. 31A by changing the positions of the guide tubes.
Figure 31B:
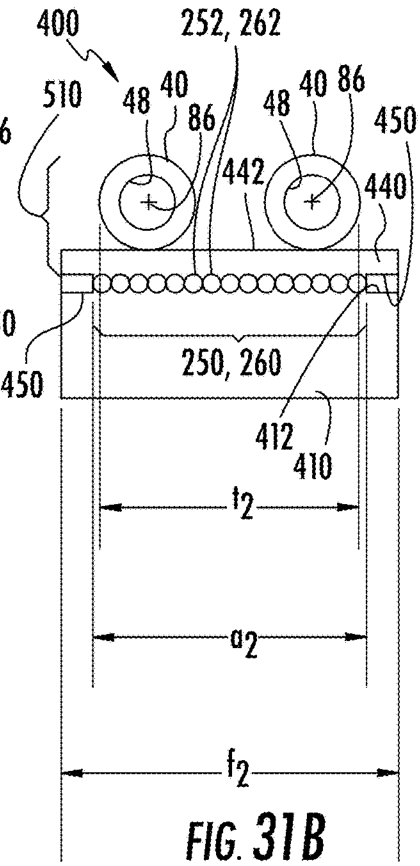

FIG. 31A is a front-on view of an example design of a fiber connector 400 and shows the following dimensions: a1=the width of the array 250 of optical fibers 252; t1=the outside width of the spaced apart guide tubes 40; f1=the width of the support substrate 440. FIG. 31B is similar to FIG. 31A and shows a more compact design for a fiber connector 400 with the following dimensions: a2=the width of the array 250 of optical fibers 252; t2=the outside spacing of the guide tubes 40; f2=the width of the support substrate 210.

With reference to FIG. 31A, the width a1 of the array 250 of optical fibers 252 is less than the outside width t1 of the guide tubes 40 that hold the guide pins 86. The width f1 of the support substrate is wider than the width t1 of the guide tubes. In FIG. 31B, the guide tubes 40 and the attendant guide pins 86 are moved closer together to reduce the width t2 and thus the total width of the connector as defined by the width f2 of the support substrate 440. In FIG. 31B, the outside width t2 of the guide tubes 40 is less than the width a2 of the array 250 of optical fibers 252. The resulting reduction in the width f2 of the support substrate 440 enables a more compact fiber connector 400 that can be made only slightly wider than the array 250 of optical fibers 250.

Figure 31C:
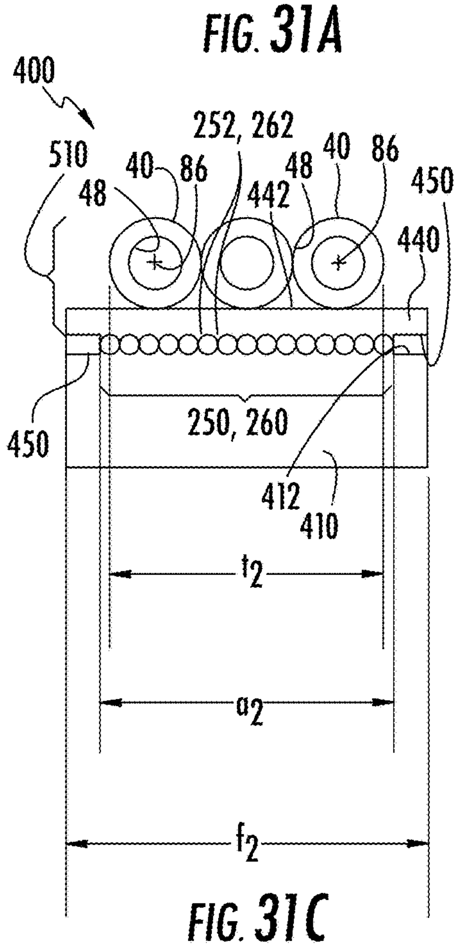
Figure 31D:
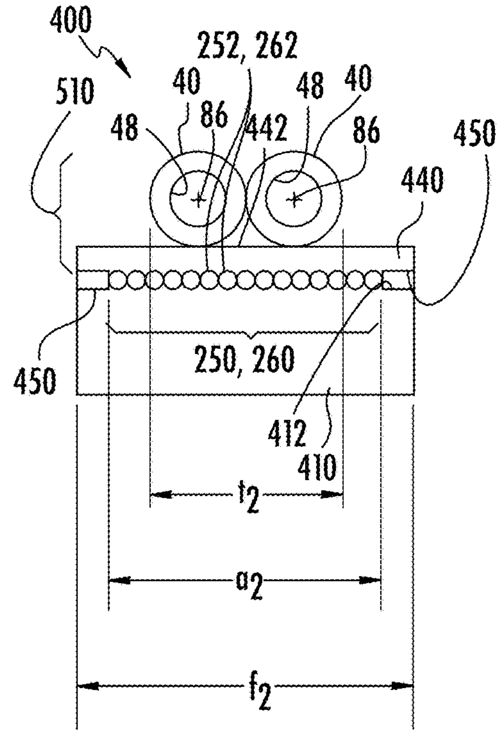

FIGS. 31C and 31D are similar to FIG. 31B and illustrate an embodiment of the fiber connector 400 wherein the pitch PB of the guide tubes 40 can be established by inserting one or more intermediate guide tubes 40 or other precision spacers between the two outboard guide tubes (FIG. 31C) or by placing the guide tubes immediately adjacent one another (FIG. 31D)

As shown in 31C, the total width of the ferrule is largely determined by the width a2 of the fiber array. While the waveguides 122 of the PLC 100 can be fabricated on very small pitches (e.g., 15 microns to 30 microns), in practice they have a pitch PB of 127 microns or 250 microns to match the pitch PF of standard 125 um diameter optical fibers 252 aligned by V-groove substrates.

To enable higher-bandwidth-density optical interconnections to waveguides 122 of PLC 100, it is desirable to reduce the width a2 of the array 250 of optical fibers 252. This can be accomplished in one example by reducing the diameter of the optical fibers 252 to a value below 125 um, such as 80 um or 62.5 um. FIG. 31D shows how the overall width of the fiber connector 400 can be reduced by using optical fibers 252 having a smaller diameter, e.g., such as 62.5 microns. In this case, it may be desirable to position the two guide tubes 40 in contact with each other, as shown. In this example, the fiber pitch PF can be as small as 62.5 microns.

When smaller diameter optical fibers 252 can be used, the number of optical fibers 252 in the array 250 can be increased while keeping the guide pin separation constant. The tube-based ferrule and connector solutions described herein provides a path to higher-bandwidth-density fiber connectors 400, since the guide tubes 40 can still be positioned over the fiber array 250 to make the fiber connector as narrow as possible. The corresponding waveguide connector ferrule 10 and waveguide connector 150 can be configured in a like manner to operably engage with the smaller fiber connector 400.

Precision Spacer

The waveguide and fiber connectors disclosed herein utilize precision vertical offsets between two guide tubes 40 and an array 120 of PLC waveguides 122 or an array 250 of optical fibers 252. As noted above, the support substrate 20 of the waveguide connector ferrule 10 and the cover 440 of the ferrule connector 400 can also serve as spacers. In particular, the support substrate 20 of the waveguide connector ferrule 10 can be used to define the vertical distance DGB between plane P3 of the waveguides 122 and the plane P4 of the bores 48 of the guide tubes 40 (see FIG. 8C). Likewise, the cover 440 can be used to define the vertical distance (spacing) DFP between the plane P5 of the optical fibers 252 and the plane P6 of the bores 48 or guide pins 86 supported in the bores of the guide tubes 40 of the fiber connector ferrule 510 (see FIG. 13B). In an example, the spacing DFP is in the range 300 microns≤DFP≤1000 microns. In an example, the spacing DFP of the fiber connector 400 is equal to the spacing DGB of the waveguide connector 150.

Some desirable properties of each of these spacers 20 and 440 include: a thickness great enough to provide mechanical rigidity during assembly and during use, e.g., >250 microns; a thickness small enough (e.g., less than 1000 microns) so that the bores 48 of the guide tubes 40 are not too high above either the waveguides 122 of the waveguide connector 150 or the optical fibers 252 of the fiber connector 400; the ability to fabricate the spacers with a precise thickness, e.g., to within ±0.25 microns or better; a limited amount of warp, e.g., less than 2 microns over a 5 mm×5 mm surface region; and low-cost fabrication.

In an example, the spacers 20 and 440 can be formed using the same kind of fusion draw process used to create LCD display glass in thickness ranging from 100 microns to 500 microns. The fusion draw process does not produce glass sheets having perfectly uniform thickness, with variations of about 3 microns to 4 microns perpendicular to the draw direction. Thickness variations in the draw direction are typically much smaller, e.g., less than 0.1 micron. Thus, the thickness variation is in the form of ripples that run in the draw direction.

An example method of forming spacers 20 and 440 from fusion-drawn glass sheets that have an acceptable thickness uniformity is as follows. First, measure the thickness across a single glass sheet perpendicular to the draw direction. Second, identify which regions of the glass sheet provide thicknesses that are within the target thickness range. Third, dice the sheet to harvest those regions that are within the target thickness range. Fourth, dice the harvested regions into smaller pieces of the size required for the given spacer 20 or 440.

Figure 32:
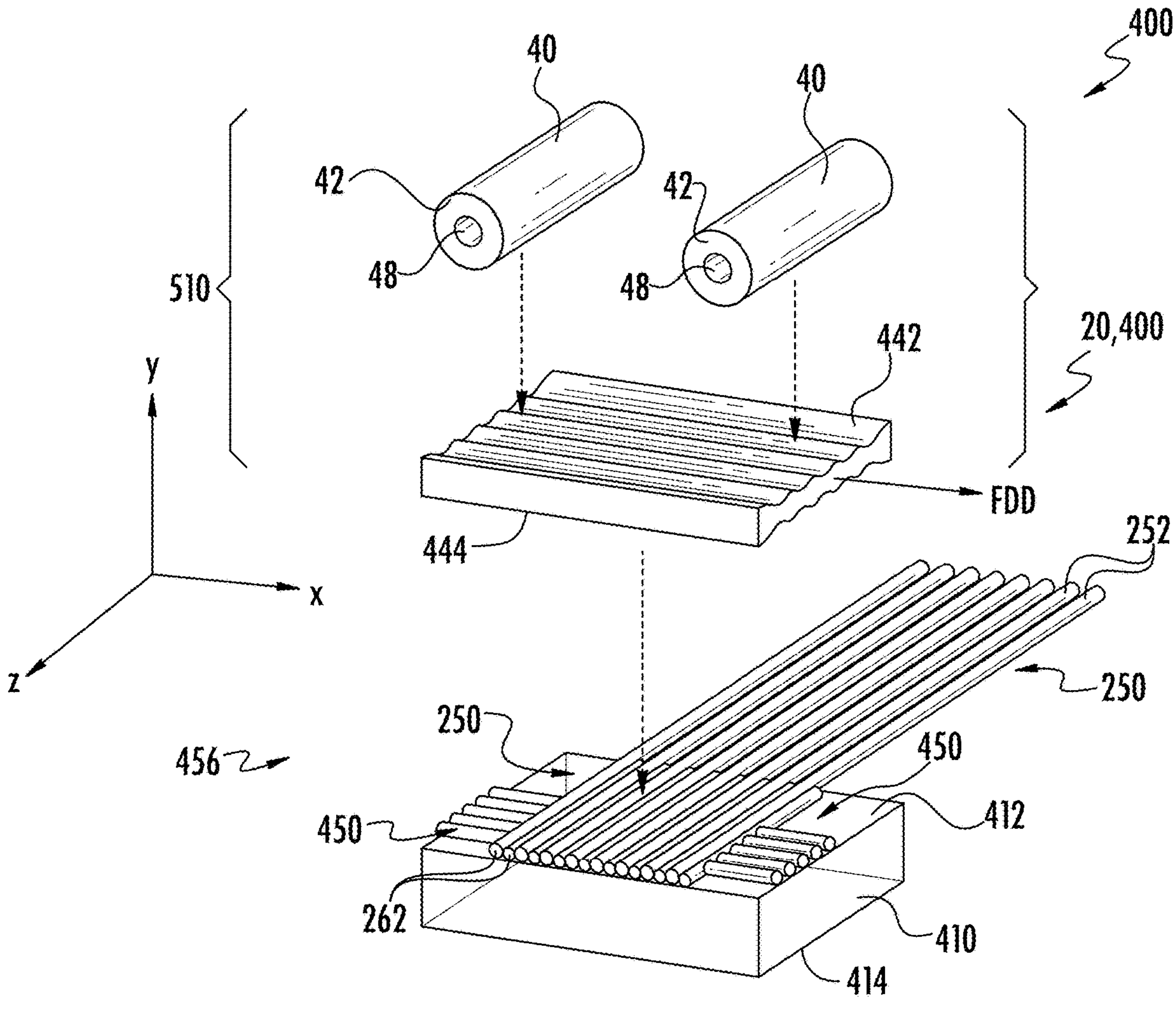
FIG. 32 is a partially exploded front-elevated view of an example fiber connector that uses a spacer made by a fusion draw process, wherein the spacer is arranged so that the fusion draw direction is perpendicular to the optical fibers.

While the thickness variation within a given spacer 20 or 440 can vary substantially over the relatively small area (e.g., 5 $mm^2$ to 6 $mm^2$), it may be preferable to orient the glass sheet so that the fusion draw direction FDD is perpendicular to the waveguides 122 or to the optical fibers 252 so that the thickness variation in the z-direction is averaged out, as shown in the partially exploded front-elevated view of FIG. 32.

Alternative Optical Coupling Embodiments

The example embodiments of the waveguide connector 150 and the fiber connector 400 described above are configured for end-to-end optical coupling wherein light passes between the waveguide end faces 132 and the fiber end faces 262 when the waveguide connector and the fiber connector are mated to form an integrated photonic device 550. In other example embodiments, the waveguide connector 150 and the fiber connector 400 can be configured for other types of optical coupling, such as edge coupling and evanescent coupling.

Figure 33A:
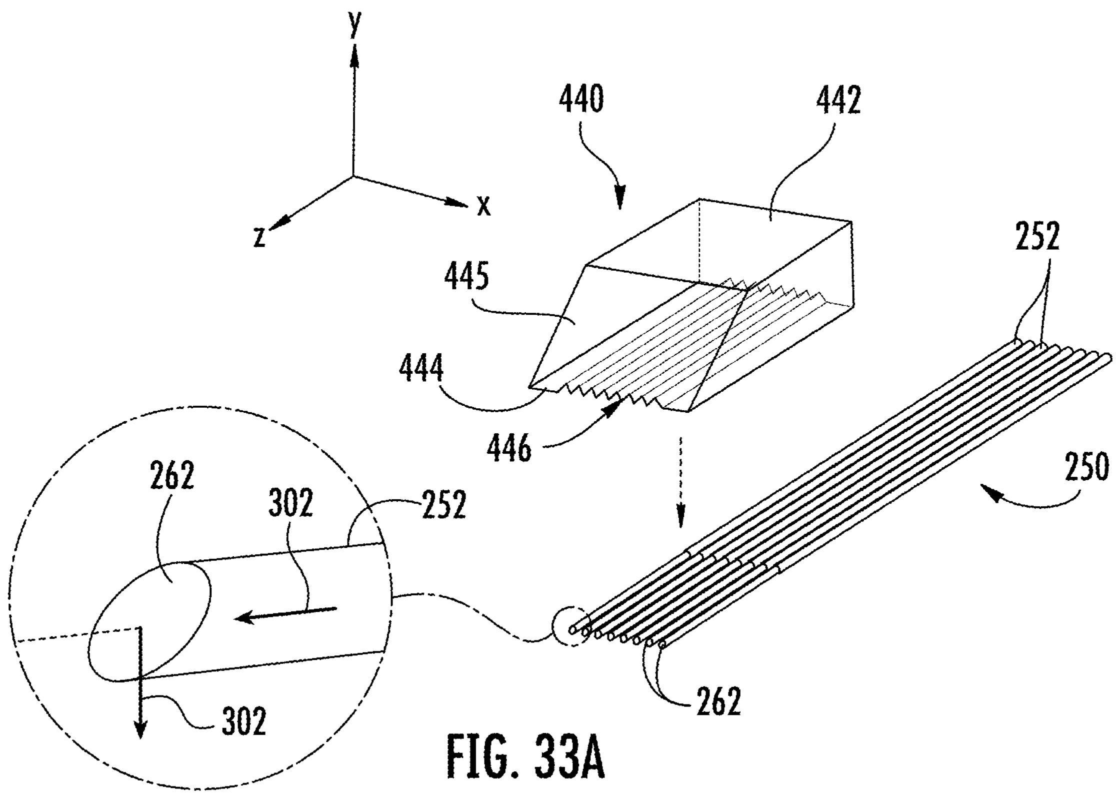
FIG. 33A is a partially exploded front elevated view of an array of optical fibers shown along with a V-groove cover in position to be placed upon the array to form a V-groove assembly.
Figure 33B:
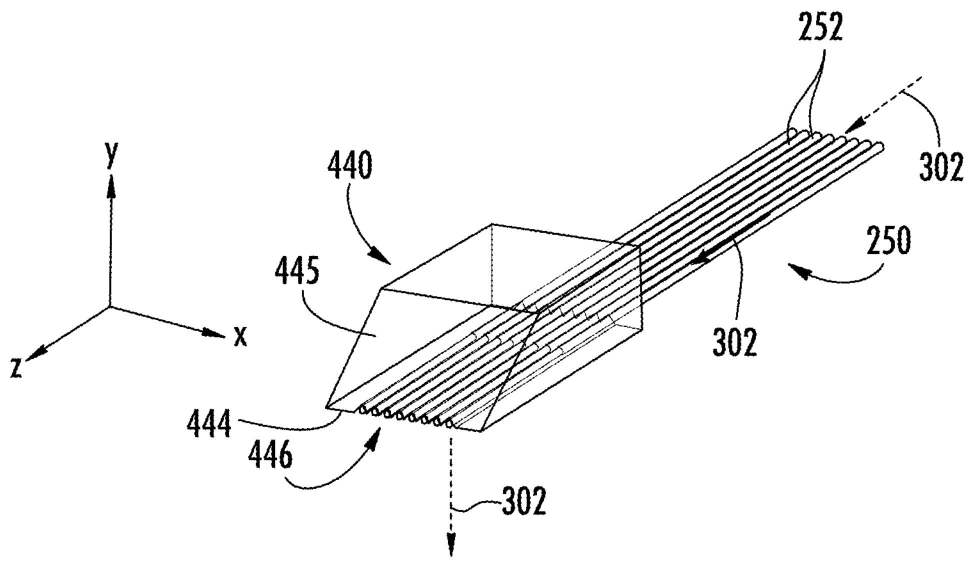
FIG. 33B shows the V-groove assembly formed as shown in FIG. 33A.

FIG. 33A is a partially exploded front elevated view of an array 250 of optical fibers 252 shown along with a V-groove cover 440 in position to be placed upon the array so that the fiber V-grooves 446 engage the bare-glass portions 260 of the optical fibers. FIG. 33B shows the resulting V-groove assembly 480. The V-groove cover 440 has a front end 445 that is angled, i.e., is not perpendicular to the z-axis. Also in an example, the fiber end faces 262 are angled (see close-up inset in FIG. 33A) so that the fiber end faces define a total-internal-reflection (TIR) surface so that light 302 traveling in the optical fiber 252 and incident upon the angled end face 262 is directed in the −y-direction (FIG. 33B). In another example, the end portions of the optical fibers 252 that include the end faces 262 can have a bend so that the end face faces downward. In an example, optical re-directing elements (not shown) can be used to assist in the optical coupling process.

Figure 34A:
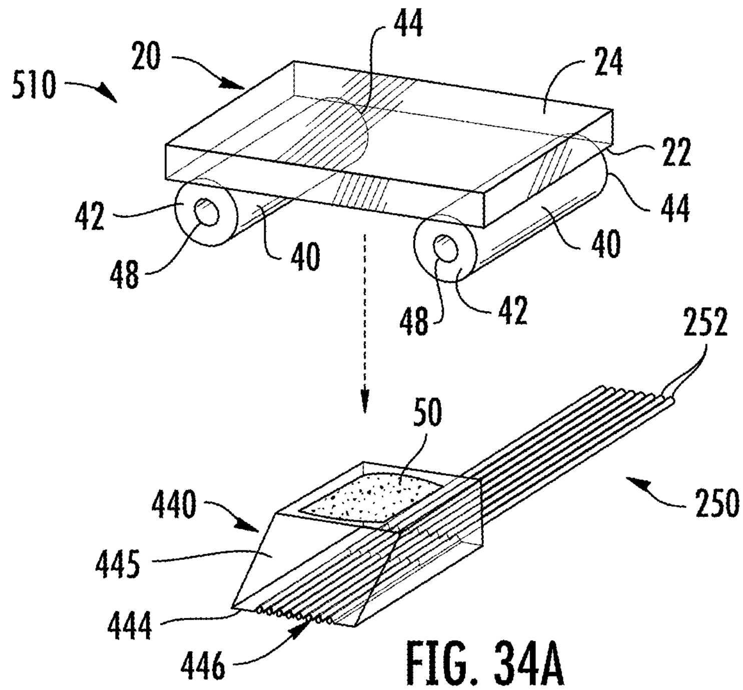
FIG. 34A shows the V-groove assembly of FIG. 33B along with a fiber connector ferrule in position to be attached to the V-groove assembly to form a fiber connector.
Figure 34B:
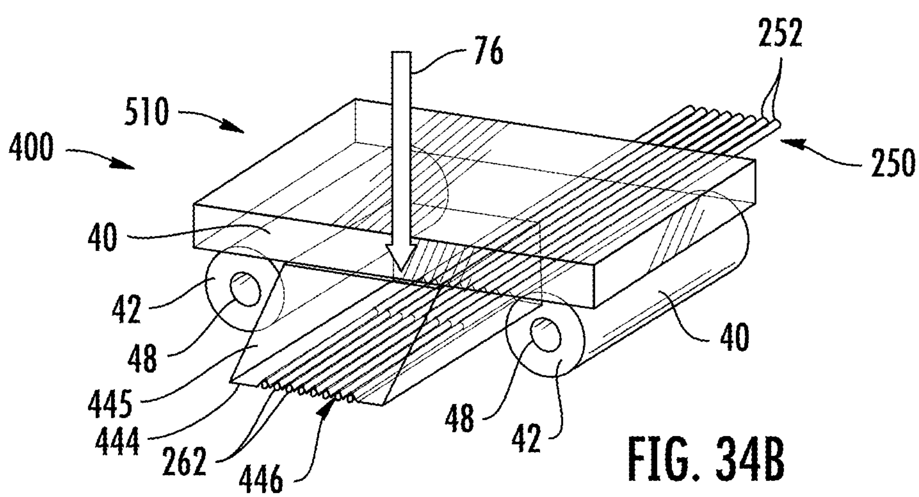
FIG. 34B shows the fiber connector formed as shown in FIG. 34A.

FIG. 34A shows the V-groove assembly 480 of FIG. 33B along with a fiber connector ferrule 510 in position to be attached to the V-groove assembly. Securing material 50 is provided on the top surface 442 of the V-groove cover 440. The fiber connector ferrule 510 is then lowered onto the V-groove assembly 480 so that the bottom surface 24 of the support substrate 20 contacts the securing material 50, as shown in FIG. 34B. At this point, active alignment of the fiber connector ferrule 510 to the V-groove assembly 480 can be performed as described above and then the securing material activated (e.g., via UV radiation 76) to fix the configuration of the resulting ferrule connector 400. At this point, guide pins 86 can be added, as shown in FIG. 34C.

Figure 34C:
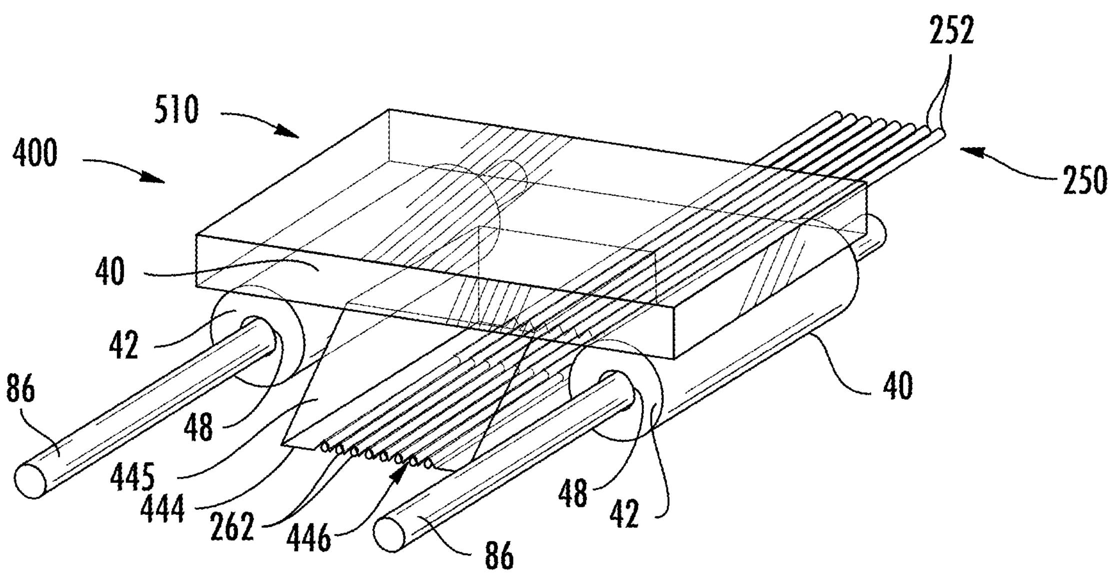
FIG. 34C shows the fiber connector of FIG. 34B with guide pins supported in the guide tubes.
Figure 35A:
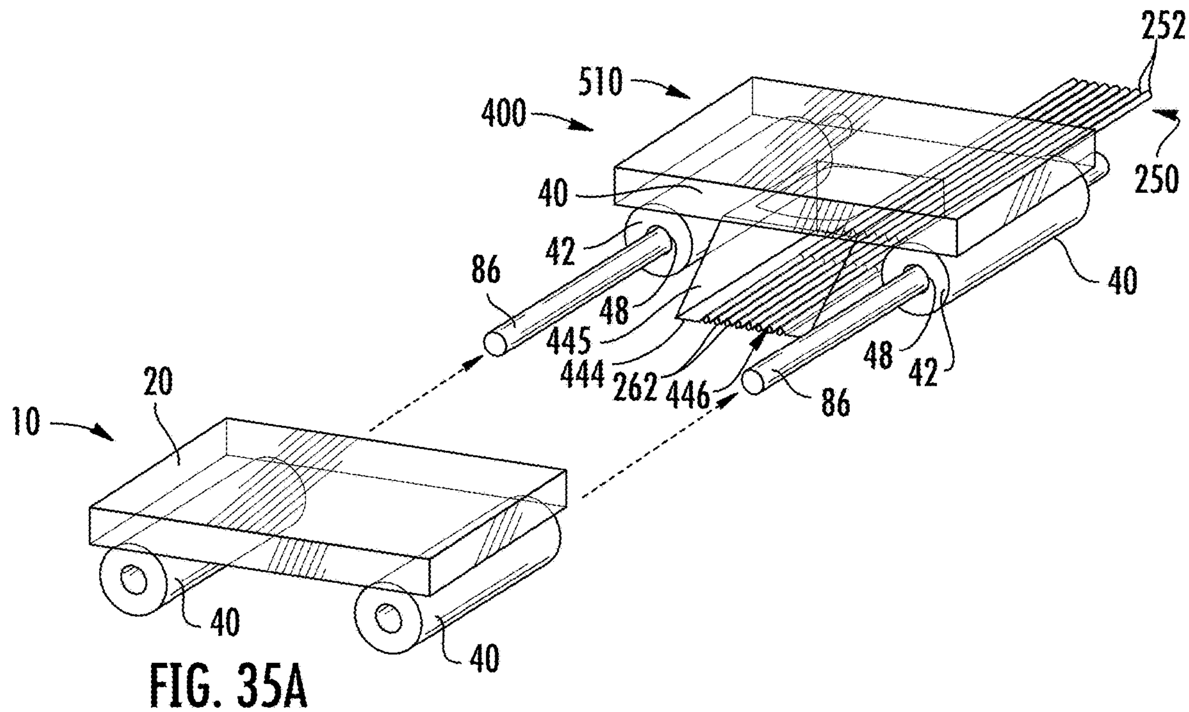
FIGS. 35A and 35B are elevated views showing the fiber connector of FIG. 34C along with a waveguide connector ferrule, wherein the guide pins of the fiber connector ferrule engage the guide tubes of the waveguide connector ferrule.
Figure 35B:
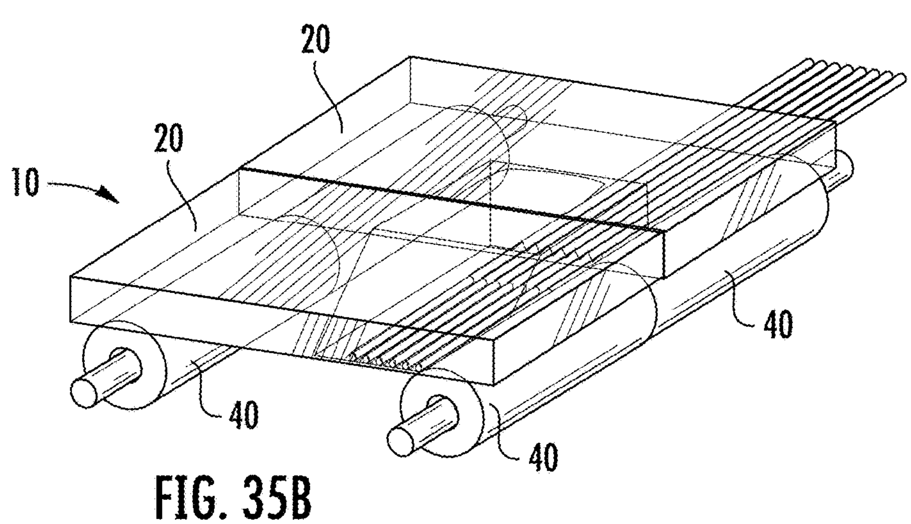

FIGS. 35A and 35B are elevated views showing the fiber connector 400 of FIG. 34C along with a waveguide connector ferrule 10, wherein the guide pins 86 of the fiber connector ferrule 510 engage the guide tubes 40 of the waveguide connector ferrule.

Figure 36A:
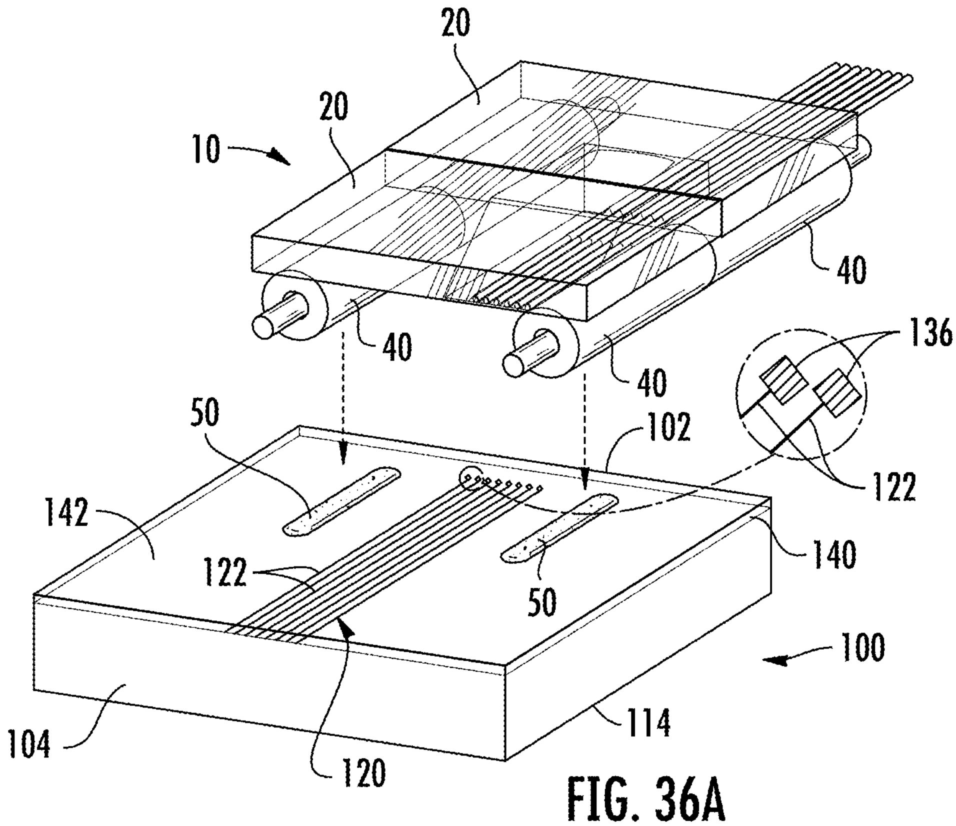
FIG. 36A shows the structure of FIG. 35B in position over an example PLC as part of the process of forming a waveguide connector.

FIG. 36A shows the structure of FIG. 35B in position over an example PLC 100 as part of the process of forming a waveguide connector 150. Securing material 50 is disposed on the top surface 142 of the silica layer 140 and beneath the guide tubes 40 of the waveguide connector ferrule 10. The waveguides 122 of the PLC 100 include light-redirecting features 136 at or adjacent the respective end faces 132 to establish optical coupling with the corresponding optical fibers 252 of the fiber connector 400. In an example shown in the close-up inset of FIG. 36A, the light-redirecting features 136 are in the form of optical gratings. In another example, the light-redirecting feature 316 can be TIR or mirror facet angled to reflect light at substantially 90 degrees. Lenses can also be provided along the optical path between the PLC waveguide and the fiber array fiber cores, in diffractive grating elements, on the surface of the PLC or the fiber array, or on substrates placed between the PLC and the fiber array.

Figure 36B:
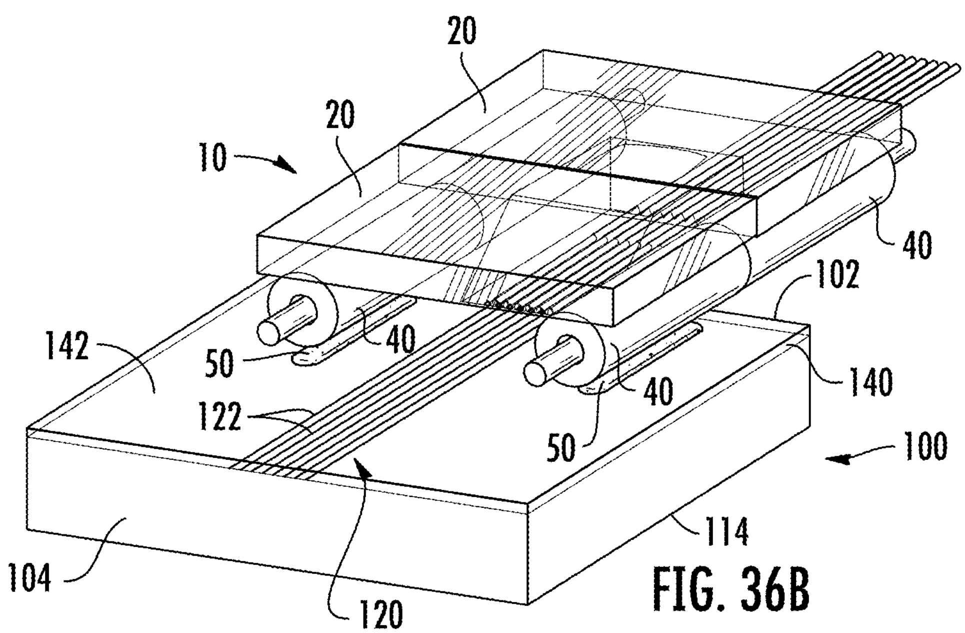
FIG. 36B shows the waveguide connector ferrule being attached to the top of the PLC.
Figure 36C:
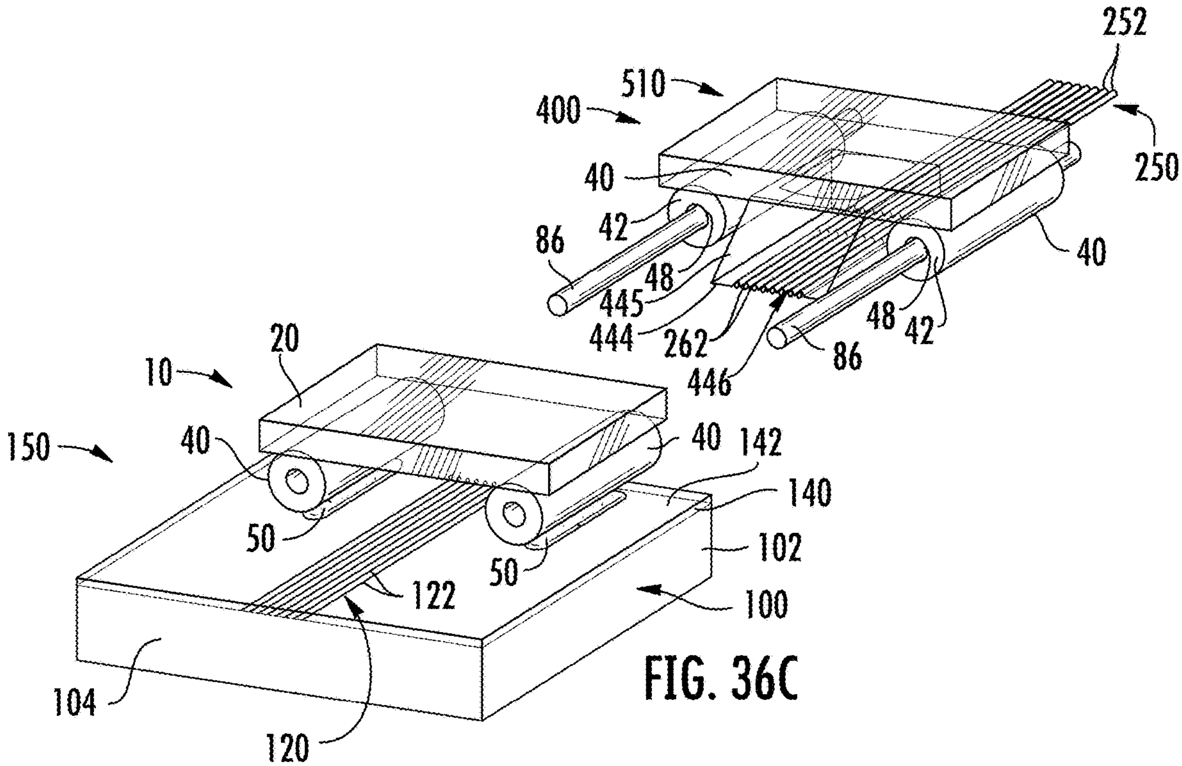
FIG. 36C shows the fiber connector removed from the waveguide connector after the waveguide connector ferrule has been fixed in an aligned position on the PLC.
Figure 36D:
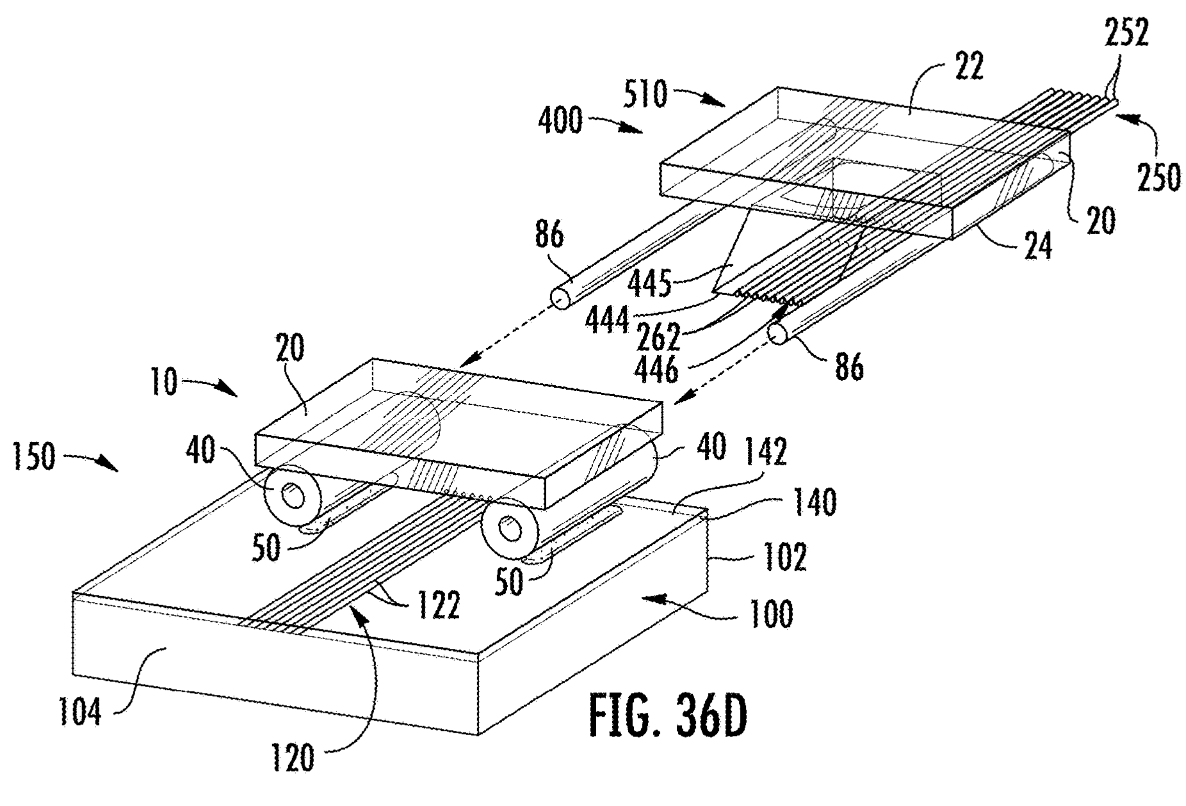
FIG. 36D is similar to FIG. 36C except that the guide pins of the fiber connector are attached directly to the support substrate.
Figure 36E:
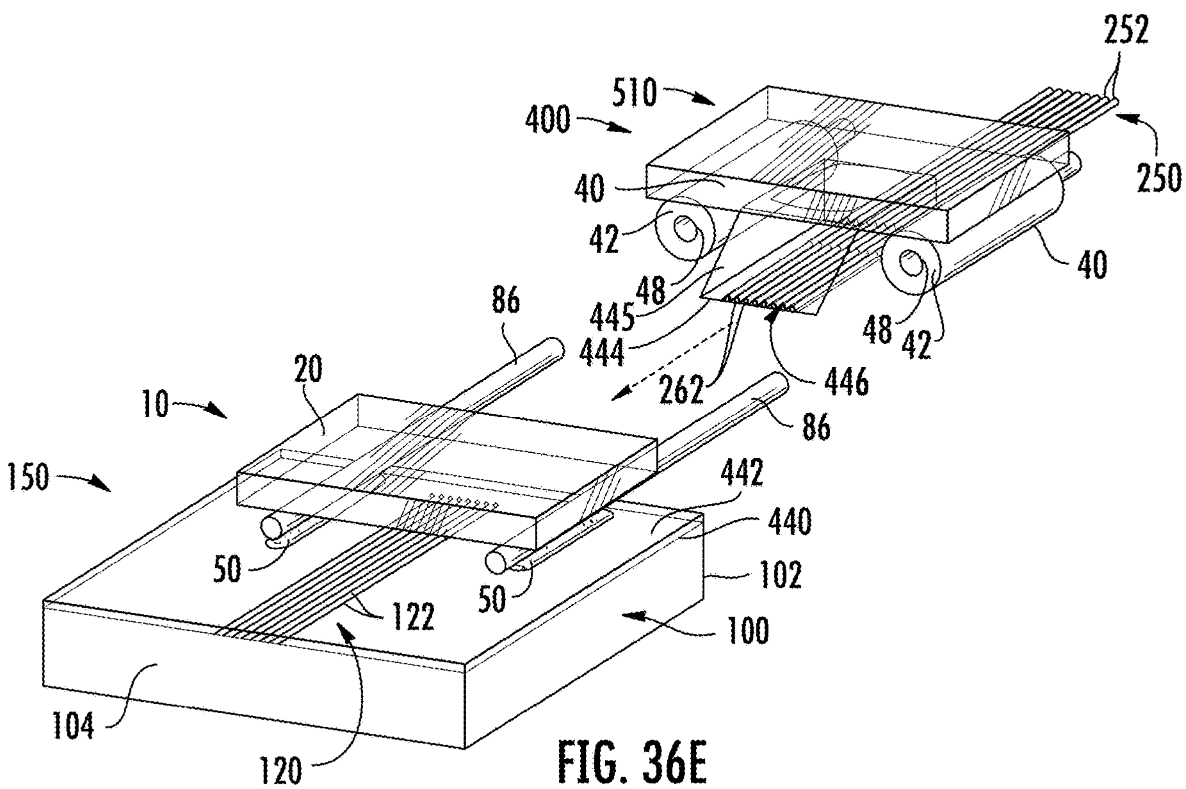
FIG. 36E is similar to FIG. 36D except that the guide pins are supported by the waveguide connector between the ferrule substrate and the PLC without using guide tubes to hold the guide pins.

FIG. 36B shows the waveguide connector ferrule 10 disposed on the PLC 100 with the guide tubes 40 in contact with the securing material 50. At this point, active alignment of the waveguide connector ferrule 10 on the PLC 100 can be carried out at described above prior to permanently fixing the waveguide connector ferrule to the PLC to form the waveguide connector 150. At that point, the fiber connector 400 can then be removed, as shown in FIG. 36C FIG. 36D is similar to FIG. 36C and shows the waveguide connector 150 of FIG. 36C along with an example fiber connector 400 that does not include the guide tubes 40 and wherein the guide pins 86 are secured directly to the support substrate 410. FIG. 36E is similar to FIGS. 36C and 36D and illustrates an embodiment where the waveguide connector 150 does not have guide tubes 40 and has guide pins 86 secured between the silica layer 410 and the substrate 20. The guide pins 86 are configured to engage the bores 48 of the guide tubes 40 of the fiber connector ferrule 510 of the fiber connector 400. In this case, the thickness of the V-groove cover 440 would be selected to be less than the guide pin diameter.

Figure 37A:
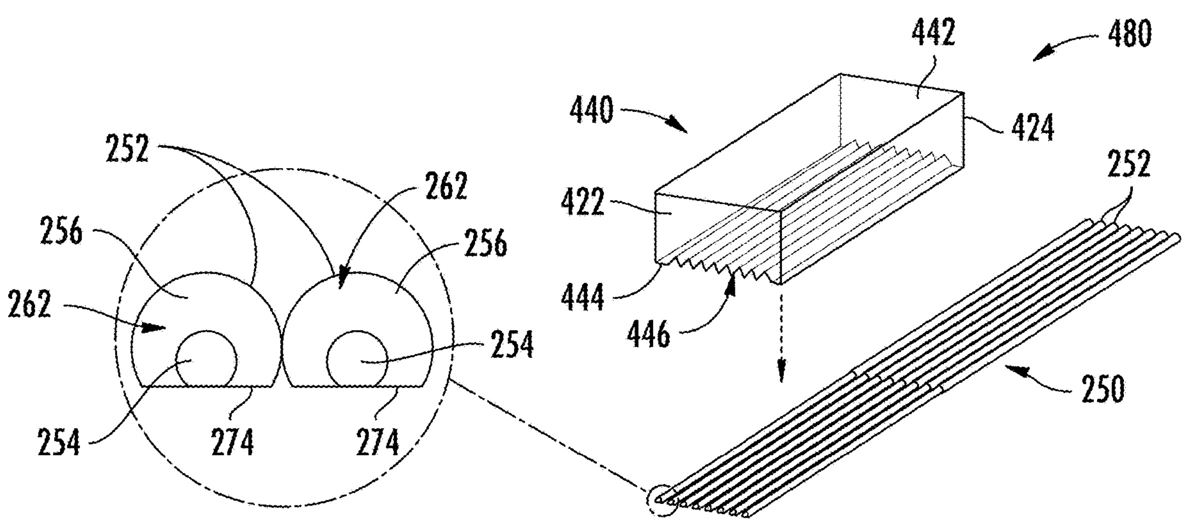
FIGS. 37A and 37B are similar to FIGS. 33A and 33B and show the V-groove cover residing above an example array of optical fibers to form an example V-groove assembly, where the optical fibers have an underside where the cores of the optical fibers are exposed.
Figure 37B:
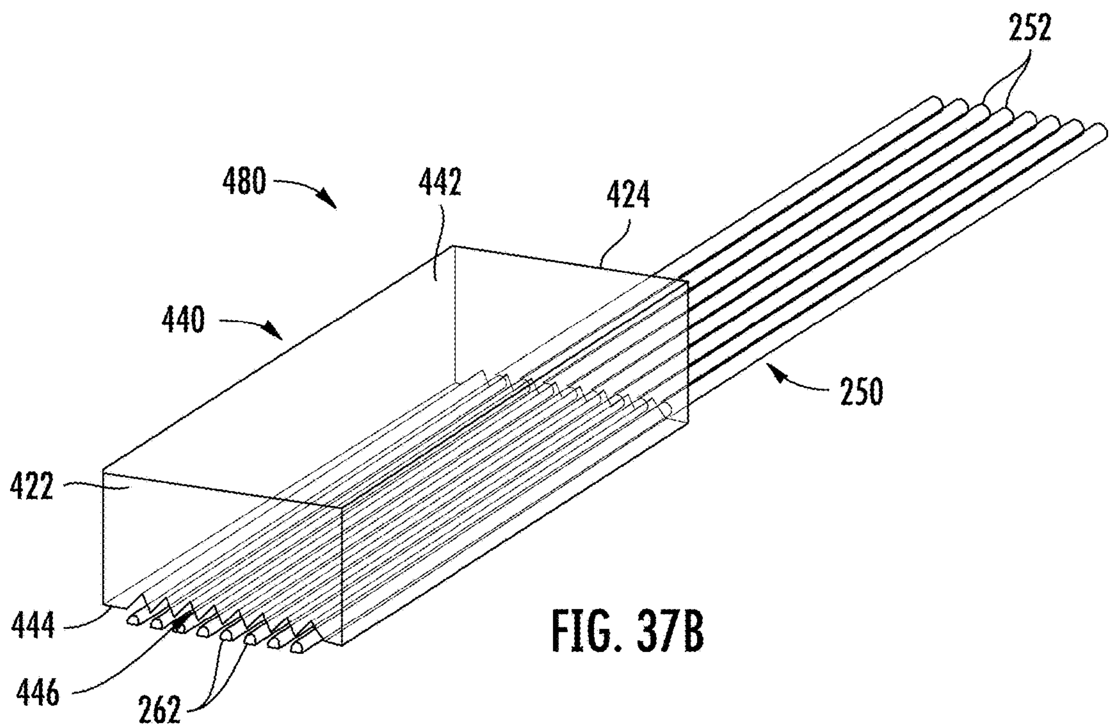

FIGS. 37A and 37B are similar to FIGS. 33A and 33B and show the V-groove cover 440 residing above an example array 250 of optical fibers 252 to form an example V-groove assembly 480. In this embodiment of the V-groove assembly 480, the bare glass portion 260 of each optical fiber 252 is further processed (e.g., via polishing) to expose a portion of the core on the underside of the optical fiber, i.e., opposite the V-groove cover 440. In an example shown in the close-up inset of FIG. 37A, each optical fiber 252 is either formed directly (e.g., via a fiber drawing process) or is polished (e.g., laser polished) so that the optical fiber has a flat underside 274 where a portion of the core 254 is exposed through the cladding 256.

Figure 38A:
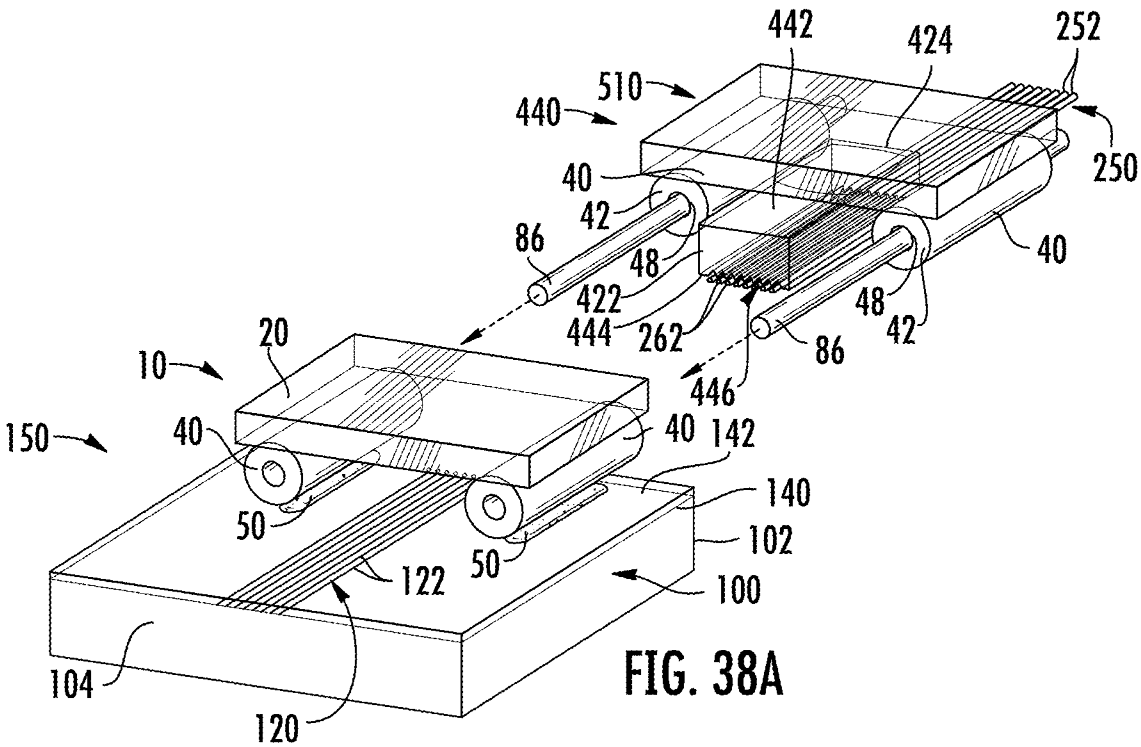
FIG. 38A is similar to FIG. 36C and shows an example fiber connector that includes the V-groove assembly of FIG. 37B combined with a fiber connector ferrule and also shows an example waveguide connector.
Figure 38B:
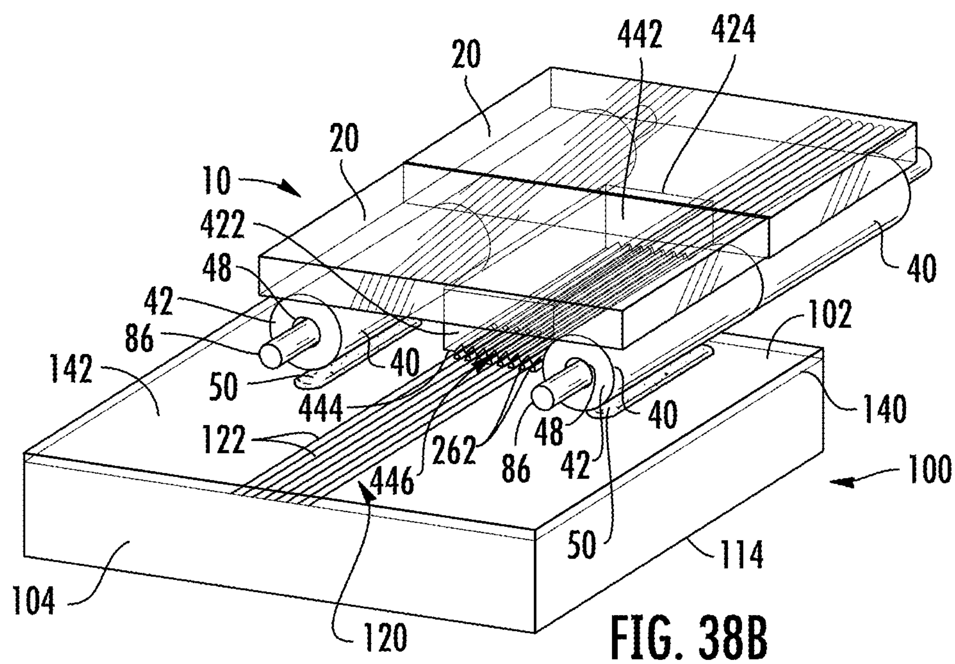
FIG. 38B shows the fiber connector and the waveguide connector of FIG. 38A operably engaged to form an example integrated photonic device.

FIG. 38A is similar to FIG. 36C and shows an example fiber connector 400 that includes the V-groove assembly 480 of FIG. 37B combined with a fiber connector ferrule 510. FIG. 38A also shows an example waveguide connector 150. FIG. 38B shows the fiber connector 400 and the waveguide connector 150 operably engaged to form an example integrated photonic device 550.

Figure 39A:
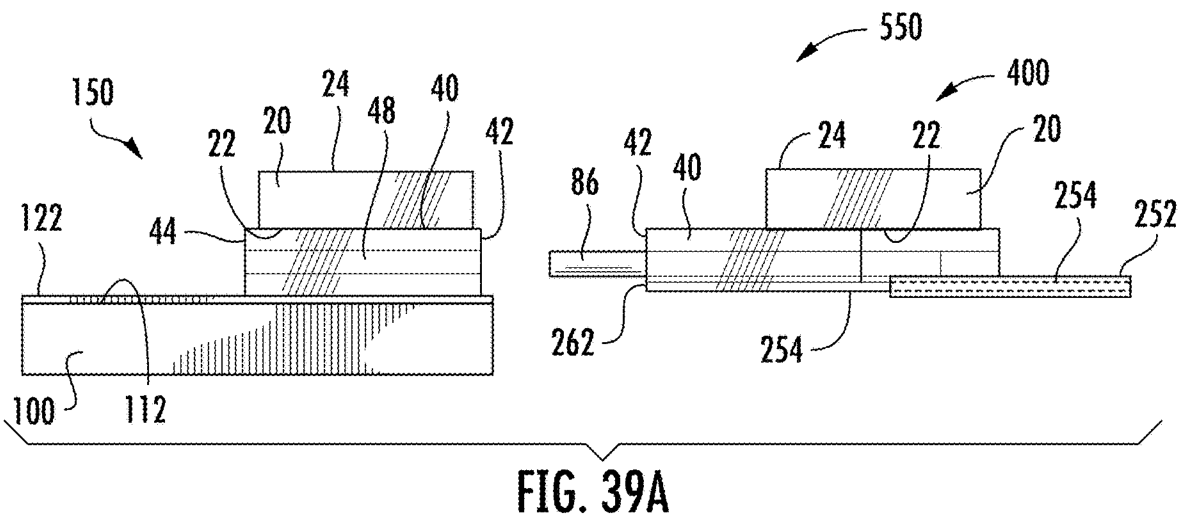
FIGS. 39A and 39B are cross-sectional views of the fiber connector and waveguide connector of FIGS. 38A and the resulting integrated photonic device 550 of FIG. 38B.
Figure 39B:
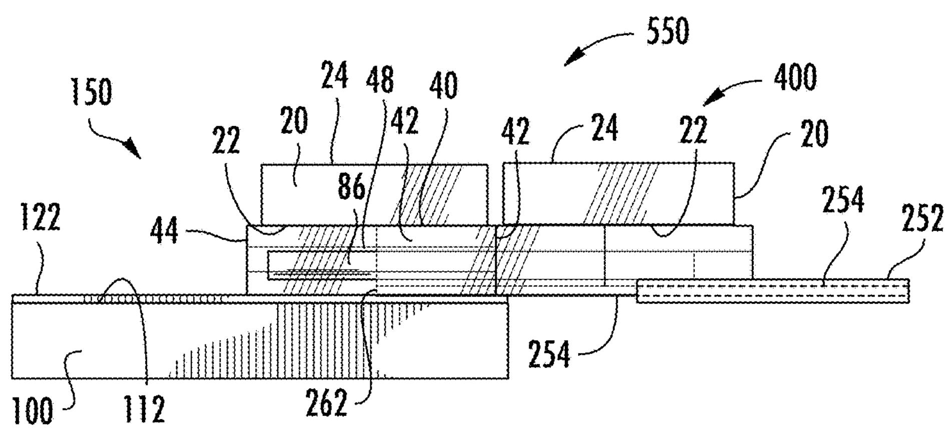

FIGS. 39A and 39B are cross-sectional views of the fiber connector 400 and waveguide connector 140 of FIGS. 38A and the resulting integrated photonic device 550 of FIG.

Figure 39C:
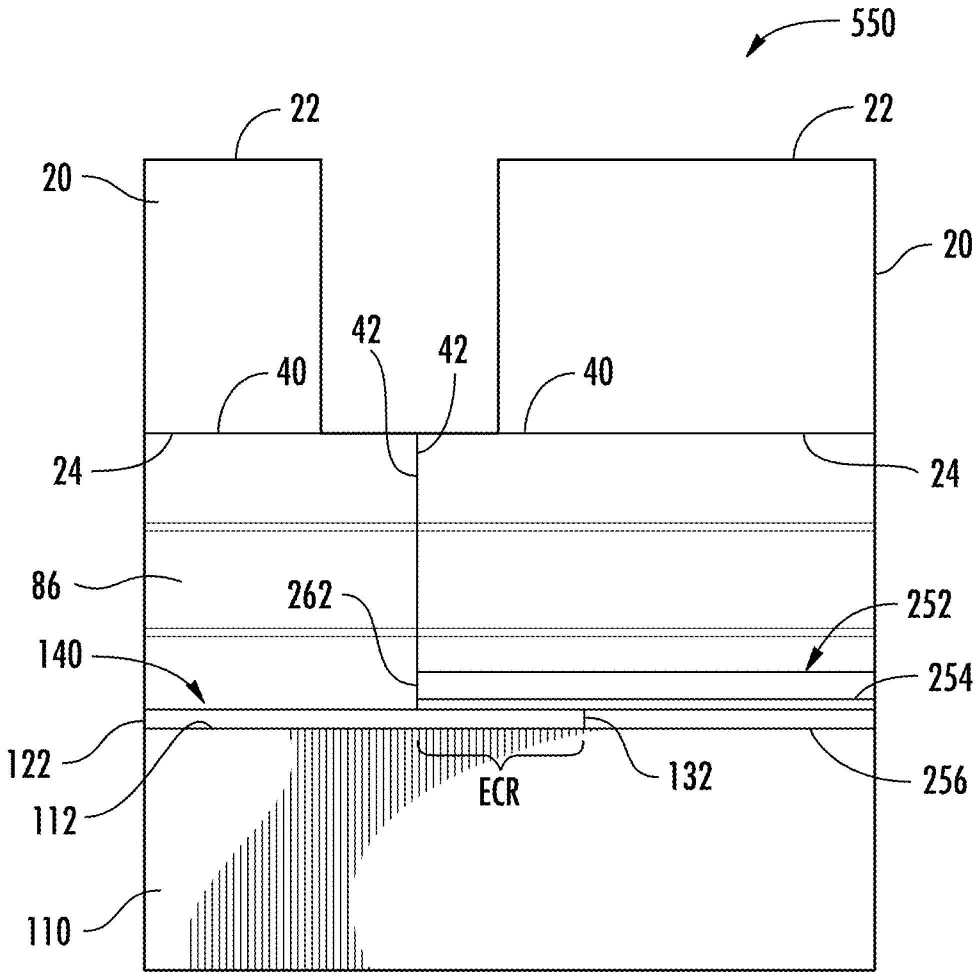
FIG. 39C is a close-up view of the interface between the mated fiber connector and the waveguide connector of FIGS. 39B showing the evanescent coupling region.

38B. FIG. 39C is a close-up view of the interface between the mated fiber connector 400 and the waveguide connector 150. When the fiber connector 400 and the waveguide connector 150 are matingly engaged as shown in FIGS. 39B and 39C, the flat undersides 272 of the optical fiber 252 overlap and are in contact with the top surfaces 126 of the waveguides 122 adjacent the front ends 130 of the waveguides. This overlap defines an evanescent coupling region ECR where light can evanescently couple between the optical fibers and the waveguides. The size (length) of the evanescent coupling region ECR can be adjusted to ensure maximum optical coupling efficiency.

Figure 40A:
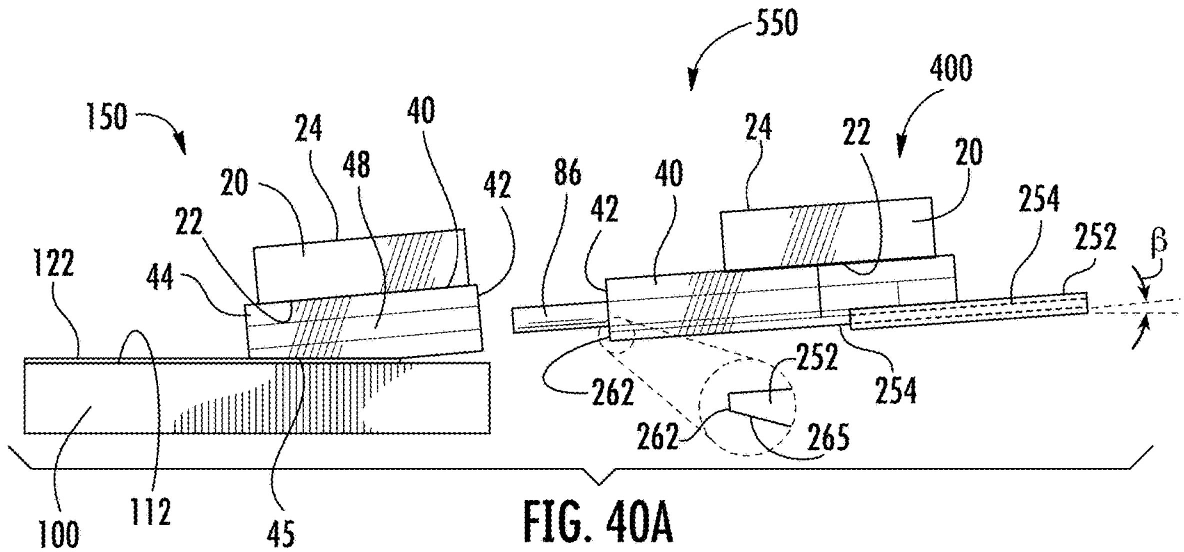
FIGS. 40A and 40B are cross-sectional views similar to FIGS. 39A and 39B and illustrate an example embodiment where fiber connector and the waveguide connector mate an angle relative to the z-direction.
Figure 40B:
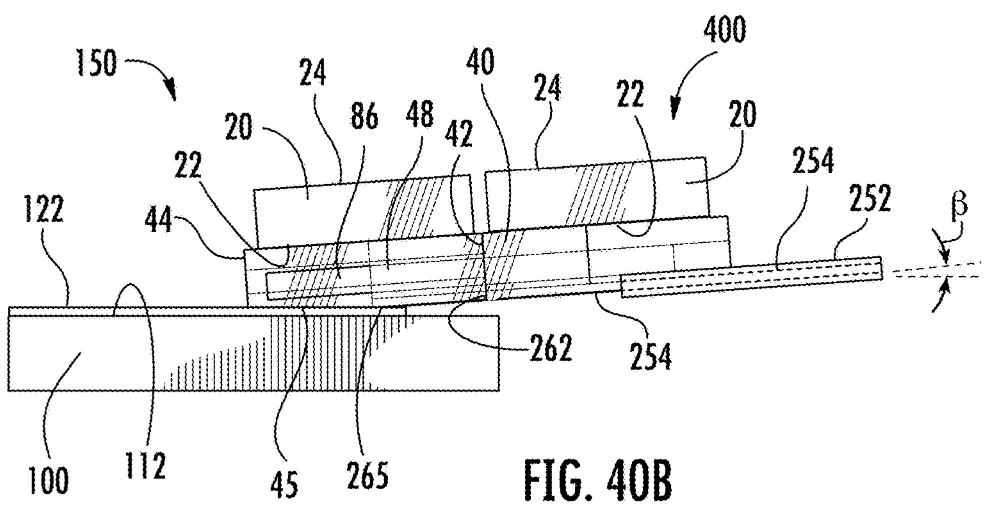
Figure 40C:
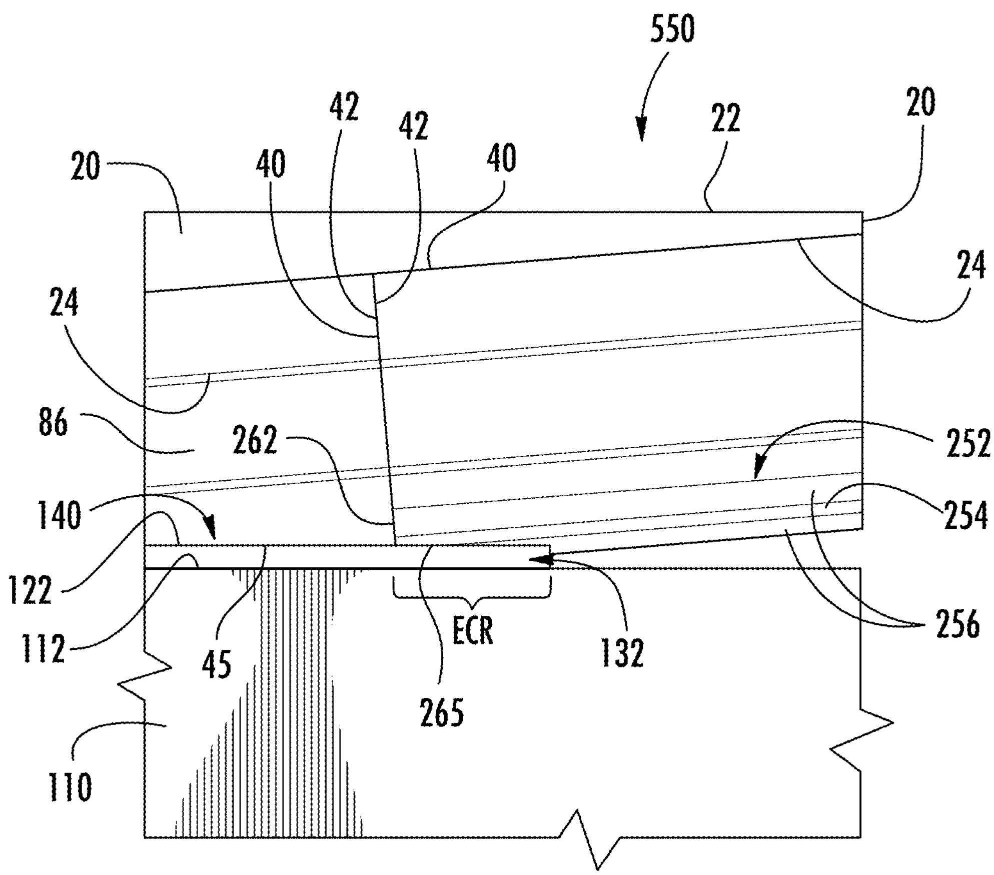
FIG. 40C is a close-up view of the interface between the mated fiber connector and the waveguide connector of FIGS. 40A and 40B showing the evanescent coupling region.

FIGS. 40A and 40B are cross-sectional views similar to FIGS. 39A and 39B and illustrate an example embodiment where fiber connector 400 and the waveguide connector 150 mate a mating angle β as measured in the y-z plane (i.e., in a plane transverse to the top surface 112 of the PLC 100). Such a configuration can be used to avoid mechanical interference when mating the fiber connector 400 and the waveguide connector 150. The angled mating configuration can be accomplished in one example by providing the guide tubes 40 of the waveguide connector ferrule 10 with an angled flat section 45. Also, each optical fiber 252 is provided with an angled flat section 265 that matches the angle of the guide tube flat section 45, which corresponds to the mating angle β. This allows for the optical fibers 252 to reside flat upon the top surfaces 126 of the waveguides 122 of the PLC 100 to define the evanescent coupling region ECR, as best seen in the close-up view of FIG. 40C.

Figure 41A:
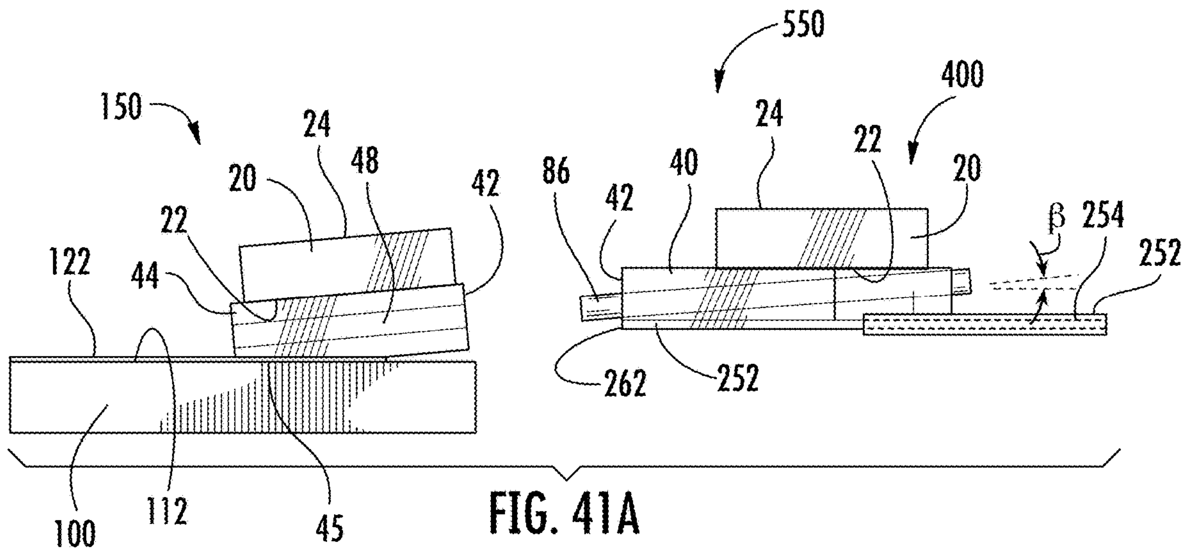
FIGS. 41A and 41B are similar to FIGS. 40A and 40B and illustrate in example where the waveguide connector has guide tubes with angled flat sections as in FIGS. 40A and 40B, but wherein the fiber connector has angled guide pins so that the fiber connector itself is not angled when connecting to the waveguide connector.
Figure 41B:
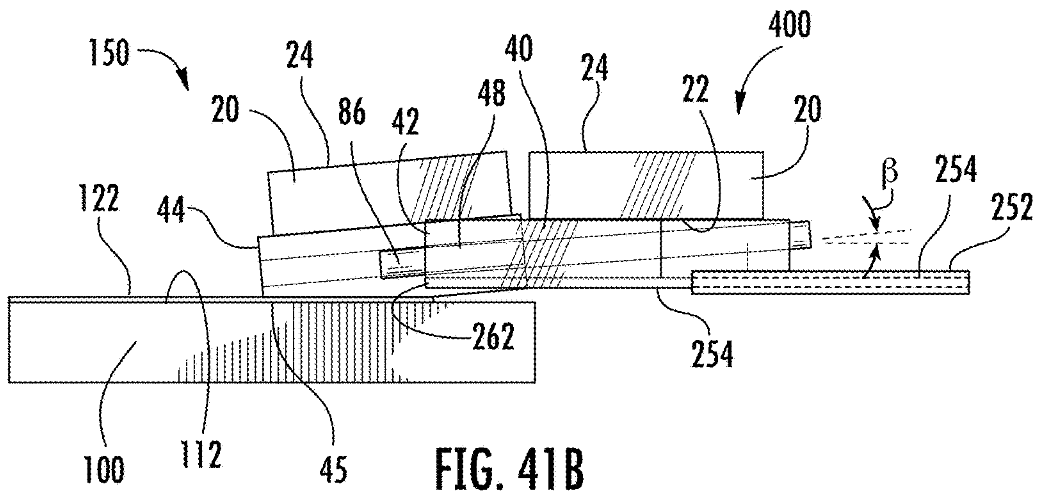

FIGS. 41A and 41B are similar to FIGS. 40A and 40B and illustrate in example where the waveguide connector 150 has guide tubes 40 with angled flat sections 45 as in FIGS. 40A and 40B, but wherein the fiber connector 400 has angled guide pins 86 so that the fiber connector itself is not angled when connecting to the waveguide connector 150. This allows for the array 250 of optical fibers 252 to remain parallel to the top surface 142 of the PLC 100. This obviates the need for the optical fibers 252 to have angled flat sections 265 and allows for the evanescent coupling region ECR to be non-angled, such as shown in FIG. 39C. In an example, the angled guide pins 86 are defined by having angled bores 48 in the guide tubes 40 of the fiber connector ferrule 510 of the fiber connector 400. In an alternate embodiment, the guide tubes 40 of the fiber connector ferrule 510 can be angled by having matching flat tube sections 45 as that for the guide tubes of the waveguide connector ferrule 10.

Guide Tube Fabrication Process

Figure 42A:
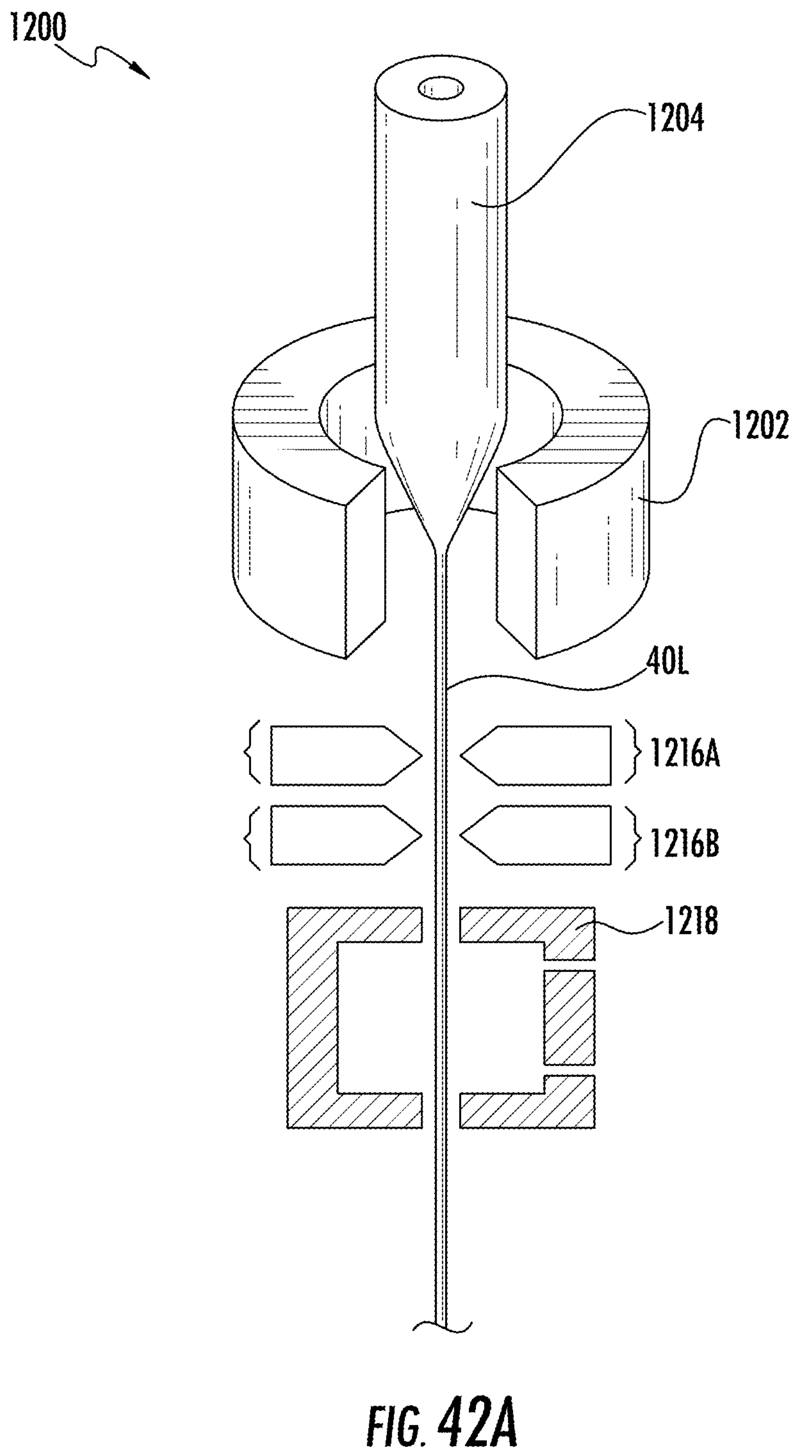
FIGS. 42A and 42B are schematic diagrams of example drawing systems used to form the guide tubes using a drawing process.
Figure 42B:
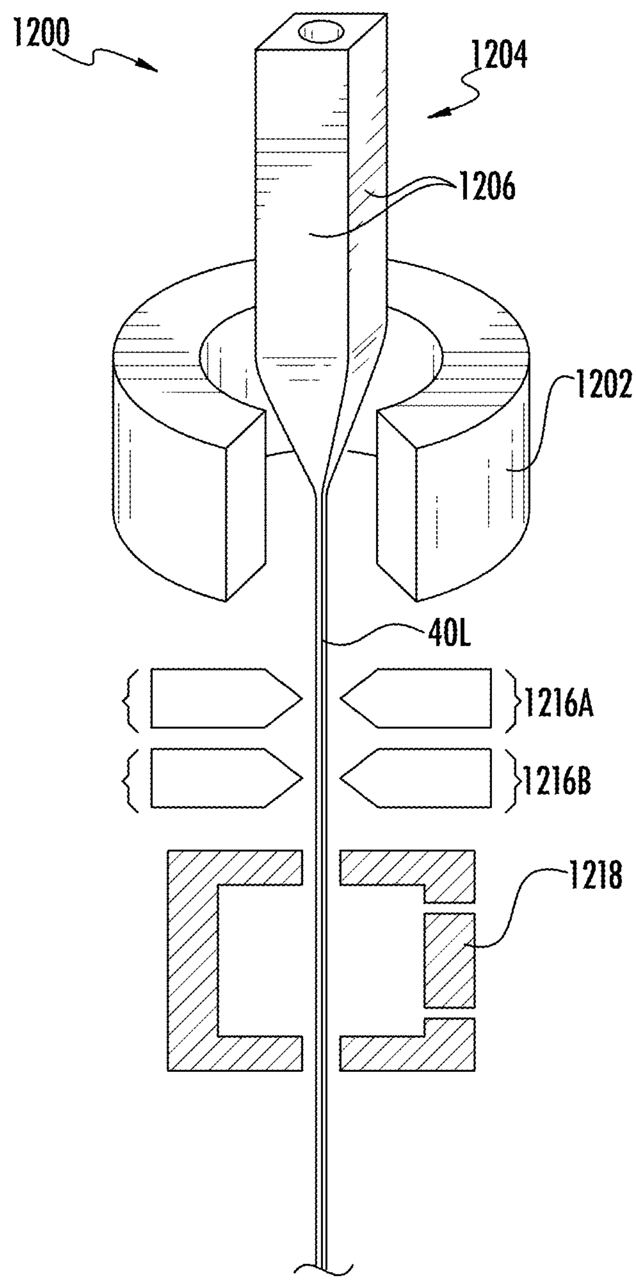

The guide tubes 40 disclosed herein can be fabricated using a drawing process. FIGS. 42A and 42B are schematic diagrams of an example drawing system 1200 for producing the guide tubes 40 as employed herein. The drawing system 1200 may comprise a draw furnace 1202 for heating a glass preform 1204. The glass preform 1204 has generally the same relative shape as the guide tube 40 but is much larger, e.g., 25× to 100× larger. Thus, in an example glass preform 1204 can have a circular cross-sectional shape as shown in FIG. 33A or can have at least one flat side 1206, e.g., for flat sides, as shown in FIG. 33B. The glass preform 1204 can be made using a large, uniform piece of glass. An example of such a glass is a borosilicate glass. Another type of glass is fused quartz. Other types of glasses can also be effectively employed.

The large piece of glass can be machined to have the desired shape, e.g., a square cross-sectional shape. In addition, the large piece of glass can be drilled to form a central bore having a diameter that is properly centered and proportioned to give the resulting glass preform 1204 the correct ratio of the bore diameter to outer diameter. In an example, at least a portion of the glass preform 1204 can be polished (e.g., laser polished), e.g., the at least one flat side 1206 can be polished. The configuration of the glass preform 1204 and the various drawing parameters (draw speed, temperature, tension, cooling rate, etc.) dictate the final form of the guide tube 40.

In the fabrication process, the drawn glass preform 1204 exits the draw furnace 1202 and has the general form of the guide tube 40 but is one long continuous guide tube 40L. After the long guide tube 40L exits the draw furnace 1202, its dimensions can be measured using non-contact sensors 1216A and 1216B. Tension may be applied to the long guide tube 40T by any suitable tension-applying mechanism known in the art.

After the dimensions of the long guide tube 40L are measured, the long guide tube may be passed through a cooling mechanism 1218 that provides slow cooling of the guide tube. In one embodiment, the cooling mechanism 1218 is filled with a gas that facilitates cooling of the guide tube at a rate slower than cooling the guide tube in air at ambient temperatures.

Once the long guide tube 40L exits the cooling mechanism 1218, it can be cut into select lengths called “canes” that are relatively long (tens of millimeters to 1.5 m) and then cut again into the smaller lengths to define the individual guide tubes 40.

In an example, the guide tubes 40 can be fabricated by performing a first draw process using glass preform 1204 to form an intermediate-sized glass preform, and then re-drawing the intermediate-sized glass preform using a second draw process to form the guide tubes 40. The glass-tube-forming process defines the guide tube 40 with the bore 48 well-positioned therein, e.g., with the tube central axis ATZ and the bore central axis ABZ positioned relative to one another (e.g., coaxial) to within 0.5 microns, and preferably to within 0.1 microns.

Glass Guide Pins

As mentioned above, in an example, guide pins 86 can be formed from a variety of materials including glass. The use of glass guide pins has a number of advantages, which include low material cost, the ability to form all-glass ferrules to take advantage of the low CTE of glass, and the availability of glass drawing systems and methods for forming optical fibers and thin glass rods such as those described immediately above. The relatively high precision of glass drawing processes is advantageous since the ferrules and connectors disclosed herein are benefit from the use of high-precision parts when performing kinematic assembly to form highly aligned ferrules, connectors and integrated photonic devices. In addition, while metal guide pins are convenient they can also scratch the glass components of the ferrules and connectors disclosed herein.

FIGS. 43A through 43F are side views of example glass guide pins 1086. The guide pins have a central axis APZ that runs in the z-direction, a front end 1092 at a front-end section 1093, a back end 1094 at a back-end section 1095, and an outer surface 1096. The glass guide pin 1086 has a length LP and a cross-sectional diameter DP. In an example, the diameter DP of the glass guide pin 1086 is a maximum diameter (e.g., in the case where the guide pin is tapered) and further in an example can be in the range from 300 um≤DP≤700 um. In another example, the length LP of the glass guide pin 1086 is in the range from 2 mm≤LP≤10 mm.

Figure 43A:
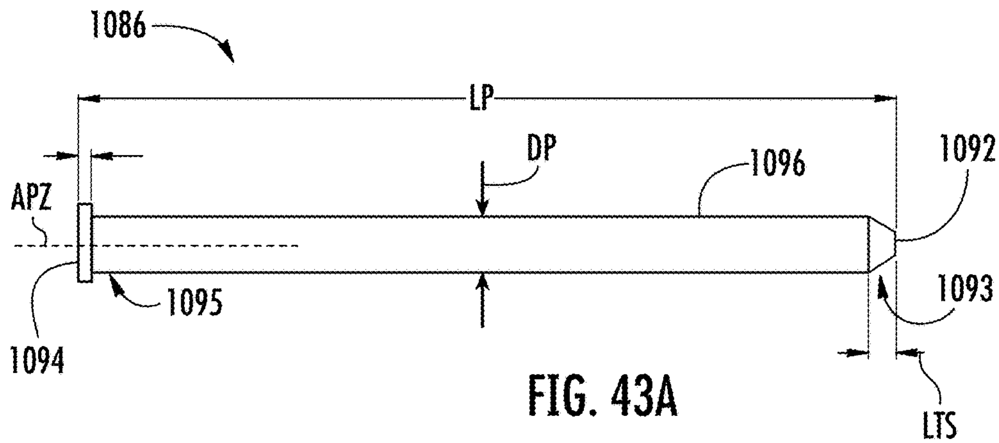
FIGS. 43A through 43G are side views of example glass guide pins.

FIG. 43A shows an example glass guide pin 1086 that has a tapered front-end section 1093 and a flat back end 1094. The profile of the tapered front-end section 1093 can be for example circular, conical or elliptical. In an example, the tapered front-end section 1093 has a length LTS that is in the range DP≤LTS≤2DP.

Figure 43B:
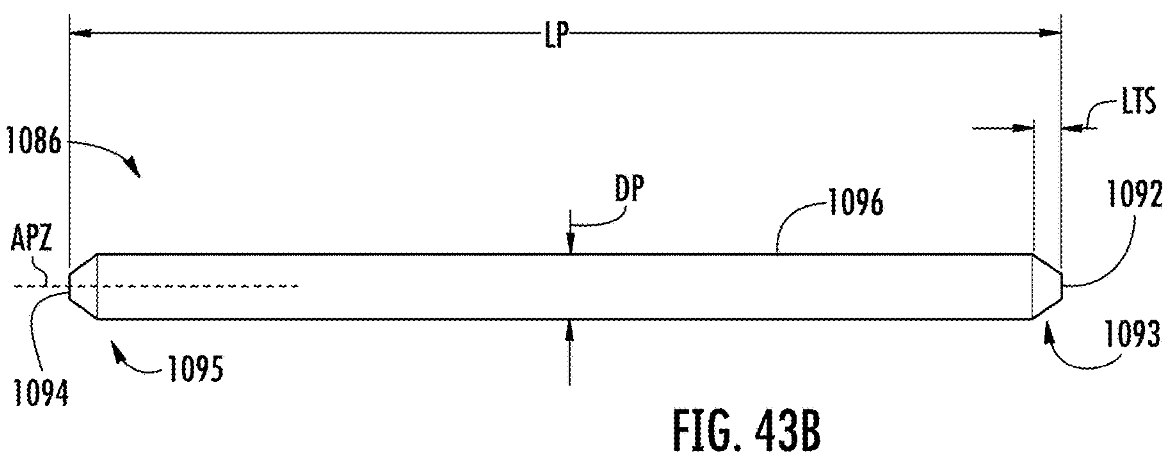
Figure 43C:
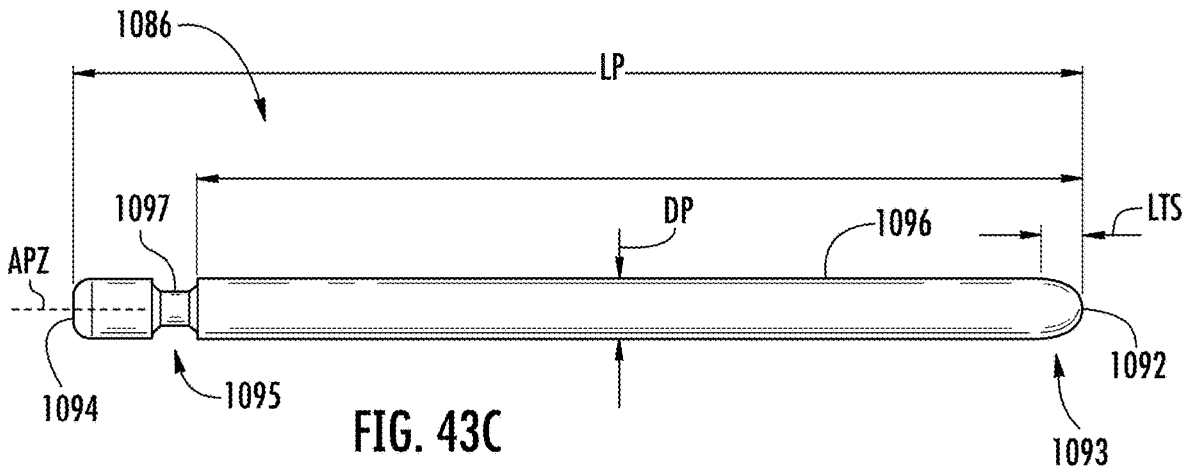
Figure 43D:
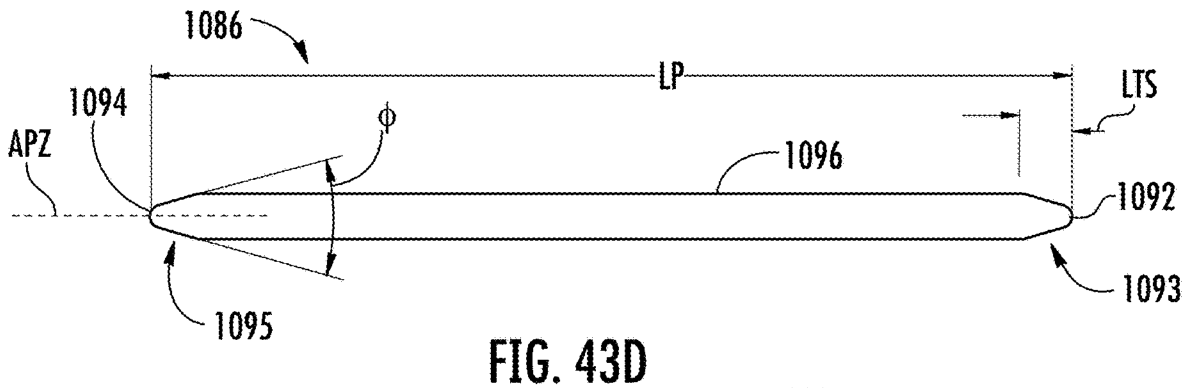

FIG. 43B shows an example glass guide pin 1086 that has a linear taper in both the front-end section 1093 and the back-end section 1095 so that the pin is symmetrical. FIG. 42C shows an example glass guide pin 1086 that includes a front-end section 1093 with an elliptical taper and a back-end section 1095 that includes a ring-shaped indent 1097 in the outer surface 1096 proximate to but spaced apart from the back end 1094. FIG. 43D is similar to FIG. 43B and shows an example taper that includes a linear section and a rounded tip section, wherein the linear section defines a tip angle ϕ, which in the example shown is 30 degrees.

Figure 43E:
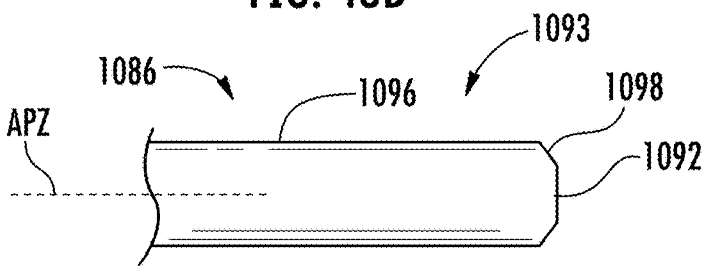
Figure 43F:
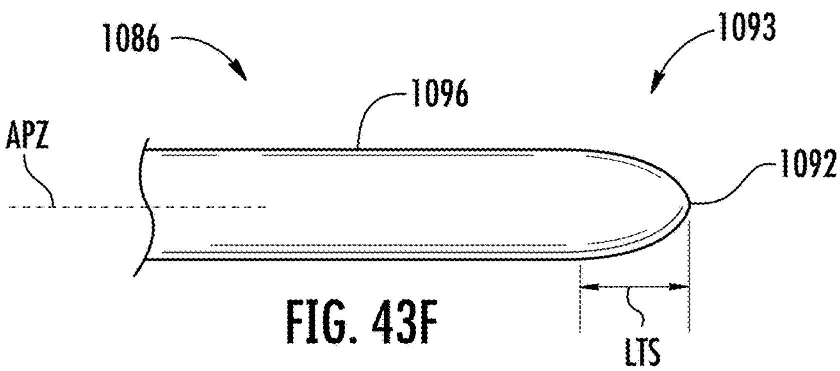

FIG. 43E shows the front-end section 1093 of an example glass guide pin 1086 wherein the front end 1092 includes a chamfer 1098. FIG. 43F shows an example glass guide pin 1086 wherein the front-end section 1093 is tapered with an elliptical end profile.

In an example, the glass guide pins 1086 are made of a chemically strengthened glass. In an example, the chemically strengthened glass is an ion-exchanged glass. In another example, the glass guide pins 1086 are made of more than one type of glass. Also in an example, the glass guide pins 1086 can include a non-glass outer coating, such as a polymer coating.

Figure 43G:
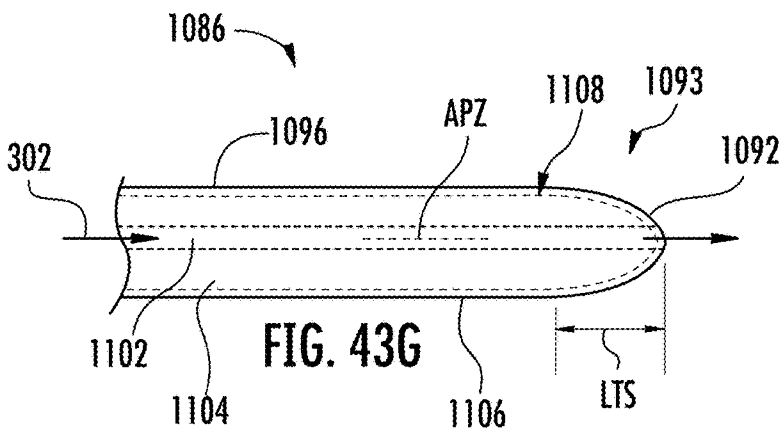

In an example illustrated in FIG. 43G, the glass guide pin 1086 comprises a core 1102 surrounded by a cladding 1104, which in an example can further be surrounded by a non-glass protective layer 1106. The core 1102 and the cladding 1104 define an optical waveguide 1108, which can be configured to support a single guided mode at an IR, visible or UV wavelength. The optical waveguide 1108 of the glass guide pin 1086 can be used to facilitate alignment of the guide pins on one of the waveguide connector 140 and the fiber connector 400 with the bores 48 of the guide tubes of the ferrule 10 or 510 on the other connector. In an example, light 302 directed through the core 1102 can be detected via digital imaging or fiber coupling techniques as it exits the front end 1092 of the guide pin. These same techniques could be used to accurately determine the location of the optical fibers 252 of the fiber connector 400, providing confirmation that the glass guide pins are located in the correct location after assembly. The glass guide pin 1086 with a single mode core 1102 at its center could also be used to characterize physical characteristics of the glass guide pin as well as the glass guide tubes 40 with which the glass guide pins engage. Such properties include the shape, concentricity, ovality, etc.

Guide Tube Modifications for Avoiding Damage

The guide tubes 40 used to form ferrules 10 are susceptible to breakage when mating a waveguide connector 150 to a fiber connector 400. This is particularly true when the guide tubes 40 have front ends 42 with sharp edges, e.g., when the front-end surface 42S is planar and defines edges at the outer surface 46 and the inner surface 49 at the bore 48. The above-described profiling of the glass guide pins 1086 is one approach to mitigating ferrule damage when a waveguide connector 150 to a fiber connector 400. Another approach is to provide the front end 42 of the guide tubes 40 of the receiving ferrule with an angle, such as described above in connection with FIGS. 15C and 15D.

Figure 44A:
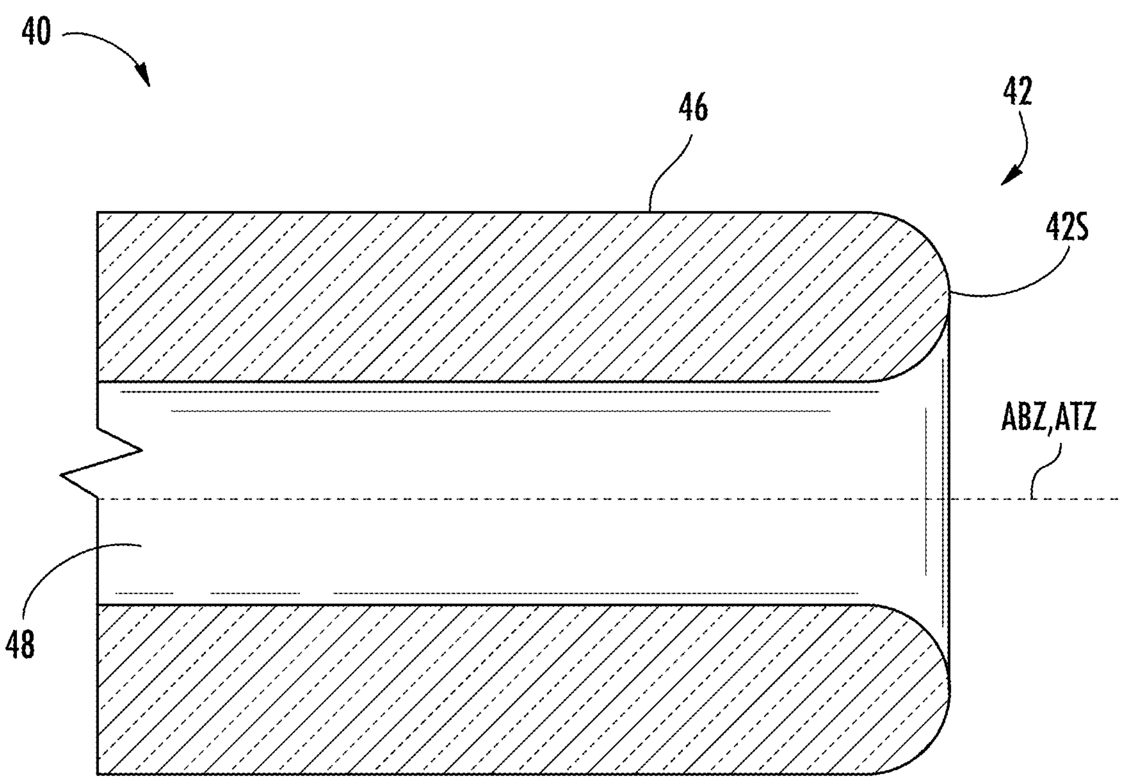
FIG. 44A is a close-up cross-sectional view of the front-end portion of an example guide tube showing an example where the front-end surface of the guide tube is rounded or tapered at the outer surface and the inner surface rather than having a square profile.

In another example, the profile of the front end 42 of the guide tube 40 is modified. FIG. 44A is a close-up cross-sectional view of the front-end portion of an example guide tube 40 showing an example where the front-end surface 42S of the guide tube is rounded or tapered rather than having a squared-off cross-sectional profile. Such a tapered configuration for the front end 42 of the guide tube 40 acts to guide the guide pin 86 (e.g., glass guide pin 1086) into the bore 48 without encountering any sharp edges. This process is facilitated when the front end of the guide pin 86 or 1086 is also tapered as discussed above. The tapered front end 42 acts to enlarge the front end of the bore 48 (i.e., defines a flared front-end portion of the bore), thereby making it easier to insert a guide pin. Such a profile for the guide tube 40 can be obtained using an etching process (e.g., HF etching) and/or polishing (e.g., flame polishing or laser polishing). The etching and polishing processes can include masking (e.g., wax-based masking) to limit the processing effects to the front end 42 of the guide tube 40.

Figure 44B:
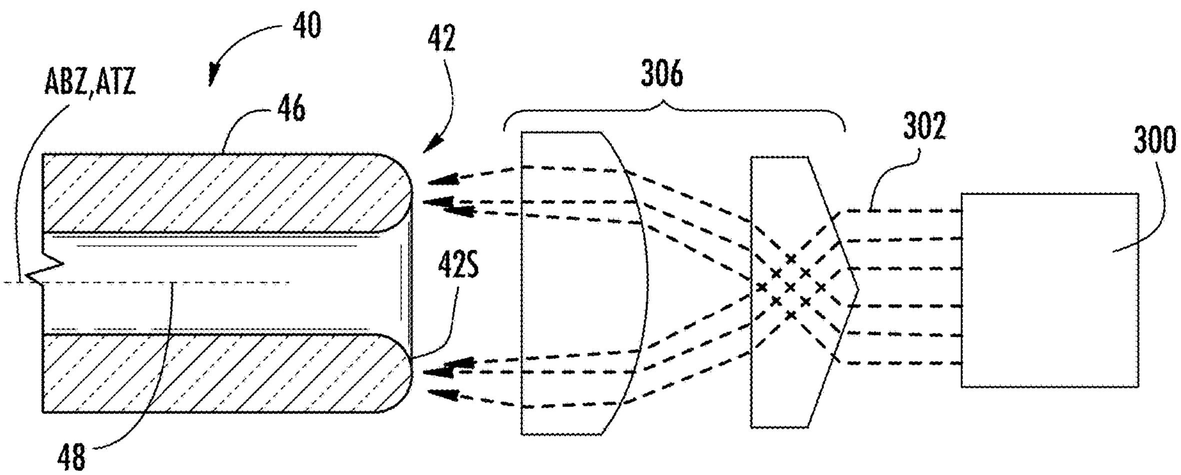
FIG. 44B shows an example of how a laser and an optical system can be used to laser process the front end of a guide tube with an annular beam of light.

FIG. 44B shows an example of how a laser 300 can be used to emit laser light 302 (e.g., infrared light) that is processed by an optical system 306 to define an annulus of light that heats the front end 42 of the guide tube without sending substantial amounts of light down the bore. In an example, the light is focused at or otherwise directed to one or two points at the front-end surface 42S of the guide tube 40 and the guide tube is rotated about the tube axis ATZ.

Figure 44C:
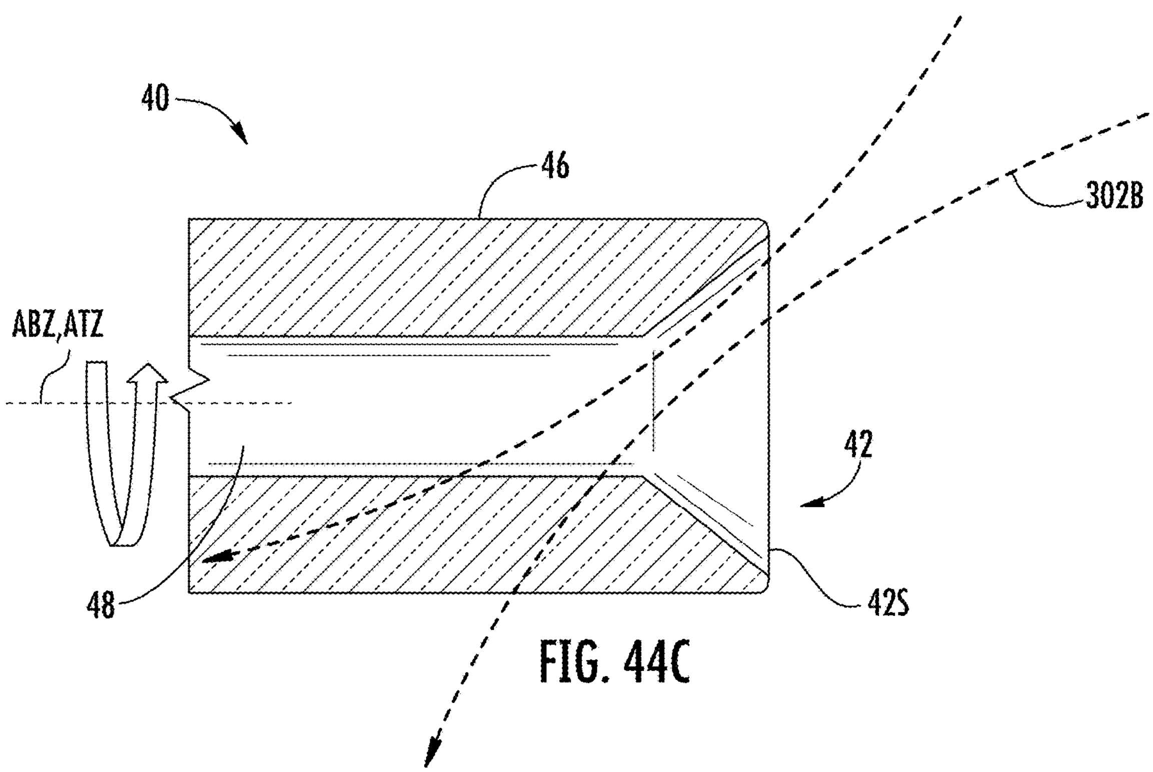
FIG. 44C shows an example configuration where the guide tube is rotated relative to a focused laser beam that ablates a portion of the front end of the guide tube to create a desired taper of the guide tube.

FIG. 44C shows an example configuration where the guide tube 40 is rotated about the tube axis ATZ relative to a focused laser beam 302B that ablates a portion of the front end 42 to create a desired taper at the front end.

Figure 44D:
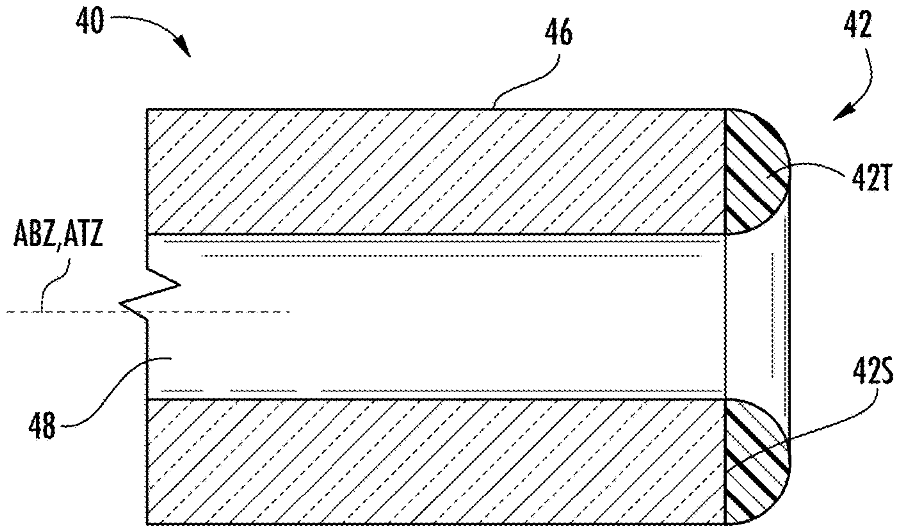
FIG. 44D is a close-up cross-sectional view of the front-end portion of the guide tube 40 similar to FIG. 44A and illustrating an example where a taper feature is added to the front end as a separate component.

FIG. 44D is a close-up cross-sectional view of the front-end portion of the guide tube 40 similar to FIG. 44A illustrating an example where a taper feature 42T is added to the front end 42 to modify the front-end surface 42S. The taper feature 42T can be formed by dip coating, a selective deposition process or a molding process. In an example, the taper feature 42T need not be glass, e.g., can be a hard material such as plastic or an elastomeric material.

Figure 44E:
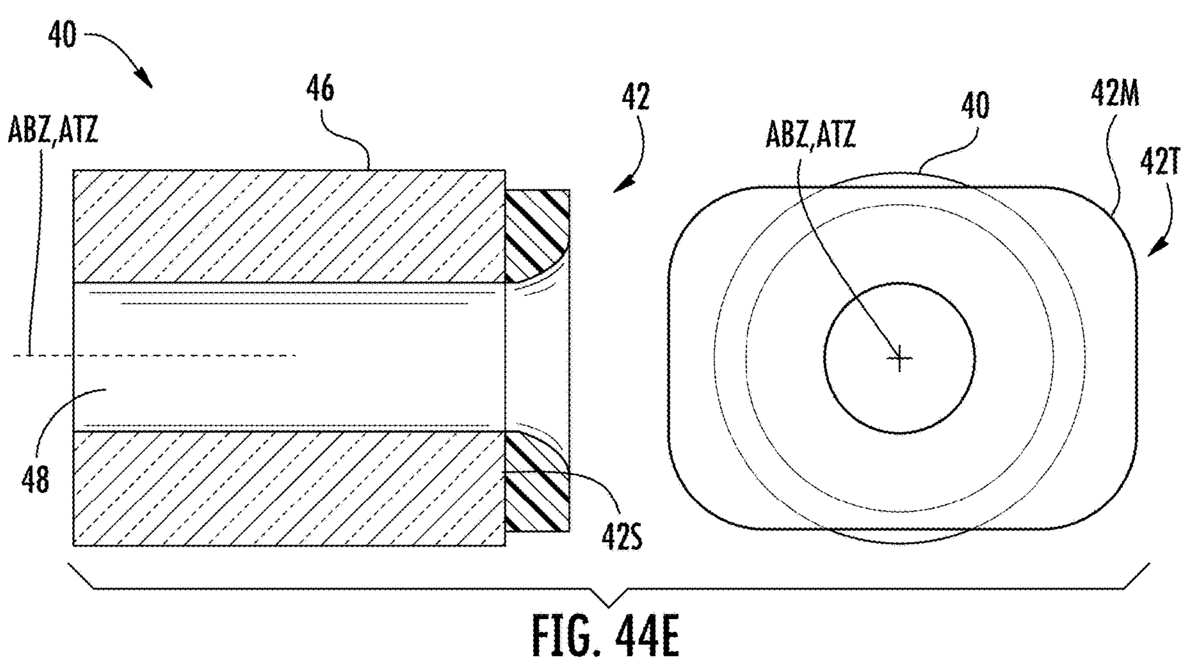
FIG. 44E is similar to FIG. 44D and illustrates an embodiment where the taper feature comprises a molded part that fits on or over the front end of the guide tube.

FIG. 44E is similar to FIG. 44D and illustrates an embodiment where the taper feature 42T comprises a molded part 42M that fits on or over the front end 42 of the guide tube. In an example, the molded part can be made of plastic, polymer, etc. The taper feature 42T can also be integrated into a molded plastic connector housing 870 that is designed to self-align to the front end 42 of the guide tube 40 when the guide tube is inserted into the connector housing.

In an example, the guide tube 40 can be made of chemically strengthened glass to avoid damage such as scratches, digs, cracks, etc. during handling, assembly, and when used as a ferrule in the connectors disclosed herein. In an example, the chemical strengthening of the glass guide tubes 40 comprises ion exchange chemical strengthening. In an example, the guide tubes 40 are made of a glass that contains Na since such glass can have higher CTE than fused silica for a better match to Si-based chips and substrates. In an example, the guide tubes 40 are made of a glass that can undergo ion exchange using Ag or K. The guide tube 40 can also be fabricated using a glass that is well-suited for chemical strengthening.

In another example, the guide tubes 40 can be subjected to glass tempering via thermal annealing wherein the guide tubes are heated above their annealing point and then quenched rapidly so that the skin (outer surface 46) freezes in a compressed state relative to the rest of the guide tube.

In another example, guide tubes 40 can be made of more than one dissimilar glasses. For example, guide tubes 40 can be made with multiple glasses using double or triple crucible melting, so that the inside and outside glass layers are placed in compression on cooling. Laser heat treatments and/or melting can be employed at the front and back ends 42 and 44 of the guide tubes 40 to manage residual high stresses at dissimilar glass interfaces.

Figure 44F:
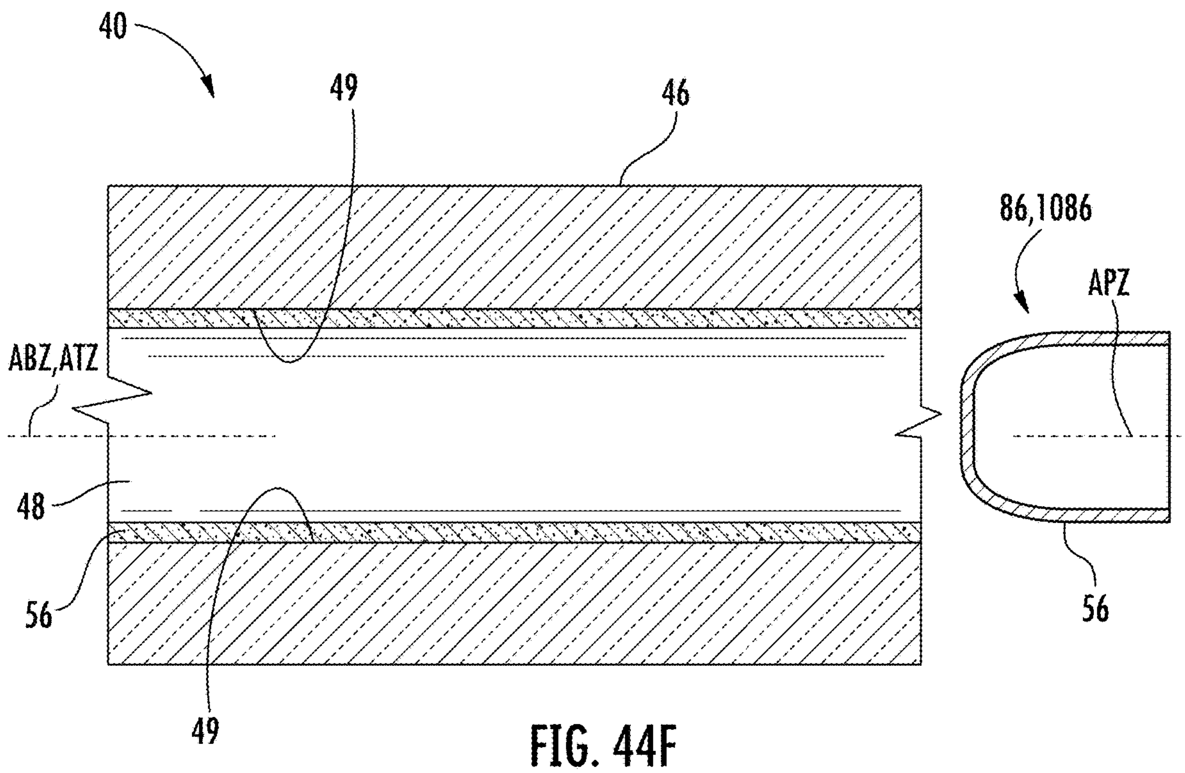
FIG. 44F is similar to FIG. 44A and shows a lubrication layer on the inner surface of the bore of the guide tube and optionally on the outer surface of the guide pin to provide lubrication between the guide pin and the guide tube.

In another example illustrated in FIG. 44F, a lubrication layer 56 can be applied on the inner surface 49 of the guide tube and/or on the outer surface of the front-end portions of the guide pins 86 (or 1086) to provide a lubrication that reduces glass cracking. In an example, the lubrication layer 56 is an organic material. Examples of organic materials for the lubrication layer 56 include PFPE (Perfluoropolyether) oils and greases, such as PFPE-K, PFPE-Y, PFPE-D, PFPE-M, and PFPE-Z, which can remain stable over a wide temperature range (e.g., −40° C. to 250° C.). In another example, the lubrication layer 56 can include self-assembled monolayers or SAMs, such as Rain-X, Aquapel, Polydimethylsiloxane (PDMS), fluoroalkylsilane (FAS) (e.g., FAS17) and like chemicals that provide a low-friction hydrophobic layer. In another example, the lubrication layer 56 can comprise long chain fatty esters or long chain fatty amide coatings for protecting glass surfaces from damage. Examples include Erucamide and Oleamide. Example of such lubrication layers are disclosed in U.S. Pat. Nos. 8,586,188 and 9,561,897, which are incorporated by reference herein.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A waveguide connector, comprising:

a waveguide connector ferrule comprising:

a glass substrate having a front end, a back end, a first surface, a second surface opposite the first surface, opposite sides, and a central axis that runs through the center of the glass substrate between the front and back ends; and first and second guide tubes each having a tube central axis, a front end, an outer surface and a longitudinal bore with a central bore axis, wherein the first and second guide tubes are secured to either the first surface or the second surface of the glass substrate at their respective outer surfaces, the first and second guide tubes being spaced apart with their respective bore axes running in substantially the same direction as the substrate central axis; and a planar lightwave circuit (PLC) having a top surface, a front end, a back end, and a PLC central axis that runs through the center of the PLC between the front and back ends, the PLC supporting a plurality of waveguides that run substantially in the direction of the PLC central axis, with each waveguide having a top surface and an end face proximate the front end of the PLC, wherein the ferrule is secured to the top surface of the PLC so that the bore axes of the first and second guide tubes of the ferrule run substantially in the same direction as the PLC central axis.

2. The waveguide connector according to claim 1, wherein the end faces of the waveguides reside at the front end of the PLC.

3. The waveguide connector according to claim 1, wherein the PLC comprises a body that comprises silicon and wherein the plurality of waveguides is formed within a silica layer formed on the body.

4. The waveguide connector according to claim 1, wherein the plurality of waveguides reside in a first plane, the bore axes of the first and second guide tubes reside in a second plane offset from the first plane, and wherein the first and second planes are spaced apart by a distance in the range from 150 microns to 1500 microns.

5. The waveguide connector according to claim 1, wherein the waveguide connector ferrule includes first alignment features, and further comprising:

a fiber connector having a plurality of optical fibers with end faces and a fiber connector ferrule that includes second alignment features and configured to operably engage with the waveguide connector ferrule via cooperation of the first and second alignment features, so that the end faces of the waveguides of the PLC are in optical communication with the plurality of optical fibers of the fiber optic connector.

6. The waveguide connector according to claim 5, wherein the first alignment features comprise the bores of the first and second guide tubes of the waveguide connector ferrule and wherein the second alignment features comprise first and second guide pins supported by the fiber connector ferrule and sized to fit within the bores of the first and second guide tubes of the waveguide connector ferrule.

7. The waveguide connector according to claim 6, wherein the first and second guide pins comprise glass.

8. The waveguide connector according to claim 7, further comprising a retention apparatus having first and second cooperating retention components, with the first retention component supported by the waveguide connector and the second retention component supported by the fiber connector.

9. The waveguide connector according to claim 8, wherein one of the first and second retention components comprises a spring-loaded plunger and the other of the first and second retention features comprises a receiving tube having an end and configured to receive an end of the spring-loaded plunger, wherein the end of the spring-loaded plunger can be locked and unlocked at the end of the receiving tube by rotation of the spring-loaded plunger.

10. The waveguide connector according to claim 8, wherein one of the first and second retention components comprises a spring-loaded plunger and the other of the first and second retention features comprises a flexible receiving latch configured to receive an end of the spring-loaded plunger, wherein the end of the spring-loaded plunger can be locked and unlocked from the receiving latch.

11. The waveguide connector according to claim 1, wherein the fiber connector includes a connector housing having a front-end section with a front end, a top and opposite sides that include respective locking guides, and wherein the waveguide connector further comprises:

an attachment fixture having two spaced apart guide arms that define a receiving region sized to accommodate the front-end section so that the guide arms cooperate with the locking guides of the connector housing.

12. The waveguide connector according to claim 11, wherein each of the guide arms includes a flexible prong having a longitudinal slot and a recess, wherein each locking guide comprises a detent configured to engage the recess of the guide arm, and further comprising:

a locking member that is axially movable over the connector housing and that includes opposites sides each having a tongue, wherein the locking member is movable to a lock position where the tongues engage the respective slots to prevent flexing of the flexible prongs thereby securing the detents of the locking guides in the respective recesses of the flexible prongs of the guide arm and moveable to an unlock position where the flexible prongs can be flexed to disengage the recesses and the detents.

13. The waveguide connector according to claim 1, wherein the waveguide connector ferrule includes first alignment features, and further comprising:

a fiber connector comprising a plurality of optical fibers comprising a portion with exposed cores and also having a fiber connector ferrule with second alignment features, wherein the fiber connector ferrule operably engages with the waveguide connector ferrule via cooperation of the first and second alignment features so that a portion of the top surfaces of the waveguides of the PLC are aligned with and in optical communication with the exposed cores of the optical fibers to define respective evanescent coupling regions for evanescent optical coupling between the waveguides and the optical fibers.

14. The waveguide connector according to claim 1, wherein the plurality of waveguides comprises respective first light-redirecting features, and further comprising:

a fiber connector having a plurality of optical fibers having bare-glass portions with second light-redirecting features and also comprising a fiber connector ferrule that operably engages with the waveguide connector ferrule so that the first and second light-redirecting features are in optical communication so that light can couple between the waveguides and the optical fibers.

15. The waveguide connector according to claim 14, wherein the first light-redirecting features comprise gratings.

16. The waveguide connector according to claim 14, wherein the second light-redirecting features comprise angled total-internal-reflection (TIR) surfaces.

17. A fiber connector, comprising:

a fiber connector ferrule comprising:

a glass substrate having a front end, a back end, a first surface, a second surface opposite the first surface, opposite sides, and a central axis that runs through the center of the glass substrate between the front and back ends; and first and second guide tubes each having a tube central axis, a front end, an outer surface and a longitudinal bore with a central bore axis, wherein the first and second guide tubes are secured to either the first surface or the second surface of the glass substrate at their respective outer surfaces, the first and second guide tubes being spaced apart with their respective bore axes running in substantially the same direction as the substrate central axis; and a fiber support substrate having a front end, a back end, opposite first and second surfaces, and a substrate central axis that runs through the center of the fiber support substrate between the front and back ends;

a plurality of optical fibers disposed on the first or second surface of the fiber support substrate and that run substantially in the same direction as the substrate central axis, with each optical fiber having an end face proximate the front end of the fiber support substrate; and wherein the fiber connector ferrule is operably attached to the fiber support substrate so that the bore axes of the first and second guide tubes of the fiber connector ferrule run substantially in the same direction as the support substrate central axis.

18. The fiber connector according to claim 17, wherein the glass substrate of the fiber connector ferrule is disposed in contact with the plurality of optical fibers.

19. The fiber connector according to claim 17, wherein the fiber support substrate, the glass substrate of the fiber connector ferrule and the optical fiber array are secured to each other.

20. The fiber connector according to claim 17, wherein the first and second guide tubes of the fiber connector ferrule are attached to the fiber support substrate on either side of the plurality of optical fibers so that the glass substrate of the fiber connector ferrule resides above and spaced apart from the plurality of optical fibers.

21. The fiber connector according to claim 17, further comprising a cover having V-grooves that engage the plurality of optical fibers.

22. The fiber connector according to claim 17, further comprising first and second guide pins respectively disposed and secured within the first and second bores of the first and second guide tubes.

23. The fiber connector according to claim 22, wherein the first and second guide pins comprise glass.

24. The fiber connector according to claim 17, wherein the fiber support substrate comprises glass.

25. The fiber connector according to claim 17, wherein the plurality of optical fibers reside in a first plane, the bore axes of the first and second guide tubes reside in a second plane offset from the first plane, and wherein the first and second planes are spaced apart by a distance DFP in the range 150 microns≤DFP≤1500 microns.

26. The fiber connector according to claim 17, wherein the plurality of optical fibers defines an optical fiber array having first and second sides, and further comprising first and second retaining members respectively disposed in contact with the first and second sides of the optical fiber array.

27. The fiber connector according to claim 17, wherein the first and second guide tubes of the fiber connector ferrule are attached to the second surface of the fiber support substrate, and further comprising a cover having V-grooves, wherein the cover is disposed on the first surface of the fiber support substrate such that the V-grooves engage the plurality of optical fibers.

28. The fiber connector according to claim 17, further comprising:

a spring-retaining member having a front end and a back end and disposed on the first surface of the fiber support substrate adjacent the back end of the glass substrate of the fiber connector ferrule, with the back end including at least a first spring-retaining feature;

a spring base member having a front end and a back end and disposed with its front end adjacent the back end of the spring-retaining member and the back end of the fiber support substrate, with the front end of the spring base member including at least one second spring-retaining feature that confronts the at least one first spring-retaining feature;

at least one spring operably supported by the at least one first and at least one second spring-retaining features; and a connector housing that encloses the fiber connector ferrule, the spring-retaining member and the spring base member, with the spring base member secured to the connector housing so that the at least one spring provides an axial force against the back end of the spring-retaining member.

29. The fiber connector according to claim 28, wherein the spring-retaining member includes spaced-apart guide pins that extend from the front end of the spring-retaining member and that extend beyond the front end of the fiber support substrate.

30. The fiber connector according to claim 17 having first alignment features and further comprising:

a waveguide connector having a plurality of waveguides with end faces and also comprising a waveguide connector ferrule with second alignment features and that operably engages the fiber connector ferrule via cooperation of the first and second alignment features so that the plurality of optical fibers are in optical communication with the plurality of waveguides.

31. The fiber connector according to claim 30, wherein the first alignment features comprise the bores of the first and second guide tubes of the waveguide connector ferrule and the second alignment features comprise first and second guide pins supported by the fiber connector ferrule.

32. The fiber connector according to claim 30, further comprising a retention apparatus having a first retention component on the waveguide connector and second retention component on the fiber connector, wherein the first and second retention components are configured to cooperate for retaining the operable engagement of waveguide connector and fiber connector.

33. The fiber connector according to claim 30, wherein one of the first and second retention components comprises a spring-loaded plunger and the other of the first and second retention features comprises a receiving tube having an end and configured to receive an end of the spring-loaded plunger, wherein the end of the spring-loaded plunger can be locked and unlocked at the end of the receiving tube by rotation of the spring-loaded plunger.

34. The fiber connector according to claim 30, wherein one of the first and second retention components comprises a spring-loaded plunger and the other of the first and second retention features comprises a flexible receiving latch having configured to receive an end of the spring-loaded plunger, wherein the end of the spring-loaded plunger can be locked and unlocked from the receiving latch.

35. The fiber connector according to claim 30, further comprising an attachment fixture attached to the waveguide connector and that attaches to a connector housing of the fiber connector to retain the fiber connector in operable engagement with the waveguide connector.

* * * * *